(12) United States Patent
Sabanovic et al.

(10) Patent No.: US 12,538,960 B2
(45) Date of Patent: Feb. 3, 2026

(54) FOOT SUPPORT SYSTEMS INCLUDING FLUID MOVEMENT CONTROLLERS AND ADJUSTABLE FOOT SUPPORT PRESSURE

(71) Applicant: NIKE, Inc., Beaverton, OR (US)

(72) Inventors: Mirza Sabanovic, Tigard, OR (US); Brian Peavey, Vancouver, WA (US)

(73) Assignee: NIKE, Inc., Beaverton, OR (US)

( * ) Notice: Subject to any disclaimer, the term of this patent is extended or adjusted under 35 U.S.C. 154(b) by 542 days.

(21) Appl. No.: 17/333,974

(22) Filed: May 28, 2021

(65) Prior Publication Data

US 2021/0368936 A1 Dec. 2, 2021

Related U.S. Application Data

(60) Provisional application No. 63/031,460, filed on May 28, 2020, provisional application No. 63/031,433, (Continued)

(51) Int. Cl.
*A43B 13/20* (2006.01)
*A43B 3/34* (2022.01)
(Continued)

(52) U.S. Cl.
CPC .............. *A43B 13/203* (2013.01); *A43B 3/34* (2022.01); *A43B 13/186* (2013.01); *A43B 13/206* (2013.01); *F04B 43/08* (2013.01); *F04B 43/113* (2013.01); *F16K 11/02* (2013.01); *F16K 27/065* (2013.01); *F16K 11/0856* (2013.01)

(58) Field of Classification Search
CPC .... A43B 3/34; A43B 3/44; A43B 3/42; A43B 13/206; A43B 13/203; A43B 13/186
See application file for complete search history.

(56) References Cited

U.S. PATENT DOCUMENTS

| | | |
|---|---|---|
| 5,813,142 A | 9/1998 | Demon |
| 2007/0000154 A1 | 1/2007 | DiBenedetto et al. |

(Continued)

FOREIGN PATENT DOCUMENTS

| | | |
|---|---|---|
| JP | 2015051065 A | 3/2015 |
| JP | 2018201610 A | 12/2018 |

(Continued)

OTHER PUBLICATIONS

Sep. 14, 2021—(WO) ISR & WO—App. No. PCT/US21/034812.

*Primary Examiner* — Katharine G Kane
(74) *Attorney, Agent, or Firm* — Banner & Witcoff, Ltd.

(57) ABSTRACT

Foot support systems include a fluid flow control system that facilitates movement of fluid into, out of, and/or within a sole structure and/or article of footwear, e.g., to change and/or control pressure in fluid filled bladder(s). Aspects of this technology may relate to one or more of: (a) footwear structures in which such systems are incorporated; (b) valve stem based fluid flow transfer systems; (c) solenoid based fluid flow transfer systems; (d) user input button features; (e) air filter features; (f) fluid tube to fluid distributor connection features; (g) fluid distributor to footwear connection features; (h) valve position sensor features; (i) valve transmission features; (j) pressure control algorithm features; (k) electronic communication features; (l) system sealing features; and/or (m) pressure sensor mounting features.

19 Claims, 76 Drawing Sheets

Related U.S. Application Data filed on May 28, 2020, provisional application No. 63/031,451, filed on May 28, 2020, provisional application No. 63/031,395, filed on May 28, 2020, provisional application No. 63/031,482, filed on May 28, 2020, provisional application No. 63/031,455, filed on May 28, 2020, provisional application No. 63/031,468, filed on May 28, 2020, provisional application No. 63/031,423, filed on May 28, 2020, provisional application No. 63/031,441, filed on May 28, 2020, provisional application No. 63/031,444, filed on May 28, 2020, provisional application No. 63/031,429, filed on May 28, 2020, provisional application No. 63/031,471, filed on May 28, 2020, provisional application No. 63/031,413, filed on May 28, 2020.

(51) Int. Cl.

| | | |
|---|---|---|
| *A43B 13/18* | (2006.01) | |
| *F04B 43/08* | (2006.01) | |
| *F04B 43/113* | (2006.01) | |
| *F16K 11/02* | (2006.01) | |
| *F16K 27/06* | (2006.01) | |
| *F16K 11/085* | (2006.01) | |

(56) References Cited

U.S. PATENT DOCUMENTS

| | | |
|---|---|---|
| 2007/0006489 A1 | 1/2007 | Case et al. |
| 2014/0165427 A1* | 6/2014 | Molyneux ............... A43B 7/14 36/102 |
| 2014/0222173 A1 | 8/2014 | Giedwoyn et al. |
| 2014/0277632 A1* | 9/2014 | Walker ................. A43B 13/14 324/109 |
| 2015/0257482 A1 | 9/2015 | Molyneux et al. |
| 2016/0262485 A1* | 9/2016 | Walker ................. A61B 5/6807 |
| 2017/0087411 A1 | 3/2017 | Bender et al. |
| 2017/0178471 A1* | 6/2017 | Levesque ............... A41D 1/002 |
| 2017/0296096 A1* | 10/2017 | Taylor ................. A61B 5/4854 |
| 2021/0145318 A1* | 5/2021 | Oumnia ............... A61B 5/1036 |
| 2021/0244128 A1* | 8/2021 | Costa ................. A43B 13/203 |
| 2023/0157410 A1* | 5/2023 | Ryabinin ............ A43B 13/206 36/29 |

FOREIGN PATENT DOCUMENTS

| | | |
|---|---|---|
| TW | M562025 U | 6/2018 |
| TW | M562028 U | 6/2018 |
| WO | 2017190049 A1 | 11/2017 |

\* cited by examiner

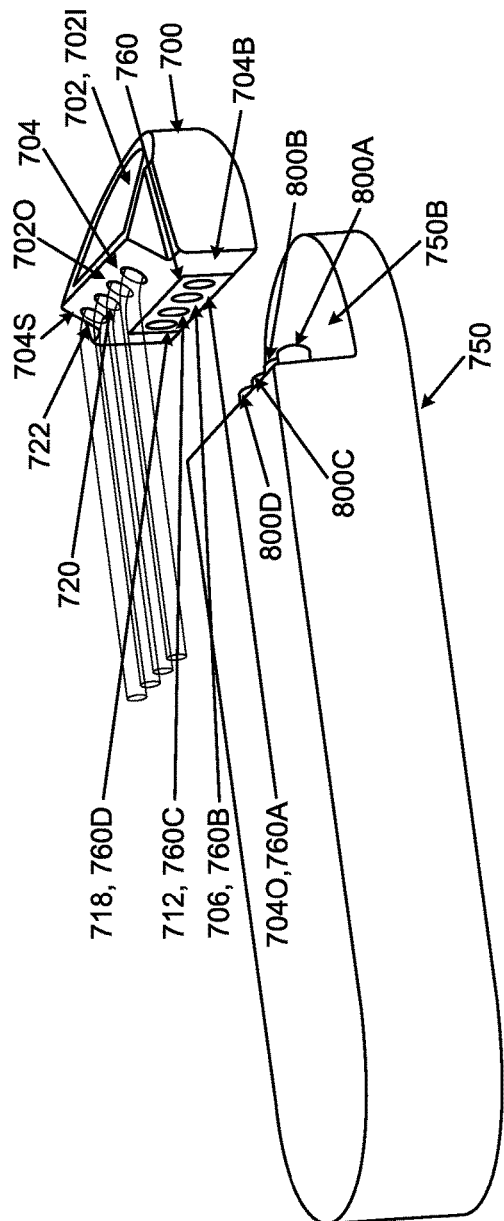
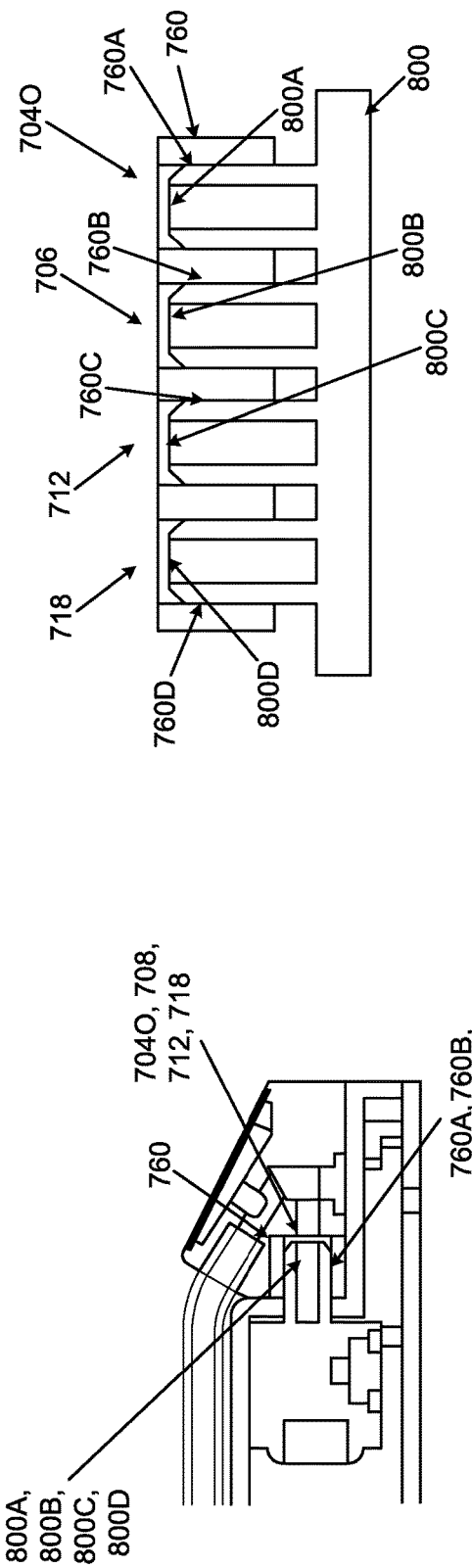

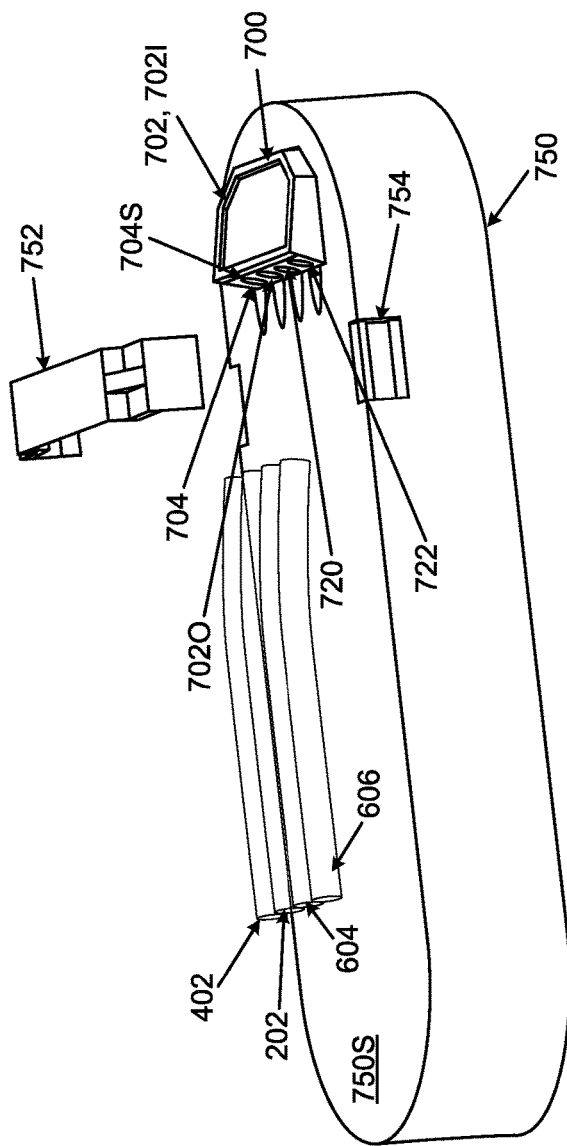
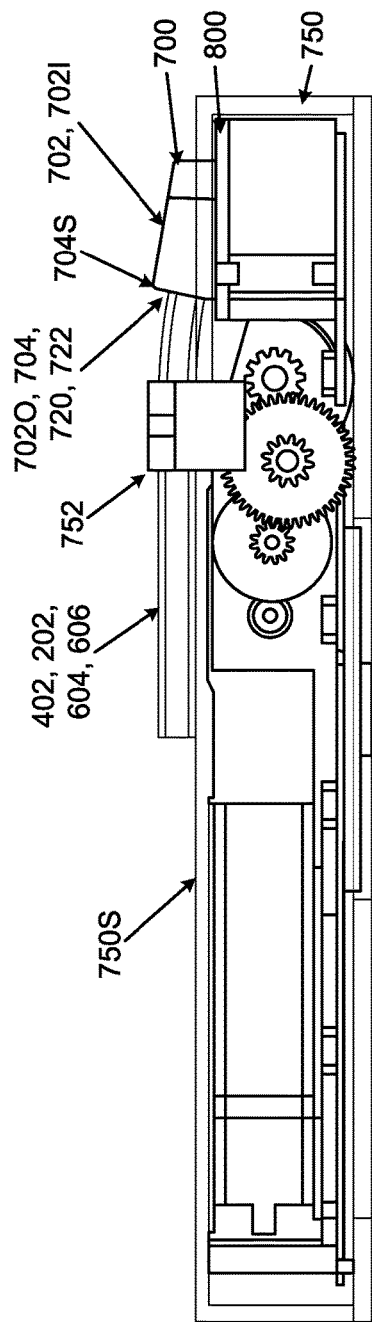
FIG. 13B
FIG. 13C

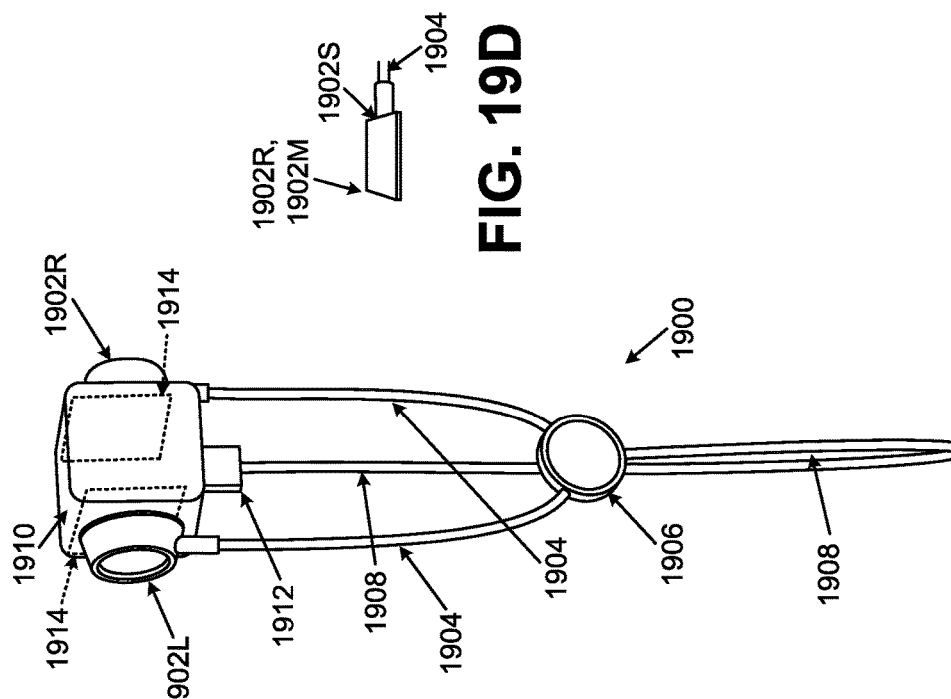
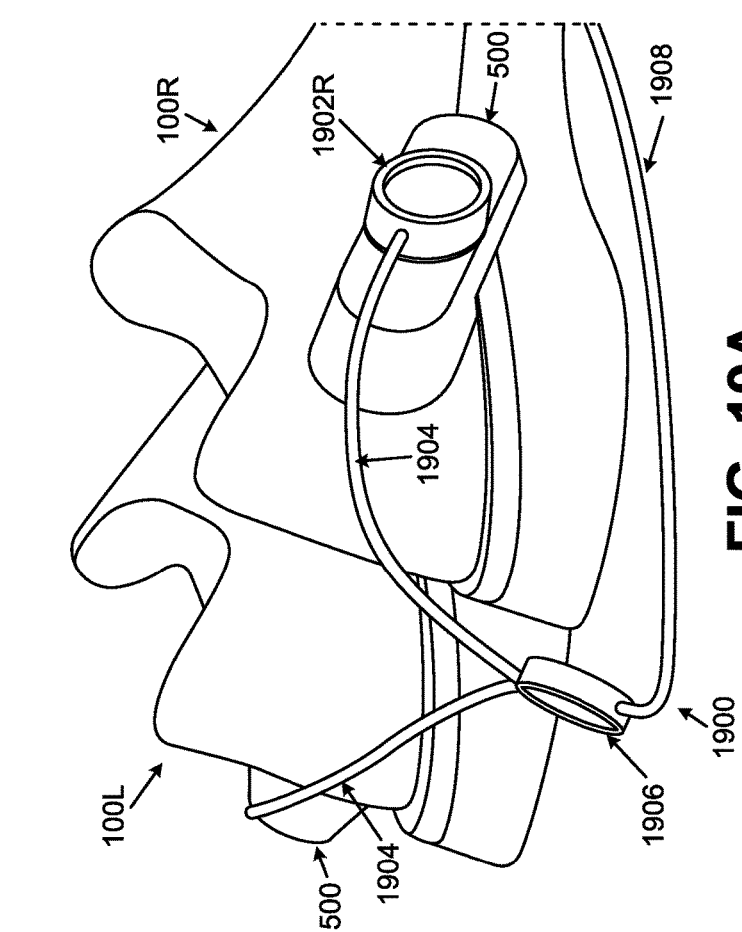
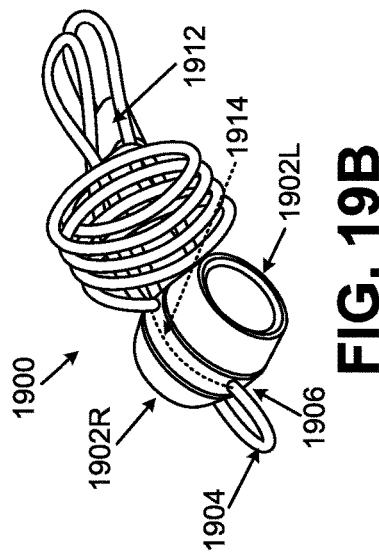
FIG. 19A
FIG. 19B
FIG. 19C
FIG. 19D

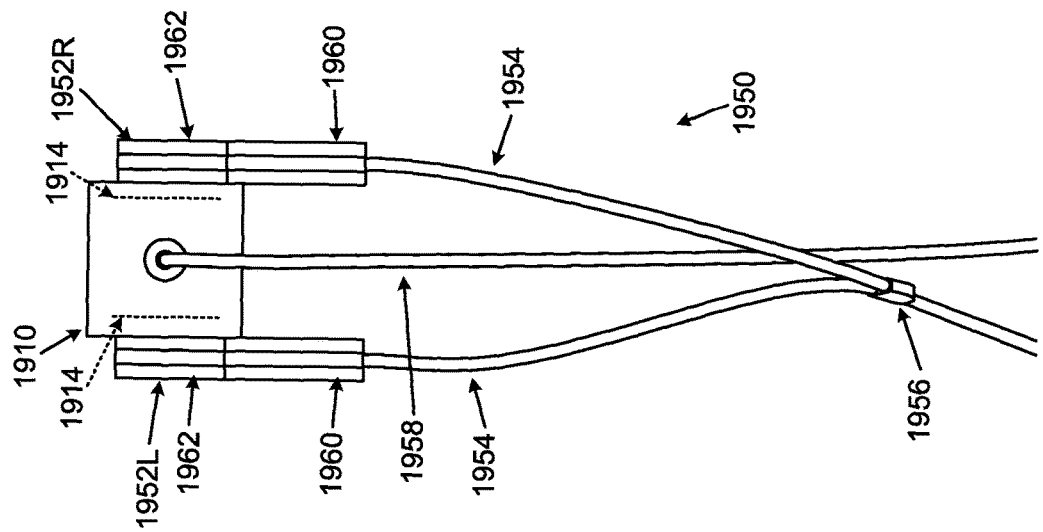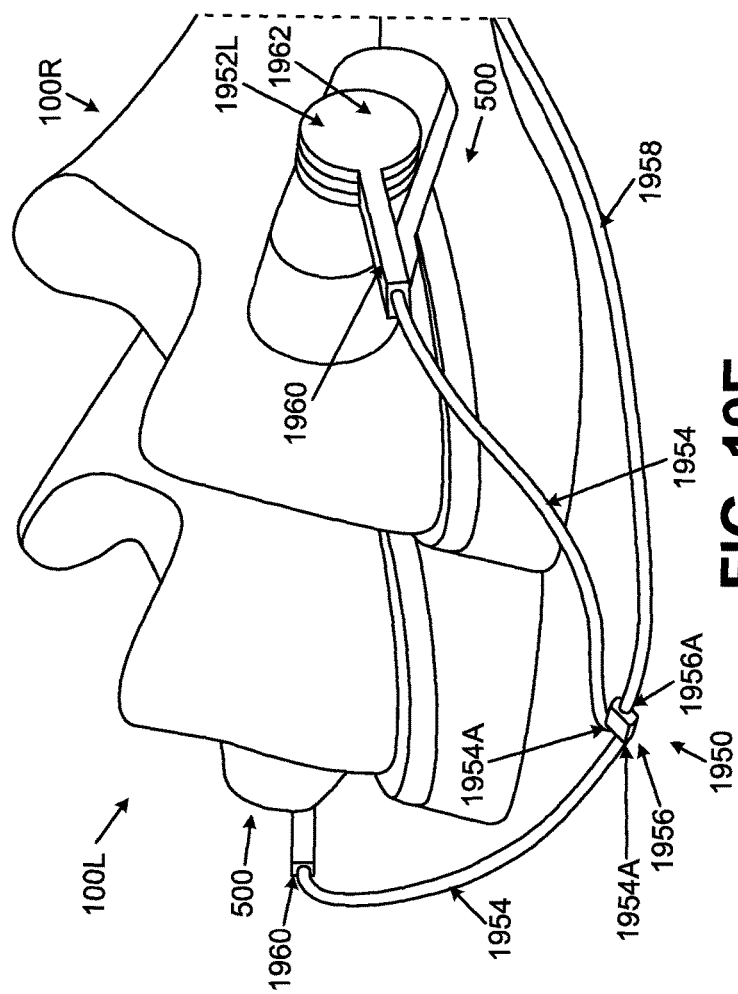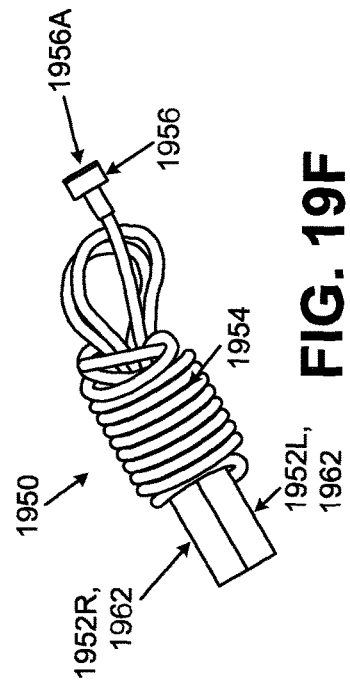

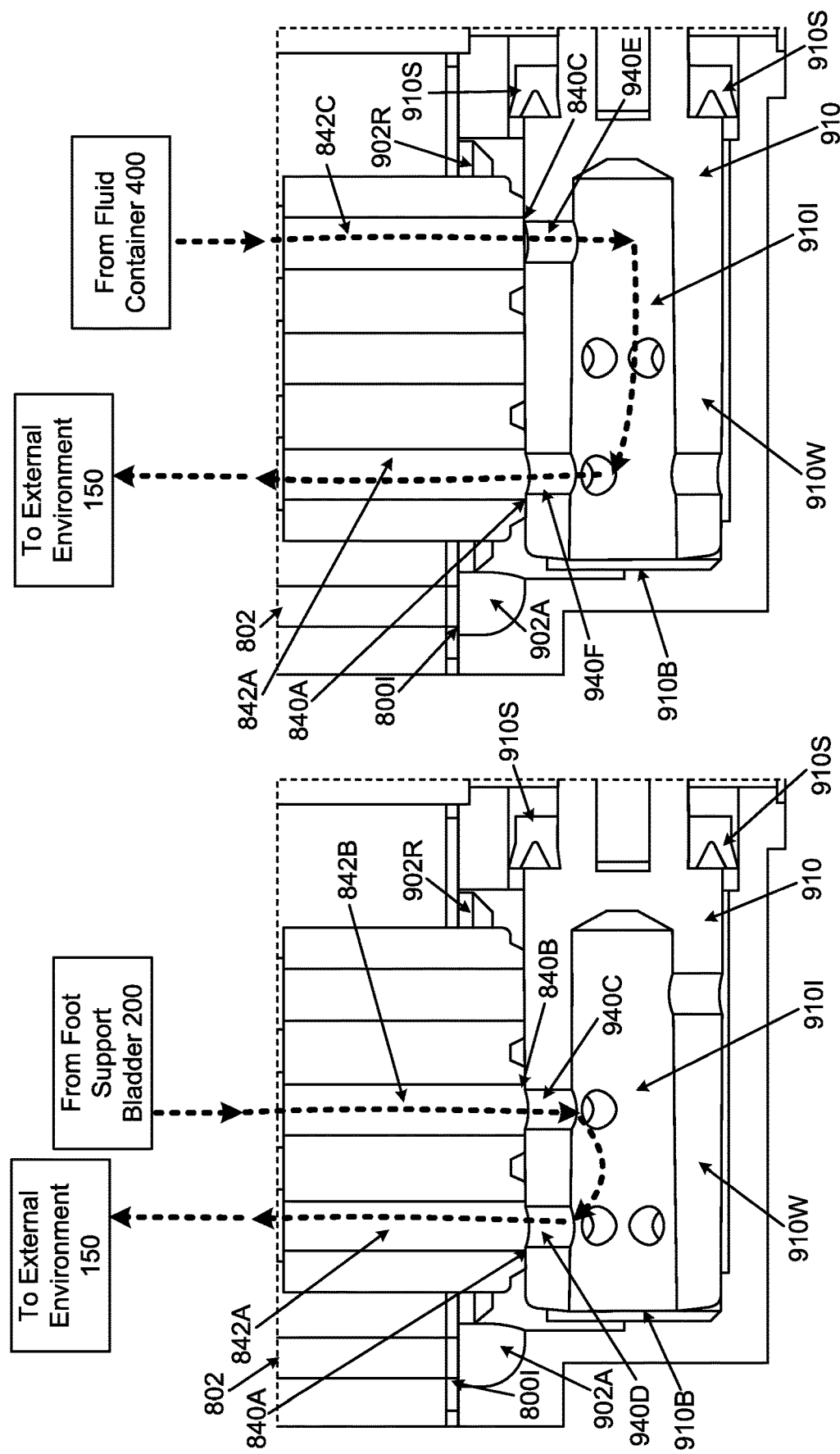

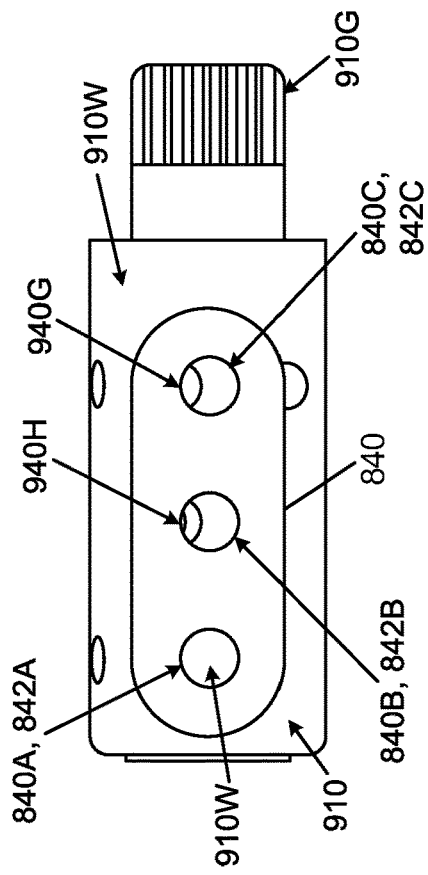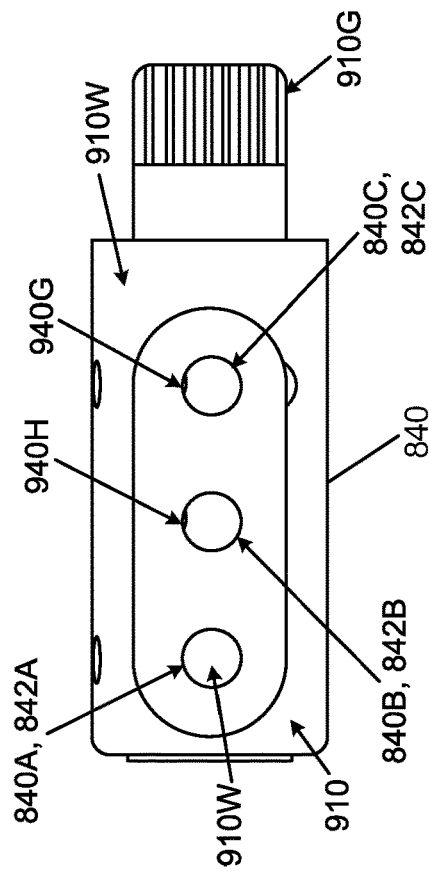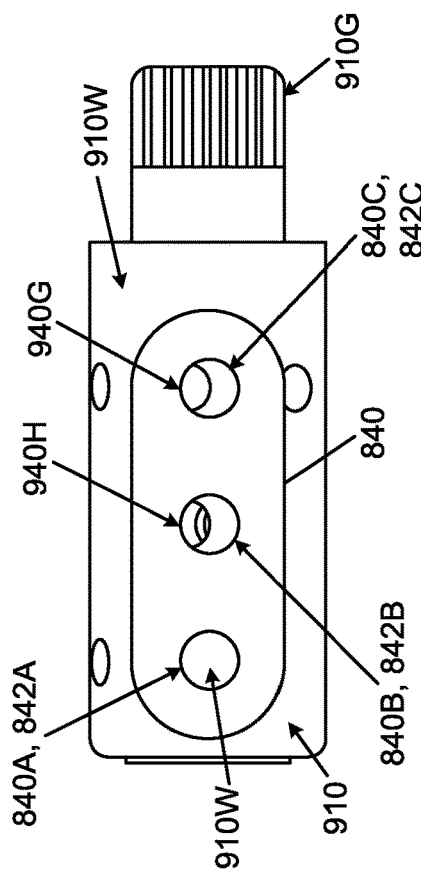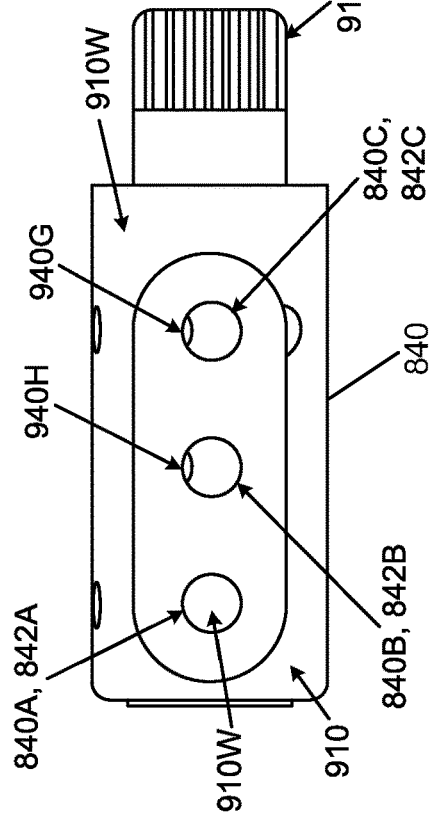

FOOT SUPPORT SYSTEMS INCLUDING FLUID MOVEMENT CONTROLLERS AND ADJUSTABLE FOOT SUPPORT PRESSURE

RELATED APPLICATION DATA

This application is a U.S. Non-Provisional application and claims priority benefits based on:
(a) U.S. Provisional Patent Appln. No. 63/031,395 filed May 28, 2020 and entitled "Foot Support Systems Including Fluid Movement Controllers and Adjustable Foot Support Pressure;
(b) U.S. Provisional Patent Appln. No. 63/031,413 filed May 28, 2020 and entitled "Foot Support Systems Including Fluid Movement Controllers and Adjustable Foot Support Pressure;
(c) U.S. Provisional Patent Appln. No. 63/031,433 filed May 28, 2020 and entitled "Foot Support Systems Including Fluid Movement Controllers and Adjustable Foot Support Pressure;
(d) U.S. Provisional Patent Appln. No. 63/031,444 filed May 28, 2020 and entitled "Foot Support Systems Including Fluid Movement Controllers and Adjustable Foot Support Pressure;
(e) U.S. Provisional Patent Appln. No. 63/031,455 filed May 28, 2020 and entitled "Foot Support Systems Including Fluid Movement Controllers and Adjustable Foot Support Pressure;
(f) U.S. Provisional Patent Appln. No. 63/031,468 filed May 28, 2020 and entitled "Foot Support Systems Including Fluid Movement Controllers and Adjustable Foot Support Pressure;
(g) U.S. Provisional Patent Appln. No. 63/031,482 filed May 28, 2020 and entitled "Foot Support Systems Including Fluid Movement Controllers and Adjustable Foot Support Pressure;
(h) U.S. Provisional Patent Appln. No. 63/031,423 filed May 28, 2020 and entitled "Foot Support Systems Including Fluid Movement Controllers and Adjustable Foot Support Pressure;
(i) U.S. Provisional Patent Appln. No. 63/031,429 filed May 28, 2020 and entitled "Foot Support Systems Including Fluid Movement Controllers and Adjustable Foot Support Pressure;
(j) U.S. Provisional Patent Appln. No. 63/031,441 filed May 28, 2020 and entitled "Foot Support Systems Including Fluid Movement Controllers and Adjustable Foot Support Pressure;
(k) U.S. Provisional Patent Appln. No. 63/031,451 filed May 28, 2020 and entitled "Foot Support Systems Including Fluid Movement Controllers and Adjustable Foot Support Pressure;
(l) U.S. Provisional Patent Appln. No. 63/031,460 filed May 28, 2020 and entitled "Foot Support Systems Including Fluid Movement Controllers and Adjustable Foot Support Pressure; and
(m) U.S. Provisional Patent Appln. No. 63/031,471 filed May 28, 2020 and entitled "Foot Support Systems Including Fluid Movement Controllers and Adjustable Foot Support Pressure.

Each of U.S. Provisional Patent Appln. Nos. 63/031,395, 63/031,413, 63/031,433, 63/031,444, 63/031,455, 63/031,468, 63/031,482, 63/031,423, 63/031,429, 63/031,441, 63/031,451, 63/031,460, and 63/031,471 is entirely incorporated herein by reference.

Aspects and features of this technology may be used in conjunction with the systems and methods described in any one or more of:
(a) U.S. Provisional Patent Appln. No. 62/463,859 filed Feb. 27, 2017;
(b) U.S. Provisional Patent Appln. No. 62/463,892 filed Feb. 27, 2017;
(c) U.S. Provisional Patent Appln. No. 62/547,941 filed Aug. 21, 2017;
(d) U.S. Provisional Patent Appln. No. 62/678,635 filed May 31, 2018;
(e) U.S. Provisional Patent Appln. No. 62/678,662 filed May 31, 2018;
(f) U.S. Provisional Patent Appln. No. 62/772,786 filed Nov. 29, 2018;
(g) U.S. Provisional Patent Appln. No. 62/850,140 filed May 20, 2019;
(h) U.S. patent application Ser. No. 16/488,623 filed Aug. 26, 2019;
(i) U.S. patent application Ser. No. 16/488,626 filed Aug. 26, 2019;
(j) U.S. patent application Ser. No. 16/105,170 filed Aug. 20, 2018;
(k) U.S. patent application Ser. No. 16/425,331 filed May 29, 2019;
(l) U.S. patent application Ser. No. 16/425,356 filed May 29, 2018;
(m) U.S. patent application Ser. No. 16/698,138 filed Nov. 27, 2019; and
(n) U.S. patent application Ser. No. 16/878,342 filed May 19, 2020.

Each of U.S. Provisional Patent Appln. No. 62/463,859, U.S. Provisional Patent Appln. No. 62/463,892, U.S. Provisional Patent Appln. No. 62/547,941, U.S. Provisional Patent Appln. No. 62/678,635, U.S. Provisional Patent Appln. No. 62/678,662, U.S. Provisional Patent Appln. No. 62/772,786, U.S. Provisional Patent Appln. No. 62/850,140, U.S. patent application Ser. No. 16/488,623, U.S. patent application Ser. No. 16/488,626, U.S. patent application Ser. No. 16/105,170, U.S. patent application Ser. No. 16/425,331, U.S. patent application Ser. No. 16/425,356, U.S. patent application Ser. No. 16/698,138, and U.S. patent application Ser. No. 16/878,342 is entirely incorporated herein by reference.

FIELD OF THE INVENTION

The present invention relates to fluid flow control systems and/or foot support systems in the field of footwear or other foot-receiving devices. At least some aspects of the present invention pertain to fluid distributors, fluid transfer systems, sole structures, fluid flow control systems, foot support systems, articles of footwear, and/or other foot-receiving devices that include components (e.g., a manifold, a fluid transfer system, an electronic controller, etc.) for selectively moving fluid within, into, and/or out of the sole structure (or other foot-supporting member) and/or article of footwear (or other foot-receiving device). Using such systems, fluid pressure (e.g., foot support pressure, fluid container pressure) in one or more fluid filled bladders (e.g., foot support bladder(s)) and/or one or more fluid reservoirs and/or containers included in the overall system may be changed and controlled.

BACKGROUND

Conventional articles of athletic footwear include two primary elements, an upper and a sole structure. The upper may provide a covering for the foot that securely receives and positions the foot with respect to the sole structure. In addition, the upper may have a configuration that protects the foot and provides ventilation, thereby cooling the foot and removing perspiration. The sole structure may be secured to a lower surface of the upper and generally is positioned between the foot and any contact surface. In addition to attenuating ground reaction forces and absorbing energy, the sole structure may provide traction and control potentially harmful foot motion, such as over pronation.

The upper forms a void on the interior of the footwear for receiving the foot. The void has the general shape of the foot, and access to the void is provided at an ankle opening. Accordingly, the upper extends over the instep and toe areas of the foot, along the medial and lateral sides of the foot, and around the heel area of the foot. A lacing system often is incorporated into the upper to allow users to selectively change the size of the ankle opening and to permit the user to modify certain dimensions of the upper, particularly girth, to accommodate feet with varying proportions. In addition, the upper may include a tongue that extends under the lacing system to enhance the comfort of the footwear (e.g., to modulate pressure applied to the foot by the laces). The upper also may include a heel counter to limit or control movement of the heel.

"Footwear," as that term is used herein, means any type of wearing apparel for the feet, and this term includes, but is not limited to: all types of shoes, boots, sneakers, sandals, thongs, flip-flops, mules, scuffs, slippers, sport-specific shoes (such as golf shoes, tennis shoes, baseball cleats, soccer or football cleats, ski boots, basketball shoes, cross training shoes, etc.), and the like. "Foot-receiving device," as that term is used herein, means any device into which a user places at least some portion of his or her foot. In addition to all types of "footwear," foot-receiving devices include, but are not limited to: bindings and other devices for securing feet in snow skis, cross country skis, water skis, snowboards, and the like; bindings, clips, or other devices for securing feet in pedals for use with bicycles, exercise equipment, and the like; bindings, clips, or other devices for receiving feet during play of video games or other games; and the like. "Foot-receiving devices" may include: (a) one or more "foot-covering members" (e.g., akin to footwear upper components) that help position the foot with respect to other components or structures, and (b) one or more "foot-supporting members" (e.g., akin to footwear sole structure components) that support at least some portion(s) of a plantar surface of a user's foot. "Foot-supporting members" may include components for and/or functioning as midsoles and/or outsoles for articles of footwear (or components providing corresponding functions in non-footwear type foot-receiving devices).

A "manifold" as used herein means a component having a surface or housing that defines or supports one or more ports that allow a fluid (e.g., gas or liquid) to enter and/or exit the component. A "port" as used herein means an opening through a wall of a component that allows fluid (e.g., gas or liquid) to pass through from one side of the opening to the other. Optionally, a "port" may include a connector structure, e.g., for engaging another object, such as a fluid line, another connector, or the like. When including a connector structure, a "port" may form, for example, a male connector structure, a female connector structure, or an abutting surface connecting structure. Object(s) connected to a "port" may be fixedly connected or releasably connected. Additionally or alternatively, object(s) connected to a port may be fixed to or releasably connected to interior surfaces of the opening through the wall of the component through which the opening is defined.

BRIEF DESCRIPTION OF THE DRAWINGS

The following Detailed Description will be better understood when considered in conjunction with the accompanying drawings in which like reference numerals refer to the same or similar elements in all of the various views in which that reference number appears.

FIGS. 11A-15G illustrate features of engaging fluid distributors with articles of footwear in accordance with some examples of this technology;

FIGS. 16A-21D illustrate features of battery charging systems that may be used in accordance with some examples of this technology;

FIGS. 30A-30G provide views of different operational states for valve stem based fluid transfer systems in accordance with some examples of this technology;

FIGS. 31A-31D provide views illustrating control of fluid flow rates in accordance with some examples of this technology;

DETAILED DESCRIPTION

Figure 1:
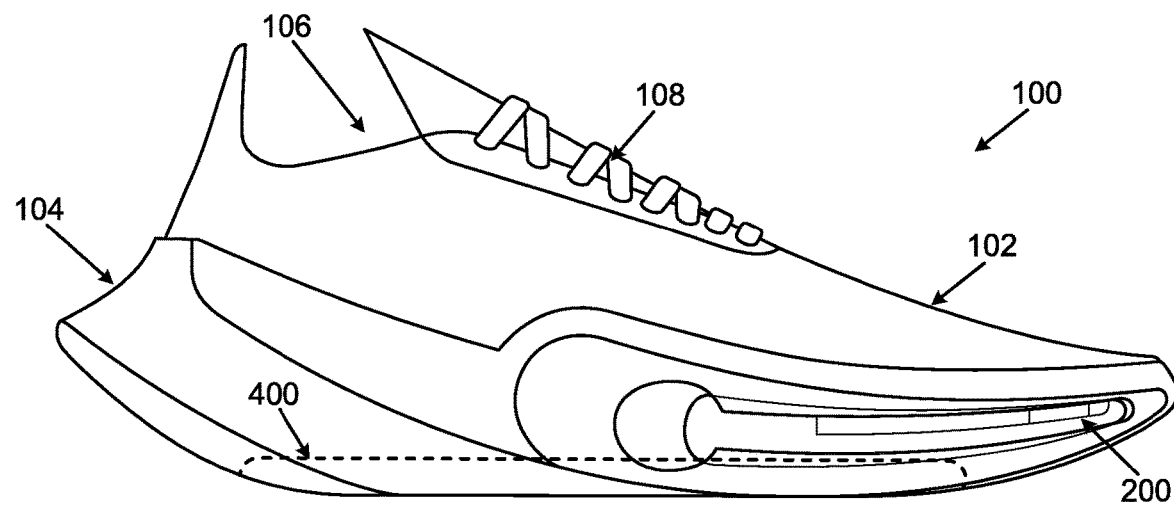
FIGS. 1-2B provide views of articles of footwear and components thereof in accordance with some examples of this technology.

In the following description of various examples of fluid flow control systems, footwear structures, and components according to the present technology, reference is made to the accompanying drawings, which form a part hereof, and in which are shown by way of illustration various example structures and environments in which aspects of the technology may be practiced. It is to be understood that other structures and environments may be utilized and that structural and functional modifications may be made to the specifically described structures, functions, and methods without departing from the scope of the present technology.

I. GENERAL DESCRIPTION OF ASPECTS OF THIS TECHNOLOGY AND THIS INVENTION

Aspects of this technology relate to fluid distributors, fluid flow control systems, foot support systems, sole structures, articles of footwear, and/or other foot-receiving devices, e.g., of the types described and/or claimed below and/or of the types illustrated in the appended drawings. Such fluid distributors, fluid flow control systems, foot support systems, sole structures, articles of footwear, and/or other foot-receiving devices may include any one or more structures, parts, features, properties, and/or combination(s) of structures, parts, features, and/or properties of the examples described and/or claimed below and/or of the examples illustrated in the appended drawings.

The following description is broken into three main parts. A first part describes aspects and features of footwear and/or foot-receiving device components, foot-receiving devices, and/or articles of footwear that include components to selectively move fluid within and/or through a fluid distributor to control and change foot support pressure of a foot support system that includes at least one fluid filled bladder. The fluid distributor is capable of placing the fluid flow control system, the foot support system, and/or the article of footwear in a plurality of different operational states. Another main part of this description relates to fluid transfer systems within the fluid distributor that include a movable valve stem to place the fluid flow control system, the foot support system, and/or the article of footwear in different operational states. Another main part of this description relates to fluid transfer systems within the fluid distributor that include one or more solenoid valves to place the fluid flow control system, the foot support system, and/or the article of footwear in different operational states. Various other aspects and features of this technology are described within those main parts.

A. Footwear Component and Articles of Footwear Features

Some aspects of this technology and this invention relate to foot support systems as well as to sole structures and/or articles of footwear (and/or other foot-receiving devices) that include such foot support systems. Foot support systems in accordance with at least some examples of this technology include: (a) at least one foot support bladder; (b) a first sole member (e.g., a midsole component, a polymeric foam component, an outsole component, etc.) engaged with the foot support bladder, wherein the first sole member includes a plantar support surface at least at a heel support area of the foot support system and a sidewall forming an exterior surface of the first sole member; (c) at least one fluid container (e.g., a fluid-filled bladder, a tank, a reservoir, etc.), optionally engaged with a portion of a footwear upper and/or with a footwear sole structure; and (d) a fluid distributor engaged with the exterior surface of the upper and/or the first sole member. This fluid distributor includes one or more of: (i) an inlet for receiving fluid from a fluid supply, (ii) a first fluid pathway for transferring fluid from the fluid distributor interior to the external environment, (iii) a second fluid pathway in fluid communication with the foot support bladder, and (iv) a third fluid pathway in fluid communication with the fluid container. The fluid distributor may take on the form of or include a manifold, a valve housing, a connector, and/or combinations of two or more of these components. The fluid supply may be one or more of: a pump (e.g., one or more foot activated pumps, one or more battery powered pumps, etc.), a compressor, and/or a fluid supply line in fluid communication with the external environment.

Additional aspects and features of foot support systems, sole structures containing them, and/or articles of footwear (or other foot-receiving devices) containing them are described in more detail below.

B. Valve Stem Features

Some aspects of this technology and this invention relate to fluid transfer systems and/or fluid flow control systems for foot support systems and/or articles of footwear (and/or other foot-receiving devices) that include a movable valve stem for selectively opening and closing fluid pathways and distributing fluid. Such fluid transfer systems and/or fluid flow control systems, as well as foot support systems and/or articles of footwear (and/or other foot-receiving devices) in accordance with at least some examples of this technology include: (a) a valve housing; (b) a valve stem movably mounted in the valve housing, wherein the valve stem includes a first end, a second end, and a perimeter wall extending between the first end and the second end, wherein the first end, the second end, and the perimeter wall define an internal chamber of the valve stem, and wherein the perimeter wall of the valve stem includes a plurality of through holes extending from the internal chamber to an exterior surface of the perimeter wall; (c) a fluid inlet port in fluid communication with the internal chamber; and (d) a manifold in fluid communication with the valve housing. The manifold may include a first fluid flow path that extends through the manifold to a first manifold port, a second fluid flow path that extends through the manifold to a second manifold port, and a third fluid flow path that extends through the manifold to a third manifold port. Movement of the valve stem (e.g., by rotation, sliding, etc.) to a plurality of positions selectively places the fluid transfer system and/or fluid flow control system in a plurality of operational states by placing one or more of the plurality of through holes (formed in the perimeter wall) in fluid communication with the first fluid flow path, the second fluid flow path, or the third fluid flow path. Additional valve stem openings, manifold ports, fluid lines, and/or operational states may be provided, if desired, to accommodate additional foot support bladders and/or fluid containers.

Additional aspects and features of valve stem based fluid transfer systems, fluid flow control systems, foot support systems, sole structures containing them, and/or articles of footwear (or other foot-receiving devices) containing them are described in more detail below.

C. Solenoid Features

Some aspects of this technology and this invention relate to fluid transfer systems and/or fluid flow control systems for foot support systems and/or articles of footwear (and/or other foot-receiving devices) that include one or more solenoids for selectively opening and closing fluid pathways and distributing fluid. Such fluid transfer systems and/or fluid flow control systems, as well as foot support systems and/or articles of footwear (and/or other foot-receiving devices) in accordance with at least some examples of this technology include: (a) a first solenoid including a first port and a second port and switchable between an open configuration and a closed configuration; (b) a second solenoid including a first port and a second port and switchable between an open configuration and a closed configuration; (c) a third solenoid including a first port and a second port and switchable between an open configuration and a closed configuration; (d) a fluid line in fluid communication with the first port of each of the first solenoid, the second solenoid, and the third solenoid; and (e) a manifold having: (i) a first manifold port in fluid communication with the second port of the first solenoid, (ii) a second manifold port in fluid communication with the second port of the second solenoid, and (iii) a third manifold port in fluid communication with the second port of the third solenoid. The first solenoid, the second solenoid, and the third solenoid are independently switchable between their open configuration and their closed configuration to selectively place the fluid transfer system or fluid flow control system in a plurality of operational states. Additional solenoids, manifold ports, fluid lines, and/or operational states may be provided, if desired, to accommodate additional foot support bladders and/or fluid containers.

Other example fluid transfer systems and/or fluid flow control systems, as well as foot support systems and/or articles of footwear (and/or other foot-receiving devices) in accordance with at least some examples of this technology and this invention include: (a) a first solenoid including a first port, a second port, and a third port; (b) a second solenoid including a first port and a second port; and (c) a fluid line in fluid communication with the first port of each of the first solenoid and the second solenoid. A manifold may be included in fluid communication with the solenoids. This manifold may include: (a) a first manifold port in fluid communication with the second port of the first solenoid, (b) a second manifold port in fluid communication with the third port of the first solenoid, and (c) a third manifold port in fluid communication with the second port of the second solenoid. The first solenoid may be independently switchable to: (a) a first configuration in which fluid flows through the first solenoid between the first port and the second port and (b) a second configuration in which fluid flows through the first solenoid between the first port and the third port. The second solenoid may be independently switchable between an open configuration and a closed configuration. Simultaneous selective placement of: (a) the first solenoid in one of the first configuration or the second configuration and (b) the second solenoid in one of the open configuration or the closed configuration selectively places the fluid flow control system in a plurality of operational states. Additional solenoids, manifold ports, fluid lines, and/or operational states may be provided, if desired, to accommodate additional foot support bladders and/or fluid containers.

Additional aspects and features of solenoid based fluid transfer systems, fluid flow control systems, foot support systems, sole structures containing them, and/or articles of footwear (or other foot-receiving devices) containing them are described in more detail below.

D. Operational State Features

Some aspects of this technology and this invention relate to fluid transfer systems, fluid flow control systems, foot support systems, and/or articles of footwear (or other foot-receiving devices) that may be selectively placed in a plurality of operational states in which movement and distribution of fluid is controlled. In at least some examples of this technology, the plurality of operational states may include two or more of (in any combination): (a) a first operational state in which fluid moves from a fluid source (e.g., a pump, a compressor, etc.) to the ambient or external environment (e.g., this may be a "steady state" or "standby" configuration in which no foot support pressure changes occur), (b) a second operational state in which fluid moves from a fluid source to a foot support bladder (to increase pressure in the foot support bladder), (c) a third operational state in which fluid moves from a foot support bladder to the ambient or external environment (to decrease pressure in the foot support bladder), (d) a fourth operational state in which fluid moves from a fluid container to the ambient or external environment (to decrease pressure in the fluid container), (e) a fifth operational state in which fluid moves from the fluid container to the foot support bladder (to increase pressure in the foot support bladder), and/or (f) a sixth operational state in which fluid moves from the fluid source to the fluid container (to increase pressure in the fluid container). Some examples of this technology may include all six of these operational states identified above. Other examples of this technology may include less than all six of these operational states, e.g., the first, third, fourth, and six operational states. For valve stem examples of this technology, fluid may be distributed into two or more of these different operational states by selectively moving (e.g., rotating, sliding, etc.) the valve stem to various positions (e.g., rotational positions, longitudinal positions, etc.) so that through holes in the valve stem selectively align with fluid paths and ports to move the fluid in the desired manners described above. For solenoid examples of this technology, fluid may be distributed into these two or more different operational states by selectively placing the various solenoids in their available configurations so that the fluid moves to fluid paths and ports in the desired manners described above.

Additional aspects and features of placing fluid transfer systems, fluid flow control systems, foot support systems, sole structures containing them, and/or articles of footwear (or other foot-receiving devices) containing them into various operational states are described in more detail below.

E. Additional or Alternative Features

Additional or alternative features and aspects of this technology and this invention relate to additional structures, components, and operation of the fluid transfer systems, fluid flow control systems, foot support systems, sole structures, and/or articles of footwear described herein and illustrated in the appended figures. Such additional or alternative features and aspects of this technology and this invention relate to one or more of: (a) user input buttons included with the shoe, e.g., to enter pressure change information and/or provide status information relating to the system(s); (b) external air inlet and/or filtering features for accepting air into the system(s); (c) connections between the ports of various components, such as connector to manifold connections, fluid line to connector and/or manifold connections, etc.; (d) fluid distributor to footwear connection features; (e) valve stem position sensor features; (f) transmission features for transmitting power from a motor to the valve stem; (g) pressure control algorithm features; (h) shoe-to-shoe and/or other system electronic communication features; (i) system sealing features, such as one or more of manifold-to-valve housing, manifold-to-solenoid, and/or manifold-to-connector sealing features; and/or (j) features relating to pressure sensor mounting and engagement with the manifold and/or sealing connector.

Some additional or alternative aspects of this technology relate to button assemblies, such as buttons for receiving user input, e.g., changing pressure settings in one or more fluid containing components in the system. One such aspect relates to button assemblies that include: (a) a first button actuator; and (b) an elastomer overmold material covering an actuator surface of the first button actuator. This elastomer overmold material may include: (a) a first base portion having a first thickness and (b) a first groove portion (e.g., U-shaped) adjacent the first button actuator, wherein the first groove portion has a second thickness, wherein the second thickness is less than the first thickness, and wherein the first base portion and the first groove portion are formed as a continuous layer of the elastomer overmold material. The same elastomer overmold material may cover an actuator surface of a second button actuator, wherein the elastomer overmold material further includes: (a) a second base portion (e.g., U-shaped) having a third thickness and (b) a second groove portion adjacent the second button actuator, wherein the second groove portion has a fourth thickness, wherein the fourth thickness is less than the third thickness, and wherein the second base portion and the second groove portion are formed as part of the continuous layer of the elastomer overmold material. In such examples of this technology, the first thickness may be the same as or different from the third thickness and/or the second thickness may be the same or different from the fourth thickness. Still some additional or alternative button assemblies according to aspects of this technology may include: (a) a capacitive touch activator for unlocking the button assembly; (b) a first physical switch button activator for receiving user input; and, if desired, a second (or more) physical switch button activators for receiving user input.

One more specific additional or alternative aspect of this technology relates to filtered fluid flow connectors for articles of footwear that include: (a) a housing; (b) an incoming fluid inlet extending through the housing; (c) an incoming fluid outlet extending through the housing; (d) a filter for filtering incoming fluid before the incoming fluid reaches the incoming fluid outlet; (e) a pumped fluid inlet extending through the housing, a pumped fluid outlet extending through the housing, and a pumped fluid line within the housing and connecting the pumped fluid inlet and the pumped fluid outlet; and (f) a first foot support bladder port extending through the housing, a second foot support bladder port extending through the housing, and a foot support fluid line within the housing and connecting the first foot support bladder port and the second foot support bladder port. Such filtered fluid flow connectors further may include: (a) a first fluid container port extending through the housing, a second fluid container port extending through the housing, and a fluid container fluid line within the housing and connecting the first fluid container port and the second fluid container port, and/or (b) a fluid release port extending through the housing. In some examples, the filter may have a surface with an area of at least 50 mm$^2$ positioned to form or cover at least a portion of an exterior surface of the housing and to cover the incoming fluid inlet.

Still additional or alternative aspects of this technology relate to fluid flow connector systems for articles of footwear that include: (a) a manifold having a first port; (b) a connector having: (i) a first port in fluid communication with the first port of the manifold, (ii) a second port, and (iii) a first internal connector fluid line connecting the first port of the connector and the second port of the connector; and (c) a first fluid line in fluid communication with the second port of the connector and in fluid communication with the first port of the manifold through the first internal connector fluid line. Additional manifold ports may be connected to additional fluid lines through additional ports and fluid paths defined in the connector, if desired. As alternatives, some aspects of this technology may include fluid flow connector systems for articles of footwear that include: (a) a manifold having a first port, a second port, and a first internal manifold fluid line connecting the first port and the second port; (b) a fluid transfer system in fluid communication with the first port of the manifold; and (c) a first external fluid line in fluid communication with the second port of the manifold, e.g., without an intermediate connector between the manifold and fluid paths. At least some of the internal fluid paths extending through the connector (when the connector is present) or through the manifold (e.g., when no separate connector is present) may define: (a) a first axial direction, (b) a second axial direction, and (c) a connecting portion joining the first axial direction and the second axial direction. In such structures, the first axial direction and the second axial direction may extend away from one another from the connecting portion of the internal fluid path(s) at an angle of 70 degrees or less (and in some examples, at an angle of 60 degrees or less, 50 degrees or less, 40 degrees or less, 30 degrees or less, 20 degrees or less, or even parallel). In this manner, fluid entering and leaving the connector (when present) or the manifold (if no separate connector is present) may do so within angles of 70 degrees or less from one another.

Additional or alternative aspects of this technology relate to methods of making sole structures for articles of footwear that include fluid flow control systems of the types described herein engaged with them. Some such methods may include: (a) engaging a first fluid line that extends from a first sole component with a first port of a connector, wherein the first port of the connector is in fluid communication with a second port of the connector by a first internal connector fluid line that extends through the connector; (b) engaging the second port of the connector with a first manifold port of a fluid distributor; and (c) engaging the fluid distributor and the connector as a single connected component with at least one of the first sole component or a different sole component. Such methods may include engaging additional fluid lines from sole components with the connector as part of the single connected component prior to engaging the single connected component with the first sole component or a different sole component. Still additional or alternative aspects of this technology include methods comprising: (a) engaging a first fluid line that extends from a first sole component with a first port of a manifold of a fluid distributor, wherein the first port of the manifold is in fluid communication with a second port of the manifold by a first internal manifold fluid line that extends through the manifold; and (b) engaging at least one of the first sole component or a different sole component with the fluid distributor having the first fluid line engaged with the first port of the manifold. Such methods may include engaging additional fluid lines from the same or other sole components with corresponding manifold ports prior to engaging the fluid distributor with the first sole component or the different sole component. Still additional aspects of this technology relate to the sole structures resulting from the methods described above, irrespective of any specific method used to the make the sole structures (e.g., sole structures having connections as described above irrespective of the method steps and/or order of method steps used to make the sole structures).

Still additional or alternative aspects of this technology relate to fluid transfer systems for articles of footwear that include: (a) a valve housing defining an interior chamber; (b) a valve stem extending at least partially through the interior chamber, the valve stem having: (i) a first end operatively coupled with a motor to move the valve stem with respect to the valve housing, (ii) a second end opposite the first end, and (iii) a perimeter wall extending from the first end to the second end; and (c) a position sensor for determining a position of the valve stem with respect to the valve housing or other component of the fluid transfer system, the position sensor including: (i) an encoder magnet movable with (e.g., engaged with) the valve stem (e.g., at the first end, second end, or between), and (ii) an encoder sensor (e.g., engaged with the valve housing) sensing changes in a magnetic field generated by the encoder magnet due to the position of the valve stem. In some examples, the encoder sensor may be located closer to the second end than to the first end of the valve stem.

Other additional or alternative aspects of this technology relate to transmissions for fluid transfer systems incorporated into articles of footwear. Such transmissions may include: (a) a motor pinion; (b) a first intermediate gear cluster including: (i) a first axial pin, (ii) a first gear having a first central axis coaxial with the first axial pin and engaging the motor pinion, the first gear having a first diameter, and (iii) a second gear having a second central axis coaxial with the first axial pin, the second gear having a second diameter different from the first diameter; (c) a second intermediate gear cluster including: (i) a second axial pin, (ii) a third gear having a third central axis coaxial with the second axial pin and engaging the second gear, the third gear having a third diameter, and (iii) a fourth gear having a fourth central axis coaxial with the second axial pin, the fourth gear having a fourth diameter different from the third diameter; (d) a third axial pin; and (e) a fifth gear having a third central axis coaxial with the third axial pin and engaging the fourth gear, wherein the third central axis of the fifth gear is coaxial with a rotational axis of an output of the transmission. Additional gears may be included, if necessary or desired, for a particular function or operation. Additionally or alternatively, aspects of this technology may relate to drive systems for fluid transfer systems in articles of footwear that include: (a) a motor including a drive shaft; (b) a valve stem; and (c) a three (or more) stage transmission operative coupled between the drive shaft and valve stem to rotate the valve stem in response to rotation of the drive shaft. If desired, the three stage transmission may comprise a transmission of the type described above.

Additional or alternative aspects of this technology relate to electronic communications between components of different shoes. Footwear systems in accordance with at least some of these aspects may include: (a) a first shoe having a first footwear component with pressure adjustment capability, a first microprocessor, and a first antenna in electronic communication with the first microprocessor; (b) a second shoe having a second footwear component with pressure adjustment capability, a second microprocessor, and a second antenna in electronic communication with the second microprocessor; and (c) a central communication source for transmitting data to at least one of the first antenna or the second antenna in response to input data directing a pressure change in at least one of the first footwear component or the second footwear component. In some examples, the central communication source is located in the first shoe, and the first shoe transmits data from the first antenna to the second antenna when the input data directs a pressure change in the second footwear component. In other examples: (a) during a first time period, the central communication source is located in the first shoe and the first shoe transmits data from the first antenna to the second antenna when the input data directs a pressure change in the second footwear component, and (b) during a second time period, the central communication source is located in the second shoe and the second shoe transmits data from the second antenna to the first antenna when the input data directs a pressure change in the first footwear component.

In other examples, the central communication source may constitute an external computing device not physically incorporated in either of the first shoe or the second shoe (e.g., a smartphone, a personal computer, etc.). In such examples, the external computing device may: (a) transmit data to the first antenna when the input data directs a pressure change in the first footwear component, and/or (b) transmit data to the second antenna when the input data directs a pressure change in the second footwear component, and/or (c) transmit data to the first antenna when the input data directs a pressure change in the first footwear component or the second footwear component, and then the first antenna transmits data to the second antenna when the input data directs a pressure change in the second footwear component. In still other examples of this aspect of the technology, communication of the input data directing the pressure change may be switchable between at least three communication configurations as follows: (a) a first communication configuration when an external computing device is in electronic communication with at least one of the first shoe or the second shoe, wherein the external computing device acts as the central communication source and each of the first shoe and the second shoe act as peripheral communication devices receiving pressure change input from the external computing device, (b) a second communication configuration when no external computing device is in electronic communication with the first shoe or the second shoe, wherein the first shoe acts as the central communication source and the second shoe acts as a peripheral communication device receiving pressure change input from the first shoe, and (c) a third communication configuration when no external computing device is in electronic communication with the first shoe or the second shoe, wherein the second shoe acts as the central communication source and the first shoe acts as a peripheral communication device receiving pressure change input from the second shoe.

Such footwear communication systems further may be in electronic communication with at least one additional electronically adjustable component. Such additional electronically adjustable component(s) may include one or more of: an apparel based adjustable component on an article of apparel separate from the first shoe and the second shoe, a motorized apparel component, a motorized lacing system for tightening or loosening lacing systems on at least one of the first shoe or the second shoe, a motorized shoe securing system for at least one of the first shoe or the second shoe, a motorized fluid containing sports bra, and a motorized fluid containing compression sleeve.

Still additional or alternative aspects of this technology relate to sealed connections between various parts. One example sealed connection extends between a rotatable valve stem having a peripheral wall including at least a first fluid port extending through it and a manifold including at least a first manifold port. A sealing connector (e.g., made of rubber or elastomer) may join these parts. The sealing connector may include: (a) a first connector port in direct contact with the peripheral wall (to seal against the peripheral wall), (b) a second connector port connected to the first manifold port, and (c) a first connector fluid path extending between the first connector port and the second connector port. Rotation of the rotatable valve stem to a first position at least partially aligns the first fluid port of the rotatable valve stem with the first connector port to place the first fluid port of the rotatable valve stem in fluid communication with the first manifold port through the first connector fluid path in a sealed condition. Such sealed connections and sealing connectors may include one or more additional ports in the valve stem, a corresponding one or more additional ports in the manifold, and a corresponding additional one or more sets of connector ports and connector fluid paths in the connector joining the corresponding ports of the valve stem and manifold. Different rotary positions of the valve stem may selectively align the ports to open one or more sets of fluid pathways at a time. Any one or more of the connector ports in direct contact with the peripheral wall (including all such connector ports) may include a curved outer surface shaped to correspond to a curvature of an outer surface of the peripheral wall and/or to seal that directly contacting port with the peripheral wall. This curved outer surface rides along (moves with respect to) the peripheral wall (and maintains sealed contact during rotation) when the valve stem is rotated. A lubricant may help support this relative sliding action and help maintain a sealed connection. Other sealed connections also may be provided in the overall systems described herein.

Additional or alternative aspects of this technology relate to inclusion of pressure sensors in fluid flow control system for articles of footwear. Such fluid flow control systems may include: (a) a fluid distributor; (b) a manifold including: (i) a manifold body, (ii) a first manifold fluid path defined through the manifold body and extending from a first manifold port that is in fluid communication with the fluid distributor to a second manifold port that is in fluid communication with a first footwear component, (iii) a first pressure sensor mount (e.g., one or more of a recess or a raised tube) defined in the manifold body or extending from the manifold body, and (iv) a first open channel extending between the first pressure sensor mount and the first manifold fluid path; and (c) a first pressure sensor mounted at the first pressure sensor mount in a fluid tight manner. Additional manifold ports, manifold fluid paths, pressure sensor mounts, and open channels may be provided, e.g., for additional pressure sensors for measuring pressure in other fluid lines. Additionally or alternatively, fluid flow control systems for articles of footwear may include: (a) a fluid distributor; (b) a manifold including a first manifold port; (c) a sealing connector including: (i) a connector body, (ii) a first connector fluid path defined through the connector body and extending from a first connector port that is in fluid communication with the fluid distributor to a second connector port that is in fluid communication with the first manifold port, (iii) a first pressure sensor mount (e.g., one or more of a recess or a raised tube) defined in the connector body or extending from the connector body, and (iv) a first open channel extending between the first pressure sensor mount and the first connector fluid path; and (d) a first pressure sensor mounted at the first pressure sensor mount in a fluid tight manner. In such systems, additional manifold ports, connector ports, connector fluid paths, pressure sensor mounts, and open channels may be provided, e.g., for additional pressure sensors for measuring pressure in other fluid lines.

Additional or alternative aspects of this technology relate to systems and methods for changing fluid pressure in a component of an article of footwear. Such systems and methods may include hardware and/or software for performing a method comprising: (a) receiving input data indicating a target pressure for fluid pressure in a first footwear component, wherein the first footwear component is a foot support bladder or a fluid container; (b) moving fluid through a continuous fluid line that extends between a first port of a manifold or a sealing connector and a second port of the manifold or sealing connector, wherein the first port is in fluid communication with the first footwear component, and wherein the second port is in fluid communication with a second footwear component or an external environment; (c) measuring fluid pressure in the continuous fluid line as fluid moves through the continuous fluid line using a first pressure sensor; (d) determining an adjusted fluid pressure based on the fluid pressure measured by the first pressure sensor during the measuring step; and (e) stopping fluid flow through the continuous fluid line when the adjusted fluid pressure determined in the determining step is within a predetermined range of the target pressure. The adjusted fluid pressure estimates fluid pressure in the first footwear component. In some examples of this technology, the adjusted fluid pressure corrects for flow rate dependent offset between the fluid pressure measured by the first pressure sensor during the measuring step and actual fluid pressure in the first footwear component. Such flow rate dependent offset may be caused, for example, by fluid flowing through fluid lines having a small internal cross sectional area or diameter (e.g., less than 50 mm$^2$, and in some examples, less than 40 mm$^2$, less than 30 mm$^2$, less than 20 mm$^2$, or even less than 16 mm$^2$).

Given the general description of features, examples, aspects, structures, processes, and arrangements according to examples of this technology and this invention provided above, a more detailed description of specific example fluid transfer systems, fluid flow control systems, foot support systems, sole structures, articles of footwear, and methods in accordance with this technology follows.

II. DETAILED DESCRIPTION OF EXAMPLE ARTICLES OF FOOTWEAR, FOOT SUPPORT SYSTEMS, AND OTHER COMPONENTS AND/OR FEATURES ACCORDING TO THIS TECHNOLOGY

Referring to the figures and following discussion, various examples of foot support systems, fluid flow control systems, sole structures, and articles of footwear in accordance with aspects of this technology are described. Aspects of this technology may be used, for example, in conjunction with foot support systems, articles of footwear (or other foot-receiving devices), and/or methods described in the various U.S. patent applications noted above.

A. Footwear Structures

As noted above, some aspects of this technology relate to foot support systems, sole structures, and/or articles of footwear (and/or other foot-receiving devices) that may be placed in various different operational states. FIG. 1 generally shows an article of footwear 100 (side view) in accordance with some examples of this technology including an upper 102 and a sole structure 104 engaged with the upper 102. Both the upper 102 and the sole structure 104 may be made from one or more component parts, including conventional component parts as are known and used in the footwear arts. The various parts of the article of footwear 100, including the upper 102 and sole structure 104 and/or the individual component parts thereof, may be engaged together in any desired manner, including in conventional manners as are known and used in the footwear art. The upper 102 of this example includes a foot-receiving opening 106 that opens into an interior chamber (defined by the upper 102 and/or sole structure 104) for a user's foot. A securing system 108 (e.g., laces shown, although other types may be used) allows the article of footwear 100 to be releasably secured to the user's foot.

As further shown in FIG. 1, this article of footwear 100 includes a foot support system having a foot support bladder 200 for supporting at least a portion of a plantar surface of a user's foot (the forefoot area in this specifically illustrated example). The foot support system further includes an "on-board" fluid container 400. The fluid container 400 contains fluid (e.g., under pressure), and in this illustrated example is comprised of a fluid filled bladder. The fluid container 400 may be located above an outsole component of the footwear 100, within a midsole component (e.g., in a cavity of a foam part), and/or engaged with the upper 102. A fluid distributor (to be described in more detail below) selectively places the foot support system and/or article of footwear 100 in two or more operational states, e.g., to move fluid from the fluid container 400 to the foot support bladder 200; from a fluid supply into the fluid container 400 and/or into the foot support bladder 200; and from a fluid supply, the fluid container 400, and/or the foot support bladder 200 to the ambient or external environment. The fluid distributor may include one or more of: a component with a movable valve stem; a component with one or more solenoids; a manifold connected with the valve stem and/or solenoid(s) (e.g., with their housings); a connector connecting components of the fluid distributor with a fluid supply and/or fluid transfer lines; and/or one or more fluid transfer lines.

Figure 2A:
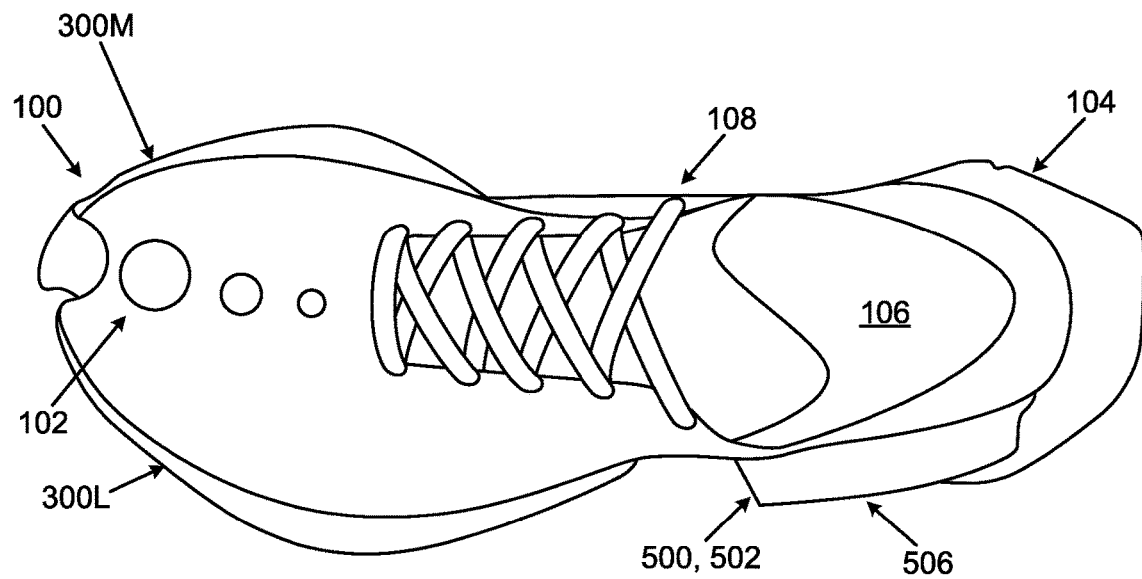
Figure 2B:
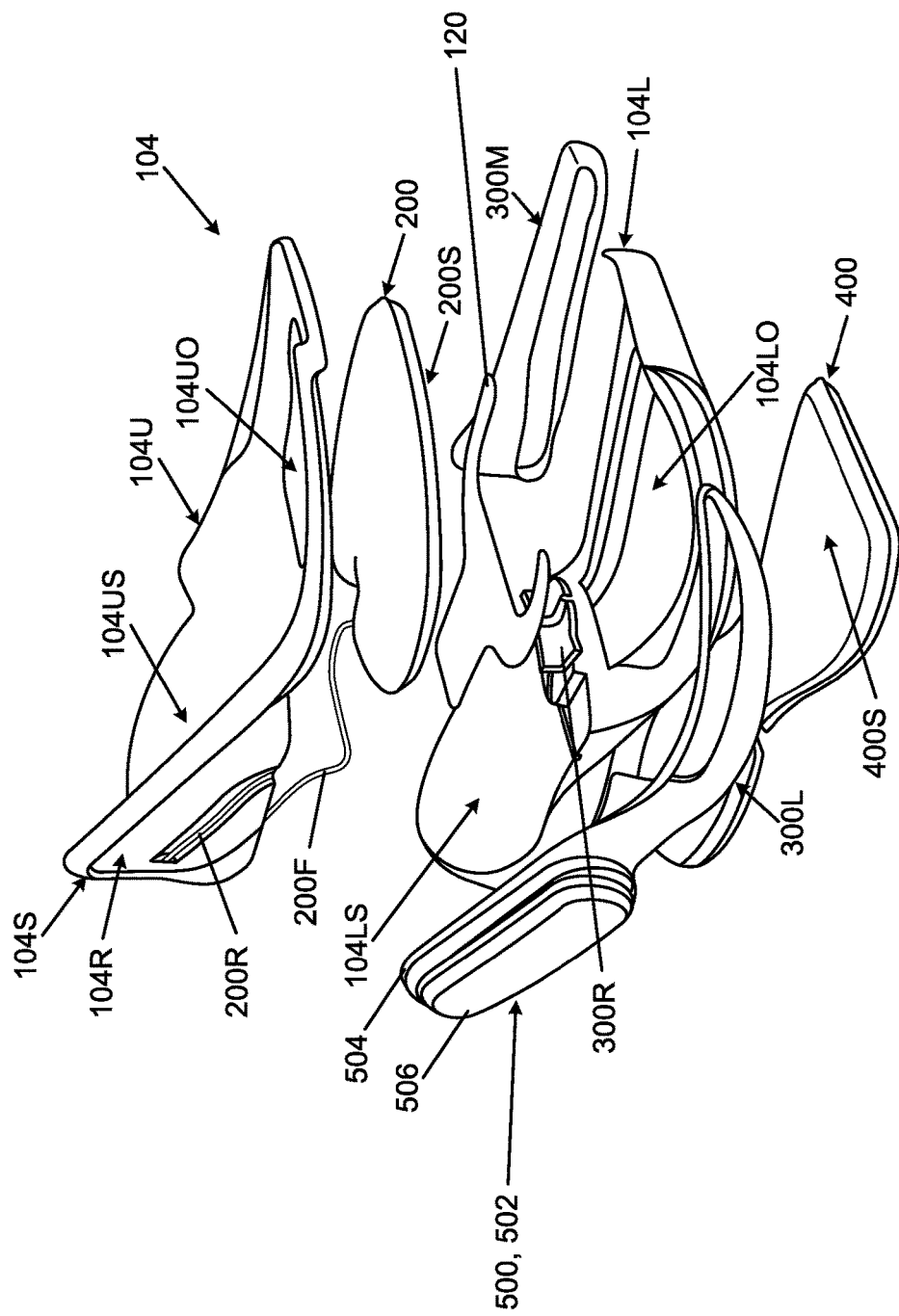

FIGS. 2A and 2B show top and exploded views, respectively, of portions of an article of footwear 100 that include various features in accordance with aspects of this technology. As shown, this example foot support system includes the fluid-filled foot support bladder 200 for supporting at least a forefoot portion of a user's foot. A portion of the fluid container 400 of this example (also a fluid-filled bladder) is located beneath the foot support bladder 200, and it extends rearward beyond the rear edge of the foot support bladder 200 (note also FIG. 1). An upper sole component 104U (e.g., an upper midsole component optionally formed of a polymeric foam material) overlies and/or engages the foot support bladder 200. A lower sole component 104L (e.g., a lower midsole component optionally formed of a polymeric foam material) underlies and/or engages the foot support bladder 200. In this illustrated example, both the upper sole component 104U and the lower sole component 104L extend rearward and include plantar support surfaces 104US and 104LS, respectively, at least at a heel support area of the sole structure 104. Also, both the upper sole component 104U and the lower sole component 104L in this illustrated example include openings 104U0 and 104L0, respectively, extending completely through them at the forefoot support area. These openings 104U0, 104L0 correspond to forefoot portions of the foot support bladder 200 and the fluid container 400 in this illustrated example so that, if desired, at least portions of the top surface 400S of the fluid container 400 and the bottom surface 200S of the foot support bladder 200 directly face and/or contact one another at least in their forefoot support areas in the final assembled sole structure 104.

One or more cage components 300 may be provided, e.g., formed of polymeric material (e.g., a thermoplastic polyurethane, etc.), to secure the foot support bladder 200. A multi-part cage component 300 is shown in FIG. 2B including a lateral cage component 300L, a medial cage component 300M, and a middle or rear cage component 300R. The lateral cage component 300L and the medial cage component 300M engage corresponding sidewalls of the lower sole component 104L and/or corresponding sidewalls of the foot support bladder 200, and the middle or rear cage component 300R engages the rear edge of foot support bladder 200. If desired (and as shown in FIG. 2B), at least one of the lateral cage component 300L and the medial cage component 300M may include openings defined through them so that the sidewall(s) of the foot support bladder 200 may be exposed and visible at the exterior of the sole structure 104 in the final assembled sole structure 104. See FIG. 1. This example sole structure 104 further includes an optional shank 120 in the midfoot area. This example shank 120 includes a generally U-shaped opening having arms to support bottom side edges of the foot support bladder 200 and/or a rear base area to support the bottom rear of the foot support bladder 200.

The upper sole component 104U of this example includes a sidewall 104S (e.g., extending upward from the plantar support surface 104US) forming a portion of its exterior surface. The exterior lateral side of sidewall 104S has a recess 104R defined in it. This recess 104R receives a fluid distributor 500. In this illustrated example, the lateral cage component 300L extends rearward and forms a portion of a base that is received in the recess 104R, and this base is engaged with and/or forms at least some portion of the fluid distributor 500 (e.g., part of its housing 502). Alternatively, if desired, the fluid distributor 500 may be an independent part from lateral cage component 300L and/or directly engaged with the exterior surface of the upper sole component 104U (or other footwear component part and/or upper 102 part).

Several features and components of the fluid distributor 500 are described in detail below. In some examples of this technology, the fluid distributor 500 includes or defines: (a) an inlet for receiving fluid from a fluid supply (e.g., from the external environment, from another internal fluid line, from a pump or compressor, etc.), (b) a first fluid pathway for transferring fluid to the external environment (e.g., to exhaust excess gas introduced by the fluid supply, to reduce pressure in the foot support bladder 200, to reduce pressure in the fluid container 400, etc.), (c) a second fluid pathway in fluid communication with the foot support bladder 200 (e.g., to move fluid into and/or out of the foot support bladder 200 and/or to change fluid pressure in the foot support bladder 200), and/or (d) a third fluid pathway in fluid communication with the fluid container 400 (e.g., to move fluid into and/or out of the fluid container 400 and/or to change fluid pressure in the fluid container 400).

FIG. 2B further illustrates a fluid transfer line 200F or tube extending to foot support bladder 200 and a tube recess 200R formed within the sidewall recess 104R. The tube recess 200R provides room to allow fluid flow lines to meet and join up with the fluid distributor 500 as will be described in more detail below. Also, while not shown in FIG. 2B, sole structures 104 of this type may include a pump (e.g., a foot activated pump, a battery operated pump, a compressor, etc.) that acts as at least a portion of a fluid supply and/or an outsole component (e.g., to cover and protect the fluid container 400).

Figure 3A:
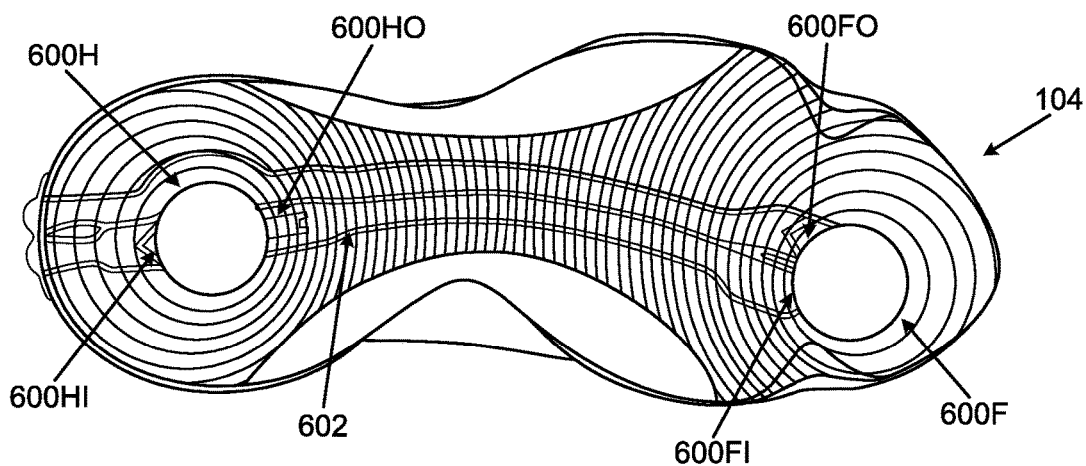
FIGS. 3A-3D provide views of pumping systems that may be used in accordance with some examples of this technology.

As mentioned above and shown in the examples of FIGS. 3A-3D, at least some examples of this technology will include a fluid supply in the form of one or more pumps, including one or more foot-activated pumps. When one pump is present, it may move fluid received from the external environment via a fluid pathway extending from the external environment to the pump to the fluid distributor 500 for distribution to a final desired destination (e.g., the foot support bladder 200, the fluid container 400, or back to the external environment). Alternatively, FIG. 3A shows a two stage pumping system including a heel activated bulb pump 600H (which also is referred to as a "first pump" herein) that is connected via fluid line 602 to forefoot activated bulb pump 600F (which is also referred to as a "second pump" herein) in "series." Thus, in at least some examples of this technology: (a) an inlet 600HI of the heel activated pump 600H is in fluid communication with the external environment (e.g., by a fluid path extending from the external environment to the inlet 600HI through the fluid distributor 500, such as fluid line 604); (b) an outlet 600HO of the heel activated pump 600H is in fluid communication with an inlet 600FI of the forefoot activated pump 600F via fluid line 602, and (c) an outlet 600FO of the forefoot activated pump 600F is in fluid communication with an inlet of the fluid distributor 500, such as fluid line 606. The "upstream" pump (600H in this description, but could be 600F in some examples) may be somewhat larger than the "downstream" pump (600F in this description, but could be 600H in some examples), to improve fluid flow and pumping efficiency. A two-stage pump may have features and/or structures like those shown in corresponding structures disclosed in U.S. patent application Ser. No. 16/698,138 filed Nov. 27, 2019.

Additionally or alternatively, if desired, when more than one pump is present, more than one pump may move fluid to an inlet of the fluid distributor 500 (e.g., two or more pumps may have their outlets connected directly to an inlet of fluid distributor 500). Once pumped into the fluid distributor 500, the fluid distributor 500 selectively moves the fluid to its ultimate destination, e.g., the foot support bladder 200, the fluid container 400, or back to the external environment, depending on its operational state. An exhaust valve or check valve may be provided with any pumps 600H, 600F present to prevent an overpressure situation (e.g., should the fluid lines and/or components downstream from the pumps 600H, 600F become blocked or non-functional for any reason). The pump(s) 600F, 660H may be made, e.g., from RF welded TPU films bonded together to make a bulb type pumping chamber in known manners.

Figure 3B:
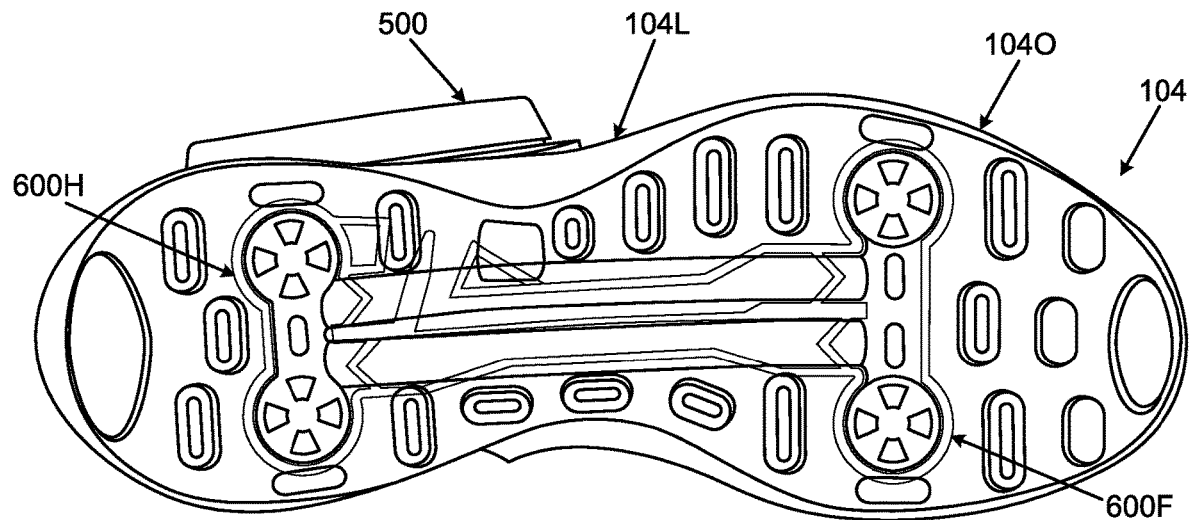
Figure 3D:
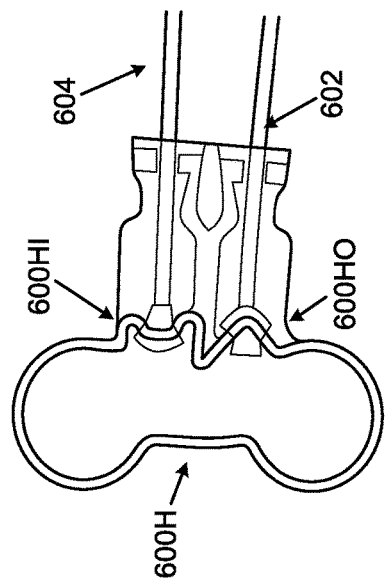
Figure 3C:
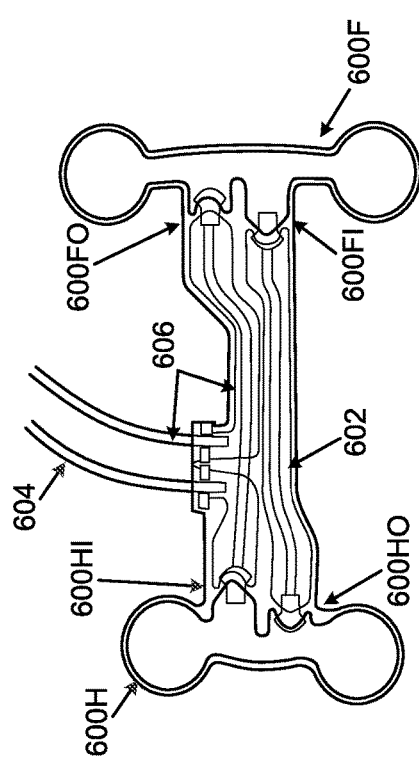

FIG. 3A illustrates generally spheroid or ellipsoid shaped bulb pumps 600H, 600F. FIGS. 3B-3D, on the other hand, shows generally T-shaped bulb pumps 600H, 600F, with the forefoot bulb pump 600F oriented more under the metatarsal head support areas of the sole structure 104 (as opposed to more in the toe support areas in FIG. 3A). FIG. 3B shows general potential locations for the pumps 600H, 600F in a sole structure 104. FIG. 3C shows an overall arrangement of the pumps 600H, 600F and their connecting lines, and FIG. 3D shows a closer view of a T-shaped bulb pump (e.g., 600H in this example), which may be in fluid communication with a forefoot pump 600F, a fluid distributor 500, or another footwear component.

The T-shaped bulb pumps 600H, 600F may be made somewhat wider and less round than spheroid or ellipsoid to distribute the pump chamber volume over a larger (e.g., wider) area of the user's foot (and thus make the pump(s) 600H, 600F feel less perceptible underfoot). These T-shaped bulb pumps 600H, 600F also may be connected in "series" (e.g., with the outlet 600HO of pump 600H feeding into the inlet 600FI of pump 600F and the outlet 600FO of pump 600F acting as a fluid source for the fluid distributor 500, foot support systems, sole structures 104, and/or articles of footwear 100, e.g., via fluid line 606). The bulb pumps 600H, 600F may be sandwiched between sole components, such as between the lower sole component 104L and one or more outsole components 104. As an alternative, if desired, a forefoot outsole component may be provided to engage forefoot pump 600F and a separate heel outsole component may be provided to engage the heel pump. In use, when a user lands a step or jump, the bulb pump 600H and/or 600F will compress between the sole components under the applied force (the user's weight), thereby forcing fluid out of the bulb pump 600H and/or 600F outlet 600HO, 600FO and moving fluid from the pumps 600H, 600F to the fluid distributor 500. One-way valves may be provided to prevent backward fluid flow through the pump(s) 600F, 600H. The bulb pump(s) 600H, 600F may be attached to and/or located between flat or smoothly curved foam, bladder, outsole, or other sole component surfaces (e.g., to increase pumping volume per step). If necessary, however, the bulb pump(s) 600H, 600F may be at least partially received within a recess in at least one of the components to which it is attached (e.g., within a recess in one or more of a foam, bladder, outsole, or other sole component surface).

FIGS. 4A-5F schematically illustrate fluid distributor 500 and foot support systems in accordance with at least some examples of this technology and their operation in various potential operational states. As shown and described above, these systems include a foot support bladder 200, a fluid container or reservoir 400 (which also may include a fluid-filled bladder), and at least one pump (e.g., a heel based pump 600H and a forefoot based pump 600F connected in series by fluid line 602 shown). These parts are operatively connected to a fluid flow control system or fluid distributor 500, which may include some or all of the component parts shown in broken lines in FIG. 4A. The fluid distributor 500 of this example serves as a central hub to which fluid comes from various starting locations (e.g., the external or ambient environment 150 or other fluid source; the pump(s) 600H, 600F; the foot support bladder 200; or the fluid container 400) and from which the fluid leaves to go to various destinations (e.g., the external or ambient environment 150; the foot support bladder 200; or the fluid container 400). The fluid distributor 500 of this example includes a connector 700, a manifold 800, and a fluid transfer system 900.

Figure 4A:
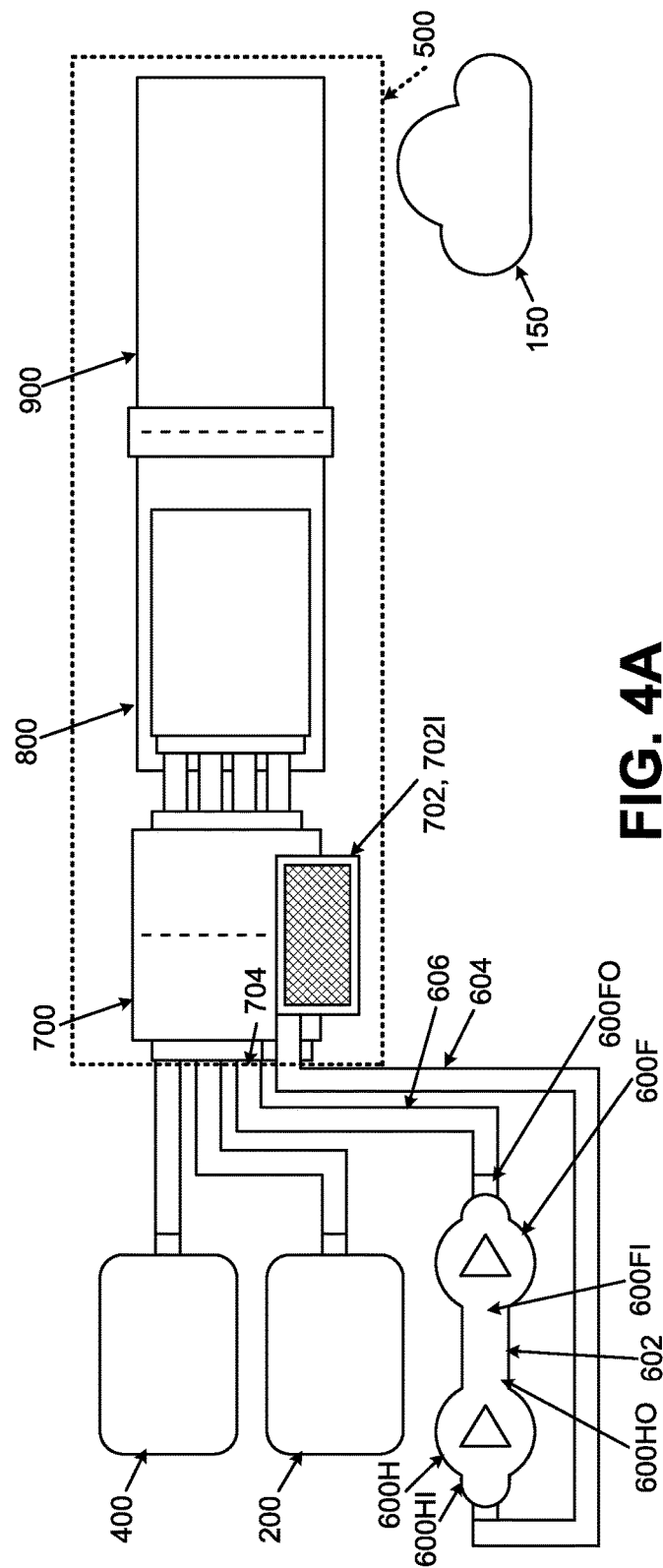
FIGS. 4A and 4B provide views of foot support systems and components thereof in accordance with some examples of this technology.
Figure 4B:
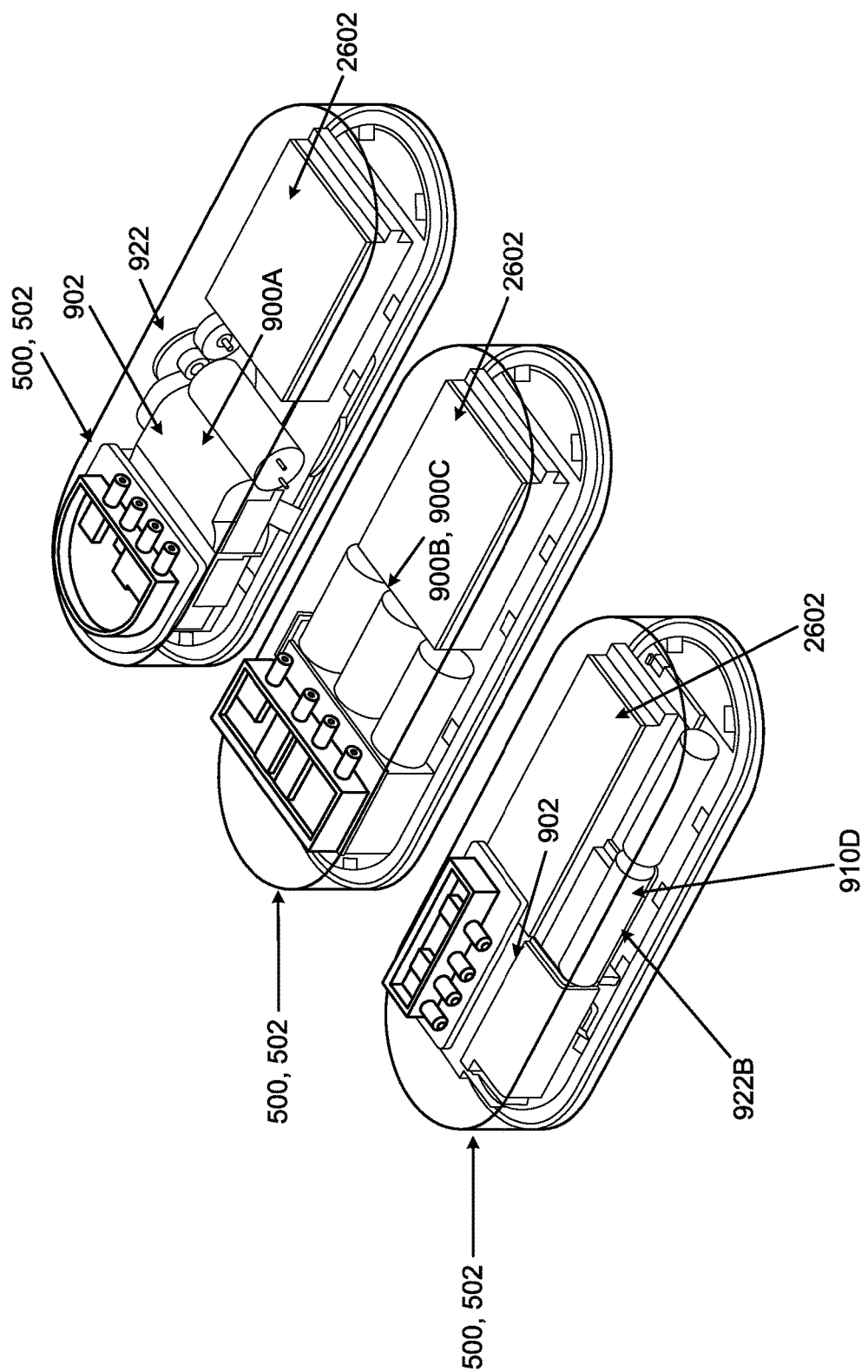

The fluid transfer system 900 shown in FIG. 4A can take on a variety of forms and/or structures. FIG. 4B illustrates various example arrangements of different types of fluid transfer systems 900 in a fluid distributor 500. The fluid transfer system toward the top right of FIG. 4B includes a valve stem based fluid transfer system 900A. The central fluid transfer systems shown in FIG. 4B are solenoid based fluid transfer systems 900B, 900C. The fluid transfer system toward the bottom left of FIG. 4B also is a valve stem based fluid transfer system 900D, but this fluid transfer system 900D includes a planetary gear type transmission 922B as opposed to the geartrain transmission 922 provided in fluid transfer system 900A. These different fluid transfers systems 900A, 900B, 900C, 900D (as well as variations thereof) are described in more detail below and may be included in the housings 502 of fluid distributor 500.

Various fluid lines connect fluid distributor 500 with the various fluid starting locations and destinations. These fluid lines are described in more detail in conjunction with the various operational states shown in FIGS. 5A-5F. The large "X's" in FIGS. 5A-5F show fluid paths of the fluid transfer system 900 that may be closed off in that operational state. When needed, these fluid paths may be closed off in any desired manner, e.g., by a check valve or one-way valve (e.g., in the fluid line 606 from the pump(s) 600H, 600F), due to features of the valve stem, due to solenoid valve configurational features, etc.

Figure 5A:
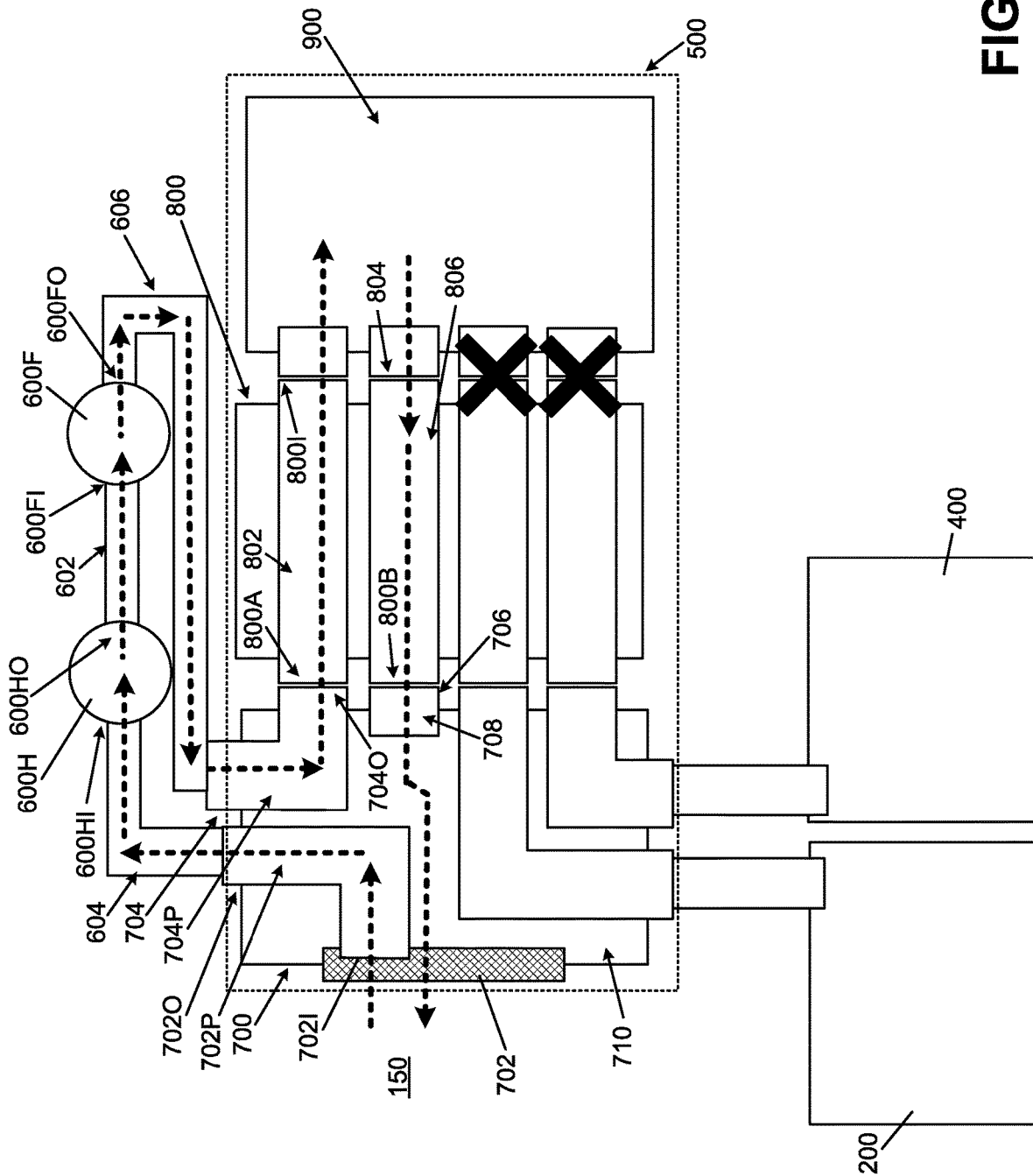
FIGS. 5A-5F provide views explaining several example operational states in accordance with some examples of this technology.

FIG. 5A shows an operational state in which fluid moves into the fluid distributor 500 from the external environment 150 and is discharged back to the external environment 150. The fluid flow in this operational state is shown by the thick, arrowed, broken lines. This operational state may be used as a "standby" or "steady state" operational state to keep the pumped fluid moving through the fluid distributor 500 even when no pressure changes are needed to the foot support bladder 200 and/or the fluid container 400. In this operational state, incoming fluid from the external environment 150 (e.g., air) enters the connector 700 via filter 702 and connector inlet 702I. If necessary or desired, the filter 702 may be removable, replaceable, and/or otherwise cleanable (e.g., to maintain adequate air intake into the system from the external environment 150). While any desired intake size may be used, in some aspects of this technology, the filter 702 may have an area of at least 50 mm$^2$, an area between 50 mm$^2$ to 100 mm$^2$, an area between 50 mm$^2$ to 150 mm$^2$, and area between 25 mm$^2$ to 250 mm$^2$, or other desired area. Any desired type of filter media, filter construction, and/or filter material may be used, such as a flat sheet of filter material, a flat screen, etc. The filter 702 may provide a relatively large exterior area of the connector 700, potentially providing at least a majority of the surface area of one exposed outer surface of the connector 702, e.g., as shown in FIGS. 5A-5E, 11A, 12A, and 13B. Additionally or alternatively, if desired, a filter may be provided at other locations within the connector 700 and/or within the fluid flow paths (e.g., somewhere before inlet to pump(s) 600H, 600F, extending at least partially inside the connector 700 body, extending at least partially inside a dedicated fluid path 702P, etc.).

From connector inlet 702I, fluid travels through the connector body (e.g., through fluid path 702P or an open interior space 710 inside connector 700) and out through port 702O. In some examples of this technology, a dedicated fluid path 702P (e.g., a closed fluid tube) could be omitted (or made non-continuous with open ends inside the connector 700 interior space 710) such that fluid may enter into open interior space 710 from the connector inlet 702I and/or flow out of this open interior space 710 at an opening providing as port 702O. In such examples, the open interior space 710 may be considered as at least part of fluid path 702P through the connector 700. Outlet 702O connects to a fluid path 604 that takes the fluid to the pump system (pump(s) 600H, 600F and fluid line 602 connecting them, in this example). From the pump(s) 600H, 600F, fluid travels down a fluid line 606 back to an inlet port 704 of the connector 700. A one-way valve or a check valve along fluid line 606 may be present to prevent fluid from flowing back toward the pump(s) 600H, 600F through connector inlet port 704 and/or fluid line 606. From connector inlet port 704, fluid flows through the connector 700 via a connector fluid path 704P (also called a "fourth connector fluid path" herein), to a connector outlet port 704O (also called a "fourth fluid path connector" herein), and to an incoming fluid port 800A of the manifold 800. Fluid flows from the incoming fluid port 800A, through a fluid inlet path 802 in the manifold 800, through a fluid inlet port 800I and into the fluid transfer system 900. In this operational state, fluid leaves the fluid transfer system 900, passes through a first manifold port 804, through a first manifold fluid flow path 806 defined in the manifold 800, through another manifold port 800B, to a first fluid path connector (or port) 706 of the connector 700, through the first connector fluid path 708, and optionally to the external environment 150. Additionally or alternatively, fluid passing through first fluid path connector 706 may empty into the interior space 710 within the connector 700 (and thus become part of the external environment) and/or be available for another pump cycle.

Alternatively, in some examples of this technology, in this operational state, rather than continuously moving fluid through the fluid distributor 500 with each step when it is simply going to be discharged back into the external environment 150, a selectively operable fluid path could be provided from the pump(s) 600H, 600F directly to the external environment 150. As another option, when no fluid pressure changes are needed, the pump(s) 600H, 600F could be deactivated.

Figure 5B:
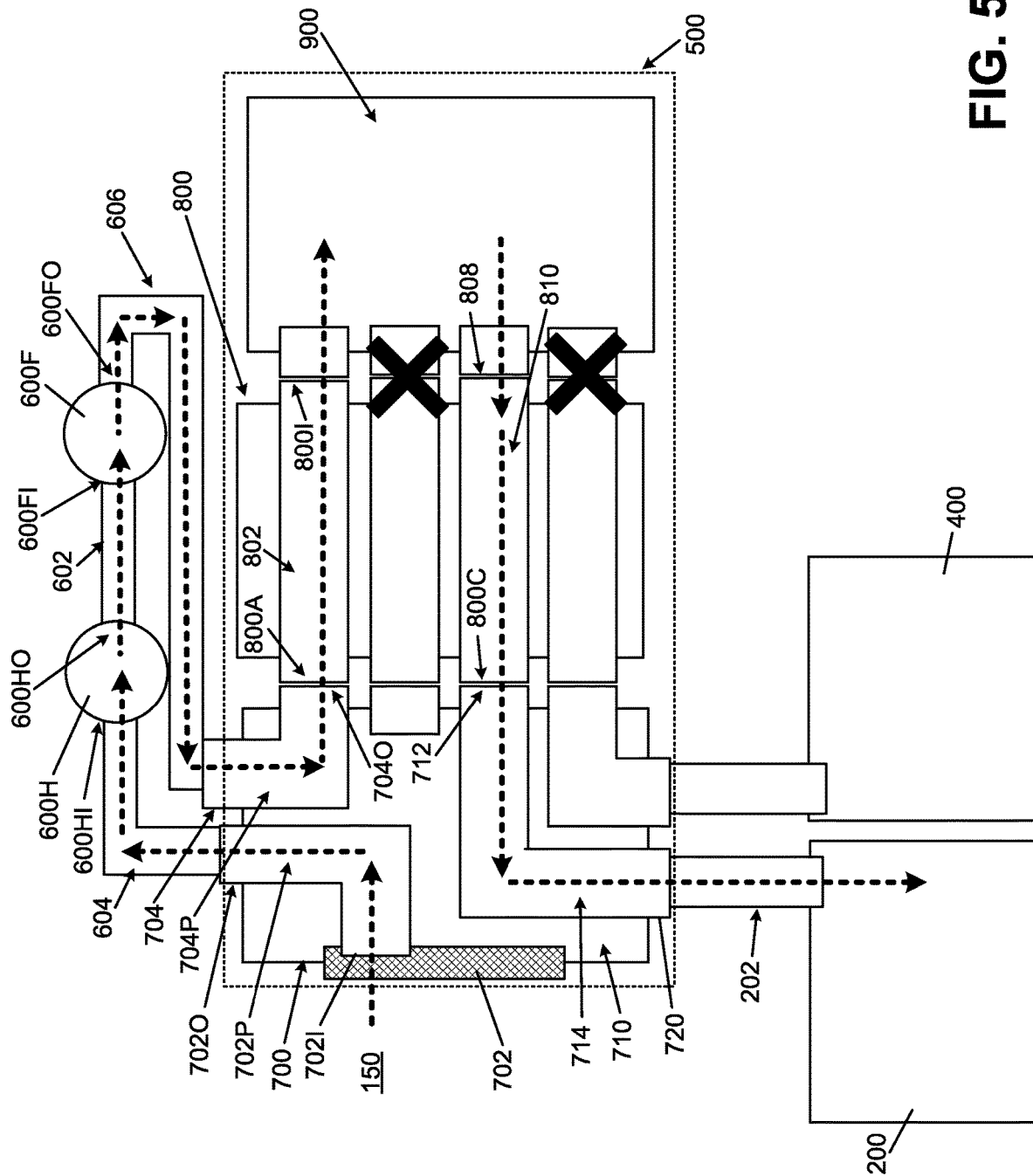

FIG. 5B shows an operational state in which fluid moves into the fluid distributor 500 from the external environment 150 and is transferred to the foot support bladder 200. Again, the fluid flow in this operational state is shown by the thick, arrowed, broken lines. This operational state may be used to increase pressure in the foot support bladder 200, e.g., for a firmer feel and/or more intense activities (such as running). In this operational state, incoming fluid from the external environment 150 (e.g., air) moves through the connector 700, through the manifold 800, and into the fluid transfer system 900 in the same manner (and through the same components) as described above for FIG. 5A. In this operational state, however, fluid leaves the fluid transfer system 900, passes through a second manifold port 808, through a second manifold fluid flow path 810 defined in the manifold 800, through another manifold port 800C, to a second fluid path connector (or port) 712 of the connector 700, through the second connector fluid path 714, through another connector port 720, into a foot support fluid line 202, and into the foot support bladder 200.

Figure 5C:
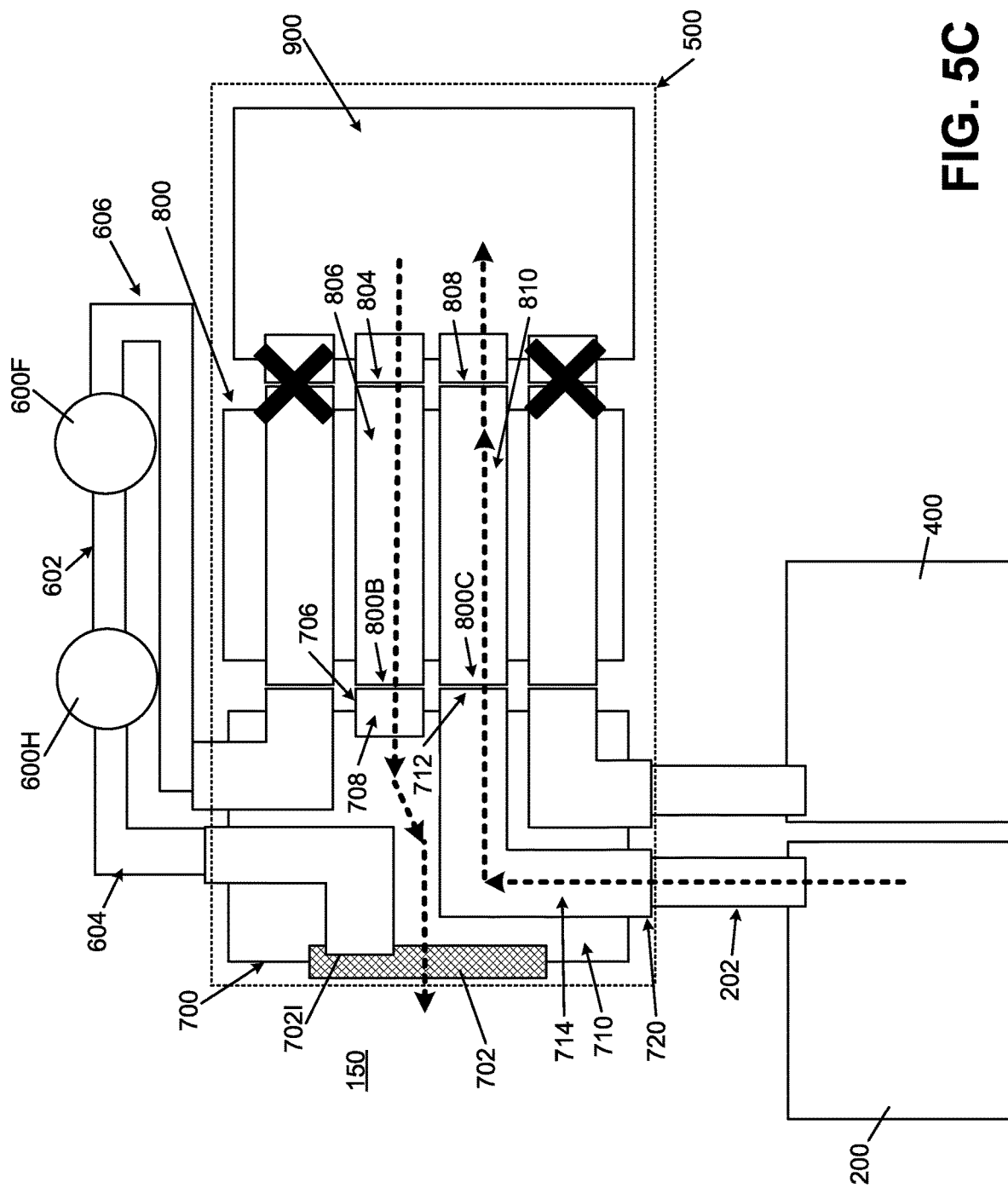

In some instances, it may be desired to remove fluid from the foot support bladder 200 in order to decrease pressure in the foot support bladder 200 (e.g., to provide a softer feel or for less intense activities, such as walking or casual wear). An example of this operational state is shown in FIG. 5C, and the fluid flow is shown by the thick, arrowed, broken lines. In this operational state, fluid leaves the foot support bladder 200, enters foot support fluid line 202, passes into the second connector fluid path 714 via connector port 720 and to second fluid path connector 712 of the connector 700. From the second fluid path connector 712, fluid passes through manifold port 800C and into the second manifold fluid flow path 810 defined in the manifold 800, through the second manifold port 808 and into the fluid transfer system 900. From here, in this example system and operational state, the fluid is discharged to the external environment 150. This occurs by the fluid leaving the fluid transfer system 900, passing through the first manifold port 804, through the first manifold fluid flow path 806 defined in the manifold 800, through manifold port 800B to the first fluid path connector (or port) 706 of the connector 700, and through the first connector fluid path 708 to the external environment 150 (which may constitute an interior space 710 within the connector 700). First connector fluid path connector (or port) 706 may form a port for bringing fluid to be released from the overall system (a "fluid release port") back to the connector 700 to enable the fluid release.

Figure 5D:
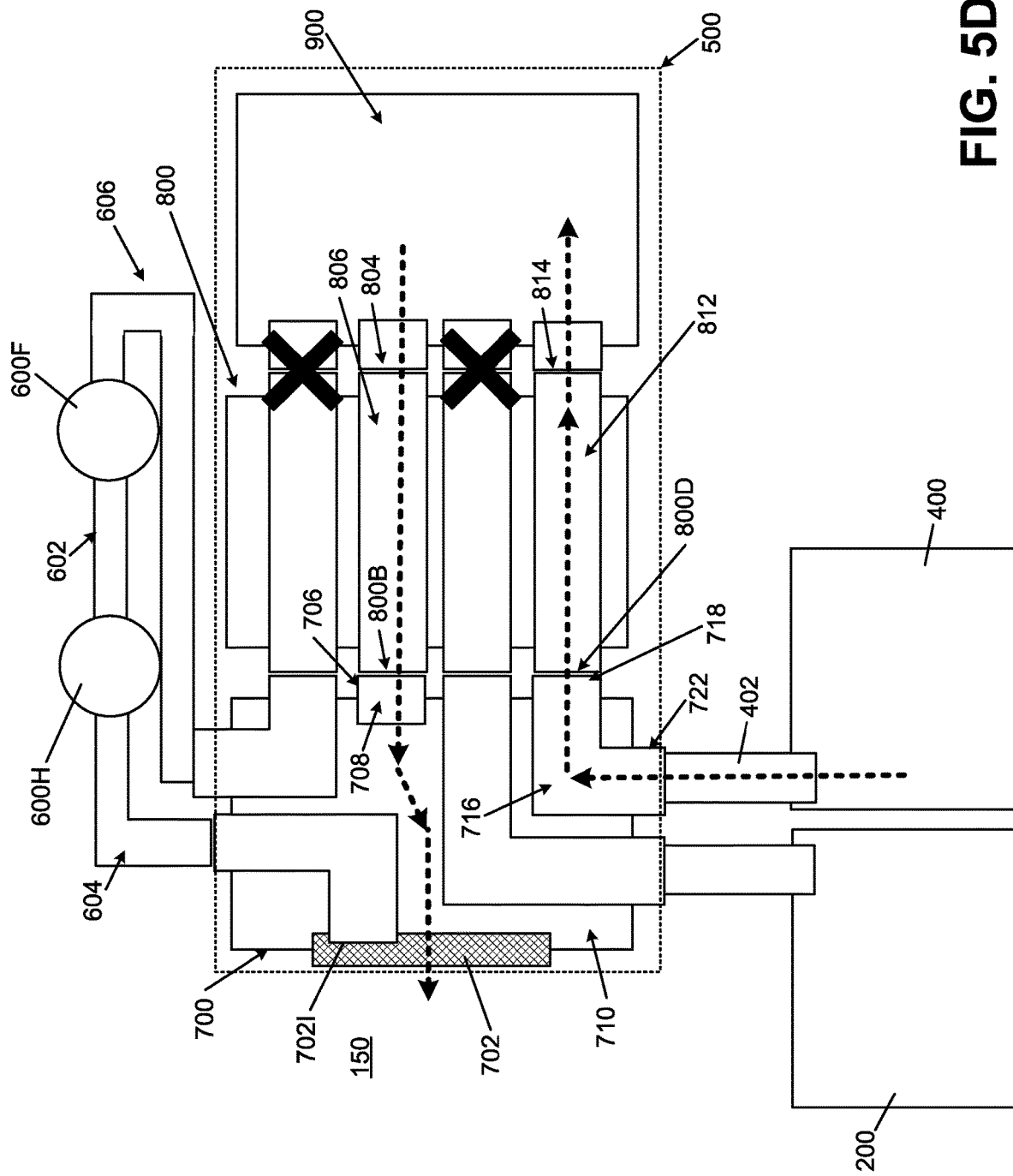

Another potential operational state for fluid distributor 500 and foot support systems in accordance with some examples of this technology is shown in FIG. 5D. In this operational state, fluid is transferred from the fluid container 400 to the external environment 150, e.g., to reduce fluid pressure in the fluid container 400. The fluid flow of this operational state is shown by the thick, arrowed, broken lines. In this operational state, fluid leaves the fluid container 400, enters a fluid container fluid line 402, passes into a third connector fluid path 716 via connector port 722 and to a third fluid path connector (or port) 718 of the connector 700. From the third fluid path connector 718, fluid passes through manifold port 800D and into a third manifold fluid flow path 812 defined in the manifold 800, through a third manifold port 814 and into the fluid transfer system 900. From here, in this example system and operational state, the fluid is discharged to the external environment 150. This occurs by the fluid leaving the fluid transfer system 900, passing through the first manifold port 804, through the first manifold fluid flow path 806 defined in the manifold 800, through manifold port 800B to the first fluid path connector (or port) 706 of the connector 700, and through the first connector fluid path 708 to the external environment 150 (which may constitute an interior space 710 within the connector 700).

Figure 5E:
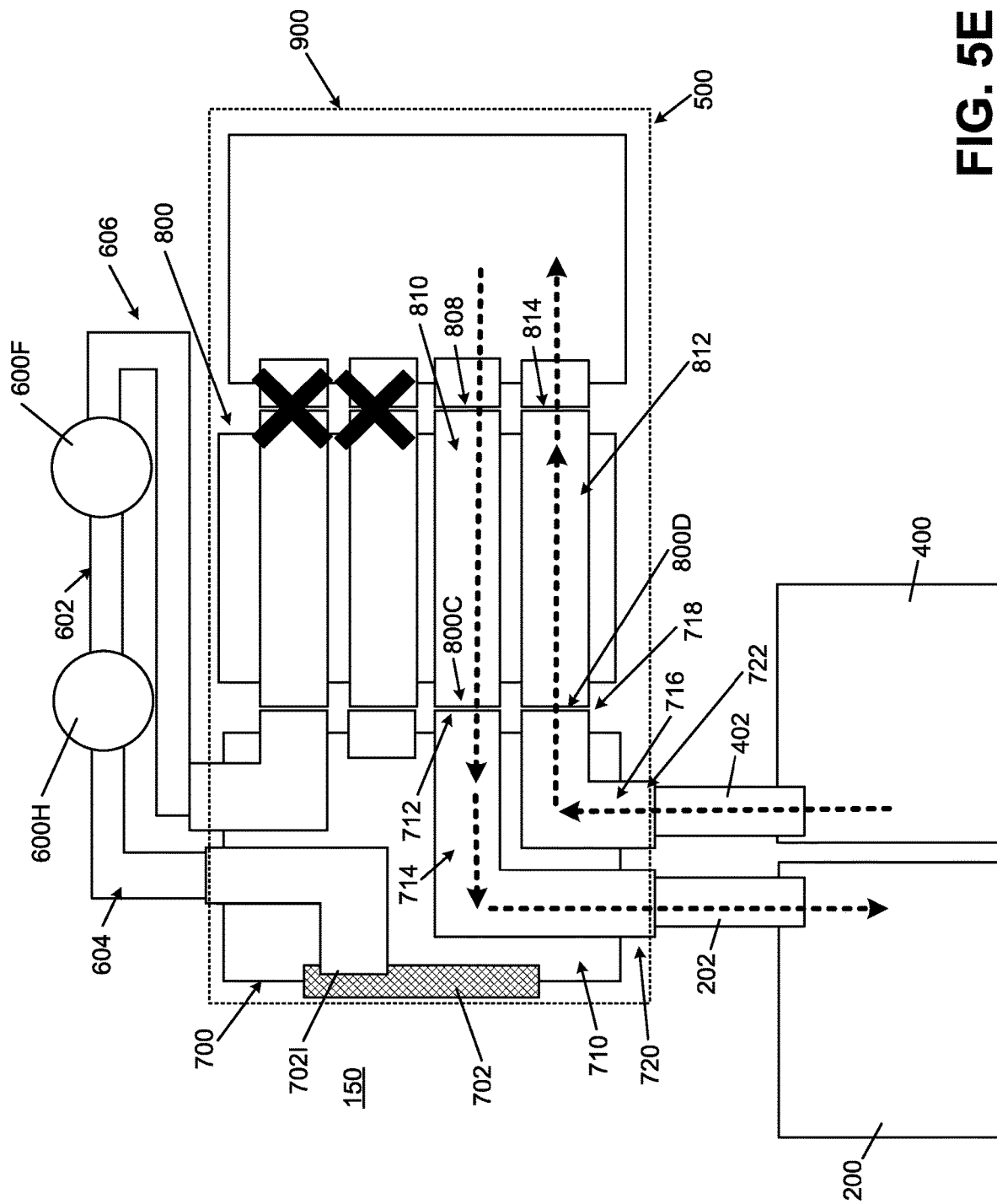

In some examples of fluid distributors 500 and foot support systems according to aspects of this technology, it may be desired to use the on-board fluid container 400 to adjust (and in this example, increase) fluid pressure in the foot support bladder 200. This may allow more predictable or controlled fluid transfer over time as less influence in fluid flow from pressure spikes due to foot contact with the ground may be experienced. An example of this operational state is shown in FIG. 5E. In this operational state, fluid leaves the fluid container 400, enters the fluid container fluid line 402, passes into the third connector fluid path 716 via connector port 722 and to the third fluid path connector 718 of the connector 700. From the third fluid path connector port 718, fluid passes through manifold port 800D into the third manifold fluid flow path 812 defined in the manifold 800, through the third manifold port 814 and into the fluid transfer system 900. From here, in this example system and operational state, the fluid is transferred to the foot support bladder 200. This occurs by the fluid leaving the fluid transfer system 900, passing through the second manifold port 808, through the second manifold fluid flow path 810 defined in the manifold 800, through manifold port 800C to the second fluid path connector 712 of the connector 700, through the second connector fluid path 714 to connector port 720, into foot support fluid line 202, and into the foot support bladder 200.

Figure 5F:
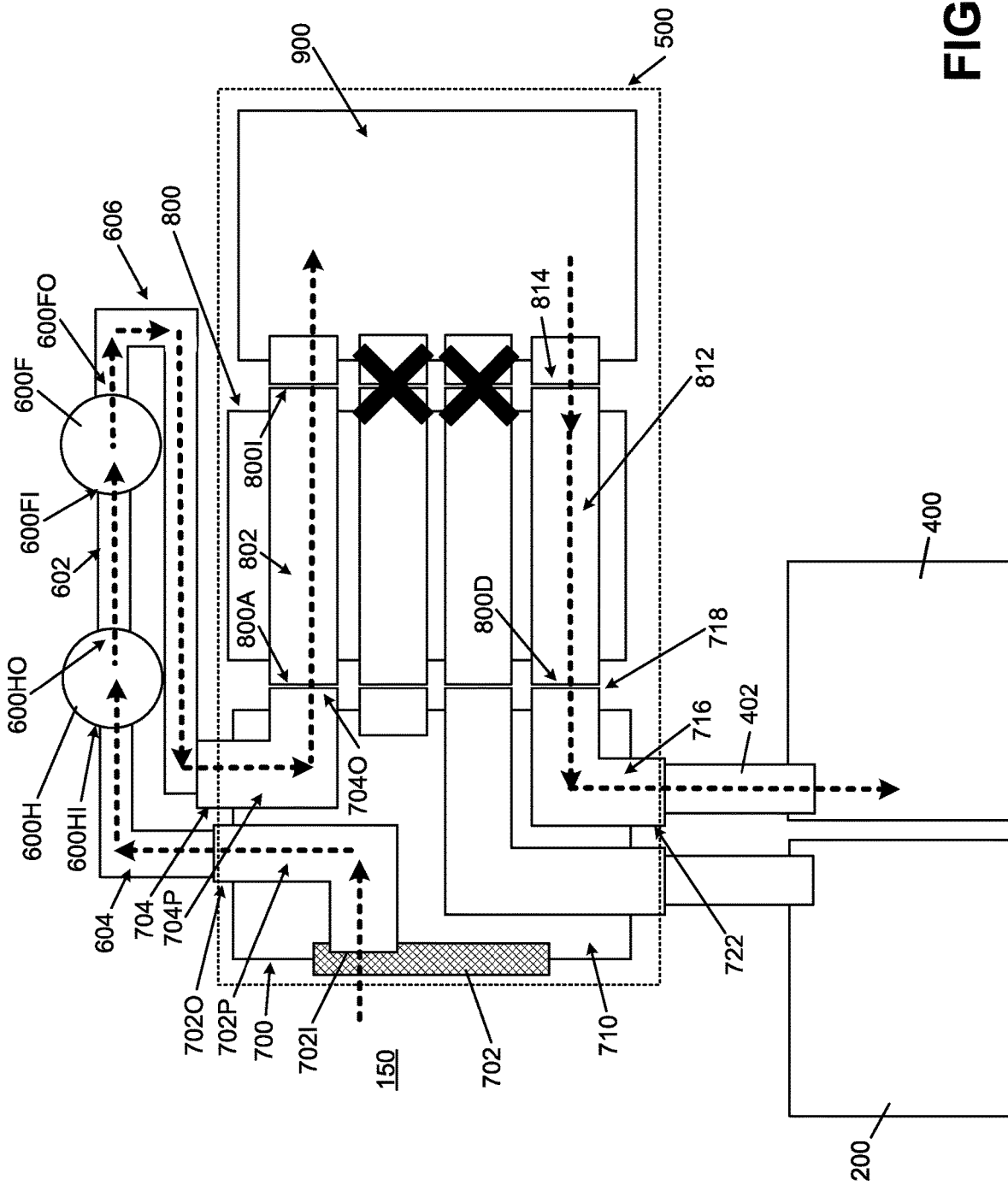

FIG. 5F shows an example operational state for adding fluid to the fluid container 400 (e.g., to increase fluid volume and/or pressure in the fluid container 400). In this operational state, incoming fluid from the external environment 150 (e.g., air) enters the connector 700 via filter 702 and connector inlet 702I. From connector inlet 702I, fluid travels through the connector body to connector outlet port 702O and to a fluid path 604 that takes the fluid to the pump system (pump(s) 600H, 600F). From the pump(s) 600H, 600F, fluid travels down a fluid line 606 back to an inlet port 704 of the connector 700. A one-way valve or a check valve along fluid line 606 may be present to prevent fluid from flowing back toward the pump(s) 600H, 600F through connector inlet port 704 and/or fluid line 606. From connector inlet port 704, fluid flows through the connector 700 via a connector fluid path 704P, to a connector outlet port 704O, and to an incoming fluid port 800A of the manifold 800. Fluid flows from the incoming fluid port 800A, through a fluid inlet path 802 in the manifold 800, through manifold inlet port 800I and to the fluid transfer system 900. In this operational state, fluid leaves the fluid transfer system 900, passes through the third manifold port 814, through the third manifold fluid flow path 812 defined in the manifold 800, through manifold port 800D, to the third fluid path connector (or port) 718 of the connector 700, through the third connector fluid path 716, through connector port 722, into the fluid container fluid line 402, and into the fluid container 400.

Figure 6:
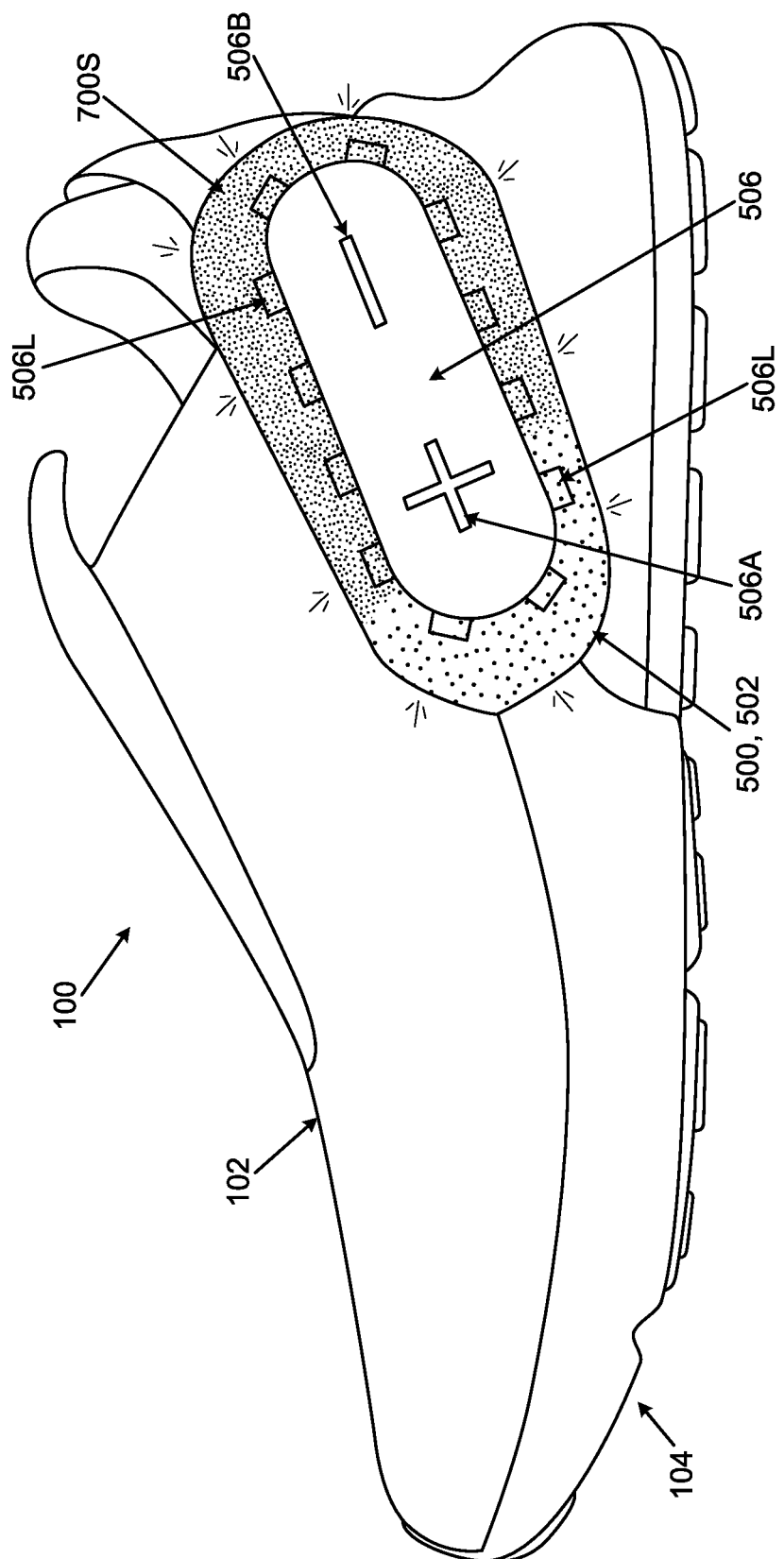
FIGS. 6-9 provide views of incorporation of fluid distributors into articles of footwear in accordance with some examples of this technology.
Figure 7A:
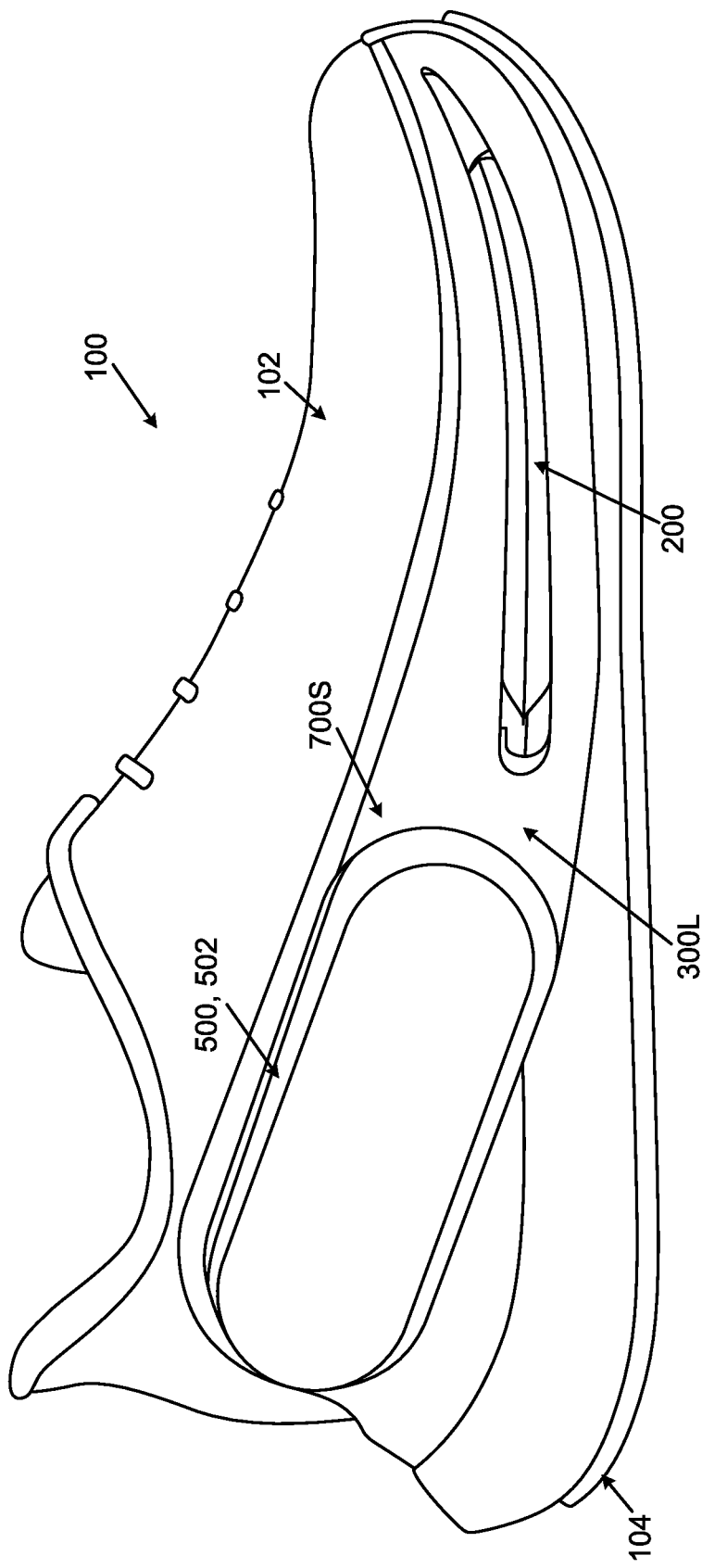
Figure 7B:
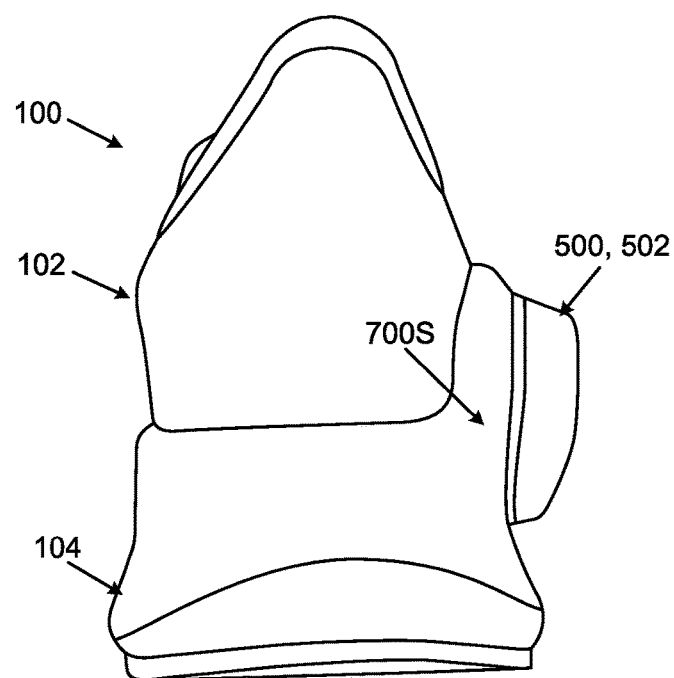
Figure 7C:
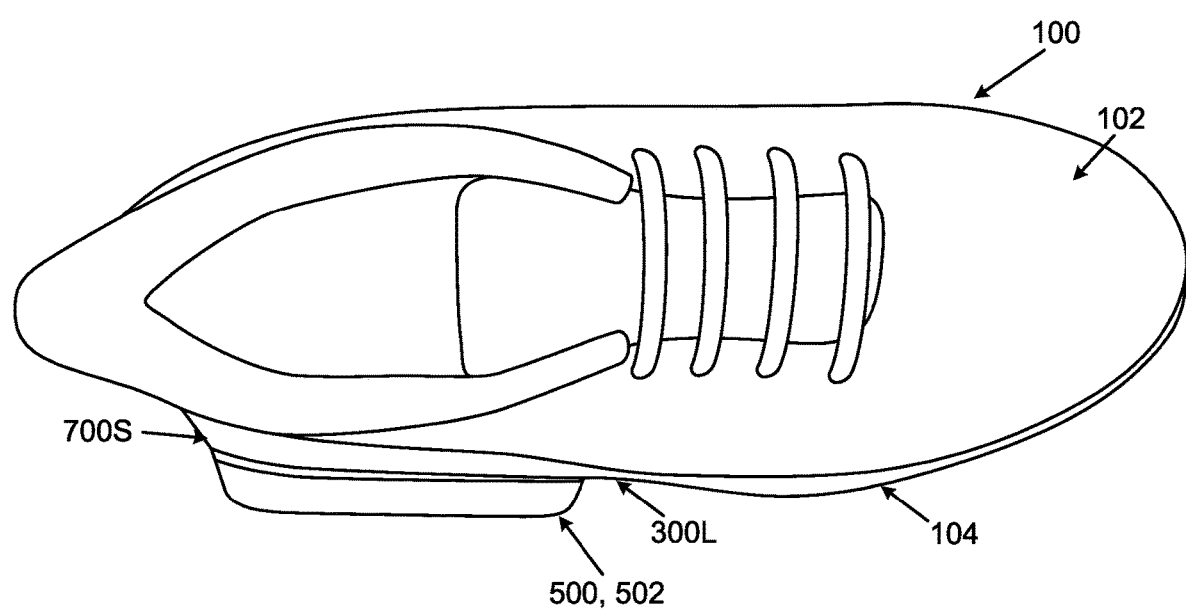
Figure 7D:
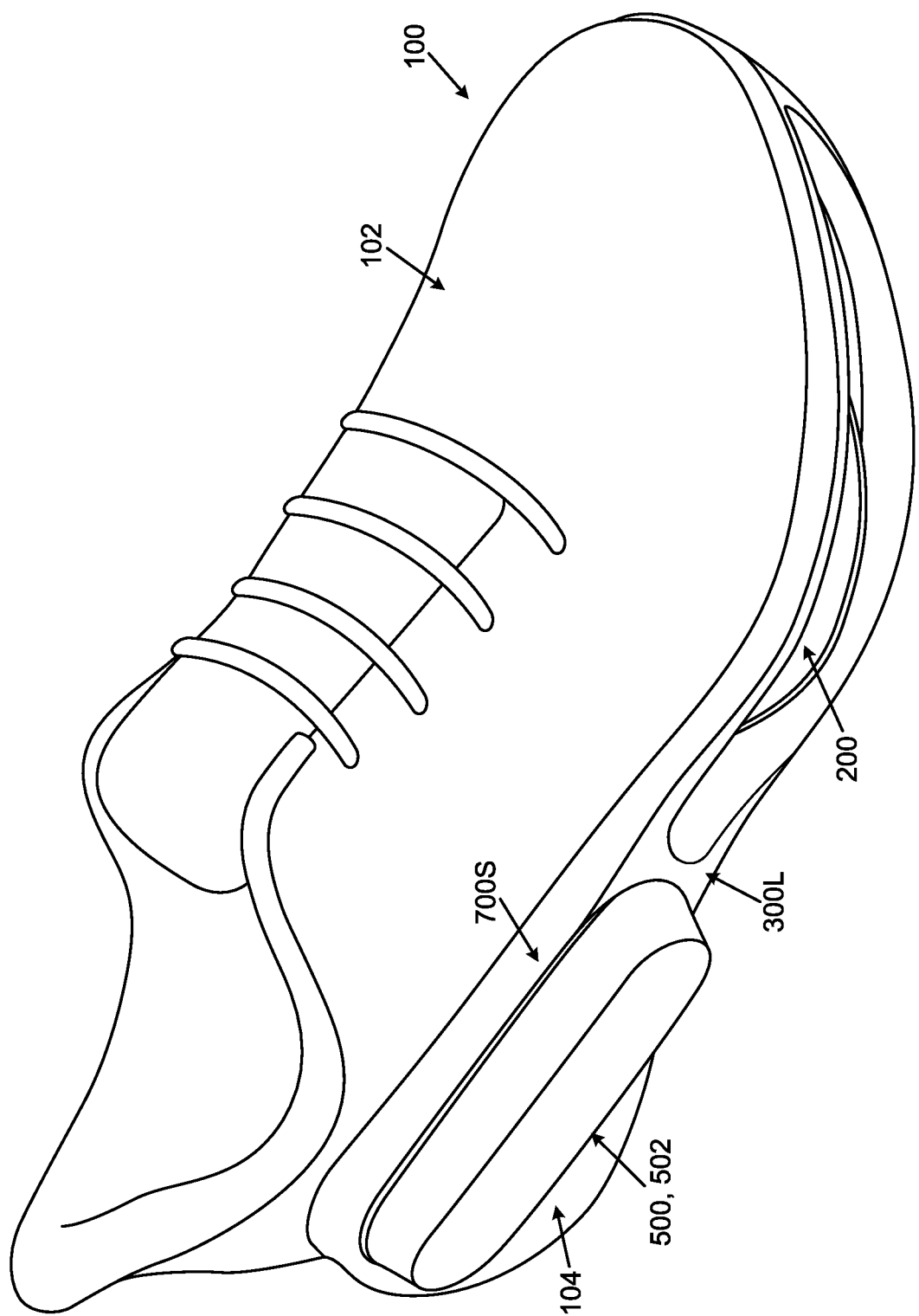
Figure 7E:
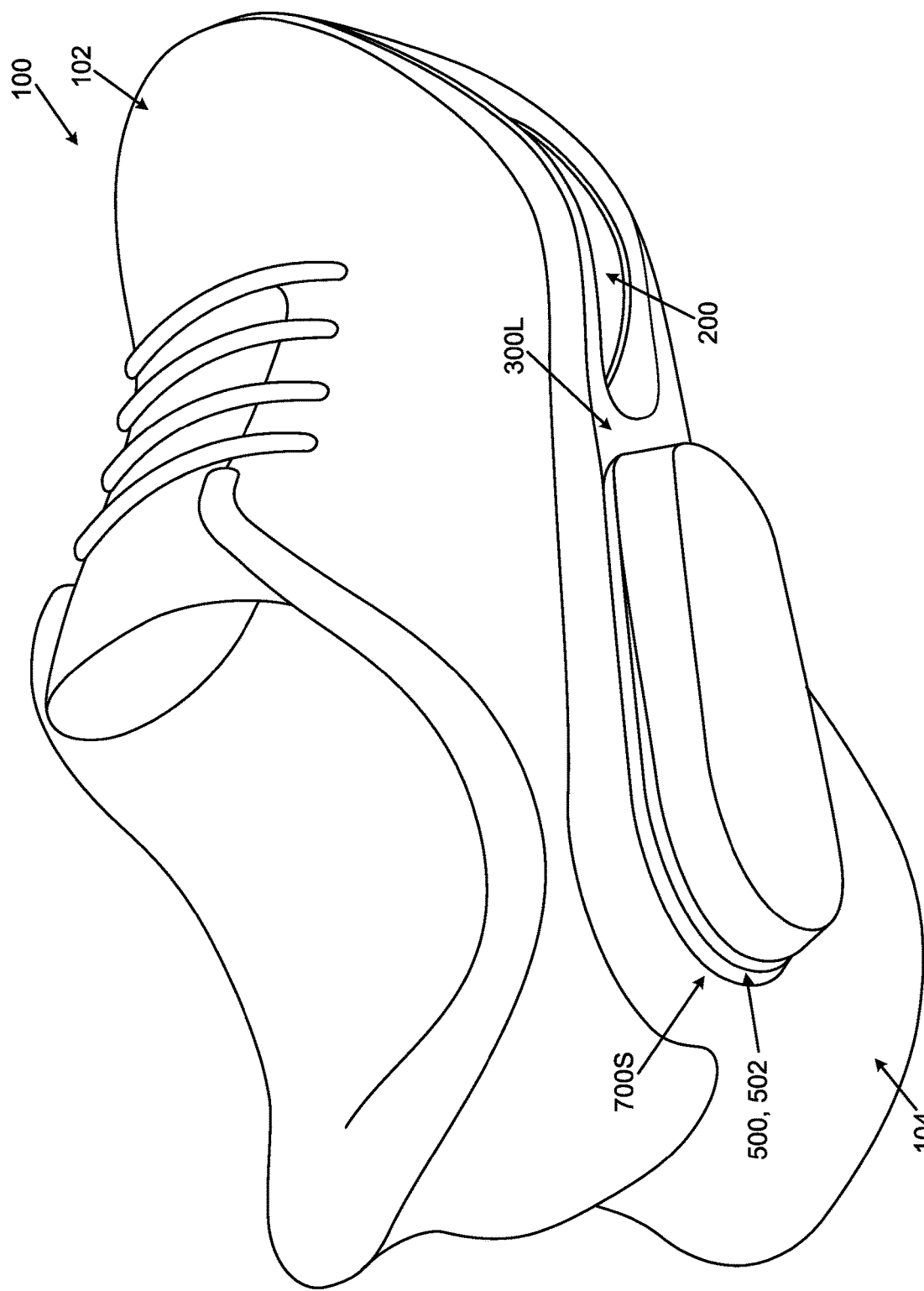

Some portions or all of the fluid distributor 500 (e.g., including some or all of the connector 700, manifold 800, and/or fluid transfer system 900) may be included in or engaged with a housing 502 (e.g., including a frame 504 and a cap 506). See FIGS. 2A and 2B. The housing 502 may be mounted to the sole structure 104 and/or to the footwear upper 102. When mounted on a side surface of an article of footwear 100, e.g., as shown in FIGS. 2A, 2B, and 6-7E, the fluid distributor 500 may be located at a lateral, heel area of the upper 102 and/or sole structure 104, e.g., to help prevent undesired contact between the user's feet. The example footwear 100 structures of FIGS. 6-7E show the sole structure 104 including an upwardly extending base surface 700S that provides a base for attachment of the fluid distributor 500. The base surface 700S may form part of lateral cage component 300L described above in conjunction with FIG. 2B. Fluid lines (e.g., from the foot support bladder 200, from the fluid container 400, from the fluid source (e.g., pump(s) 600H, 600F), and/or from the external environment 150) may extend through this base surface 700S and/or otherwise may be exposed at this base surface 700S for engagement with the fluid distributor 500, as will be described in more detail below.

As further shown in FIG. 6 (and as will be described in more detail below), if desired, the cap 506 of the fluid distributor 500 may include an input system, e.g., one or more switches (506A and 506B shown in FIG. 6). These switches 506A and 506B can function as user inputs, e.g., to allow a user to manually increase (switch 506A) or decrease (switch 506B) air pressure in the foot support bladder 200. User interaction with switches 506A and 506B, when present, may activate the fluid distributor 500 and fluid transfer system 900 to move fluid as described with respect to one or more of the operational states above. FIG. 6 further illustrates that the fluid distributor 500 may include one or more lights 506L (e.g., one or more LED's (e.g., 12) around a perimeter of its housing 502) within a light guide. These light(s) 506L may be decorative and/or may allow color variations of the displayed light. In some examples, the light(s) 506L may provide information, e.g., relating to one or more of: (a) an "on" or "off" status of the fluid distributor 500 (e.g., light(s) 506L on means powered, light(s) 506L off means unpowered); (b) foot support pressure and/or other pressure status information of the footwear 100 (e.g., depending on light color and/or flashing indicating maximum pressure, minimum pressure, intermediate pressure(s), etc.); (c) system reset status; (d) factory reset status; (e) powering on, powering off, and/or reboot status; (f) pressure adjustment in progress; (g) an error condition; (h) battery charging status; (i) remaining battery charge status; (j) successful and/or unsuccessful electronic communication status information with the other shoe and/or a mobile computing device (BTLE confirmation status); (k) data download, upload, and/or software update progress or status information; (l) operational state identifying and/or status information; etc. Additionally or alternatively, input data (e.g., from speed and/or distance monitoring device, optionally included with the footwear) may be used to control the lights (e.g., the color(s) of the lights(s) 506L, the number of light(s) 506L lit, change in lighting arrangement, the arrangement of lit light(s) 506L, the sequence of lighting, the animation of the lights, etc.). Such data also may enable the lights to provide information, such as foot speed information, distance run information, acceleration information, workout intensity information, battery life status information, decorative features, etc. Light colors, animations, styles, and the like may differ, e.g., between different shoe models, different shoe types, different shoe colorways, etc. Light "animations" as used herein may include, for example one or more of: displayed light colors; changes in displayed light colors; light blinking or flashing rates; changes in light blinking or flashing rates; the number and/or arrangement of the displayed lights; changes in the number and/or arrangement of the displayed lights; etc. While other options are possible, in the specific example of FIG. 6, the lights 506L form an annular ring around the housing 502 (although the entire annular ring need not be lit at the same time).

Accelerometer data, speed and/or distance data, impact force data, and/or other data (e.g., detected by "on-board" foot sensors systems, data from sensors included in apparel, and/or data from an external device (such as a smartphone based speed and/or distance monitoring system)) may be communicated to the fluid flow control system and used, e.g., to automatically adjust foot support bladder 200 pressure. Detected faster speeds and/or acceleration may be used as input(s) to initiate a foot support pressure increase, while detected slower speeds and/or deceleration may be used as input(s) to initiate a foot support pressure decrease. These types of additional input data, input data sources, and/or pressure adjustments may be provided in any of the examples of fluid distributors 500, fluid flow control systems, fluid transfer systems 900, foot support systems, sole structures 104, and/or articles of footwear 100 described in this specification.

Figure 8B:
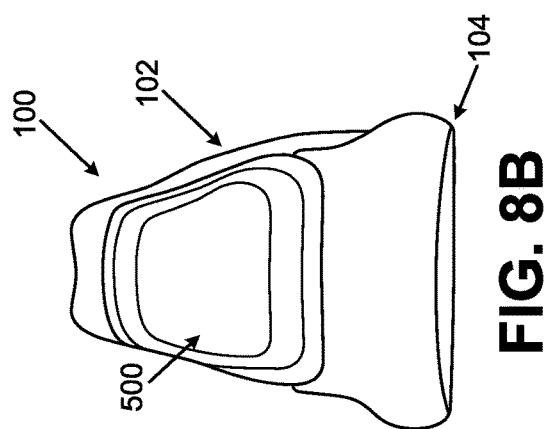
Figure 8A:
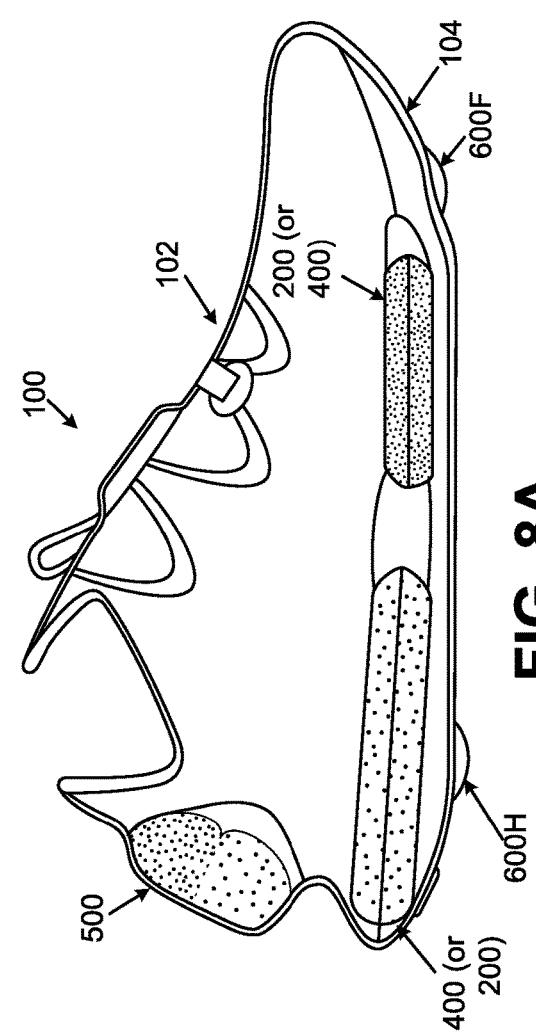
Figure 9:
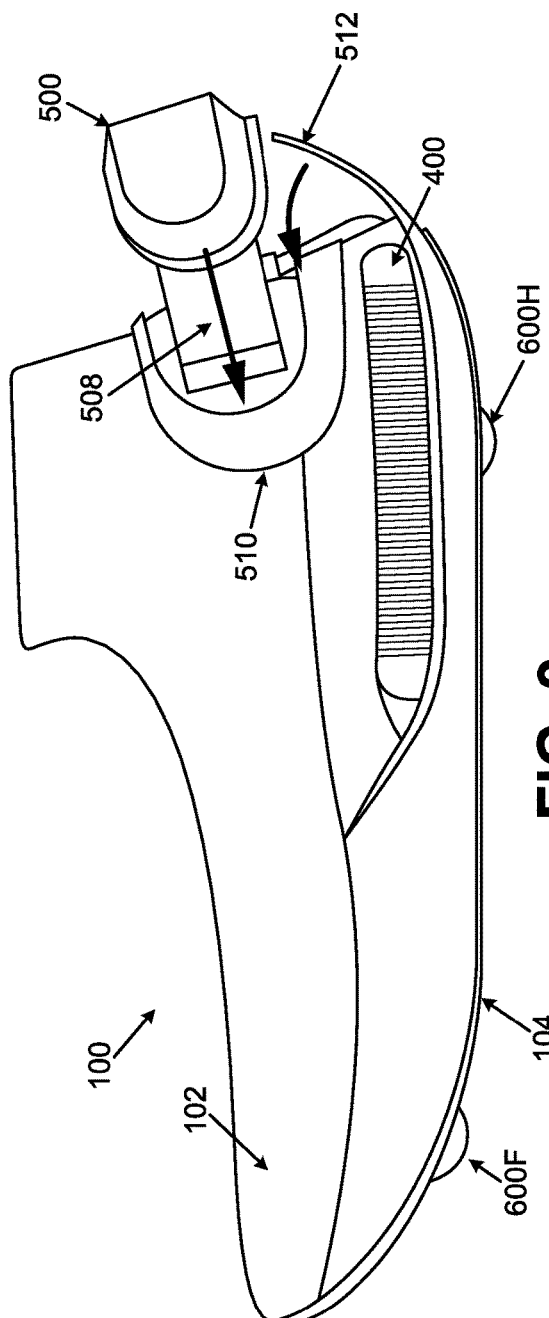

FIGS. 8A and 8B illustrate another example arrangement of a fluid distributor 500 and/or a foot support system in an article of footwear 100. As shown in these figures, the fluid container 400 (formed as a fluid-filled bladder in this example) is provided at least in a heel support area of the article of footwear 100 and the foot support bladder 200 is provided at least in a forefoot support area of the article of footwear 200. The opposite arrangement also is possible. For example, in FIG. 8A, the fluid container 400 (e.g., formed as a fluid-filled bladder) may be provided at least in a forefoot support area of the article of footwear 100 and the foot support bladder 200 may be provided at least in a heel support area of the article of footwear 200. Some portions or all of the fluid distributor 500 (e.g., including some or all of the connector 700, manifold 800, and/or fluid transfer system 900) may be mounted at a rear heel area of the article of footwear 100. The fluid distributor 500 in this example is engaged with the upper 102, although it may be engaged, at least in part, with the sole structure 104 at the rear heel area, if desired. Additionally or alternatively, as shown in FIG. 9, if desired, at least a portion of the fluid distributor 500 may be releasably secured (see arrow 508) within a receptacle 510 provided on the footwear 100 structure (e.g., as part of the sole structure 104 and/or upper 102, such as a heel counter type component). If necessary or desired, a locking mechanism (e.g., releasable retaining flap 512) may be used to hold the fluid distributor 500 in place with respect to the receptacle 510. Any desired manner of releasably securing the fluid distributor 500 in the receptacle 510 may be used without departing from this technology.

Figure 10:
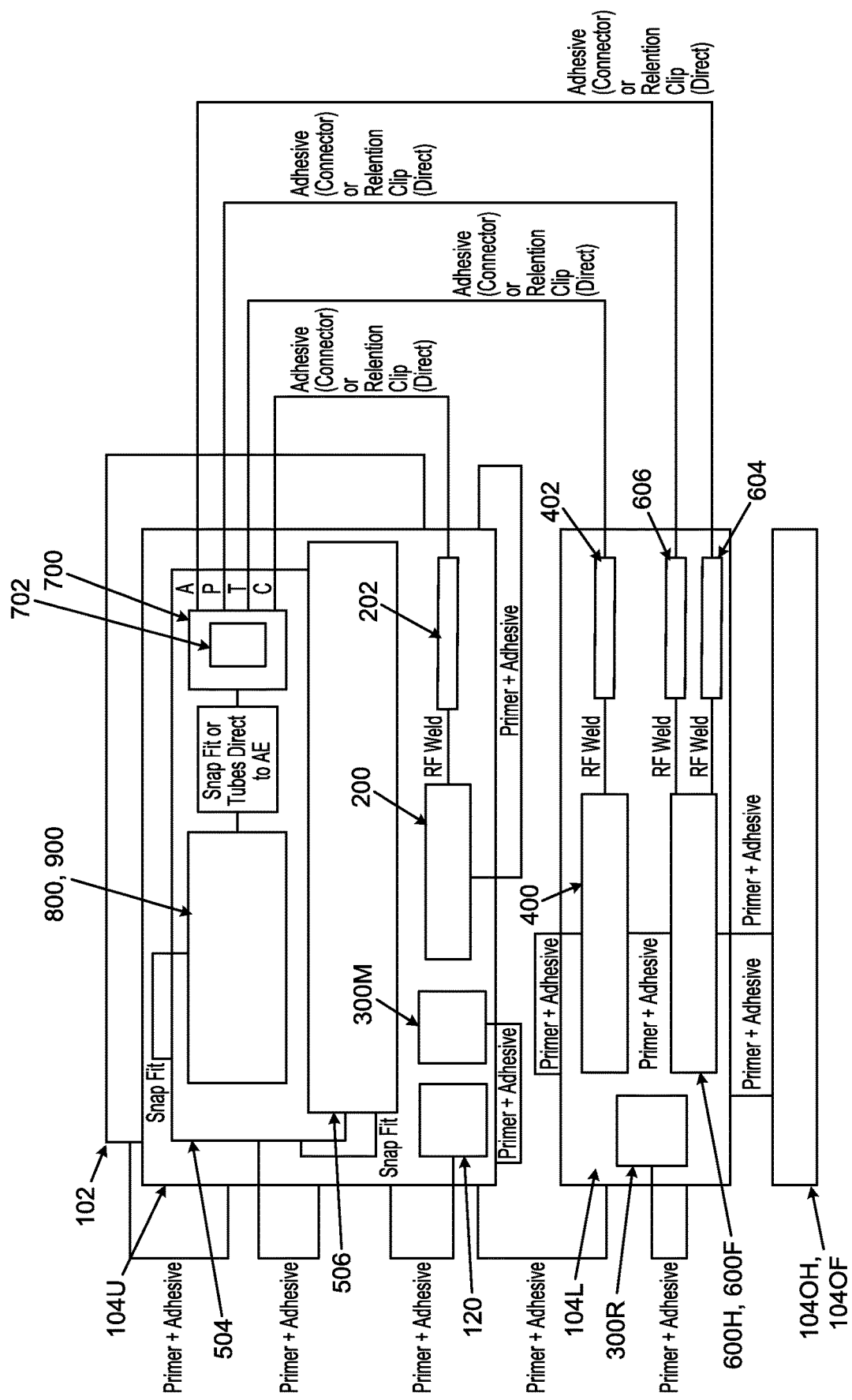
FIG. 10 schematically illustrates features of the layout and engagement of component parts in accordance with some examples of this technology.

FIG. 10 provides a block diagram illustrating features of assembly of an example article of footwear 100 (e.g., including a sole structure 104 like that shown in FIG. 2B), including inclusion of a fluid distributor 500 or fluid flow control system in accordance with some aspects of this technology. In addition to the various components and parts described above, FIG. 10 provides additional information as to how the components and/or parts may be engaged together. Examples include the use of primers and adhesives, snap fit parts, retention clips, RF welds, and direct tube connections. Any desired manner of engaging the various components and/or parts together may be used without departing from this technology, including connectors, adhesives, and the like as are conventionally known and used in the footwear arts.

Figure 11A:
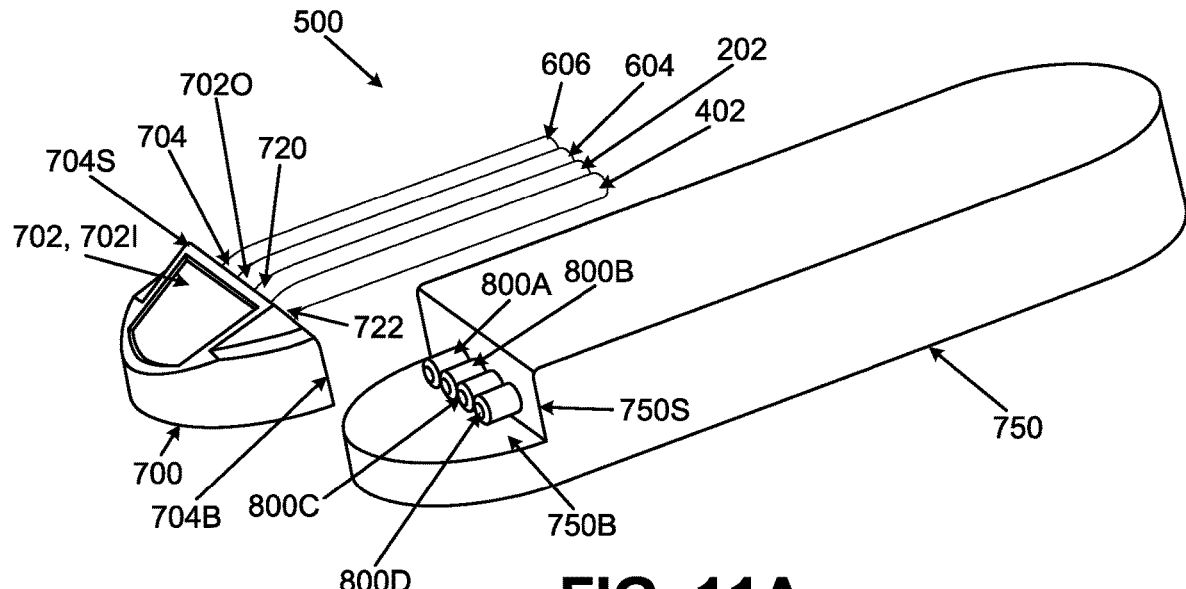
Figure 11B:
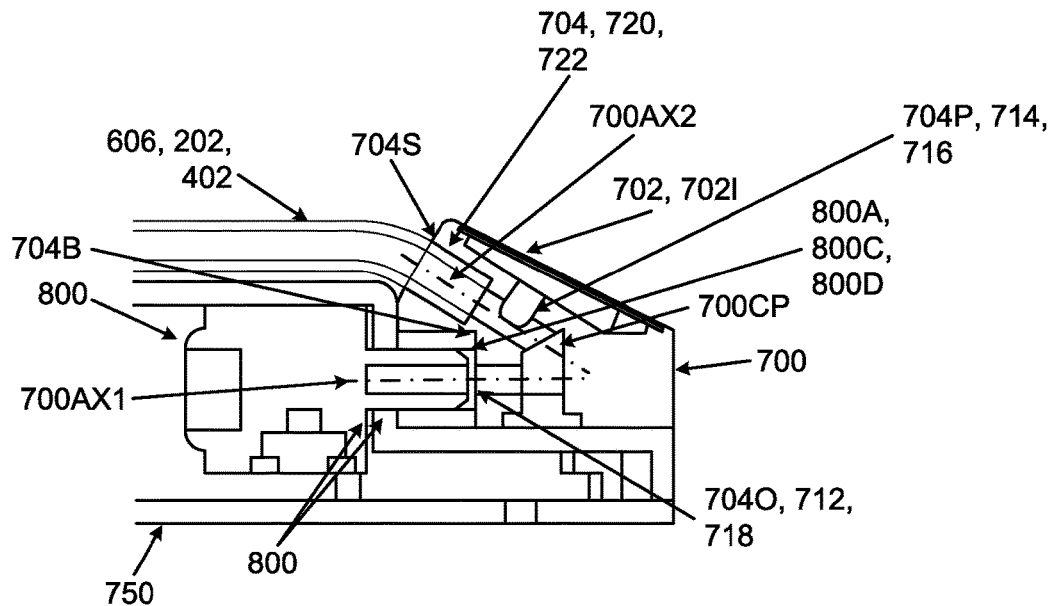

In some examples of this technology, the fluid distributor 500 may have a configuration like that shown in FIGS. 11A and 11B (note also the discussion of FIGS. 5A-5F above). In this example, the connector 700 includes a filter 702 that accepts fluid from the external environment (e.g., via inlet port 702I). The connector 700 forms a separate part that is engaged with a housing 750, and the manifold 800 and fluid transfer system 900 are contained within housing 750. The connector 700 of this example connects with four external fluid lines (e.g., flexible tubes). One fluid line 604 takes incoming fluid from the external environment, via connector inlet port 702I and outlet port 702O, to the pump(s) (600H, 600F). A second fluid line 606 takes fluid from the pump(s) (600H, 600F) back to the connector 700 so it can be introduced into the manifold 800 and fluid transfer system 900 under increased pressure from the pump(s) 600H, 600F. A third fluid line 202 extends to and is in fluid communication with the foot support bladder 200. This fluid line 202 is used to move fluid into the foot support bladder 200 from the fluid distributor 500 and out of the foot support bladder 200 into the fluid distributor 500. A fourth fluid line 402 extends to and is in fluid communication with the fluid container 400. This fluid line 402 is used to move fluid into the fluid container 400 from the fluid distributor 500 and out of the fluid container 400 into the fluid distributor 500. Notably, as shown in FIGS. 11A and 11B, the ports 702O, 704, 720, and 722 of connector 700 connecting with external fluid lines 604, 606, 202, and 402, respectively, may be aligned along one surface 704S of the connector 700 (and extend, at least in part, in parallel through the connector 700, if desired).

FIGS. 11A and 11B further illustrate that the housing 750 for the manifold 800 and fluid transfer system 900 of this example includes four ports: 800A, 800B, 800C, and 800D. Port 800A of this example connects with port 704O on the connector 700 body in fluid communication with fluid line 704P to accept incoming fluid from fluid line 606 (and thus from the pump(s) (600H, 600F)) and takes the incoming fluid into the manifold 800 and/or fluid transfer system 900. Port 800B of this example connects with port 706 on the connector 700 body and exhausts excess or undesired fluid back to the external environment (e.g., through the connector 700 body). Port 800C of this example connects with port 712 on the connector 700 body and exchanges fluid (in either direction) between the foot support bladder 200 and the manifold 800. Port 800D of this example connects with port 718 on the connector 700 body and exchanges fluid (in either direction) between the fluid container 400 and the manifold 800. Notably, as shown in FIGS. 11A and 11B, the ports 800A, 800B, 800C, and 800D of manifold 800 may be aligned along one surface 750A of the housing 750 and/or of the manifold 800 (and may extend, at least in part, in parallel through the housing 750 and/or the manifold 800, if desired). Connector 700 ports 704O, 706, 712, and 718 (which connect with manifold ports 800A, 800B, 800C, and 800D, respectively) may be aligned along one surface 704S of the connector 700 (and extend, at least in part, in parallel through the connector 700, if desired). In this illustrated example, connector 700 ports 704O, 706, 712, and 718 may be located somewhat below and offset from connector ports 704, 702O, 720, and 722, respectively, on surface 704B of the connector 700. Surfaces 704S and 704B may constitute a common surface on the connector 700, may be offset from one another, may be different from one another, may face in different directions, etc.

FIG. 11B further illustrates that one or more of the connector fluid paths 704P, 714, 716 may define a bent or curved path. One or more connector fluid paths 704P, 714, 716 may include: (a) a first axial direction 700AX1, (b) a second axial direction 700AX2, and (c) a connecting portion 700CP joining the first axial direction 700AX1 and the second axial direction 700AX2. The first axial direction 700AX1 and the second axial direction 700AX2 extend away from one another from the connecting portion 700CP at an angle of 70 degrees or less.

As further shown in FIGS. 11A and 11B, the connector 700 of this example includes fluid paths 704P, 714, 716 that pass through the connector body to connect connector ports 704, 720, 722 with manifold ports 800A, 800C, 800D. The fluid paths 704P, 714, 716 form a bent or curved path through the connector 700 body in this example. Fluid may enter and exit the connector 700 from the same general side of the connector 700 and/or in the same general direction (e.g., as shown in FIG. 11B).

FIGS. 12A-12C further illustrate the connector 700-to-housing 750 connection of FIGS. 11A and 11B to highlight some additional potential features. As shown in these figures, a sealing system 760 is provided between the ports 800A, 800B, 800C, 800D of manifold 800 and the ports, 704O, 706, 712, 718, respectively, of connector 700. The sealing system 760 includes female engagement parts (e.g., channels 760A, 760B, 760C, 760D) that fit around male engagement parts (e.g., tubular structures forming the outer surfaces of ports 800A, 800B, 800C, 800D) to sealingly engage the manifold 800 with the connector 700. The other ends of channels 760A, 760B, 760C, 760D may sealingly engage the connector 700 and align with (and/or form) connector ports 704O, 706, 712, 718.

Figure 13A:
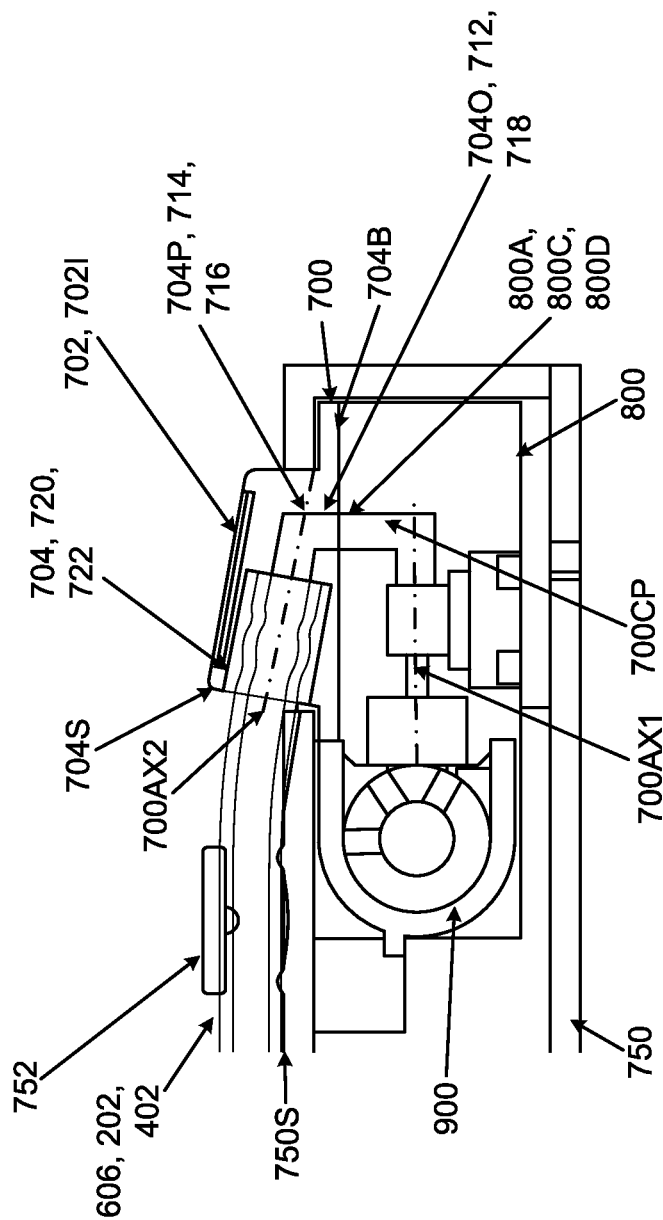

FIGS. 13A-13C illustrate a different connection between the housing 750 and the external fluid lines 202, 402, 604, 606. In this example, the connector 700 is not a separate part engaged with manifold 800, but rather the connector 700 constitutes part of the manifold 800 and/or is fixed in housing 750. In this connection, the ends of fluid lines 202, 402, 604, 606 form male connector parts that extend into female openings forming the ports 704, 702O, 720, 722 of the connector 700 portion of manifold 800. In this structure, fluid enters and exits the connector 700 from different sides or surfaces 704S, 704B of the connector 700 and/or in different directions. Thus, the connector 700-to-housing 750 connections shown in FIGS. 13A-13C follow a different path shape than the connector 700-to-housing 750 fluid flow path shapes shown in FIGS. 11A-12C (i.e., connector fluid paths 704P, 714, 716 differ in shape in these examples). FIGS. 13A-13C further show fluid lines 202, 402, 604, 606 (which extend from internal locations within the article of footwear 100) secured to the outer surface 750S of housing 750 by one or more retainer clips 752 (one clip 752 shown in FIGS. 13A-13C engaging all of fluid lines 202, 402, 604, 606). The retainer clip(s) 752 helps hold the fluid lines 202, 402, 604, 606 in place with respect to the housing 750, which can help prevent kinks, disconnections, etc. and/or assist with assembly. The retainer clip(s) 752 may be engaged with housing 750 in any desired manner, including via retaining structures 754 and friction fit, releasable engagements, fixed engagements, adhesives, mechanical connectors, etc.

Figure 14A:
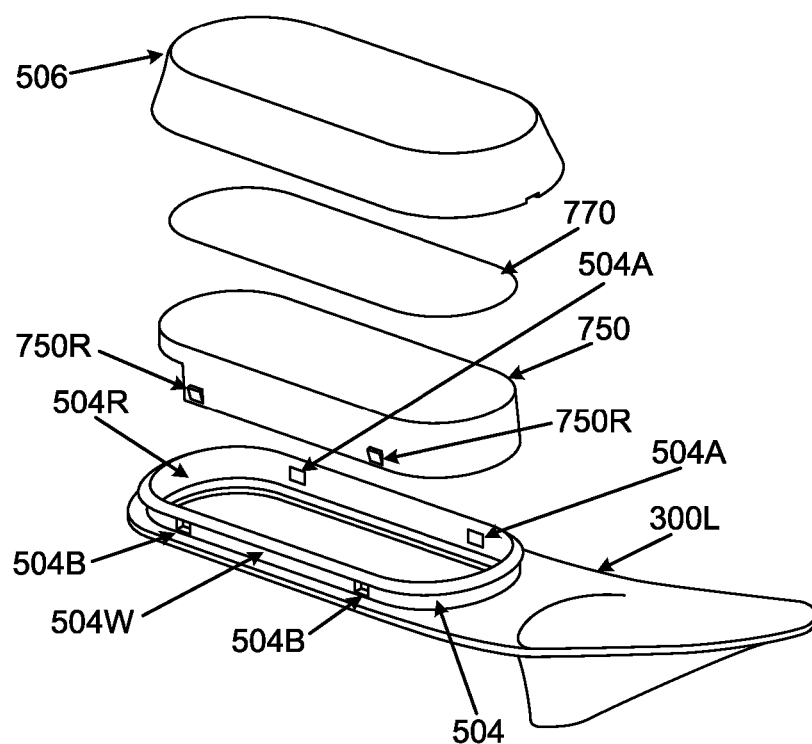
Figure 14B:
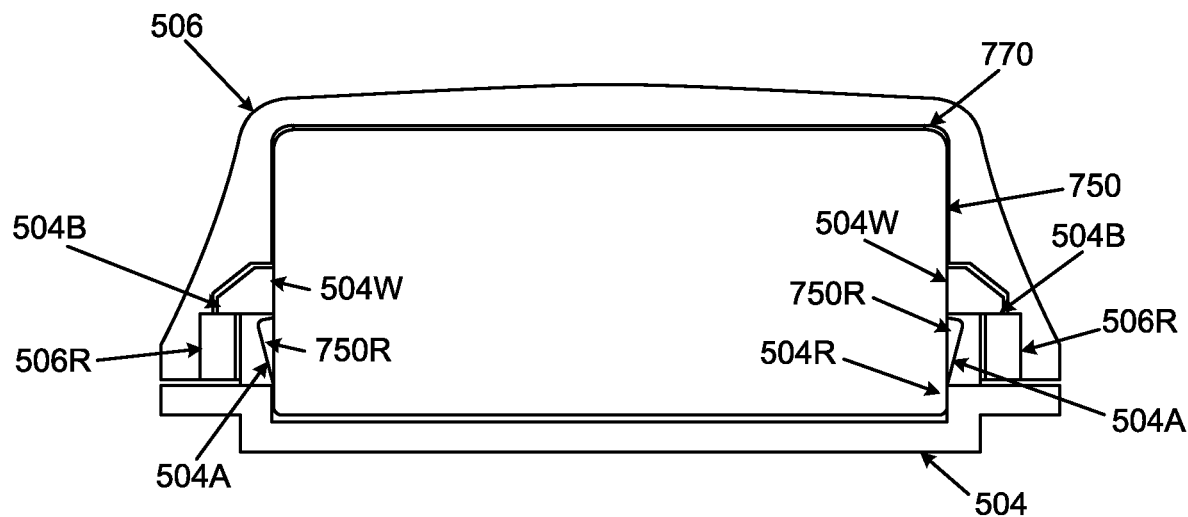

FIGS. 14A and 14B illustrate features of engaging a fluid distributor 500 according to some aspects of this technology with an article of footwear 100 or a component thereof (such as part of a sole structure 104). Referring back to the example of FIGS. 2A and 2B, the fluid distributor 500 of that example was engaged with a lateral cage component 300L of a sole structure 104. The fluid distributor 500 of this example includes housing 750 that contains at least the manifold 800 and fluid transfer system 900 (optionally engaged with connector 700 as described above). The frame 504 may be engaged or integrally formed with the cage component 300L or other sole 104 and/or upper 102 component in any desired manner, e.g., such as adhesives, mechanical connectors, 3D printing, etc. Once the housing 750 is engaged with the connector 700 and/or the connector 700 is engaged with the external fluid lines (e.g., as described above and in more detail below), the housing 750 may be engaged within the recess 504R of the frame 504 and fixed to it (in a permanently fixed or releasable manner). In the illustrated example, housing 750 is engaged with sidewalls 504W of the frame 504 by retaining elements 750R extending and fitting into retaining recesses 504A provided in the interior of sidewalls 504W of frame 504. A pressure sensitive adhesive ("PSA") 770 may be applied to the top surface of the housing 750 and/or the bottom interior surface of the cap 506 to help hold these parts together. Additionally or alternatively, the cap 506 may be engaged (permanently or releasably) with sidewalls 504W of the frame 504, e.g., by retaining elements 506R extending and fitting into retaining recesses 504B provided in the exterior of sidewalls 504W of frame 504. The retaining element(s) 506R of cap 506, when present, may be made from a polyether based thermoplastic polyurethane material having good low temperature flexibility and damping characteristics (e.g., to reduce rattling of the cap 506 on the frame 504).

Figure 15A:
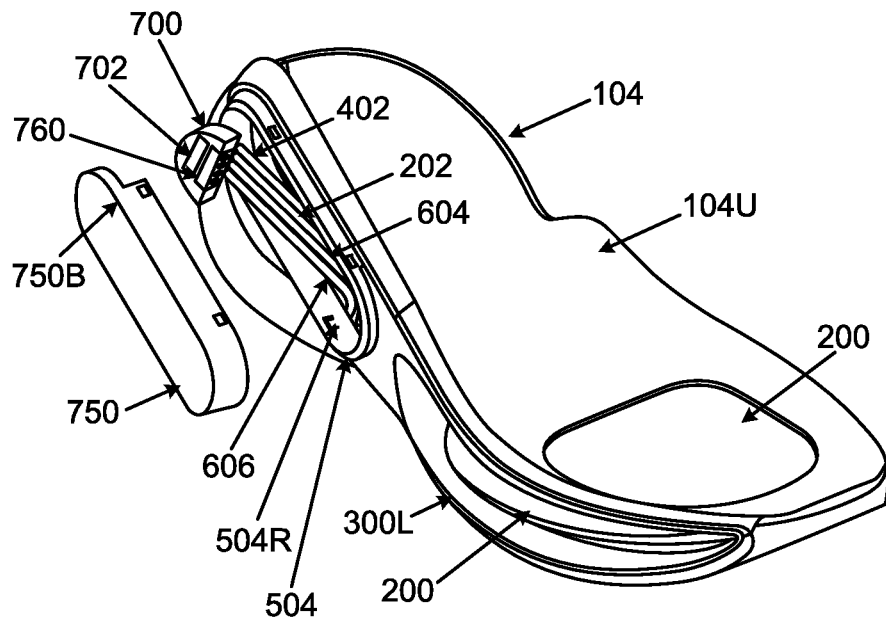
Figure 15B:
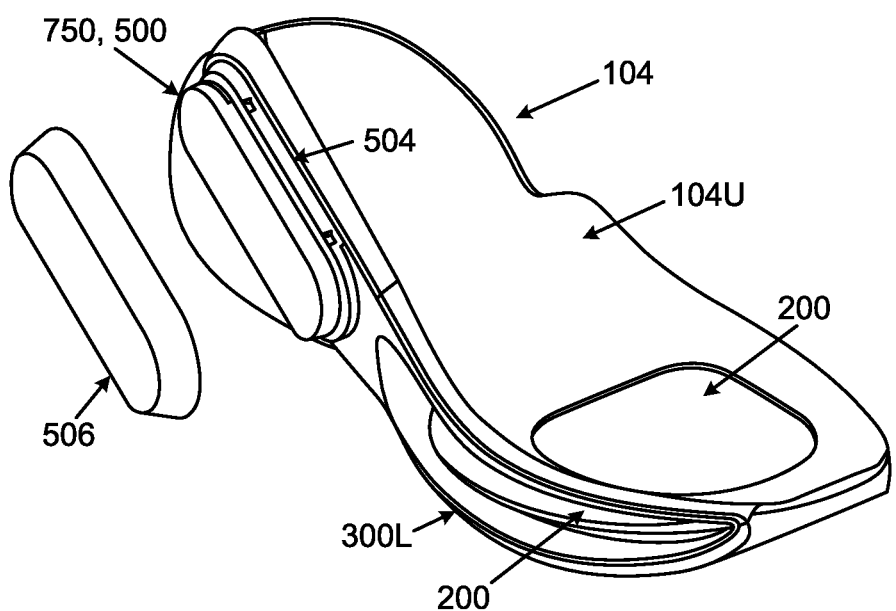
Figure 15C:
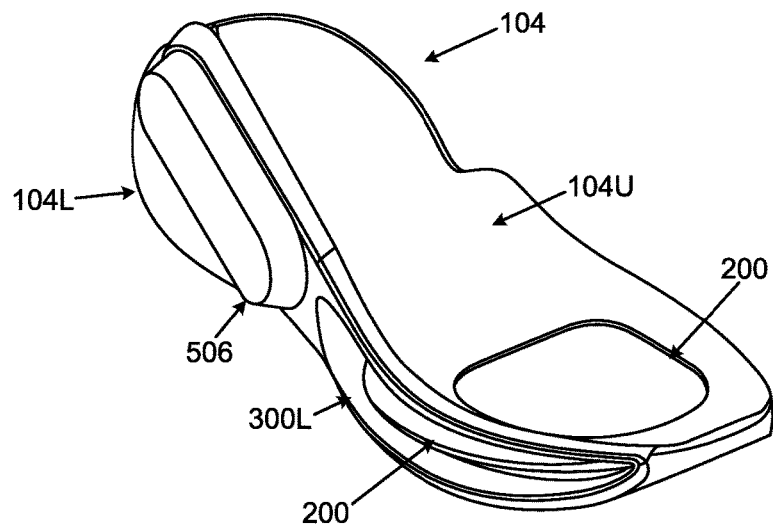

FIGS. 15A-15C further illustrate an example of incorporating a fluid distributor 500 into a footwear structure (e.g., into a footwear sole structure 104) in accordance with some examples of this technology. The connection shown in FIGS. 15A-15C relates to a system having a housing 750 containing the manifold 800 and fluid transfer system 900 engaged with a separate connector 700 structure, e.g., as shown in FIGS. 11A-12C. As shown in FIG. 15A, first the fluid lines from the various footwear component parts are brought to and engaged with connector 700. In this example, these fluid lines include: (a) fluid line 604 extending from the connector inlet 702I to the pump(s) 600H, 600F, (b) fluid line 606 extending from the pump(s) 600H, 600F back to the connector 700, (c) fluid line 202 extending between the foot support bladder 200 and the connector 700, and (d) fluid line 402 extending between the fluid container 400 and the connector 700. Fluid lines 604, 606, 202, 402 may be engaged with their respective connector ports 702O, 704, 720, 722 in any desired manner, including via use of adhesives, mechanical connectors, friction fits, engaged male/female connectors, etc.

Then, as shown in FIGS. 15A and 15B, the housing 750 including the manifold 800 and the fluid transfer system 900 may be engaged with the connector 700 (e.g., to form the complete fluid distributor 500 of this example). This may occur, for example, by sliding manifold ports 800A, 800B, 800C, 800D into fluid communication with connector fluid paths 704P, 708, 714, 716, respectively at connector ports 704O, 706, 712, 718, respectively. Note the discussion above relating to FIGS. 5A-5F and 11A-12C. While not a requirement, this illustrated example includes the sealing system 760 having channels 760A-760D receiving male ports 800A-800D, respectively, of manifold 800. If necessary or desired, an adhesive may be applied to the manifold ports 800A, 800B, 800C, 800D, the connector 700 ports 704O, 706, 712, 718, and/or (when present) the sealing channels 760A, 760B, 760C, 760D to fix the connecting parts together.

As shown in FIGS. 15A and 15B, as the housing 750 is being engaged with the connector 700 (in housing recess 750B), the housing 750—with engaged connector 700—may be moved into the recess 504R of the frame 504 so that the housing 750 engages frame 504 in the manner described above in conjunction with FIGS. 14A and 14B (e.g., snap fit into place, adhesively bonded, mechanical connectors, etc.). Then, as shown by a comparison of FIGS. 15B and 15C, the cap 506 may be engaged with the housing 750 and/or frame 504, e.g., in the manner described above in conjunction with FIGS. 14A and 14B (e.g., snap fit into place, adhesively bonded with pressure sensitive adhesive 770, mechanical connectors, etc.). FIG. 15C shows the final assembled sole component 104 of this example. The sole component 104 may be engaged with an upper 102 to form the overall article of footwear 100 (before or after the housing 750 is engaged in the frame 504).

Figure 15D:
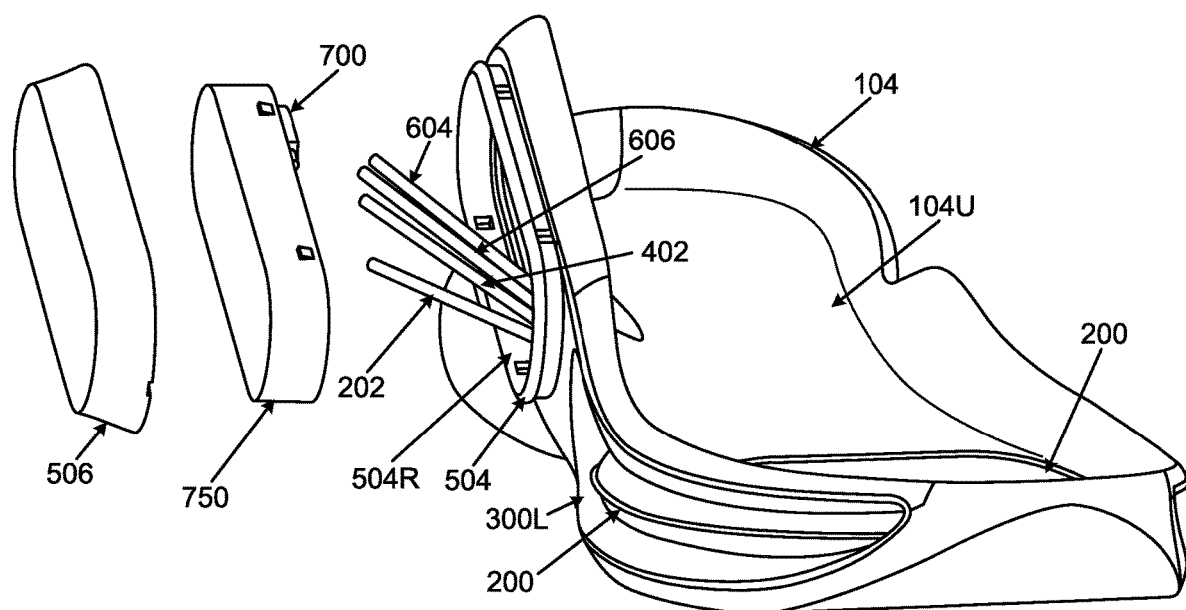
Figure 15E:
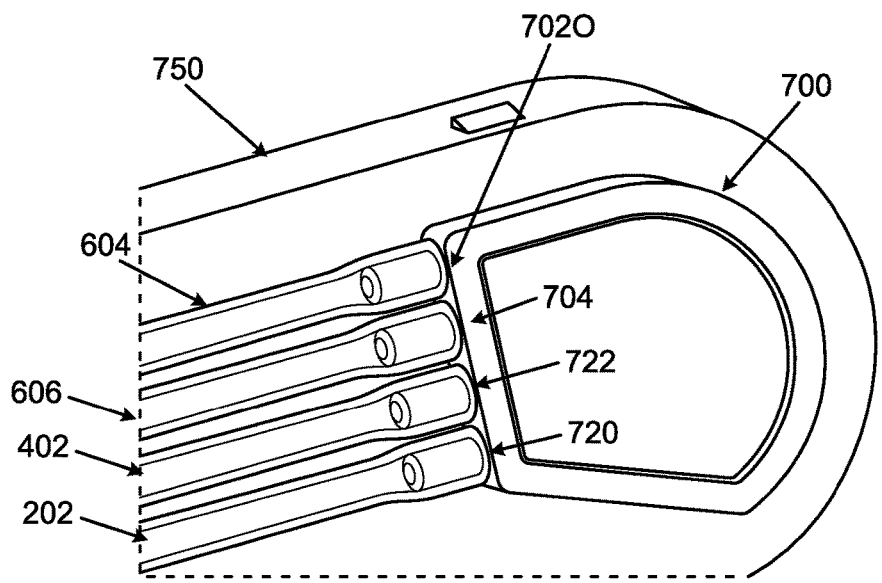

FIGS. 15D-15G illustrate assembly of a connection in which the connector 700 is formed as part of the manifold 800 structure and included in housing 750 prior to assembly. As shown in FIGS. 15D and 15E, first the fluid lines from the various footwear component parts are brought to and engaged with connector 700 ports located at the interior side of housing 750. In this example, these fluid lines include: (a) fluid line 604 extending from the connector inlet 702I to the pump(s) 600H, 600F, (b) fluid line 606 extending from the pump(s) 600H, 600F back to the connector 700, (c) fluid line 202 extending between the foot support bladder 200 and the connector 700, and (d) fluid line 402 extending between the fluid container 400 and the connector 700. The fluid lines 604, 606, 202, 402 may be engaged with their respective connector ports 702O, 704, 720, 722 in any desired manner, including via use of adhesives, mechanical connectors, friction fits, etc. The ends of fluid lines 604, 606, 202, 402 of this example constitute or include female type connectors that fit over male type individual connectors provided with connector ports 702O, 704, 720, 722. Alternatively, the ends of 604, 606, 202, 402 may constitute or include male type connectors and fit within female type individual connectors provided with connector ports 702O, 704, 720, 722. Not all connections on an individual fluid distributor 500 need to be the same type and/or structure.

Figure 15F:
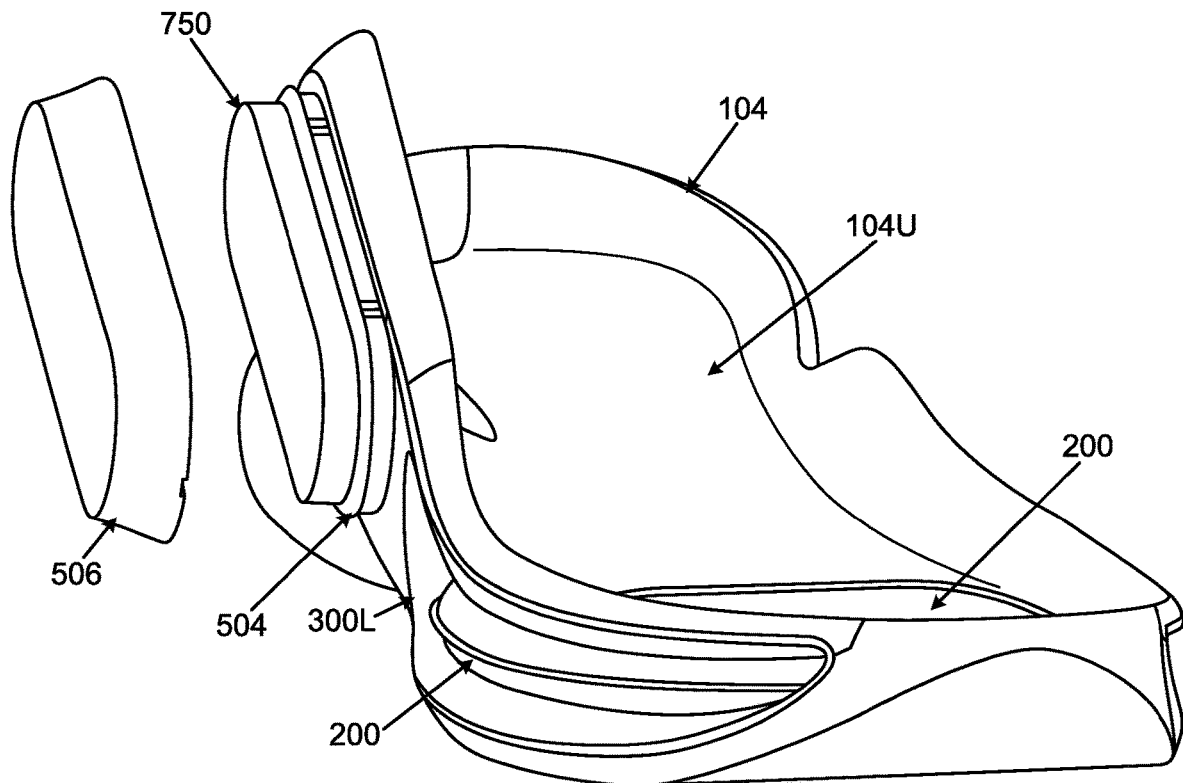
Figure 15G:
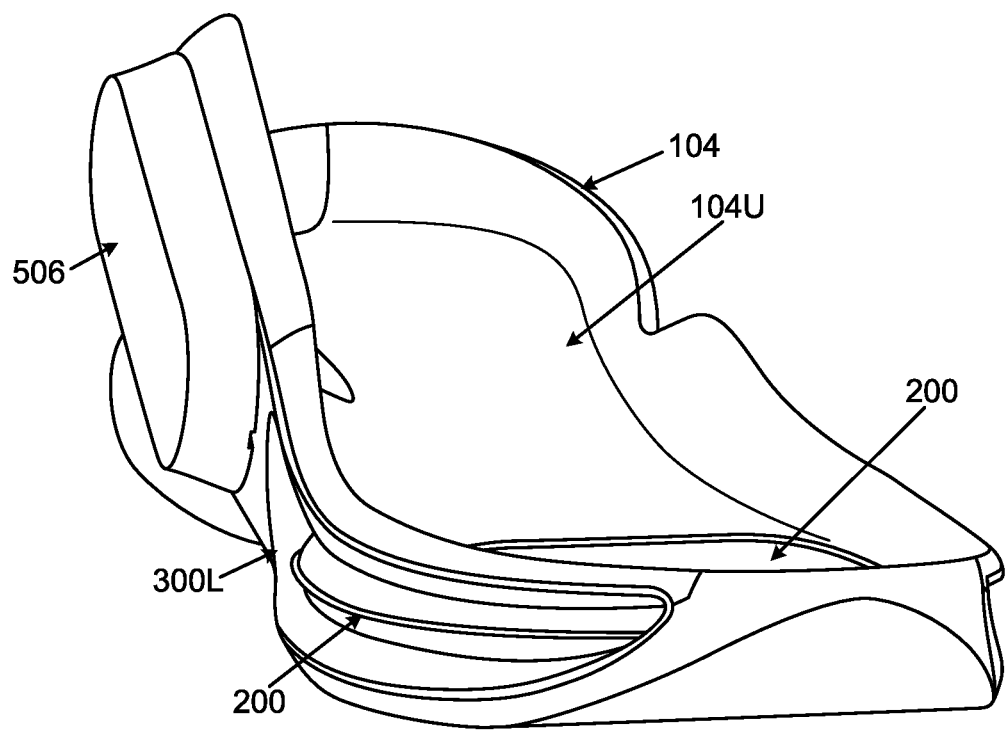

As shown in FIGS. 15D and 15F, after the fluid lines 604, 606, 402, 202 are engaged with the connector 700, the housing 750 may be moved into the recess 504R of the frame 504 so that the housing 750 engages frame 504, e.g., in the manner described above in conjunction with FIGS. 14A and 14B (e.g., snap fit into place, adhesively bonded, mechanical connectors, etc.). Then, as shown by a comparison of FIGS. 15F and 15G, the cap 506 may be engaged with the housing 750 and/or frame 504, e.g., in the manner described above in conjunction with FIGS. 14A and 14B (e.g., snap fit into place, adhesively bonded with pressure sensitive adhesive 770, mechanical connectors, etc.). FIG. 15G shows the final assembled sole component 104 of this example. The sole component 104 may be engaged with an upper 102 to form the overall article of footwear 100 (before or after the housing 750 is engaged in the frame 504).

Figure 16B:
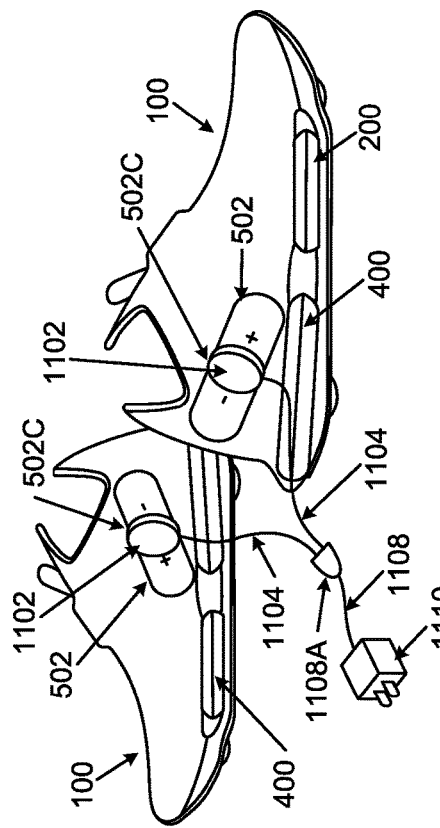
Figure 16A:
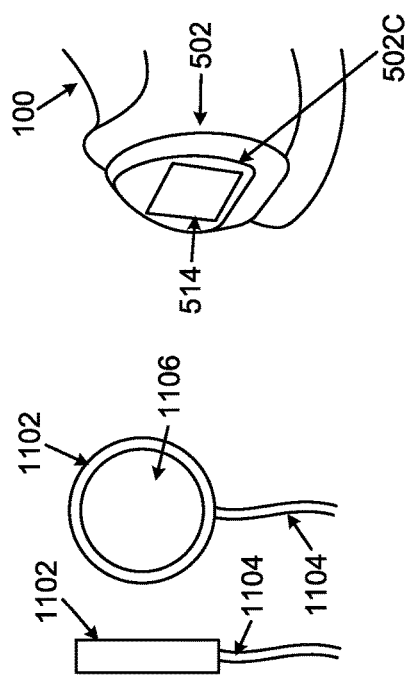
Figure 16C:
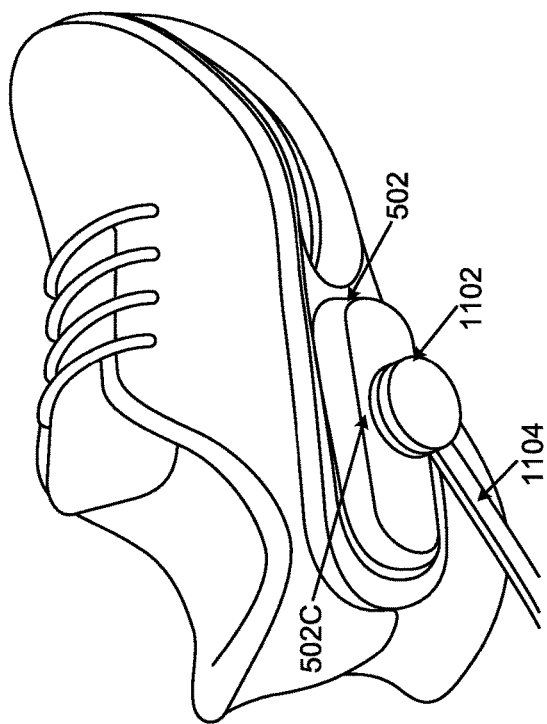

Fluid flow control systems (e.g., fluid distributor 500 and/or portions thereof), foot support systems including such fluid flow control systems, and/or articles of footwear 100 in accordance with aspects of this technology may require a power source, e.g., for powering various components. Components that may require power may include, but are not necessarily limited to, one or more of: a user input system; systems for changing pressure within one or both of the foot support bladder 200 and/or the fluid container 400; a system for driving and/or controlling the fluid transfer system 900; the lights 506L (if present); accelerometers and/or other sensors; pumps; compressors; etc. In at least some examples of this technology, the power source may include a rechargeable battery contained in housing 750. FIGS. 16A-21C illustrate various examples of systems (e.g., wireless systems) for recharging a battery in accordance with some examples of this technology. As one example, FIGS. 16A-16C show a charge puck 1102 that may be engaged with an AC adapter 1110 (e.g., via power lines 1104 and 1108). The charge puck 1102 includes a magnet 1106 that engages with the shoe 100 at a charging station 502C. The charging station 502C (which may be included as part of the fluid distributor 500) includes a receiver coil 514 that operatively engages the transmitter coil of the charge puck 1102 to wirelessly recharge the battery in conventional manners (e.g., inductive coupling) as are known and used in the relevant art. FIG. 16A shows charge puck 1102 engagable at a rear heel area of the shoe 100. FIGS. 16B and 16C show charge puck 1102 engaged at a side (e.g., lateral, heel side) of shoe 100. FIG. 16B further illustrates a pair of charge pucks 1102 including individual power lines 1104 engaged with a connector 1108A that extends to a single power line 1108 coupled with AC adapter 1110. Rather than rechargeable batteries, some examples of this technology may use non-rechargeable batteries.

Figure 17A:
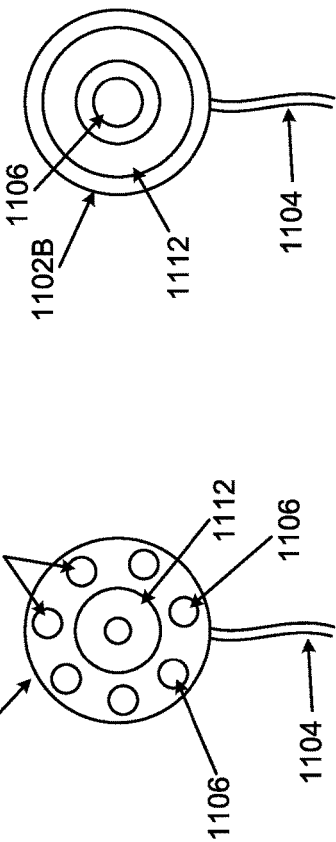
Figure 17B:
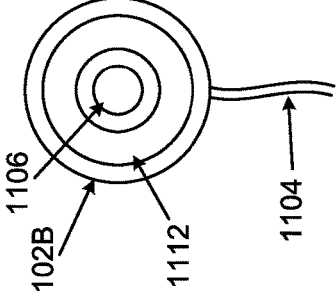

FIGS. 17A and 17B illustrate other examples of charge pucks 1102A and 1102B that may be used in some examples of this technology. Charge puck 1102A of FIG. 17A includes plural magnets 1106 arranged around an annular transmitter coil 1112 to magnetically engage charge puck 1102A with the charging station 502C magnet. Charge puck 1102B of FIG. 17B includes a central magnet 1106 that has an annular transmitter coil 1112 arranged around it.

Figure 18A:
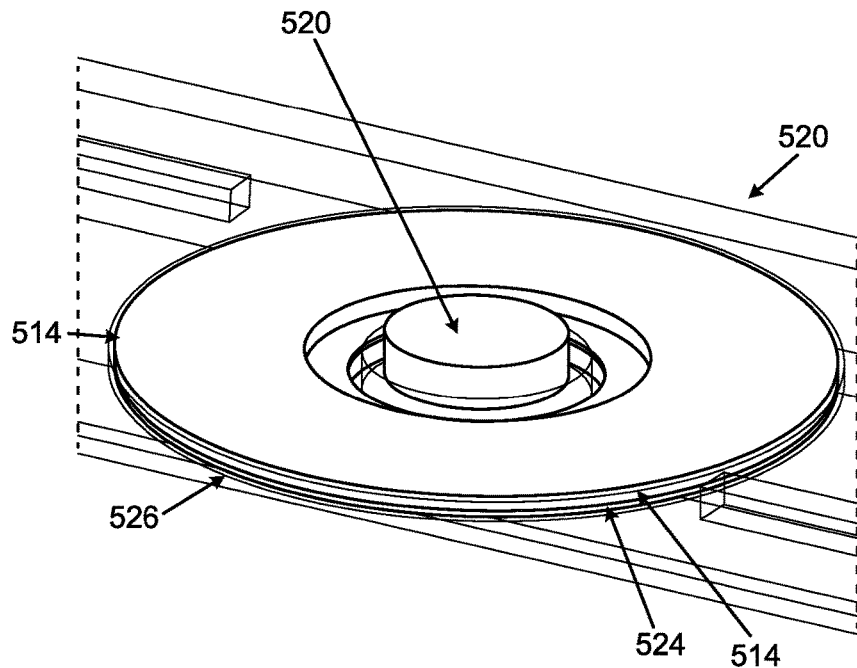
Figure 18B:
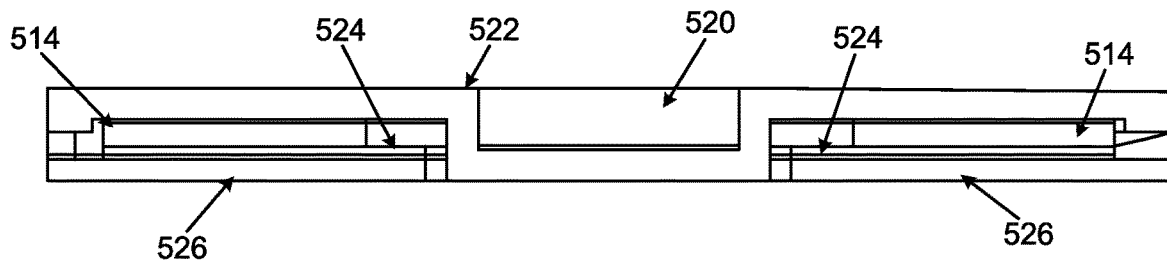
Figure 18C:
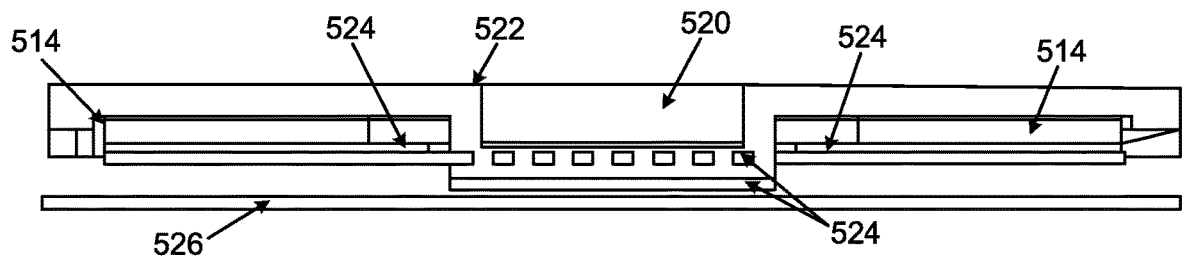

FIGS. 18A-18C show various manners in which a receiver coil 514 may be incorporated into a fluid distributor 500, e.g., of the types described above (such as beneath or as part of cap 506). The fluid distributor 500 (e.g., its housing 750, cap 506, etc.) includes a magnet 520 to releasably couple the charging puck (e.g., 1102, 1102A, 1102B, another structure) for inductive coupling and charging. Receiver coil 514 is included to operatively couple to a transmitter coil in the charging puck for inductive charging. A housing 522 (such as a portion of housing 750, cap 506, etc.) may prevent direct contact between the receiver coil 514 and the charging puck 1102, 1102A, 1102B. Electrical output generated by the receiver coil 514 (due to interaction with the transmitter coil in the charge puck) can be used to charge a rechargeable battery, e.g., in ways that are known and used in various arts.

FIGS. 18B and 18C show alternative structures for an inductive charging system in fluid distributor 500 (e.g., beneath cap 506). FIG. 18B shows the receiver coil 514 separated from printed circuit board 526 with a thin layer of ferrite 524 (e.g., an annular ring of ferrite 524). FIG. 18C shows an additional and/or a thicker layer of ferrite 524, including ferrite 524 extending beneath the magnet 520 and separating the magnet 520 from the printed circuit board 526. The additional ferrite 524 of the example of FIG. 18C helps shield the charging system from the printed circuit board 526 and/or helps prevent overheating. The additional ferrite 524 of the example of FIG. 18C also may help prevent the magnet(s) 520 from interfering with operation of solenoids, e.g., for fluid transfer systems 900 and/or fluid distributors 500 that include solenoids. Alternatively, if desired, rechargeable batteries that rely on direct electrical contact between the power source and battery may be used (rather than inductive charging systems).

One or both shoes 100 of a pair may require a power source and thus may include a rechargeable battery for operating various components of the fluid distributor 500. FIGS. 19A-21C illustrate various examples of charging systems for a pair of shoes 100. FIGS. 19A-19D illustrate an example system 1900 for simultaneously charging a pair of shoes 100L and 100R using wireless charging. In this illustrated example, the charging system 1900 resembles a pair of wired earbuds, with a charging puck 1902L and 1902R for each shoe 100L, 100R, respectively. Wires 1904 from the charging pucks 1902L, 1902R (which may be located within an insulating outer cover as is known in the relevant arts) meet at an intermediate connector 1906, and a wire 1908 extends from the connector 1906 to an AC power adapter 1910. The term "wire" as used herein in the context of recharging systems for the footwear 100 means any type of electrical connector, including single wires, multiple wires, cables, conductive tracks or tracings, etc. The connector 1906 may distribute power to the two separate wires 1904, one going to each charging puck 1902L, 1902R. FIG. 19A shows the charging pucks 1902L, 1902R engaged with the fluid distributor 500 on the lateral sides of each of the left shoe 100L and the right shoe 100R, respectively. FIGS. 19B and 19C show the charging system 1900 parts for storage or travel, both without the AC power adapter 1910 (FIG. 19B) and with the AC power adapter 1910 (FIG. 19C). While other options are possible, as shown in these figures, power wire 1908 may terminate at a USB connector component 1912 and the AC power adapter 1910 may include a port for receiving the USB connector component 1912. Further, as shown in FIG. 19D, in this system, the power wire 1904 engages the body of the puck 1902L, 1902R through the side surface 1902S of the puck 1902L, 1902R.

FIGS. 19B and 19C further show that, for storage, the magnets of the charging pucks 1902L, 1902R may engage with a magnet or magnetic attracting material in the connector 1906 and/or the AC power adapter 1910. In this manner, the charging pucks 1902L, 1902R are releasably fixed to the connector 1906 and/or the AC power adapter 1910 by magnetic engagement and forces, e.g., for storage or travel. If necessary, a magnet or magnetic attracting material may be incorporated into the connector 1906 and/or the AC power adapter 1910 (e.g., to internal or external side surfaces of the connector 1906 and/or the AC power adapter 1910) to facilitate this magnetic attractive engagement. Potential locations for magnet or magnetic attracting material the connector 1906 and/or the AC power adapter 1910 for this purpose are shown schematically as broken lines 1914 in FIGS. 19B and 19C (e.g., provided as one or more small metal plates, panels, rings, etc.). Alternatively, if desired, the two charging pucks 1902L, 1902R may engage one another by the magnets included therein. As another option or alternative, if desired, a separate cover may be provided, including, a magnet or magnetic attracting material therein, and the magnets of the charging pucks 1902L, 1902R may engage the cover. The cover may constitute a cover or container for holding the AC power adapter 1910, the connector 1106, and/or the overall charging system 1900.

FIGS. 19E-19G show a similar "wired earbud" style charging system 1950 to that described above in conjunction with FIGS. 19A-19D. Rather than the pucks 1902L, 1902R, however, the charging connectors 1952L and 1952R are shaped more akin to paddles. More specifically, a rigid plastic "handle" 1960 extends rearward from the charging base 1962, and the wires 1954 from the charging base 1962 extend through the handle 1960. The wires 1954 from each charging connector 1952L, 1952R (which may be located within an insulating outer cover as is known in the relevant arts) meet at an intermediate connector 1956, and a wire 1958 extends from the connector 1956 to an AC power adapter 1910. The connector 1956 may distribute power to the two separate wires 1954, one going to each charging connector 1952L, 1952R. FIG. 19E shows the charging connectors 1952L, 1952R engaged with the fluid distributor 500 on the lateral sides of each of the left shoe 100L and the right shoe 100R, respectively. FIGS. 19F and 19G show the charging system 1950 parts for storage or travel, both without the AC power adapter 1910 (FIG. 19F) and with the AC power adapter 1910 (FIG. 19G). The charging system 1950 of FIGS. 19E-19G may include a magnet or magnetic attracting material 1914 in the AC power adapter 1910, e.g., in the same manner described above with respect to FIGS. 19B and 19C.

FIGS. 19E and 19F further show that intermediate connector 1956 may releasably connect to wires 1954, e.g., by end 1956A from wire 1958 engaging ends 1954A of wires 1954. When releasable, any desired type of releasable electrical connection may be used, including sockets, plugs, clips, and/or other releasable connections as are known and used in the relevant arts. FIG. 19F further shows charging connectors 1952L, 1952R directly and magnetically engaged with one another for storage or travel by the magnets included in them. Additionally, the wires 1954, 1958 may wrap around handles 1960 in a compact manner for storage or travel, e.g., as shown in FIG. 19F.

Figure 20C:
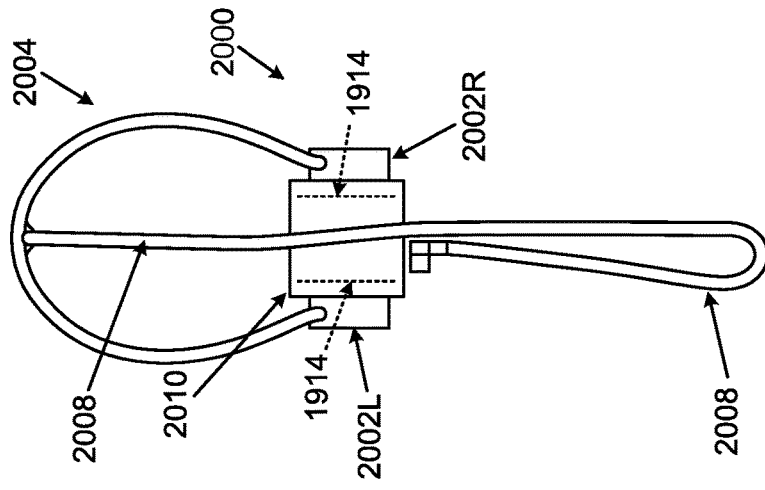
Figure 20D:
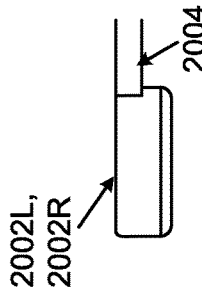
Figure 20A:
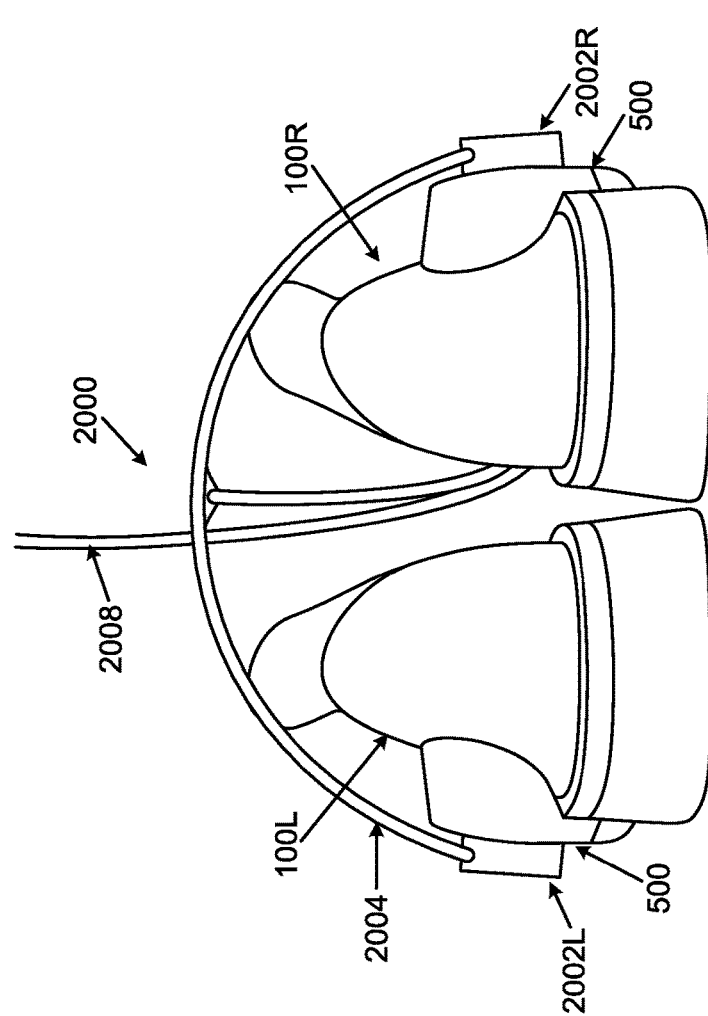
Figure 20B:
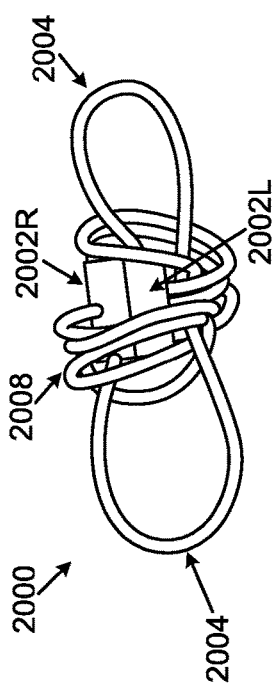

FIGS. 20A-20D illustrate another example system 2000 for simultaneously charging a pair of shoes 100L and 100R using wireless charging, e.g., of the various types described above. In this illustrated example, the charging system 2000 resembles a pair of headphones, with a charging puck 2002L and 2002R for each shoe 100L, 100R, respectively. Wires from the charging pucks 2002L, 2002R extend through the interior of a flexible connector 2004 having a normally arched structure. The wires from the charging pucks 2002L, 2002R connect to a wire 2008 that extends from the arched connector 2004 to an AC power adapter 2010. Internal circuitry and/or switching within arched connector 2004 may distribute power to the two charging pucks 2002L, 2002R. FIG. 20A shows charging puck 2002L engaged with the fluid distributor 500 on the lateral side of left shoe 100L and charging puck 2002R engaged with the fluid distributor 500 on the lateral side of right shoe 100R. FIGS. 20B and 20C show the charging system 2000 parts for storage or travel, both without the AC power source 2010 (FIG. 20B) and with the AC power source 2010 (FIG. 20C). Further, as shown in FIGS. 20A and 20D, in this system 2000, the arched connector 2004 engages the side (and/or top) surface of the body of the puck 2002L, 2002R. FIG. 20B further shows charging connectors 2002L, 2002R directly engaged with one another for storage or travel by the magnets included in them. Additionally or alternatively, if desired, the charging system 2000 of FIGS. 20A-20D may include a magnet or magnetic attracting material 1914 in the AC power adapter 2010, e.g., in the same manner described above with respect to FIGS. 19B and 19C.

Figure 21A:
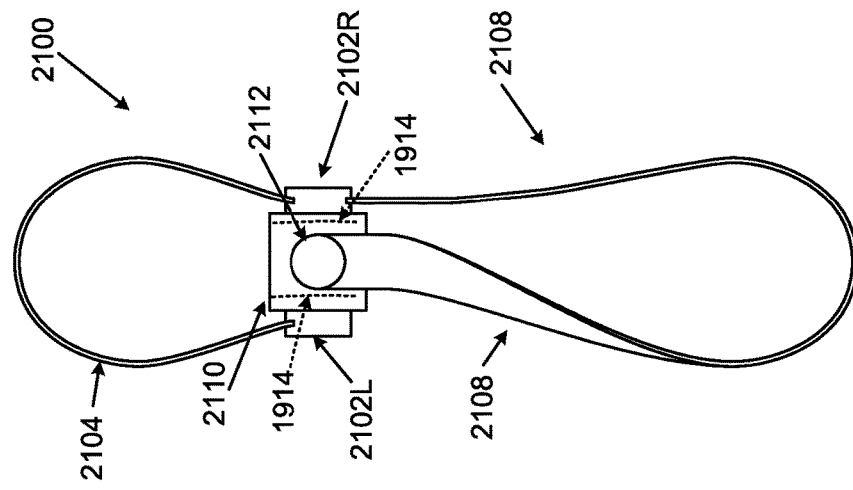
Figure 21B:
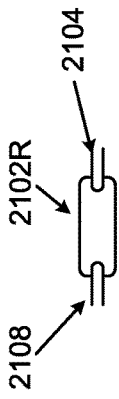
Figure 21C:
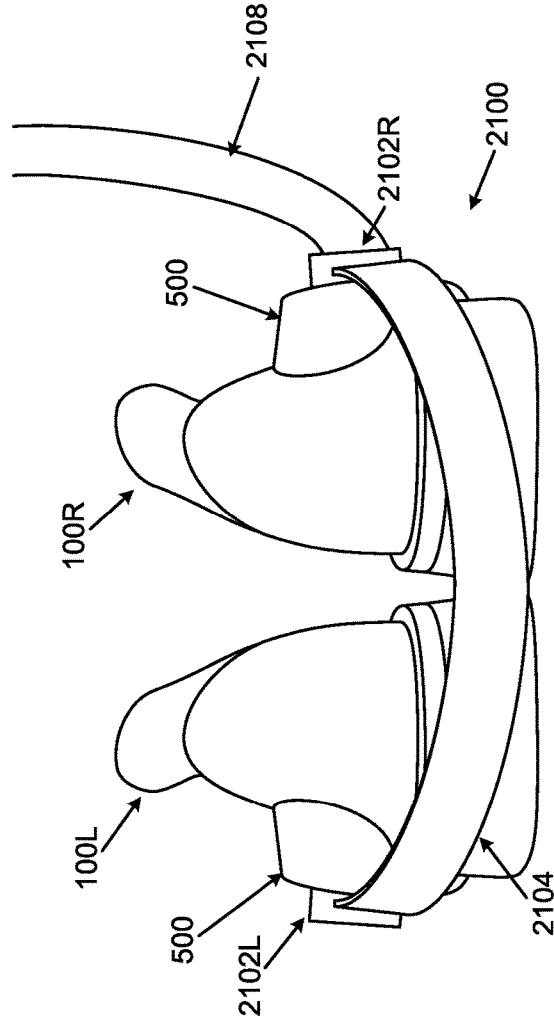
Figure 21D:
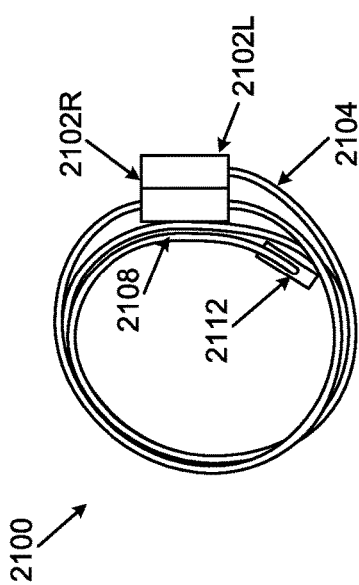

FIGS. 21A-21D illustrate another example system 2100 for simultaneously charging a pair of shoes 100L and 100R using wireless charging, e.g., of the various types described above. In this illustrated example, the charging system 2100 includes a charging puck 2102L and 2102R for each shoe 100L, 100R, respectively. A wire 2108 from an AC power adapter 2110 connects to one of the charging pucks (puck 2102R in this illustrated example), and another wire 2104 extends from that charging puck to the other charging puck (2102L in this illustrated example). Thus, as shown in FIG. 21D, circuitry within charging puck 2102R splits incoming power from wire 2108: (a) to be used for charging at puck 2102R and (b) to pass through puck 2102R to wire 2104 and to puck 2102L. Thus, the wires 2108 and 2014 connect charging pucks 2102R, 2102L in series. FIG. 21A shows the charging puck 2102R engaged with the fluid distributor 500 on the lateral side of right shoe 100R and the connection of charging puck 2102L with the lateral side of left shoe 100L. FIGS. 21B and 21C show the charging system 2100 parts for storage or travel, both without the AC power adapter 2110 (FIG. 21B) and with the AC power adapter 2110 (FIG. 21C). FIG. 21B further shows charging connectors 2102L, 2102R directly engaged with one another for storage or travel by the magnets included in them. Additionally or alternatively, if desired, the charging system 2100 of FIGS. 21A-21D may include a magnet or magnetic attracting material 1914 in the AC power adapter 2110, e.g., in the same manner described above with respect to FIGS. 19B and 19C.

FIGS. 21B and 21C further show a different connector 2112 between wire 2108 and AC power adapter 2110. Connector 2112 includes a mechanical connector to make electrical connection with a corresponding connector provided on the power adapter 2110 (e.g., a plug type connection). Any desired type of connection between connector 2112 (as well as the other connectors described above in FIGS. 19A-20D) and its corresponding AC power adapter 2110 can be used without departing from this technology, including fixed electrical connections, releasable electrical connections, USB plug connections, and/or other suitable plugs, sockets, clips, and/or electrical connections as are known and used in the relevant rechargeable electronic and electrical device arts.

As mentioned above, the fluid distributor 500 (e.g., including housing 502 made from a rigid plastic material) may include one or more buttons 506A, 506B, e.g., used as user input for changing/controlling pressure in the foot support bladder 200 (and/or other portions of the footwear 100). The fluid distributor 500 also may include one or more lights 506L, e.g., as decoration and/or to indicate some status information about the footwear 100 and/or the overall system as described above. FIGS. 22A-22E provide additional information regarding potential examples of a user interface switch or system 2200 for unlocking the user interface switch or system 2200 and/or changing the pressure in some portion of the foot support system. The "keep-out" zone shown in FIG. 22A corresponds with an area of the housing 502 that includes the coil for magnetic charging as described above ("keep-out" meaning that the "real estate" beneath that area already is claimed for the coil or other structures, and thus cannot house circuitry and/or components for user interface switch 2200).

Figure 22A:
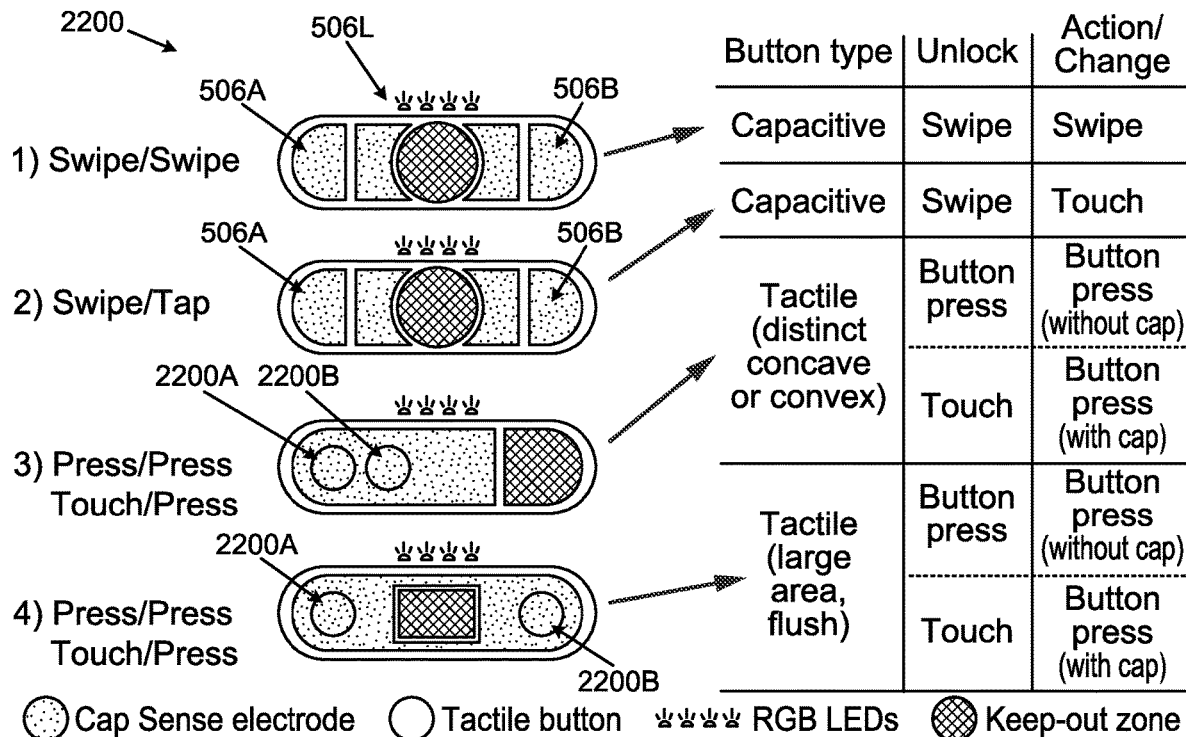
FIGS. 22A-22E illustrate features of example user input systems in accordance with some examples of this technology.

FIG. 22A provides a chart of various options for unlocking and using user interface switch or system 2200 and its operation. FIGS. 22B-22E provide views of potential structures for such input systems (with Example 4 from FIG. 22A particularly illustrated). In FIG. 22A, Example 1, the button is a capacitive type button (e.g., detecting a user's finger touch by capacitive coupling of structures as is known and used in relevant arts). This example user interface switch or system 2200 is unlocked by a swipe action of the button, and changes in pressure also are input by a swipe action (e.g., swipe right (toward 506B in FIG. 22B) to decrease pressure by a predetermined amount or step, swipe left (toward 506A in FIG. 22B) to increase pressure by a predetermined amount or step). A single swipe could be used to both unlock the user interface switch or system 2200 and introduce pressure change input. For example, the initial "touch" and beginning of the swipe could unlock (and if needed, wake up) the user interface switch or system 2200, and the continuing swiping action (left or right) could provide the pressure change input. Additionally or alternatively, two swipes may be used or required, e.g., the first to unlock and/or wake up the user interface switch or system 2200 and the second to provide the pressure change input.

In FIG. 22A, Example 2, the button is a capacitive type button (e.g., including a capacitive sense electrode of structure known and used in art relevant arts). This example user interface switch or system 2200 is unlocked by a swipe action of the button, and changes in pressure are input by a touch action on either side of the center (e.g., touch the right side 506B to decrease pressure by a predetermined amount, touch the left side 506A left to increase pressure by a predetermined amount).

In FIG. 22A, each of Examples 3 and 4 illustrates structure for two potential input options. As one option in each of Examples 3 and 4 (the top options shown in the table), the buttons 2200A, 2200B may be physical buttons (also called "tactile buttons" herein) that require two physical presses— one press to unlock the user interface switch or system 2200 and another press to enter the desired pressure increase or pressure decrease information. As another option (the bottom options of Examples 3 and 4 shown in the Table), the buttons 2200A, 2200B may be a combination of a capacitive touch button (used to unlock the user interface switch or system 2200) and a tactile button (used to change pressure setting). In these bottom options of Examples 3 and 4, the systems operate by (a) an initial "touch" action to unlock and/or wake up the user interface switch or system 2200 and then (b) a button press action (at buttons 2200A, 2200B) to change pressure settings. One difference between the buttons of FIG. 22A Examples 3 and 4 relates to the locations of the buttons 2200A, 2200B with respect to the "keep-out" zone. In Example 3, the buttons 2200A, 2200B are adjacent one another on the same side of the button and the same side of the keep-out zone. In Example 4, the buttons 2200A, 2200B are separated from one another by the keep-out zone and are on different ends of the button. Buttons having a "button press" or "press" label in FIG. 22A may constitute physical switch type button activators.

The tactile buttons (e.g., of structure known and used in the relevant art) may have an outer surface providing a distinct tactile feel. As one example, the exposed pressing surface of one button (e.g., pressure increase button 2200A) may have a convex outer surface and the exposed pressing surface of the other button (e.g., pressure decrease button 2200B) may have a concave surface. As another option, as shown in FIG. 6, one side of the button 506 may be marked with a recessed or raised "plus" sign ("+") and the other side may be marked with a recessed or raised "minus" sign ("−") to provide the distinct tactile feel. In this manner, the user can more easily locate and interact with the correct button, even while wearing the shoes, to make desired pressure changes.

Figure 22B:
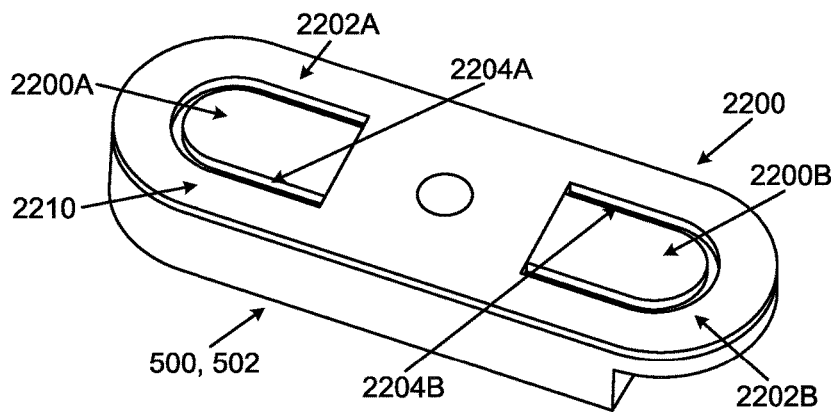
Figure 22C:
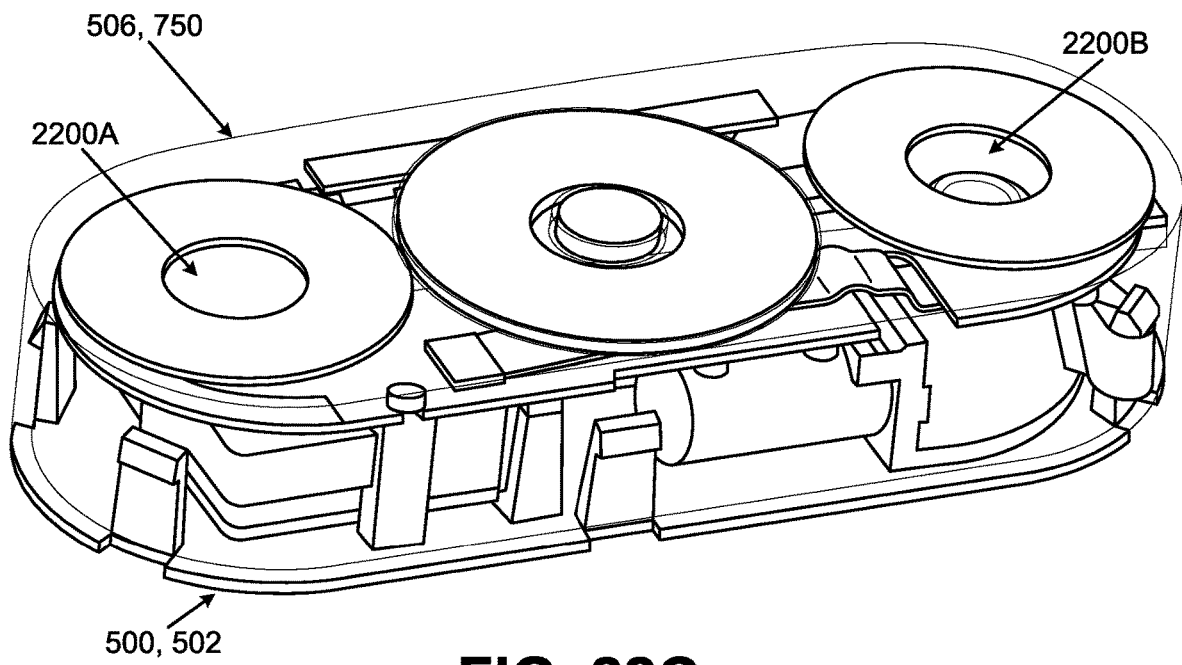
Figure 22D:
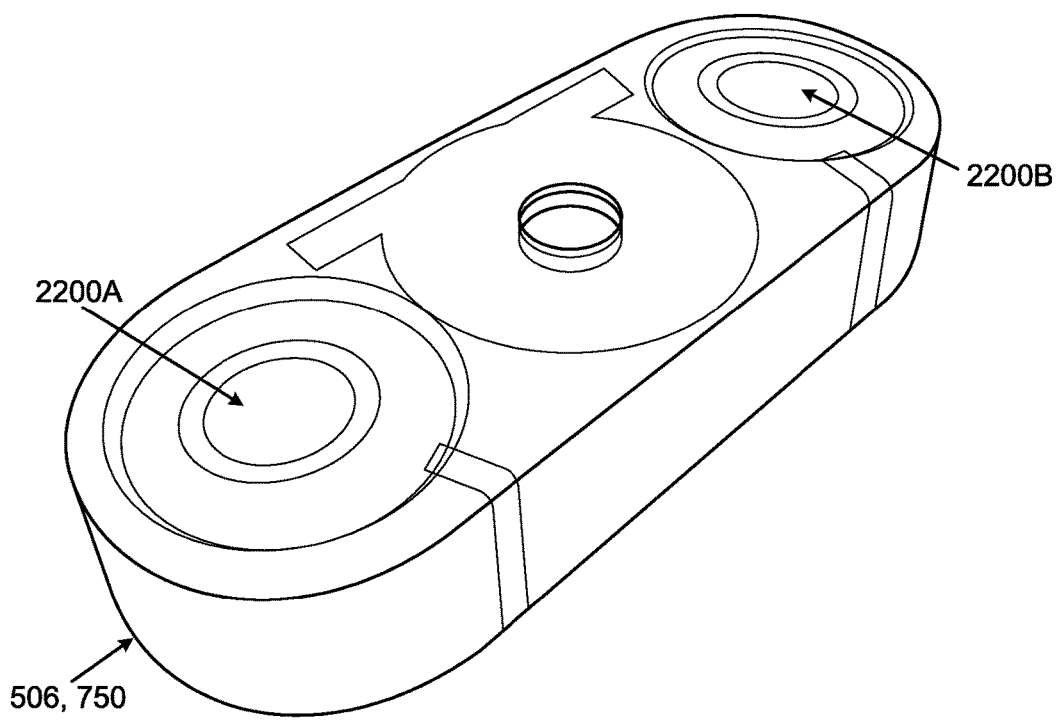
Figure 22E:
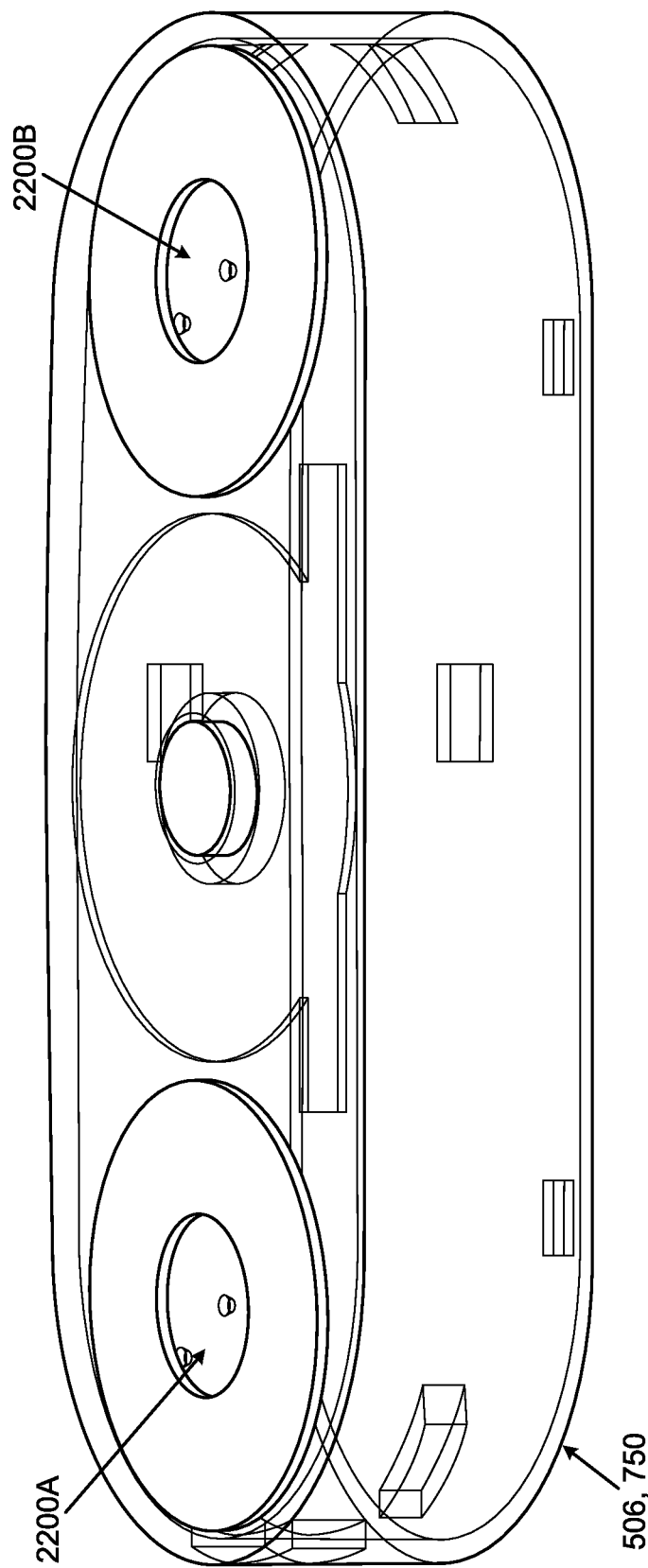

FIGS. 22B-22E provide various views of an example button construction for the "touch/press" option of Example 4 of FIG. 22A. FIG. 22B shows flex areas 2202A, 2202B corresponding to the physical tactile button locations 2200A, 2200B overmolded by a rubber or other polymer (e.g., silicone or other elastomer) composition (or formed in a two-shot molding process). Grooves 2204A and 2204B extending partially through the overmold material 2210 around the button actuator area create a thinner layer of rubber or other material (e.g., elastomer) to better enable flexion when buttons 2200A, 2200B are pushed. These grooves 2204A, 2204B also may provide the tactile feel features described above. Flex areas 2202A, 2202B may include a base portion having elastomer overmold material of a first thickness (e.g., 2 mm to 10 mm thick) and the grooves 2204A, 2204B may have a second thickness (e.g., 0.5 mm to 3 mm thick) that is less than the first thickness. The first thickness of the overmold material at the base portion may be from 1.5 to 20 times thicker than the second thickness of overmold material in the grooves 2204A, 2204B.

In this example, when buttons 2200A, 2200B are pressed, the overmold material in the grooves 2204A, 2204B stretches somewhat under the applied force. As force from the button push is reduced or removed, the stretched material in grooves 2204A, 2204B returns toward its unstretched configuration, providing return energy. This return energy may provide an interesting tactile feel on the user's finger, somewhat of a "bouncy" or "trampoline" effect. The overmold material 2210 also closes the button area to help prevent water, debris, or other undesirable material from entering the interior of housing 502. The flex areas 2202A, 2202B may be formed as part of the cap 506 placed over the housing 750 of the fluid distributor 500 and/or as the top surface of the housing 750 of the fluid distributor 500. If desired, however, grooves 2204A and/or 2204B in the flex areas 2202A and/or 2202B may be replaced by through holes. If necessary or desired, in such systems, other sealing components (e.g., elastomer gaskets, O-rings, etc., see FIG. 22E) may be provided to seal off the button openings and/or provide the bouncy" or "trampoline" effect (if desired).

The grooves 2204A and 2204B in FIG. 22B may have any desired shape(s) without departing from this technology. They may be located adjacent the button actuator areas (e.g., above and/or around the hardware needed to activate the button). In the illustrated example of FIG. 22B, the grooves 2204A and 2204B are generally U-shaped, having their free or open ends facing one another. The free or open ends could face in other direction(s) as well, including away from one other, toward the other surfaces of the button, etc. In other examples, the grooves 2204A and/or 2204B may form closed paths around the button actuator area.

Figure 23:
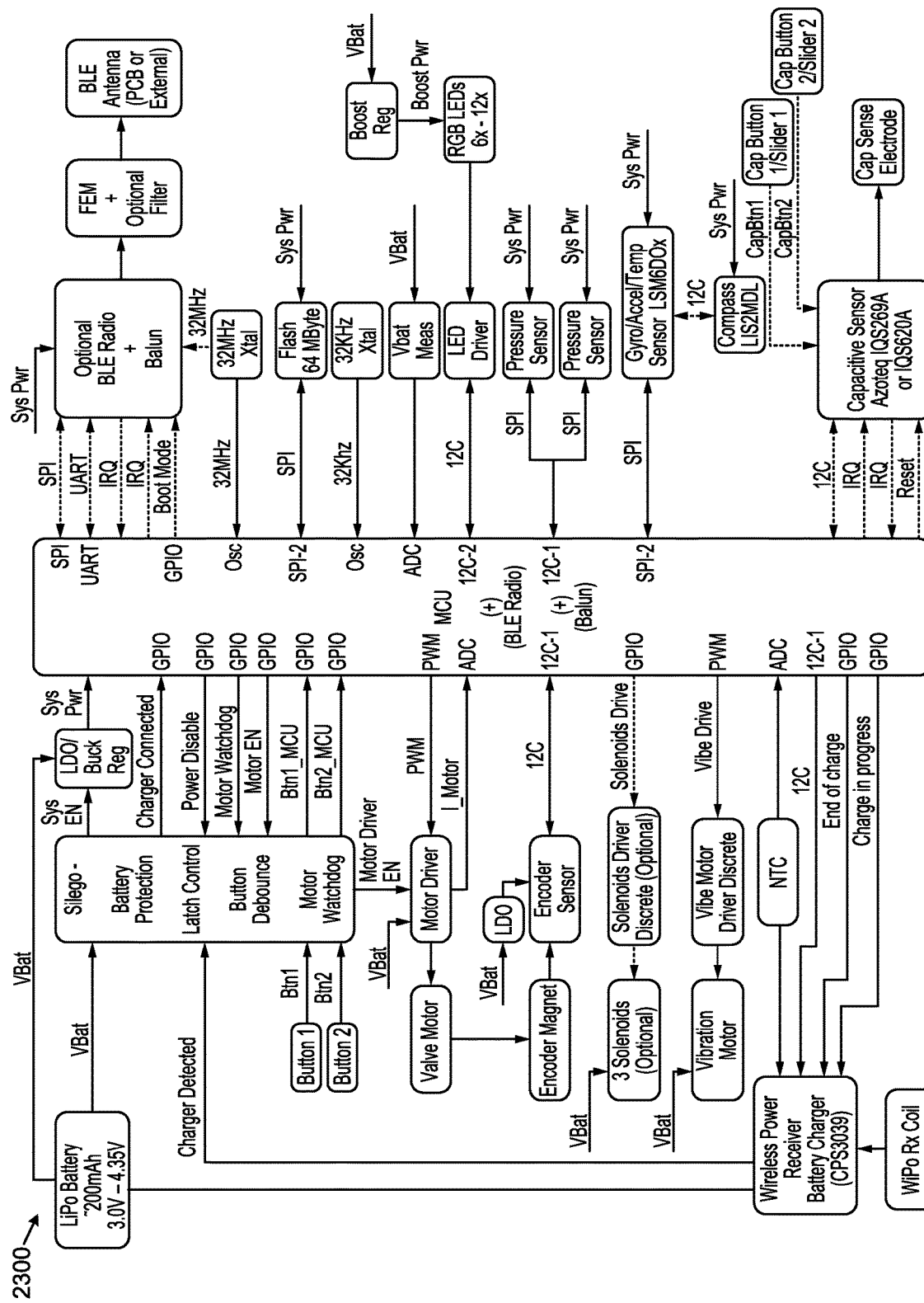
FIGS. 23 and 24 illustrate schematic diagrams and component positioning features in accordance with some examples of this technology.

FIG. 23 provides an electrical block diagram 2300 of components in some example fluid distributors 500, fluid flow control systems, sole structures 104, and/or articles of footwear 100 in accordance with aspects of this technology. While FIG. 23 illustrates several components and systems incorporated into fluid distributors 500, fluid flow control systems, sole structures 104, and/or articles of footwear 100 in accordance with aspects of this technology, any desired subset or combination of these components and systems may be used in some examples of this technology. More of these components and systems identified in FIG. 23 will be described in more detail below.

Figure 24:
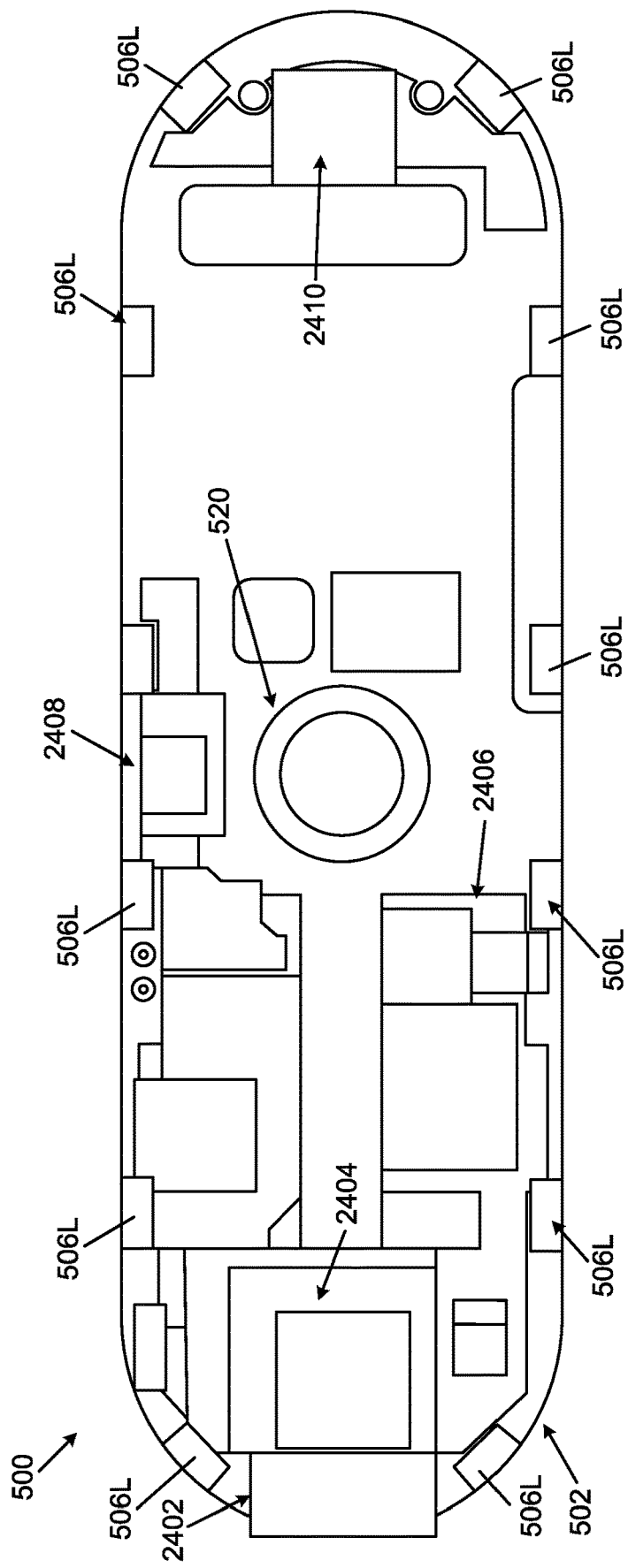

FIG. 24 illustrates an example layout of various components within a housing 502 (and/or on a circuit board) of a fluid distributor 500 in accordance with at least some examples of this technology. FIG. 24 shows various lights 506L arranged around the exterior perimeter of the housing 502, as mentioned above. A light driver 2410 ("LED driver") is provided to control operation of the lights 506L, which may constitute a 12 RGB LED ring of lights (e.g., under programmed/programmable control). FIG. 24 further shows that this system may include an antenna 2402 (e.g., a Bluetooth Low Energy ("BLE") antenna) for receiving wireless input (such as from a computing device, mobile computing device (e.g., a "smart phone")); for receiving electronic information from the other shoe of a pair; for receiving electronic information from apparel and/or another source; for receiving electronic information from other sensors (e.g., on-board shoe sensor(s), apparel based sensors, sensors included as a speed and/or distance monitor in an external computing device, etc.); etc. A microcontroller 2404 ("MCU") is provided to run the software and hardware needed to perform the functions described above and those described in more detail below (and optionally any other functions and/or hardware that may be provided). One or more inertial measurement units ("IMU's") 2406 also may be provided, such as accelerometers ("ACC"), magnetometers ("MAG"), etc., to detect user motion in the article of footwear 100. Data from such inertial measurement units or other available sensors may be used to automatically control and/or change pressure settings in the foot support bladder 200 and/or fluid container 400 in one or both shoes. A motor driver 2408 is present in this illustrated example, e.g., to control operation of any motor(s) in the fluid distributor 500 (e.g., as will be described in more detail below). The seemingly "open space" within the housing 502 may be filled, at least in part, with some or all of a manifold 800 and fluid transfer system 900, the rechargeable battery, and/or other desired components.

Figure 25:
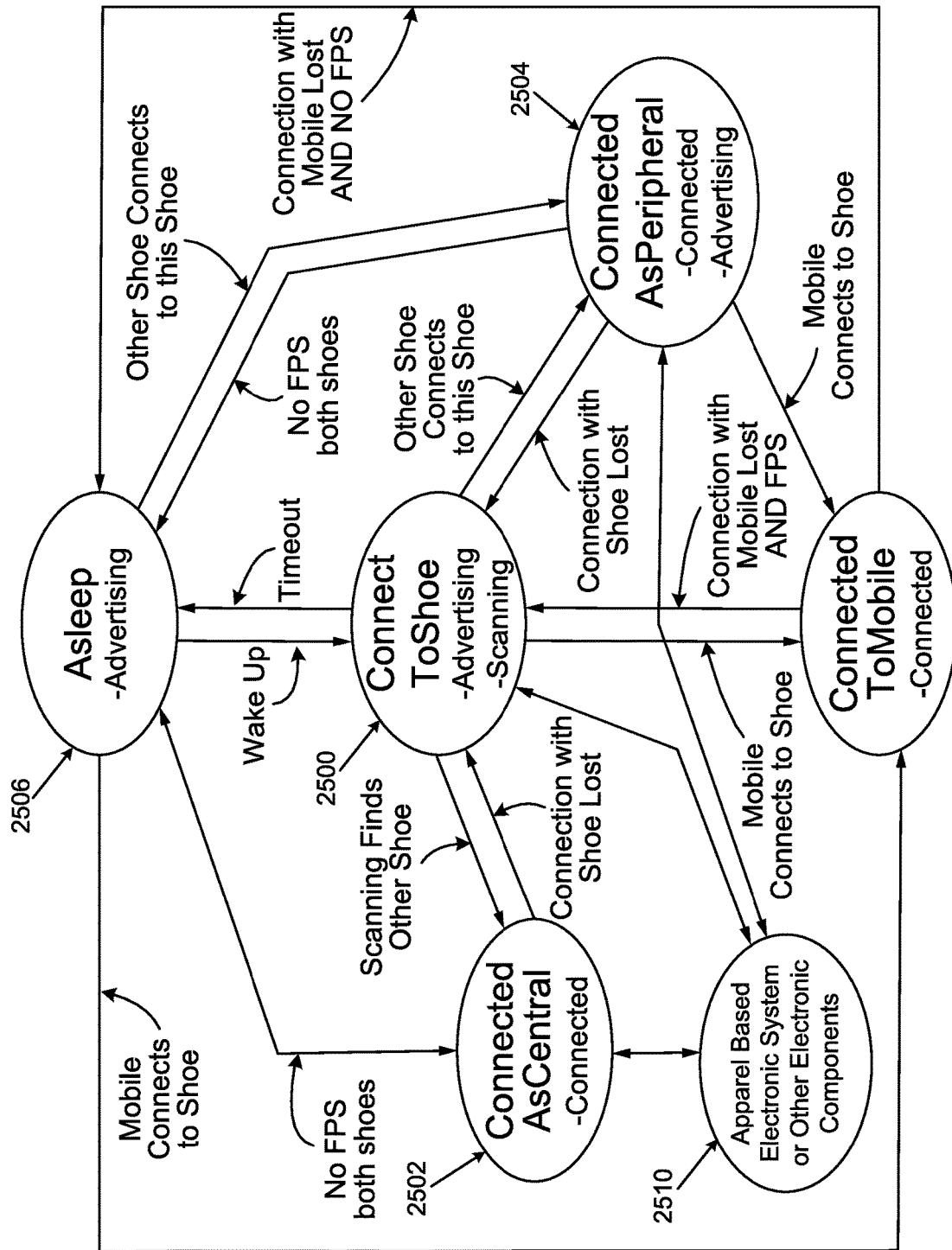
FIG. 25 illustrates examples of communications in systems and methods in accordance with some examples of this technology.

FIG. 25 illustrates several potential avenues of communication between a central controller 2500 and the shoes of a pair (e.g., being worn by a user). These communications may take place via hardware, systems, communication protocols, and the like, as are conventionally known and used in the relevant art. While both shoes of a pair may include all of the hardware and software needed to provide the desired functions (e.g., as described above and/or as described in more detail below), in some examples of this technology, one shoe of a pair may include all of the desired hardware and software ("connected as central" shoe 2502 in FIG. 25), and that shoe 2502 may communicate with the other shoe ("connected as peripheral" shoe 2504 in FIG. 25), e.g., in a wireless manner, via an antenna 2402. In this manner, the overall hardware costs may be reduced for a pair of shoes by providing less hardware on one shoe. The central controller 2500 may be included as part of one shoe (e.g., within housing 502 of fluid distributor 500 for that shoe), and it may communicate with that shoe via a wired or wireless connection. The shoe including the central controller 2500, in turn, may communicate with the other shoe, e.g., via a wireless connection as mentioned above. Additionally or alternatively, if desired, the central controller 2500 may be provided as part of a computing device, e.g., a mobile computing device, such as an application program operating on a smartphone. In this manner, pressure change information may be provided via an external computing device (e.g., the smartphone) and transmitted to one or both shoes, e.g., via antenna 2402 in housing 502.

FIG. 25 further illustrates how the various components operate to go into and out of an "asleep" mode 2506. The component(s) may go into an "asleep" mode 2506, for example, when no "foot presence sensor" or "FPS" data is received for a predetermined time period for one or both shoes, when the connection is lost from one or both shoes, after a timeout period (e.g., with no foot pressure sensing), etc. Foot presence within a shoe 2502, 2504 may be sensed in any desired manner, such as by capacitance sensors, force/pressure sensors, switch type sensors, etc. The components may "awake" from "asleep" mode, e.g., when foot pressure is sensed in at least one shoe 100, when user interaction with an input device (e.g., input buttons 506A, 506B, an application program on a mobile computing device, etc.) is received, etc. Once awakened, the central controller 2500 may be activated to "advertise" an available wireless connection to engage with at least shoe 2502. The central controller 2500 also may inform the central shoe 2502 that the peripheral shoe 2504 is available and facilitate connection (and optionally act as a connection intermediary) between the central shoe 2502 and the peripheral shoe 2504. Other component interaction and communication states are shown in FIG. 25, e.g., to show when and how the various components may attempt to connect to one another, attempt to maintain connections with one another, and/or attempt to reconnect to one another.

In the arrangement shown in FIG. 25, the shoes 2502, 2504 can communicate directly with one another. Further, in some connection protocols, when in direct communication: (a) either shoe 2502, 2504 is capable as functioning as the "central" communication point (providing input and information to the other shoe) and/or the controller 2500 and (b) either shoe 2502, 2504 is capable as functioning as the "peripheral" communication point (receiving input and information from the other shoe and/or controller 2500). For a given pair of shoes, the same shoe need not always be the central shoe and/or controller 2500 and the same shoe need not always be the peripheral shoe. Further, in some arrangements like those shown in FIG. 25, when communication between the shoes 2502, 2504 and an external computing device occurs, such as via wireless communication connection with a mobile telephone, smartphone, etc., both shoes 2502, 2504 become peripheral devices and the external computing device becomes the central device. The external computing device may include a user input system, e.g., to receive user input via an application program, and transmit this input (e.g., pressure change input) to the relevant shoe or shoes 2502, 2504.

In addition, if desired, either shoe 2502, 2504 and/or an external communication device in communication with the shoes 2502, 2504 may receive data and/or information from and/or transmit data and/or information to one or more electronic devices integrated into apparel 2510 (e.g., motorized fluid containing sports bra (e.g., in which fluid pressure changes alter the support provided, e.g., by a fluid-tight bladder incorporated into the sports bra), motorized fluid containing compression sleeves (e.g., a hollow tubular sleeve comprising a fluid-tight bladder in which fluid pressure in the fluid-tight bladder of the sleeve alters the level of compression provided), apparel having fluid transfer systems (e.g., with fluid-tight bladders) of the types described herein incorporated into them, motorized shoe lacing components, etc.). Thus, either shoe 2502, 2504 and/or an external communication device in communication with the shoes 2502, 2504 can receive communications from and/or send communications to other components, such as motorized and/or adaptive lacing and support systems in/on the shoe or in/on apparel (e.g., a sports bra, compression sleeve, and the like). When in communication with other such systems provided in apparel 2510, the apparel 2510 may function as the central communication point with both shoes 2502, 2504 as peripherals, or either shoe 2502, 2504 may function as the central communication point with the apparel 2510 and other shoe functioning as peripherals. In such systems, however, if an external computing device comes into the communication loop, that device may serve as the central device and both shoes 2502 and any devices included in the apparel 2510 may function as peripheral devices. Further the wireless connection(s) with shoes 2502, 2504 may allow connections to any one or more of automatic and/or motorized shoe securing mechanisms, such as motorized laces, or the like. The apparel 2510 may include any part of or all of the electronics, communications capabilities, and/or fluid transfer capabilities as described herein for similar components in footwear.

Various examples of structures and operations of fluid transfer systems 900 are described in more detail in the sections that follow. Some aspects of fluid transfer systems 900 in accordance with this technology relate to valve stems within a valve housing to open and close various fluid pathways through a manifold 800. Other aspects of fluid transfer systems 900 in accordance with this technology relate to solenoid based systems that selectively open and close to control fluid flow through a manifold 800.

B. Valve Stem Based Fluid Transfer System Features

FIGS. 26A-26D provide various views of an example fluid distributor 500 including a movable valve stem type fluid transfer system 900A in accordance with aspects of this technology. As described above, this example fluid distributor 500 includes a housing 502 in which a manifold 800 and fluid transfer system 900A are housed as well as a connector 700 that engages the components within housing 502 with a fluid source (e.g., the external environment, pump(s) 600H, 600F, a compressor, etc.), the external environment 150, at least one foot support bladder 200, and at least one fluid container 400. FIGS. 26A-26D further show the locations of fluid transfer system 900A and a rechargeable battery 2602 for powering the various electrical or electronic components.

FIGS. 27A-29 provide additional details regarding components of the example manifold 800 and fluid transfer system 900A in accordance with some aspects of this technology. The manifold 800 of this example includes a manifold body or housing 820. Referring also to FIGS. 5A-5F, one surface 822A or side of manifold body 820 includes ports 800A, 800B, 800C, 800D having fluid communicating connections with corresponding ports 704O, 706, 712, 718, respectively, of connector 700. The opposite surface 822B of manifold body 820 (although it could be another surface) includes inlet port 800I, first manifold port 804, second manifold port 808, and third manifold port 814. A fluid inlet path 802 extends between port 800A and fluid inlet port 800I, a first fluid flow path 806 extends between port 800B and first manifold port 804, a second fluid flow path 810 extends between port 800C and second manifold port 808, and a third fluid flow path 812 extends between port 800D and third manifold port 814. Thus, in this illustrated example, manifold 800 includes four separate fluid pathways extending through it. The manifold 800 of this example further includes at least one pressure sensor (two pressure sensors 850A, 850B shown in FIGS. 27A-28). The pressure sensor(s) 850A, 850B may be positioned for determining fluid pressure in at least one of the first fluid flow path 806, the second fluid flow path 810, or the third fluid flow path 812. In some more specific examples, a first pressure sensor 850A may be provided to determine fluid pressure in the third fluid flow path 812 (and thus in fluid container 400), and a second pressure sensor 850B may be provided for determining fluid pressure in at least one of the first fluid flow path 806 or the second fluid flow path 810 (e.g., the pressure in foot support bladder 200). O-rings 852 (or gaskets and/or other appropriate sealing devices) may be provided to sealingly engage the pressure sensor(s) 850A, 850B with the manifold body 820.

The fluid transfer system 900A of this illustrated example includes a valve housing 902 and a valve stem 910 movably (e.g., rotatably, slidingly, etc.) mounted in the valve housing 902. The valve stem 910 of this example includes a first end 910A (e.g., a driven end) and a second end 910B opposite the first end 910A (e.g., a free end). A perimeter wall 910W extends between the first end 910A and the second end 910B. The first end 910A, the second end 910B, and the perimeter wall 910W define an internal chamber 910I of the valve stem 910. Also, the perimeter wall 910W of the valve stem 910 includes a plurality of through holes 910H extending from the internal chamber 910I to an exterior surface of the perimeter wall 910W and valve stem 910. As will be described in more detail below (e.g., in conjunction with FIGS. 30A-30G), movement of the valve stem 910 to a plurality of positions selectively places this fluid flow control system (e.g., fluid distributor 500, fluid transfer system 900A, the combined manifold 800 and fluid transfer system 900A, etc.) in a plurality of operational states by placing one or more of the plurality of through holes 900H in fluid communication with the first fluid flow path 806, the second fluid flow path 810, and/or the third fluid flow path 812.

FIGS. 27A-29 further illustrate that this example fluid transfer system 900A includes a drive system (e.g., a motor 920) and a transmission 922 (including output gear, nose pin, cup seal, and other gears, described in more detail below). The transmission 922 components transfer power from the motor 920 to the first end 910A of the valve stem 910 to move (rotate in this example) the valve stem 910 with respect to the valve housing 902 (and manifold 800). A power source (e.g., from rechargeable battery 2602) and a microcontroller, e.g., provided with the fluid distributor 500 and not shown in FIGS. 27A-29, selectively drive the motor 920 to position the valve stem 910 in one of the plurality of positions to enable movement of the fluid from the desired starting points to the desired locations.

The fluid transfer system 900A of this example additionally includes an encoder system (e.g., an on-axis magnetic encoder system, an off-axis magnetic encoder system, etc.), including an encoder magnet 932 and an encoder board 934, for detecting the position (e.g., rotational position) of the valve stem 910 with respect the housing 902 and/or other component parts. The encoder system provides data indicating this position to the microcontroller. Such encoder systems are commercially available and their operation are known in the relevant arts.

In this example fluid transfer system 900A, the valve housing 902 is engaged with the manifold body 820 in a sealed manner. While this sealing can be accomplished in a variety of ways, in this illustrated example, one or more sealing connectors 840 are provided between the perimeter wall 910W of the valve stem 910 and one or more of fluid inlet port 800I, first manifold port 804, second manifold port 808, and/or third manifold port 814. Sealing connector 840 extends into recess 902R on one side of valve housing 902. In this illustrated example, a single sealing connector 840 or seal block includes three sealing ports 840A, 840B, 840C. Three sealed channels 842A, 842B, 842C through the sealing connector 840 connect with first manifold port 804, second manifold port 808, and third manifold port 814, respectively. In this manner, sealed channels 842A, 842B, 842C are in fluid communication with first fluid flow path 806, second fluid flow path 810, and third fluid flow path 812, respectively, of the manifold body 820. Additionally or alternatively, if desired, another sealing port and another sealed channel may be provided in sealing connector 840 to connect the manifold 800 fluid inlet port 800I with the valve housing 902.

Figure 29:
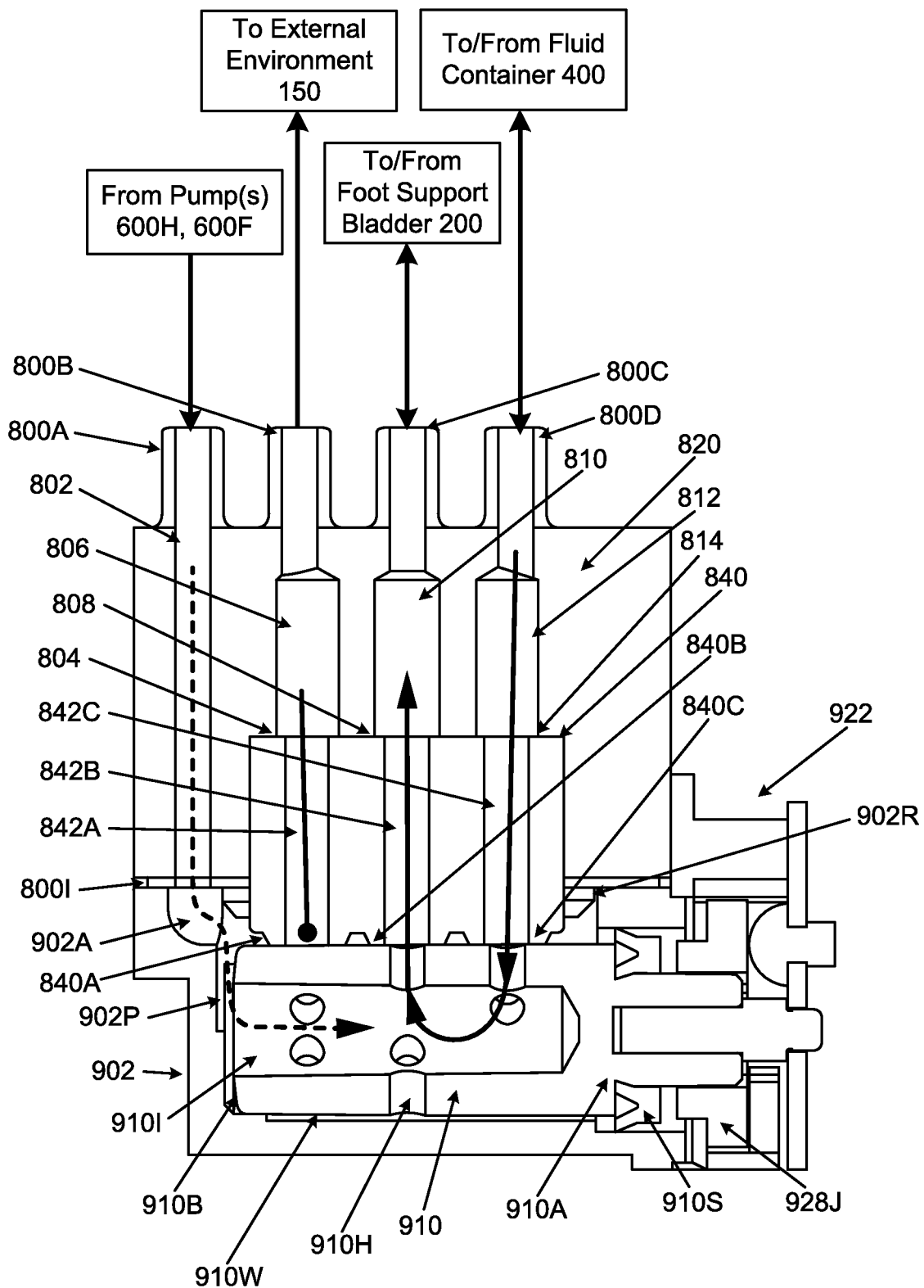

In the specific example of FIG. 29, however, the fluid inlet path 802 from manifold port 800A to fluid inlet port 800I connects directly with valve housing 902, and a fluid intake path 902A extends through valve housing 902 to admit incoming fluid into the internal chamber 910I of valve stem 910 through the open second end 910B thereof. See fluid pathway 902P shown in dashed line in FIG. 29.

As further shown in FIG. 29, the first manifold port 804, the second manifold port 808, and the third manifold port 814 align along an exterior side of the manifold 800. Additionally or alternatively, if desired, manifold ports 800A, 800B, 800C, 800D align along an exterior side of the manifold 800 (and in this illustrated example, on the opposite side of the manifold 800 from ports 804, 808, 814). Any two or more of the fluid flow paths 802, 806, 810, and 812 may align and/or extend in parallel through the manifold body 820. Additionally or alternatively, any two or more of the sealed channels 842A, 842B, 842C of sealing connector 840 may align and/or extend in parallel through the sealing connector 840 body.

The valve stem 910 may place the fluid transfer system 900A in two or more operational states depending on the position of the valve stem 910 with respect to the housing body 902. Movement of the valve stem 910 changes positioning of the through holes 910H through the perimeter wall 910W of the valve stem 910 and allows different holes 910H to align with the sealing connector 840 ports 840A, 840B, 840C. The valve stem 910 may be moved, e.g., rotated, under control of a microprocessor controlling a motor 920. FIGS. 30A-30G provide additional details about various operational states that may be provided and used in fluid distributor 500, foot support systems, sole structures 104, and articles of footwear 100 including fluid transfer system 900A in accordance with aspects of this technology. This discussion, as shown in FIG. 29, assumes: (a) manifold port 800A is in fluid communication with a fluid source, such as pump(s) 600H, 600F (e.g., via connector ports 702I and 704O and the components connecting them or other appropriate fluid lines) to bring fluid into the fluid transfer system 900A; (b) manifold port 800B is in fluid communication with the external environment 150 (e.g., via connector port 706 and fluid path 708 and/or other appropriate fluid lines) to exhaust any excess fluid in the fluid transfer system 900A to the external environment 150; (c) manifold port 800C is in fluid communication with a foot support bladder 200 (e.g., via connector ports 712 and 720 and fluid line 714 and/or other components connecting them) to increase or decrease fluid pressure in the foot support bladder 200; and (d) manifold port 800D is in fluid communication with a fluid container 400 (e.g., via connector ports 718 and 722 and fluid line 716 and/or other components connecting them) to increase or decrease fluid pressure in the fluid container 400. Note also the connections and discussion of operational states shown and discussed in connection with FIGS. 5A-5F.

Figure 30A:
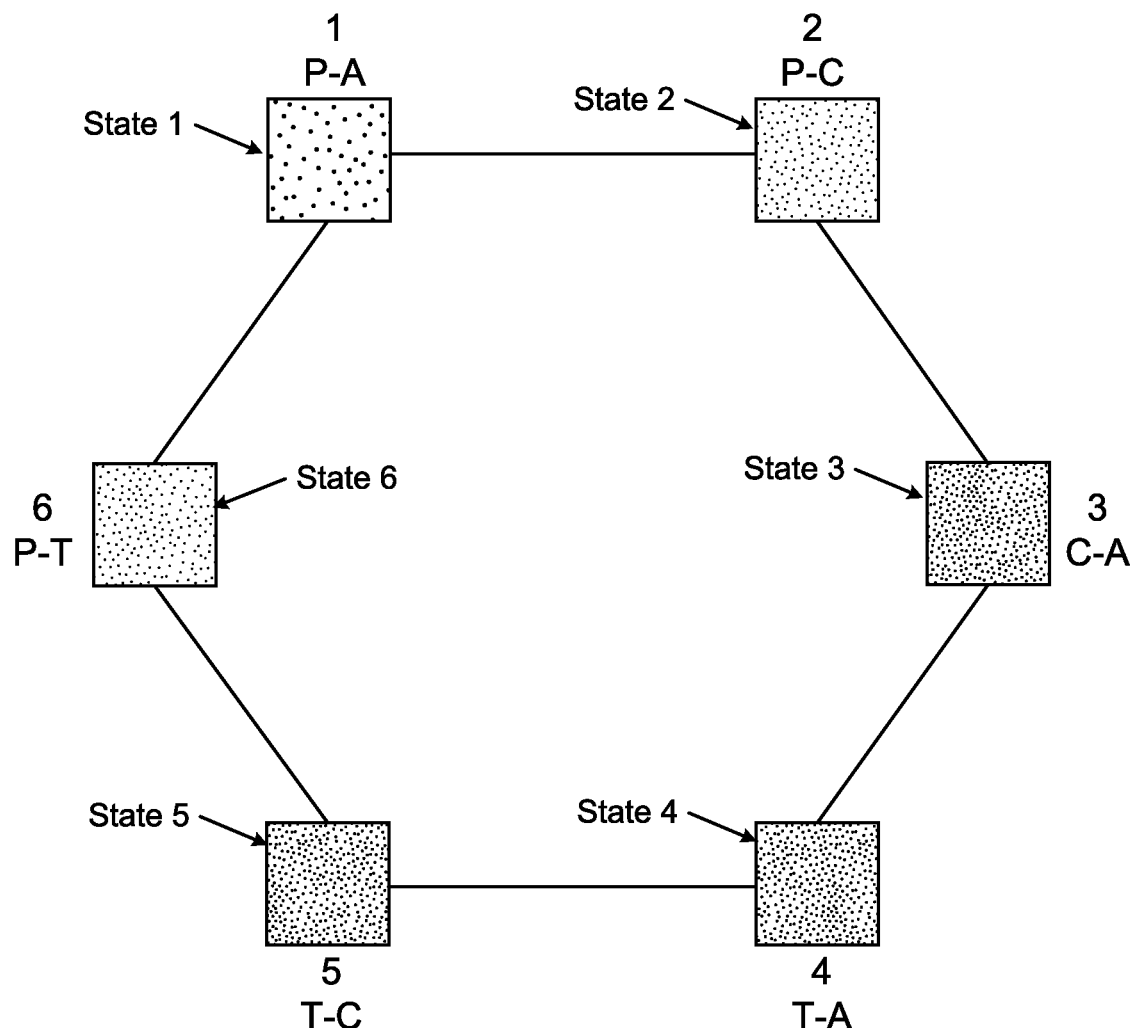

As described above, in this example fluid distributor 500, the valve stem 910 is rotated to different positions to place the fluid distributor 500, foot support system, sole structure 104, and/or article of footwear 100 in different operational states. While any number of operational states may be provided, in this illustrated example, valve stem 910 may be rotated to six distinct operational states as shown in FIGS. 30A-30G. FIG. 30A schematically illustrates various positions of valve stem 910 as it is rotated clockwise (e.g., from operational state 1 to operational state 6) or counter-clockwise (e.g., from operational state 6 to operational state 1). In some pressure control methods in accordance with aspects of this technology, the "standby" state may be the typical state during most times (when no pressure changes occur). The valve stem 910 rotates the proper amount to go into the desired operational state (e.g., operational states 2-6), waits for the pressure to reach the desired level (as measured by pressure sensor(s) 850A, 850B), and then rotates back to the standby state.

Operational state 1 of this example is the "standby" or "idle" state in which fluid pumped with each step simply passes through the system, e.g., from pump(s) 600H, 600F, through manifold 800, through fluid transfer system 900A, back through manifold 800, and to the external environment 150. See FIG. 30B. Operational state 1 prevents any part of the overall foot support system from becoming over pressurized, e.g., when a foot-activated pump is used and activated in each step to move fluid.

Operational state 2 (e.g., with the valve stem 910 rotated 60 degrees clockwise from operational state 1) is a "pumping" state for moving fluid from the pump(s) (or other fluid source) to the foot support bladder 200. In operational state 2, fluid pumped during a step passes through the system (e.g., from pump(s) 600H, 600F, through manifold 800, through fluid transfer system 900A, back through manifold 800) and into the foot support bladder 200. See FIG. 30C. This operational state may be used to quickly and/or directly increase fluid pressure in the foot support bladder 200 (e.g., a foot support bladder 200 "inflate" configuration).

Operational state 3 (e.g., with the valve stem 910 rotated 60 degrees clockwise from operational state 2) is a "live" state for moving fluid from the foot support bladder 200 to the external environment 150. In operational state 3, fluid passes through the system (e.g., from foot support bladder 200, through manifold 800, through fluid transfer system 900A, back through manifold 800) and to external environment 150. See FIG. 30D. This operational state may be used to release fluid and decrease fluid pressure in the foot support bladder 200 (e.g., a foot support bladder 200 "deflate" configuration).

Operational state 4 (e.g., with the valve stem 910 rotated 60 degrees clockwise from operational state 3) also is a "live" state for moving fluid from the fluid container 400 to the external environment 150. In operational state 4, fluid passes through the system (e.g., from fluid container 400, through manifold 800, through fluid transfer system 900A, back through manifold 800) and to external environment 150. See FIG. 30E. This operational state may be used to release fluid and decrease fluid pressure in the fluid container 400 (e.g., a fluid container 400 "deflate" configuration).

Operational state 5 (e.g., with the valve stem 910 rotated 60 degrees clockwise from operational state 4) also is a "live" state for moving fluid from the fluid container 400 to the foot support bladder 200. In operational state 5, fluid passes through the system (e.g., from fluid container 400, through manifold 800, through fluid transfer system 900A, back through manifold 800) and to the foot support bladder 200. See FIG. 30F. This operational state may be used to increase fluid pressure in the foot support bladder 200 by moving fluid from the fluid container 400 into the foot support bladder 200 (e.g., a foot support bladder 200 "inflate" configuration). This operational state allows fluid pressure changes in the foot support bladder 200 without the need for the user to take one or more steps to activate a pump 600H, 600F (e.g., while the user is standing or sitting still and/or off his/her feet). This operational state also may allow for more controlled and fine-tuned pressure changes in the foot support bladder 200, e.g., because large pressure spikes resulting from the wearer landing a step or jump are closed off from direct fluid communication with the foot support bladder 200 in this operational state (e.g., because the fluid line 606 from the foot-activated pump(s) 600H, 600F is closed).

Operational state 6 (e.g., with the valve stem 910 rotated 60 degrees clockwise from operational state 5) is a "pumping" state from the pump(s) (or other fluid source) to the fluid container 400. In operational state 6, fluid passes through the system (e.g., from pump(s) 600H, 600F, through manifold 800, through fluid transfer system 900A, back through manifold 800) and into the fluid container 400. See FIG. 30G. This operational state may be used to quickly and/or directly increase fluid pressure in the fluid container 400 (e.g., a fluid container 400 "inflate" configuration).

Some pressure sensing algorithms and methods in accordance with aspects of this technology may rely on sensor input in addition to pressure sensing in the foot support bladder 200 and/or fluid container 400 to determine the operational state to use. For example, data from an accelerometer, foot force sensor, and/or speed and/or distance monitor may be used to determine whether a pressure increase in the foot support bladder 200 should be accomplished by operational state 2 (with fluid transferred from a foot activated pump system 600H, 600F) or by operational state 5 (with fluid transferred from the fluid container 400). For example, if the user is moving relatively slowly, transfer via operational state 2 may be desirable, particularly if the fluid container 400 is at a relatively low pressure. But if the user is moving fast and/or applying high contact forces on the foot pumps 600H, 600F, operational state 5 may be preferred (e.g., to produce more even fluid flow without pressure spikes due to contact of the sole with the ground). Additionally or alternatively, accelerometer, foot force sensor, and/or speed and/or distance monitor data may be used to automatically change operational states, e.g., to increase or decrease foot support pressure in the foot support bladder depending on movement speed, contact force, etc. Still additionally or alternatively, in at least some examples of systems and methods in accordance with this technology, the system can start to "learn" (e.g., identify patterns) how a user moves (e.g., tends to run or exercise at certain time(s) of the day, tends to run on specific types of surfaces, tends to run at varying speeds (e.g., based on a workout program), etc.) and, based on this information, predict and apply changes in operational states to match predicted changes in motion. In this manner, pressure changes to the foot support system may better align to changes in the user's motion in "real time" or seemingly real time. Alternatively, when linked to a digital coaching system, automatic (or system generated) operational state changes can be aligned to desired changes in movement received from the digital coaching system to match desired performance or to mitigate injury risk, thereby also being a communication system to the user.

Additionally or alternatively, if desired, systems and methods in accordance with at least some aspects of this technology may determine and/or use various step metrics, including step-by-step metrics relating to various features of user contact force with the ground and/or user motion (e.g., metrics relating to the user's running or other motion technique(s)). Such metrics may include one or more of: (a) contact time per foot per step (e.g., using a foot force signal, such as the time period when vertical force applied by the foot is greater than 50 N); (b) swing time period per foot per step (e.g., using a foot force signal, such as the time per foot when vertical force applied by the foot is less than 50 N until that foot again creates a force greater than 50 N); (c) step cadence (e.g., using a foot force signal, such as the inverse of the sum of the contact and swing time for each foot); (d) step length (e.g., using a foot force signal, such as the sum of contact and swing time×average speed); (e) impact (e.g., using a foot force signal, such as the peak rate of rise of the vertical ground reaction force, the active peak of the vertical ground reaction force, etc.); (f) impulse per foot per step (e.g., using a foot force signal, such as the integral of the ground reaction force magnitude during contact); and (g) contact type per foot per step (e.g., using motion capture data, such as foot angle relative to horizontal at the time of foot contact per step, rearfoot contact angle, midfoot contact ankle, forefoot contact angle, etc.).

A fluid distributor 500, foot support system, sole structure 104, and/or article of footwear 100 may have (or may be placed in) any one or more of (and any combination of) these operational states. Some specific examples of this technology may include all six operational states. Alternatively, some specific examples of this technology may include operational states 1, 3, 5, and 6 or 1, 3, 4, 5, and 6 (and any desired pressure increases in the foot support bladder 200 are accomplished using fluid supplied from the fluid container 400). If necessary or desired, fluid distributors 500, foot support systems, sole structures 104, and/or articles of footwear in accordance with some examples of this technology may include a relief valve in fluid communication with the foot support bladder 200 and/or the fluid container 400 (optionally in place of operational states 3 and/or 4, respectively), e.g., to prevent over-pressurization of these components.

More details of fluid flow through the fluid distributor 500 including fluid transfer system 900A now will be described in conjunction with FIGS. 5A-5F, 29, and 30B-30G. In operational state 1 shown in FIGS. 5A, 29, and 30B, at this first rotational position of the valve stem 910, fluid moves: (a) from the fluid supply (e.g. from external environment 150, through connector inlet 702I, through fluid path 702P, through connector outlet 702O, through fluid path 604, through heel pump 600H, through fluid path 602, through forefoot pump 600F, through fluid line 606), (b) through the connector inlet port 704, (c) through connector fluid path 704P, (d) through connector outlet port 704O, (e) through manifold port 800A, (f) through manifold fluid inlet path 802, (g) through manifold fluid inlet port 800I, (h) through fluid intake path 902A, (i) into the open end 910B of valve stem 910, (j) through the internal chamber 910I, (k) through a first through hole 940A, (l) through sealing port 840A, (m) through first sealed channel 842A, (n) through first manifold port 804, (o) through first manifold fluid flow path 806, (p) through manifold port 800B, (q) through first fluid path connector port 706, (r) through first connector fluid path 708, and (s) to the external environment 150 (e.g., through the interior space 710 of connector 700). If a specific fluid distributor 500, foot support system, sole structure 104, and/or article of footwear 100 does not include all of these parts (e.g., no separate connector 700, no sealing block 840, one or fewer foot activated pumps 600H, 600F, etc.), then the fluid flow through those parts would not be present in the fluid flow path described above.

Figure 30C:
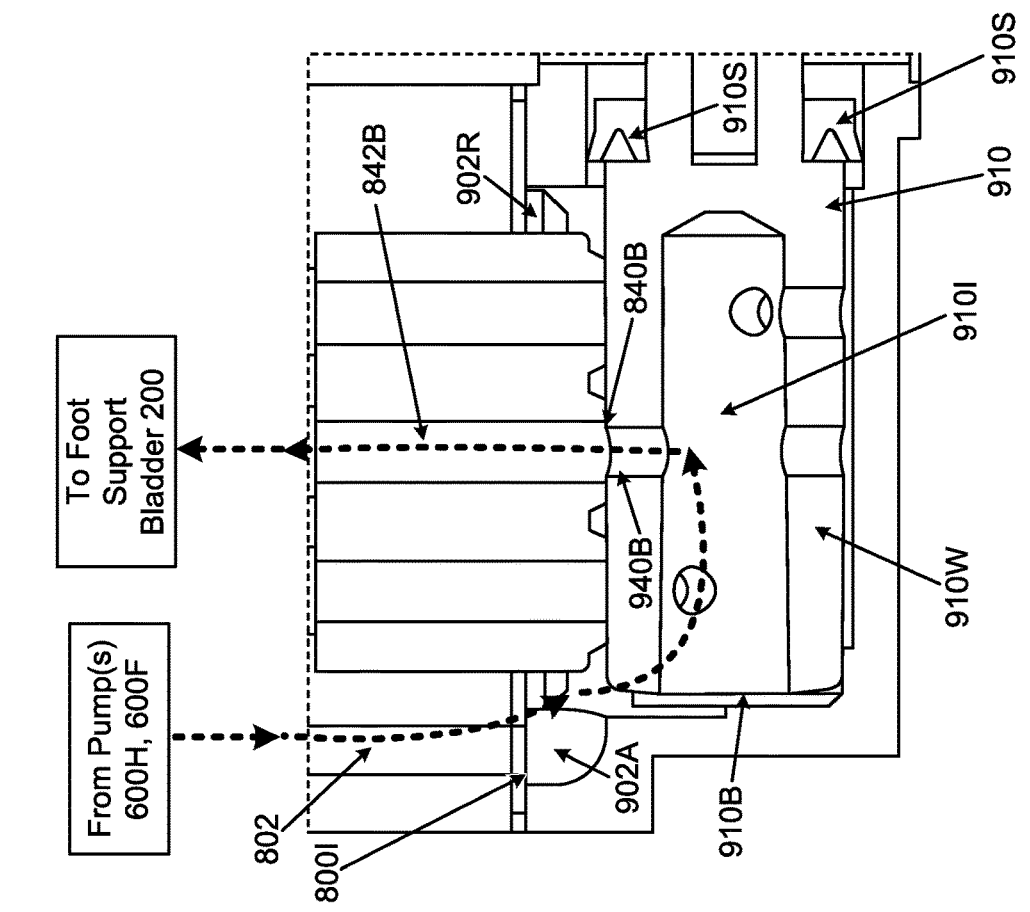
Figure 30B:
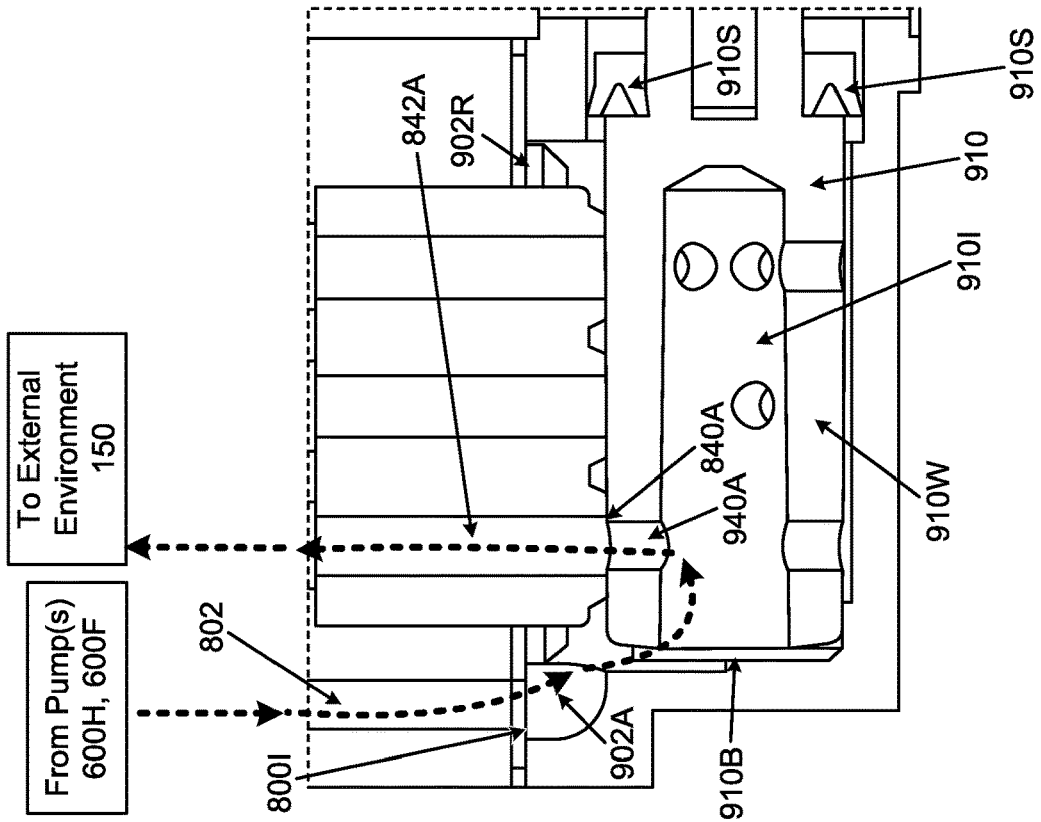

In operational state 2 shown in FIGS. 5B, 29, and 30C, at this second rotational position of the valve stem 910, fluid moves: (a) from the fluid supply (e.g. from external environment 150, through connector inlet 702I, through fluid path 702P, through connector outlet 702O, through fluid path 604, through heel pump 600H, through fluid path 602, through forefoot pump 600F, through fluid line 606), (b) through the connector inlet port 704, (c) through connector fluid path 704P, (d) through connector outlet port 704O, (e) through manifold port 800A, (f) through manifold fluid inlet path 802, (g) through manifold fluid inlet port 800I, (h) through fluid intake path 902A, (i) into the open end 910B of valve stem 910, (j) through the internal chamber 910I, (k) through a second through hole 940B, (l) through sealing port 840B, (m) through second sealed channel 842B, (n) through second manifold port 808, (o) through second manifold fluid flow path 810, (p) through manifold port 800C, (q) through second fluid path connector port 712, (r) through second connector fluid path 714, (s) through connector port 720, (t) through bladder fluid line 202, and (u) into the foot support bladder 200. If a specific fluid distributor 500, foot support system, sole structure 104, and/or article of footwear 100 does not include all of these parts (e.g., no separate connector 700, no sealing block 840, one or fewer foot activated pumps 600H, 600F, etc.), then the fluid flow through those parts would not be present in the fluid flow path described above.

In operational state 3 shown in FIGS. 5C, 29, and 30D, at this third rotational position of the valve stem 910, fluid moves: (a) from foot support bladder 200, (b) through bladder fluid line 202, (c) through connector port 720, (d) through second connector fluid path 714, (e) through second fluid path connector port 712, (f) through manifold port 800C, (g) through second manifold fluid flow path 810, (h) through second manifold port 808, (i) through second sealed channel 842B, (j) through sealing port 840B, (k) through a third through hole 940C, (l) through the internal chamber 910I, (m) through a fourth through hole 940D, (n) through sealing port 840A, (o) through first sealed channel 842A, (p) through first manifold port 804, (q) through first manifold fluid flow path 806, (r) through manifold port 800B, (s) through first fluid path connector port 706, (t) through first connector fluid path 708, and (u) to the external environment 150 (e.g., through the interior space 710 of connector 700). If necessary or desired, a one-way valve somewhere in the fluid pathway from the fluid supply (e.g., in fluid line 606) may prevent fluid from flowing out of the second end 910B of valve stem 910 and into channel 902A, through fluid inlet 800I, and/or through fluid inlet path 802. If a specific fluid distributor 500, foot support system, sole structure 104, and/or article of footwear 100 does not include all of the parts identified above (e.g., no separate connector 700, no sealing block 840, one or fewer foot activated pumps 600H, 600F, etc.), then the fluid flow through those parts would not be present in the fluid flow path described above.

In operational state 4 shown in FIGS. 5D, 29, and 30E, at this fourth rotational position of the valve stem 910, fluid moves: (a) from fluid container 400, (b) through container fluid line 402, (c) through connector port 722, (d) through third connector fluid path 716, (e) through third fluid path connector port 718, (f) through manifold port 800D, (g) through third manifold fluid flow path 812, (h) through third manifold port 814, (i) through third sealed channel 842C, (j) through sealing port 840C, (k) through a fifth through hole 940E, (l) through the internal chamber 910I, (m) through a sixth through hole 940F, (n) through sealing port 840A, (o) through first sealed channel 842A, (p) through first manifold port 804, (q) through first manifold fluid flow path 806, (r) through manifold port 800B, (s) through first fluid path connector port 706, (t) through first connector fluid path 708, and (u) to the external environment 150 (e.g., through the interior space 710 of connector 700). If necessary or desired, a one-way valve somewhere in the fluid pathway from the fluid supply (e.g., in fluid line 606) may prevent fluid from flowing out of the second end 910B of valve stem 910 and into channel 902A, through fluid inlet 800I, and/or through fluid inlet path 802. If a specific fluid distributor 500, foot support system, sole structure 104, and/or article of footwear 100 does not include all of the parts identified above (e.g., no separate connector 700, no sealing block 840, one or fewer foot activated pumps 600H, 600F, etc.), then the fluid flow through those parts would not be present in the fluid flow path described above.

Figure 30G:
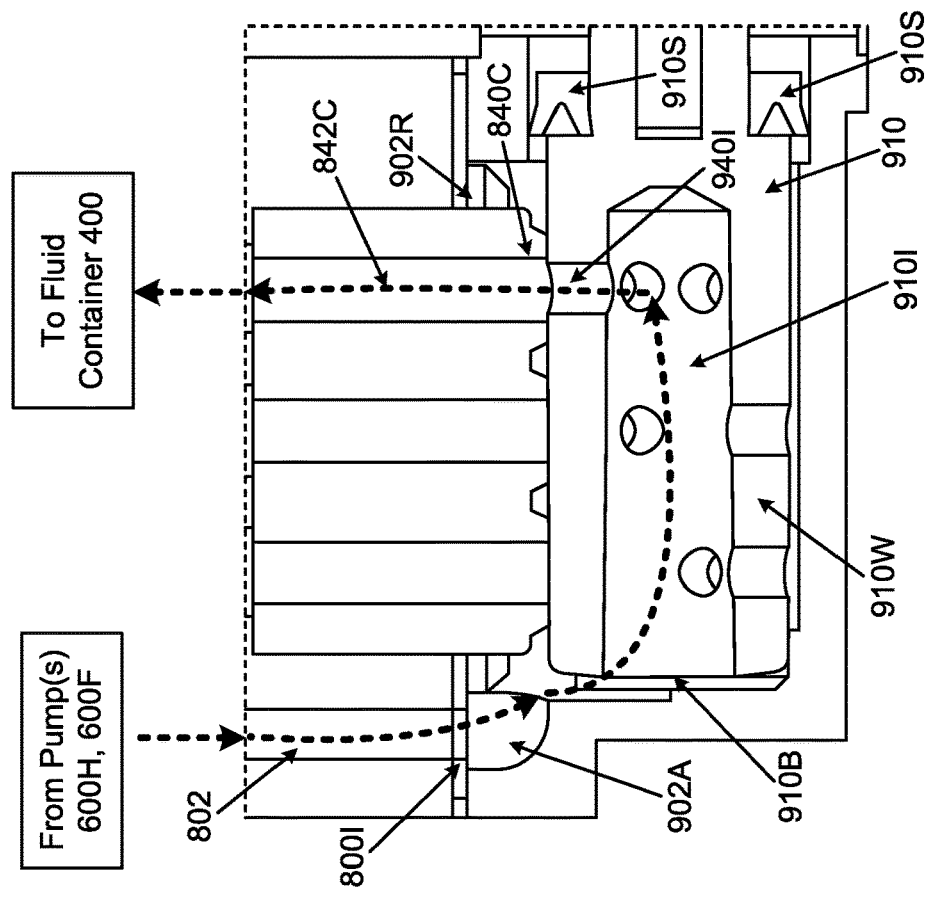
Figure 30F:
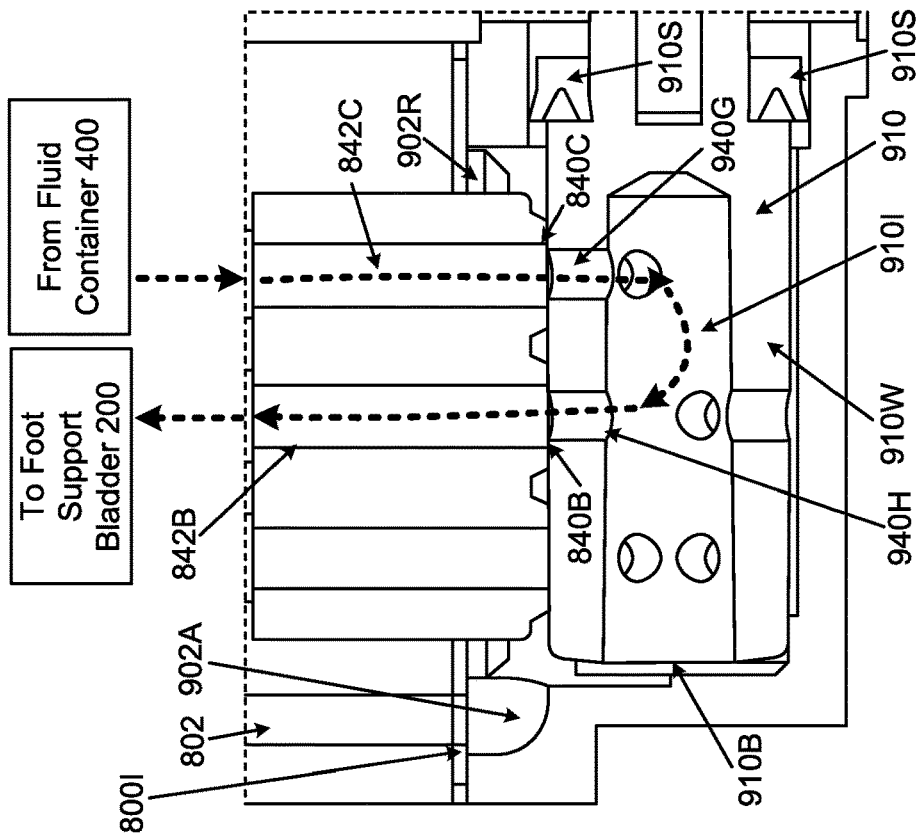

In operational state 5 shown in FIGS. 5E, 29, and 30F, at this fifth rotational position of the valve stem 910, fluid moves: (a) from fluid container 400, (b) through container fluid line 402, (c) through connector port 722, (d) through third connector fluid path 716, (e) through third fluid path connector port 718, (f) through manifold port 800D, (g) through third manifold fluid flow path 812, (h) through third manifold port 814, (i) through third sealed channel 842C, (j) through sealing port 840C, (k) through a seventh through hole 940G, (l) through the internal chamber 910I, (m) through an eighth through hole 940H, (n) through sealing port 840B, (o) through second sealed channel 842B, (p) through second manifold port 808, (q) through second manifold fluid flow path 810, (r) through manifold port 800C, (s) through second fluid path connector port 712, (t) through second connector fluid path 714, (u) through connector port 720, (v) through bladder fluid line 202, and (w) into the foot support bladder 200. If necessary or desired, a one-way valve somewhere in the fluid pathway from the fluid supply (e.g., in fluid line 606) may prevent fluid from flowing out of the second end 910B of valve stem 910 and into channel 902A, through fluid inlet 800I, and/or through fluid inlet path 802. If a specific fluid distributor 500, foot support system, sole structure 104, and/or article of footwear 100 does not include all of the parts identified above (e.g., no separate connector 700, no sealing block 840, one or fewer foot activated pumps 600H, 600F, etc.), then the fluid flow through those parts would not be present in the fluid flow path described above.

In operational state 6 shown in FIGS. 5E, 29, and 30G, at this sixth rotational position of the valve stem 910, fluid moves: (a) from the fluid supply (e.g. from external environment 150, through connector inlet 702I, through fluid path 702P, through connector outlet 702O, through fluid path 604, through heel pump 600H, through fluid path 602, through forefoot pump 600F, through fluid line 606), (b) through the connector inlet port 704, (c) through connector fluid path 704P, (d) through connector outlet port 704O, (e) through manifold port 800A, (f) through manifold fluid inlet path 802, (g) through manifold fluid inlet port 800I, (h) through fluid intake path 902A, (i) into the open end 910B of valve stem 910, (j) through the internal chamber 910I, (k) through a ninth through hole 940I, (l) through sealing port 840C, (m) through third sealed channel 842C, (n) through third manifold port 814, (o) through third manifold fluid flow path 812, (p) through manifold port 800D, (q) through third fluid path connector port 718, (r) through third connector fluid path 716, (s) through connector port 722, (t) through container fluid line 402, and (u) into fluid container 400. If a specific fluid distributor 500, foot support system, sole structure 104, and/or article of footwear 100 does not include all of these parts (e.g., no separate connector 700, no sealing block 840, one or fewer foot activated pumps 600H, 600F, etc.), then the fluid flow through those parts would not be present in the fluid flow path described above.

Thus, as described above, the valve stem 910 includes a plurality of through holes 910H (and 940A to 940I) defined through its perimeter wall 910W. As evident from FIGS. 30B-30G, rotation of valve stem 910 aligns various specific holes 910H with ports 840A, 840B, 840C in the sealing connector 840 (and/or with ports 804, 808, 814 in manifold 800, if a separate sealing connector 840 is omitted and/or if the manifold 800 itself functions as a sealing connector). The holes 910H that align with the ports 840A, 840B, 840C, 804, 808, 814 in the individual operational states of the valve stem 910 are circumferentially offset from one another so that only the one or more holes needed to make the desired fluid flow connection and pathway align with the correct ports. For operational states that rely on two (or more) through holes 910 through the perimeter wall 910W (e.g., operational states 3, 4, and 5 above), the through holes needed to make the fluid flow connection may: (a) align along the axial length and direction of the valve stem 910, and/or (b) extend in parallel through the perimeter wall 910W.

Fluid flow rates into and/or out of the fluid transfer system 900A may be controlled in various ways. For example, when the perimeter of a through hole 910H in the valve stem 910 fully aligns with the port to which it is connected (e.g., sealing connector ports 840A, 840B, 840C), the maximum flow rate through the hole 910H and aligned port may be realized (e.g., depending on the pressure differential between the fluid source direction and the fluid destination direction).

In some instances, however, the maximum flow rate may not be desired. This may occur, for example, when a user wants to make a small pressure change in the foot support bladder 200, when a potential overpressure situation is approaching, etc. Thus, when desired, in any operational state, valve stem 910 may be moved (e.g., rotated) to a position with respect to the corresponding connecting port (e.g., 840A, 840B, 840C, 804, 808, 814) so that the through hole 910H does not completely align with the port to which it is connected. FIGS. 31A-31D provide various examples of this type of "offset" in the axial directions of a through hole 910H with respect to its connecting port to reduce and control the flow rate through and fluid exchange rate between the components. FIGS. 31A-31D show examples in which two through holes 940G, 940H are partially aligned with a corresponding two seal ports 840B, 840C and two sealed channels 842B, 842C from operational state 5 above in FIG. 30F. These same types of variations, however, may be applied at the other operational states and/or when only one and/or when other through holes are to be at least partially aligned with a port. The examples of FIGS. 31A-31D show seal connector port 840A and sealed channel 842A not aligned with a through hole (and thus the perimeter wall 910W is visible through the port 840A and channel 842A).

In FIG. 31A, the valve stem 910 is rotationally positioned such that the central axes of through holes 940G, 940H are offset from the central axes of seal ports 840C, 840B, respectively, by 10 rotational degrees. In at least some arrangements (e.g., depending on fluid pressures, hole sizes, relative hole sizes, etc.), the offset amount results in a fluid flow rate reduction to about 41% of the full flow rate when the holes and parts are fully aligned. In FIG. 31B, the valve stem 910 is rotationally positioned such that the central axes of through holes 940G, 940H are offset from the central axes of seal ports 840C, 840B, respectively, by 15 rotational degrees. This example results in a fluid flow rate reduction to about 25% of the full flow rate when the holes and parts are fully aligned. In FIG. 31C, the valve stem 910 is rotationally positioned such that the central axes of through holes 940G, 940H are offset from the central axes of seal ports 840C, 840B, respectively, by 20 rotational degrees. This example results in a fluid flow rate reduction to about 10% of the full flow rate when the holes and parts are fully aligned. In FIG. 31D, the valve stem 910 is rotationally positioned such that the central axes of through holes 940G, 940H are offset from the central axes of seal ports 840C, 840B, respectively, by 25 rotational degrees. This example results in a fluid flow rate reduction to about 1% of the full flow rate when the holes and parts are fully aligned. Only a small sliver of holes 940G, 940H are visible in FIG. 31D. The reduced flow rates can be used, for example, to make minor or slow pressure adjustments, e.g., to the foot support bladder 200 and/or the fluid container 400, to fine-tune to a desired pressure, etc.

Figure 32A:
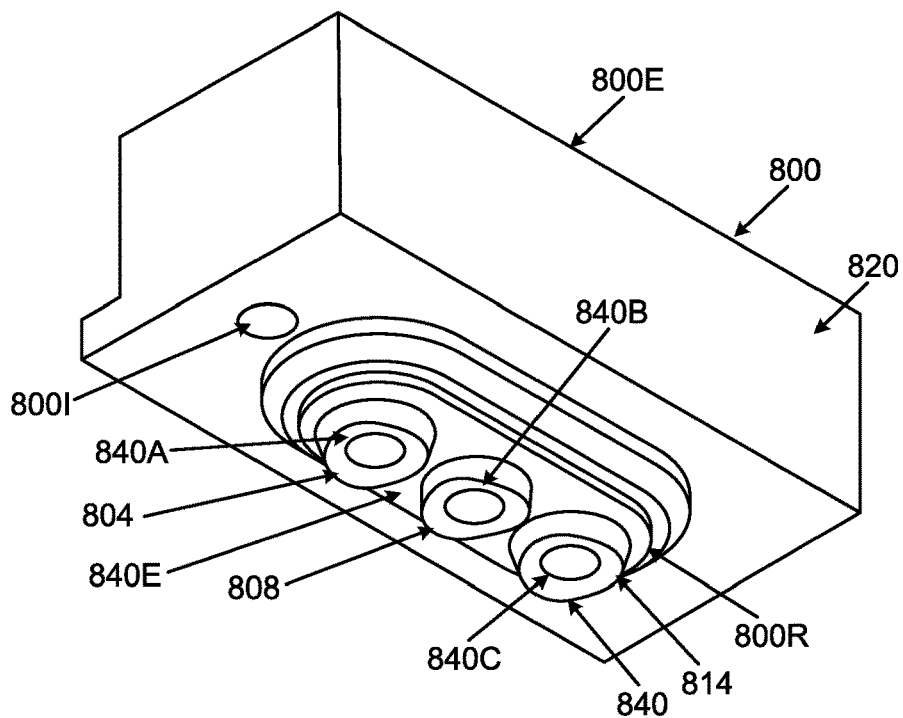
FIGS. 32A-32C provide views of sealing block and manifold connections in accordance with some examples of this technology.
Figure 32B:
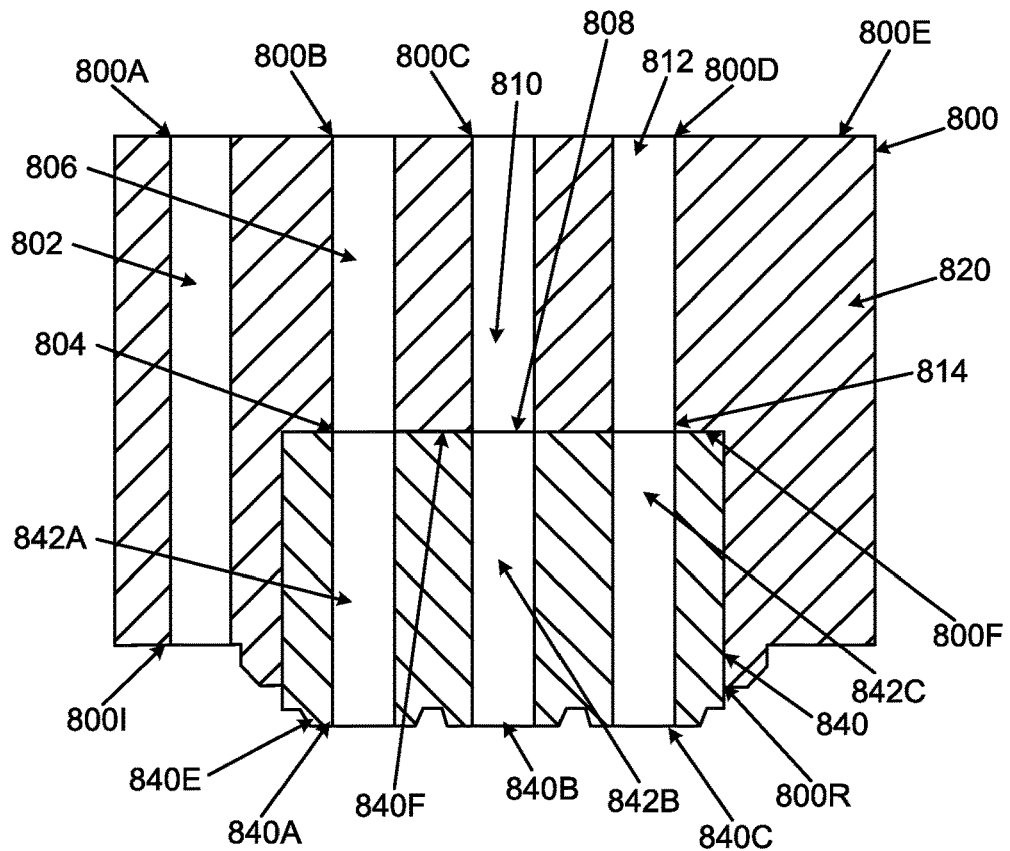

FIGS. 32A and 32B provide a perspective view and cross-sectional view, respectively, of the combined manifold 800 (rigid plastic) and cartridge style sealing connector 840 of one example. As shown, this example manifold 800 has: (a) four ports 800A, 800B, 800C, 800D (optionally aligned) at one surface 800E, (b) fluid inlet port 800I, (c) first port 804, second port 808, and third port 814 at another surface 800F (e.g., the opposite surface from surface 800E), e.g., with ports 804, 808, 814 aligned, and (d) four fluid flow paths 802, 806, 810, 812 through the manifold body 820 (optionally aligned and/or extending in parallel). While FIGS. 32A and 32B show end surfaces 800E and 800F at opposite sides of the manifold body 820 and fluid flow paths 806, 810, 812 extending straight through the manifold body 820 from surface 800E to surface 800F, other arrangements are possible. For example, one or more of the fluid flow paths 802, 806, 810, 812 may be curved and/or angled such that one or more ports 800A, 800B, 800C, 800D at one end of the fluid flow paths are not located on an opposite surface from the corresponding port 800I, 804, 808, 814 at the other end of the fluid flow path. Any desired arrangement of ports and/or path shapes may be used. The illustrated arrangement helps maintain the manifold 800 at a relatively compact size and shape.

Ports 804, 808, 814 of this example (as well as surface 800F) are located within a recess 800R defined in the manifold body 820. The sealing connector 840 is received in that recess 800R and is secured by chemical bonds or opposing face seals (and optionally not just perimeter seals). The sealing connector 840 of this example includes: (a) three ports 840A, 840B, 840C at one surface 840E and (b) three sealed channels 842A, 842B, 842C extending from ports 840A, 840B, 840C to openings at surface 840F (the openings in the sealing connector at surface 840F also may be considered "ports" of the sealing connector 840). Surface 840F of sealing connector 840 abuts against surface 800F of manifold 800, and sealed channels 842A, 842B, 842C align with manifold 800 fluid flow paths 806, 810, 812, respectively, to place the sealing connector 840 and manifold 800 in fluid communication. While FIGS. 32A and 32B show end surfaces 840E and 840F at opposite sides of the sealing connector 840 and sealed channels 842A, 842B, 842C extending straight through the sealing connector 840 from surface 840E to surface 840F, other arrangements are possible. For example, one or more of the sealed channels 842A, 842B, 842C may be curved and/or angled such that one or more ports 840A, 840B, 840C, at one end of the fluid flow path are not located on an opposite surface from the corresponding opening at the other end of the fluid flow path. Any desired arrangement of ports, openings, and/or path shapes may be used. The illustrated arrangement helps maintain the sealing connector 840 at a relatively compact size and shape.

The example structures shown in FIGS. 29-32B include sealing connector 840 having three sealed channels 842A, 842B, 842C in fluid communication with three fluid flow paths 806, 810, 812 in manifold 800. In these structures, the fluid inlet path 802 through manifold 800 does not pass through the sealing connector 840. Rather, it directly connects with fluid intake path 902A of housing 900 (housing 900 not shown in FIGS. 32A and 32B). As another alternative, as shown in FIG. 32C, the sealing connector 840 may include four ports 840A, 840B, 840C, 840D at one surface 840E and (b) four sealed channels 842A, 842B, 842C, 840D extending from ports 840A, 840B, 840C, 840D to openings at surface 840F (the openings in the sealing connector at surface 840F also may be considered "ports"). The additional port 840D and sealed channel 842D of the example of FIG. 32C may engage with fluid inlet port 800I and flow in fluid communication with fluid inlet path 802. The manifold 800 recess 800R in such a structure could be increased in size and/or changed in shape to extend to include fluid inlet port 800I and to accommodate the additional port 840D, sealed channel 842D, and fluid communication with fluid inlet path 802. As another alternative, if desired, the additional port 840D and sealed channel 842D of the example of FIG. 32C may engage with a fluid passageway in fluid communication with another component of the overall foot support system, such as another foot support bladder (if present), another fluid container (if present), etc.

Figure 32C:
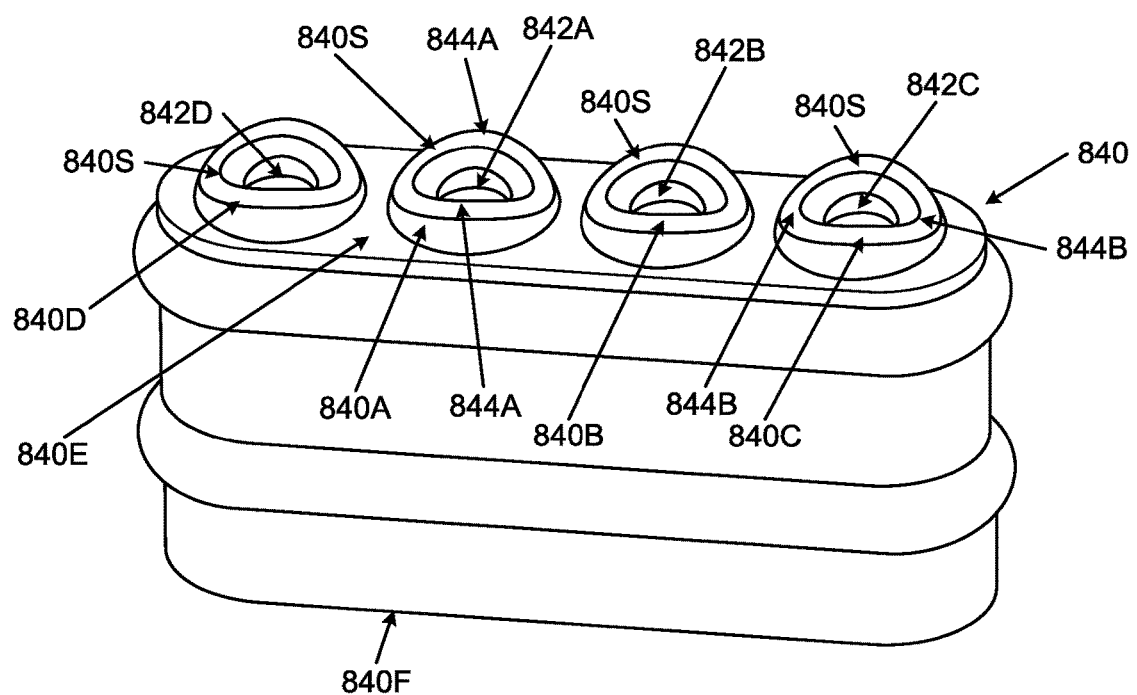
Figure 33A:
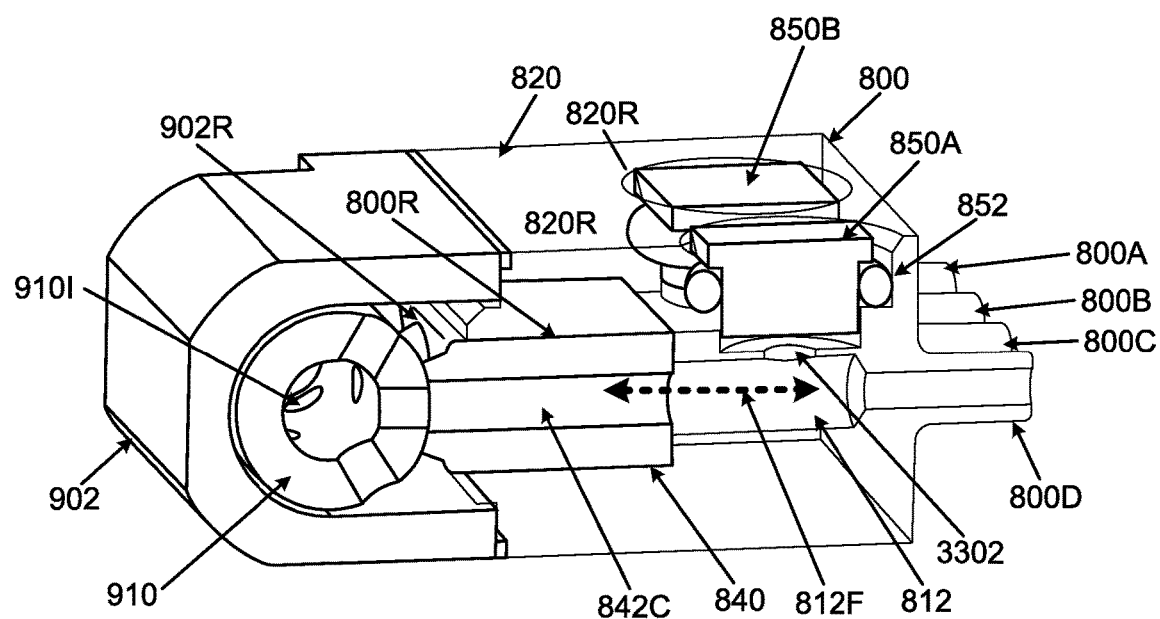
FIGS. 33A-33F provide views of combined valve housing, sealing connector, manifold, and pressure sensors in accordance with some examples of this technology.
Figure 33B:
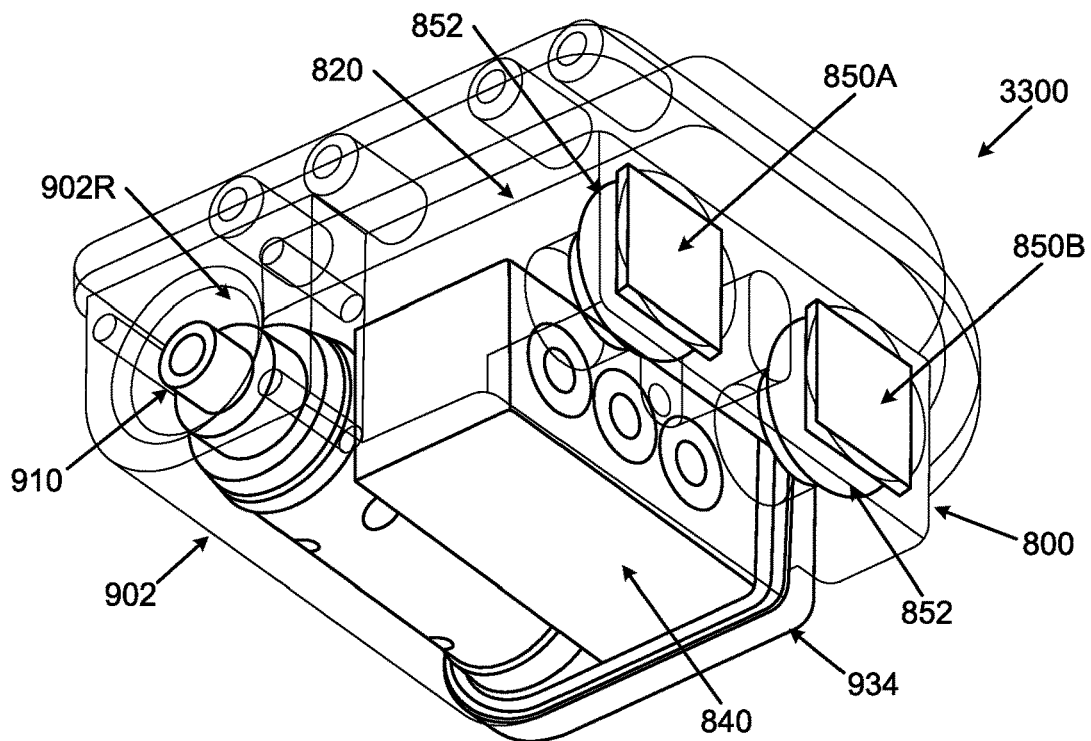
Figure 33C:
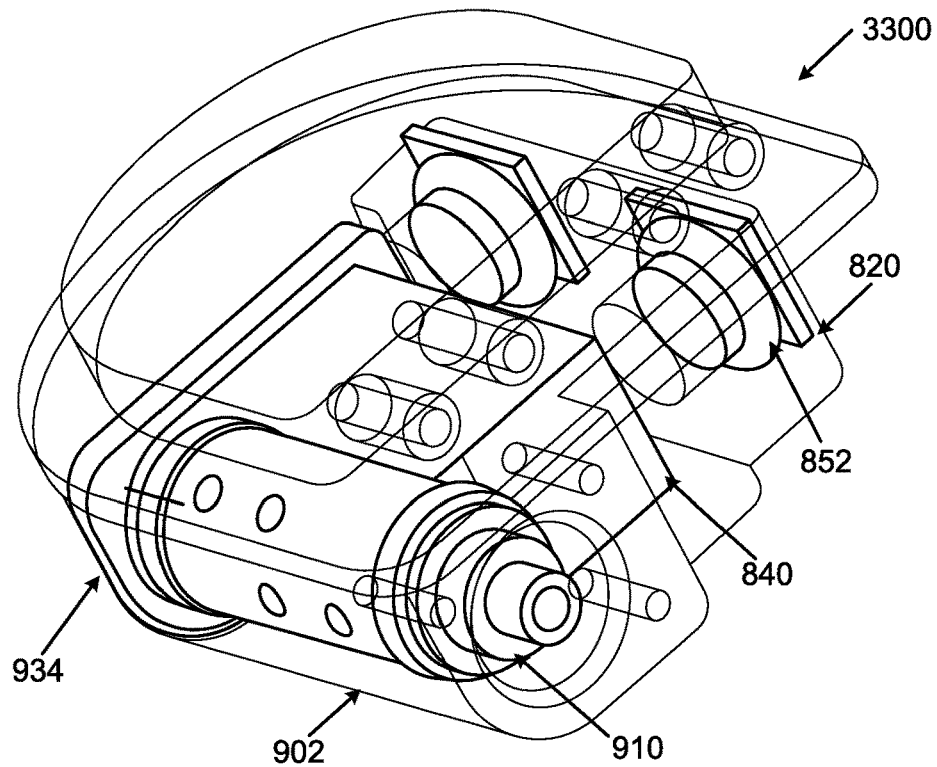
Figure 33D:
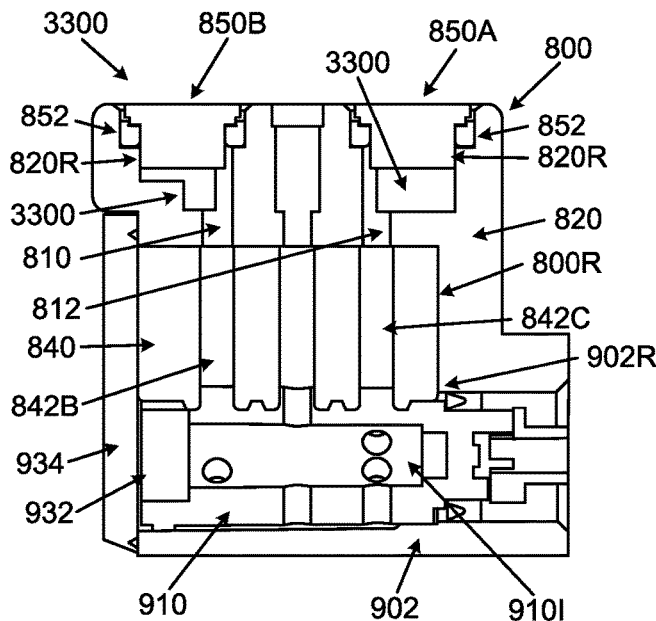
Figure 33E:
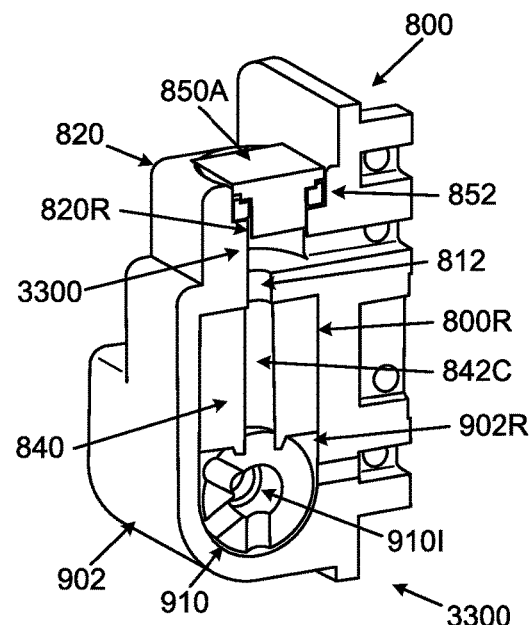
Figure 33F:
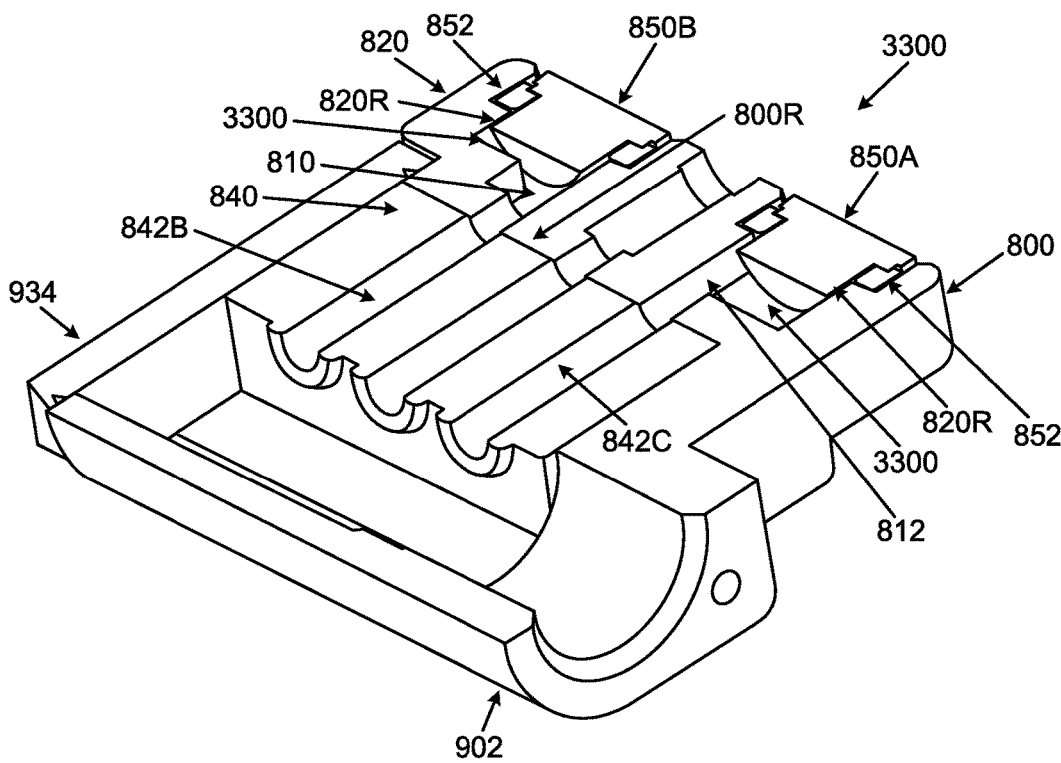

As described above in conjunction with FIGS. 28A-31G, in some examples of this technology, the sealing connector ports 840A, 840B, 840C directly engage the outer surface of the perimeter wall 910W of the valve stem 910. Valve stem 910 moves (e.g., rotates) to place the fluid transfer system 900A of this example into the various operational states. FIG. 32C shows features of sealing connector ports 840A, 840B, 840C (and 840D, in this example) that may assist in maintaining a sealed connection between sealing connector 840 and the valve stem 910 perimeter wall 910W. In the illustrated examples, the outer surface of the perimeter wall 910W of the valve stem 910 has a circular cylindrical shape and a curved perimeter (e.g., circular circumference) and cross sectional shape. To maintain better contact and seal between the sealing connector 840 and the perimeter wall 910W, even while in relative rotation, the sealing connector ports 840A, 840B, 840C (and 840D) have an arched outer surface shape (840S). This arched outer surface shape 840S is shaped to correspond to the curvature of the perimeter wall 910W. The arched outer surface shapes 840S of this example have two opposed curve inflection points (e.g., local maxima) 844A on opposite sides of the ports 840A, 840B, 840C in the rotational direction of the valve stem 910 and two opposed curve inflection points (e.g., local minima) 844B on opposite sides of the ports 840A, 840B, 840C in the axial direction of the valve stem 910. The arched outer surface shapes 840S of this example are raised up from base surface 840E to give the arched outer surface shapes 840S somewhat of a "fishlips" type appearance. These shapes correspond to and maintain better contact with the curved surface of perimeter wall 910W. If necessary or desired, the perimeter wall 910W and/or ports 840A, 840B, 840C may be treated with a lubricant (or made from materials having relatively low coefficients of friction with respect to one another, e.g., polytetrafluoroethylene containing materials, etc.) to facilitate the sliding and sealing actions of the perimeter wall 910W with respect to 840A, 840B, and/or 840C.

FIGS. 33A through 37B illustrate aspects of this technology relating to incorporating one or more pressure sensors into the fluid flow control system and/or foot support system, e.g., to enable determination of fluid pressure within the foot support bladder 200, the fluid container 400, and/or other components of the system. Various types of pressure sensors may be used without departing from this technology, including, for example MPR Series pressure sensors (e.g., piezoresistive silicon pressure sensors) available from Honeywell. As some examples, pressure sensors useful in accordance with at least some aspects of this technology will have one or more of: (a) a sensing pressure range from atmospheric pressure to at least +40 psi (e.g., 14.7 to 54.7 psi); (b) a small size (e.g., 5 mm by 5 mm or less), (c) a relative accuracy or error level of less than 0.15 psi (including non-linearity, hysteresis, and non-repeatability), (d) an absolute accuracy of less than 1 psi, (e) a digital output with on-board temperature compensation, and/or (f) an update rate of 50 Hz or more.

In at least some examples of this technology, typically: (a) one pressure sensor 850A is in fluid communication with third fluid flow path 812 for measuring fluid pressure in the fluid container 400 (which is in fluid communication with fluid flow path 812 via connector fluid path 716 and container fluid path 402 in at least some of the illustrated examples) and (b) another pressure sensor 850B is in fluid communication with second fluid flow path 810 for measuring fluid pressure in the foot support bladder 200 (which is in fluid communication with fluid flow path via connector fluid path 714 and foot support fluid path 202 in at least some of the illustrated examples). Some of the figures may appear to show the pressure sensors in other labeled paths. This is done, at least in part, so that the depictions of the pressure sensors 850A, 850B and their ports are sufficiently separated to maintain clarity. The same types of pressure sensors, structures, and/or mountings may be used irrespective of the specific fluid channel in which the pressures are mounted. Any desired arrangement of fluid paths—coming from or going to any location—through the sealing connector 840, manifold 800, and/or connector 700 may be used. In addition or as an alternative to the "typical" pressure sensors 850A, 850B mentioned above, if desired, a pressure sensor (including one of pressure sensors 850A, 850B) may be placed in fluid communication with first fluid flow path 806 for measuring fluid pressure in the fluid line extending to the external environment 150 and/or in fluid inlet path 802 (e.g., from the fluid source, such as pump(s) 600H, 600F).

FIGS. 33A-33F illustrate examples of combined valve housing 902, valve stem, 910, sealing block 840, and manifold 800 in which two pressure sensors 850A and 850B (e.g., of the types described above) are provided within separate recesses 820R formed in the manifold body 820. The recesses 820R provide pressure sensor mounts in this illustrated example and extend inward from a base surface of the manifold body 820. The pressure sensors 850A, 850B are sealingly engaged within the recesses 820R of manifold body 820 with O-rings 852. An open channel 3302 extends from the recess 820R to the fluid channel (812 shown in FIG. 33A) to expose the pressure sensor 850A, 850B to fluid pressure in the channel (similar arrangements of an open channel may be provided in other pressure sensor mount recesses 820R). In the FIG. 33A example, manifold 800 is provided as a separate component part from the valve housing 902 and is engaged with valve housing 902 (e.g., via mechanical connectors, adhesive, etc.). In the example structure shown in FIG. 33A, the pressure sensor mount recess(es) 820R for receiving the pressure sensor(s) 850A, 850B extend into the manifold body 820 in a direction substantially perpendicular to a fluid flow direction (arrow 812F) through the manifold fluid path (e.g., 812) at the open channel 3302's location(s). The open channel(s) 3302 may be considered an extension of the recess 820R.

FIGS. 33B-33F provide various views of another example combined valve housing 902, valve stem, 910, sealing block 840, and manifold 800 in which two pressure sensors 850A and 850B (e.g., of the types described above) are provided. In this example structure 3300, the manifold body 820 and the valve housing 902 are formed as a one-piece construction. Sealing block 840 and valve stem 910 may be inserted into this combined manifold body 820 and the valve housing 902 structure, e.g., at the open end where encoder board or sensor 934 later may be mounted. The various parts shown in FIGS. 33B-33F use the same reference numbers used above for the same or similar parts (and thus much of the overlapping or redundant description has been omitted).

Figure 34A:
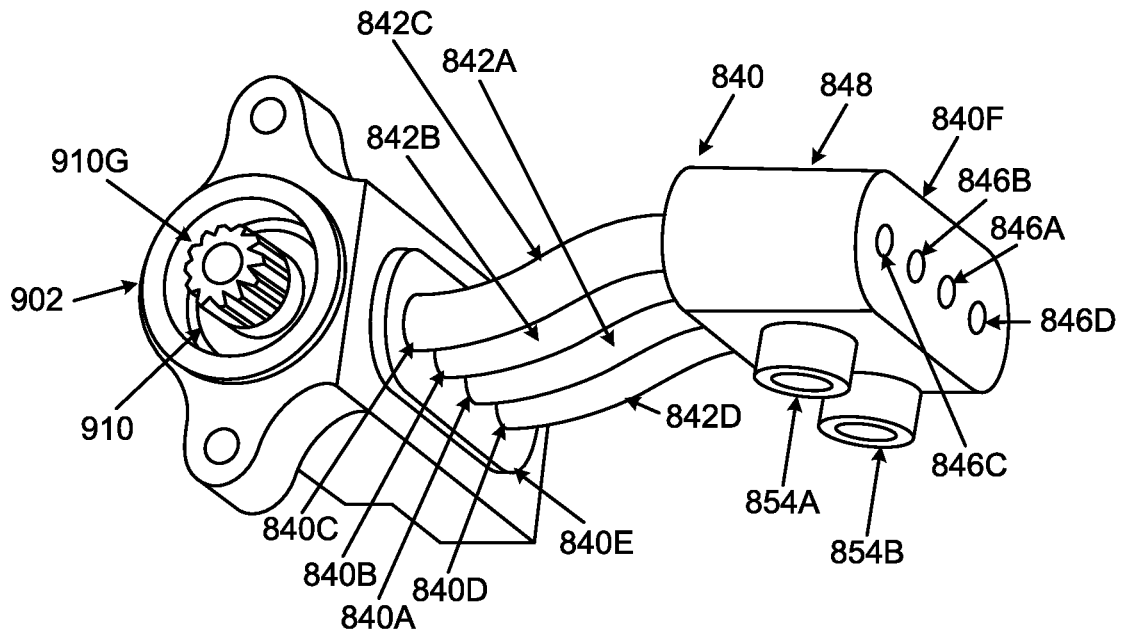
FIGS. 34A-37B provide views of engagement of pressure sensors in accordance with some examples of this technology.
Figure 34B:
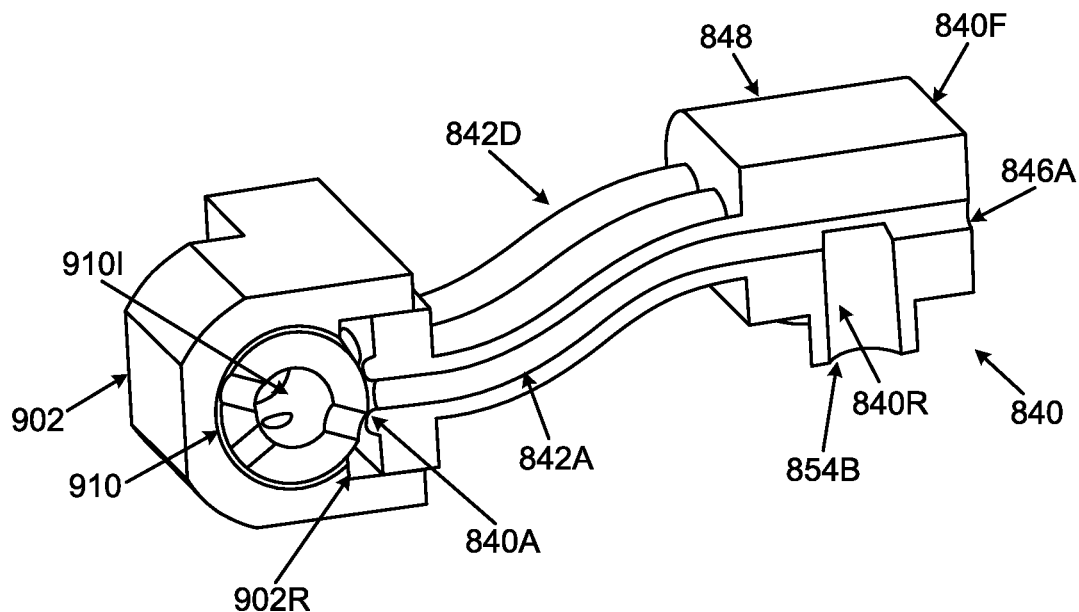

One or more pressure sensors 850A and/or 850B may be placed at other locations in an overall system without departing from this technology. FIGS. 34A and 34B show an example structure having one or more pressure sensor mounts, e.g., tubes (two tubes 854A, 854B shown in FIGS. 34A and 34B) that define a recess 840R for mounting a pressure sensor (e.g., 850A, 850B), as part of a sealing connector 840. The sealing connector 840 of this example includes: (a) a base surface 840E including the ports 840A, 840B, 840C, 840D; (b) an outlet surface 840F including openings (or ports) 846A, 846B, 846C, 846D for engaging ports 800I, 804, 808, 814 of manifold 800 (manifold not shown in FIGS. 34A and 34B); and (c) sealed fluid channels 842A, 842B, 842C, 842D extending between surfaces 840E and 840F. Surface 840F is provided at the free end of a block 848 of material in which the pressure sensor tube(s) (e.g., 854A, 854B) is/are defined and to which the pressure sensor(s) (e.g., 850A, 850B) is/are mounted. If desired, the tubular structures defining the sealed fluid channels 842A, 842B, 842C, 842D may be flexible so that the block 848 can be moved with respect to the connection to the housing 902 at surface 840E, e.g., to ease assembly, provide tolerance, etc. The pressure sensor tube(s) (e.g., 854A, 854B) may be in fluid communication with any of sealed fluid channels 842A, 842B, 842C, 842D extending between surfaces 840E and 840F, e.g., via open channels as described above in conjunction with FIG. 33A, to measure pressure in any of channels 842A, 842B, 842C, 842D and/or devices in fluid communication with them. In some examples, pressure sensors 850A, 850B will provide pressure readings in foot support bladder 200 and fluid container 400. While not shown in FIGS. 33A-33F, if desired, pressure sensor mounts in a manifold body 820 may have tubular structures of the types shown in FIGS. 34A-34B (as well as pressure sensor mounts like those shown in FIGS. 35A-37B).

Figure 35A:
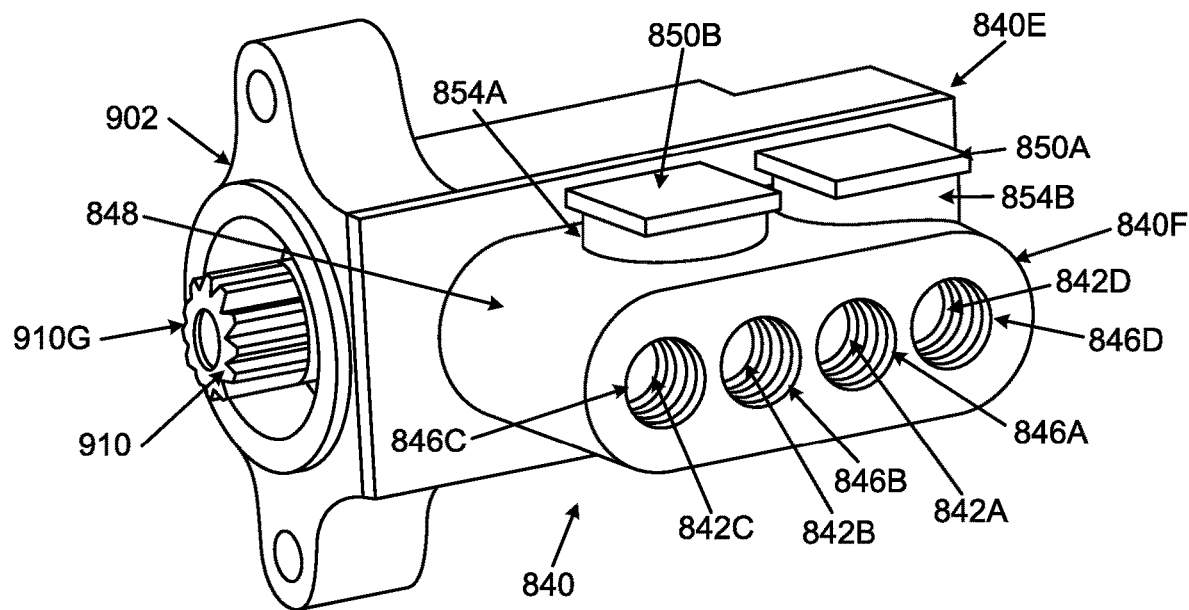
Figure 35B:
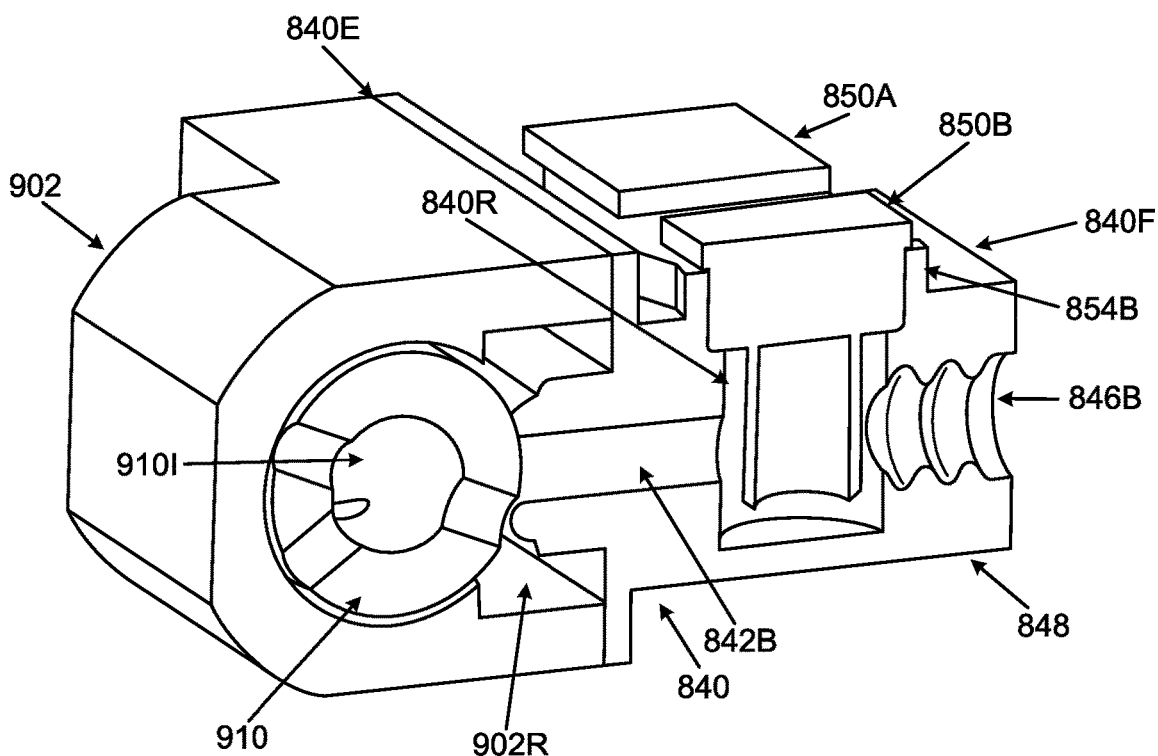

FIGS. 35A and 35B illustrate another example in which pressure sensor(s) (e.g., 850A, 850B) is/are engaged with sealing connector 840. Different from the example of FIGS. 34A and 34B, this sealing connector 840 is more like that shown in FIG. 32C, e.g., without flexible and/or individually apparent sealed fluid channels 842A, 842B, 842C, 842D. Rather, the sealing connector 840 of this example is more of a block 848 of material through which sealed fluid channels 842A, 842B, 842C, 842D are formed. While shown in fluid communication with sealed channels 842B, 842D in FIGS. 35A and 35B, the pressure sensor tube(s) (e.g., 854A, 854B)—and thus pressure sensor(s) (e.g., 850A, 850B)—may be in fluid communication with any of sealed fluid channels 842A, 842B, 842C, 842D extending between surfaces 840E and 840F, e.g., to measure pressure in any of channels 842A, 842B, 842C, 842D and/or devices in fluid communication with them. In some examples, pressure sensors 850A, 850B will provide pressure readings in foot support bladder 200 and fluid container 400.

Figure 36A:
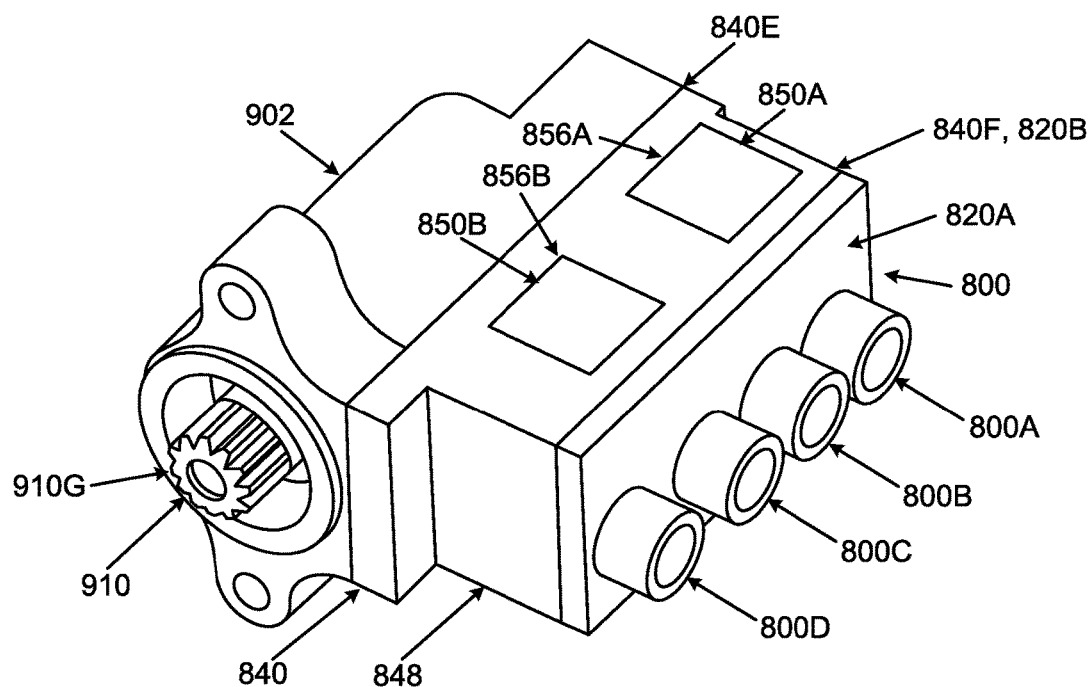
Figure 36B:
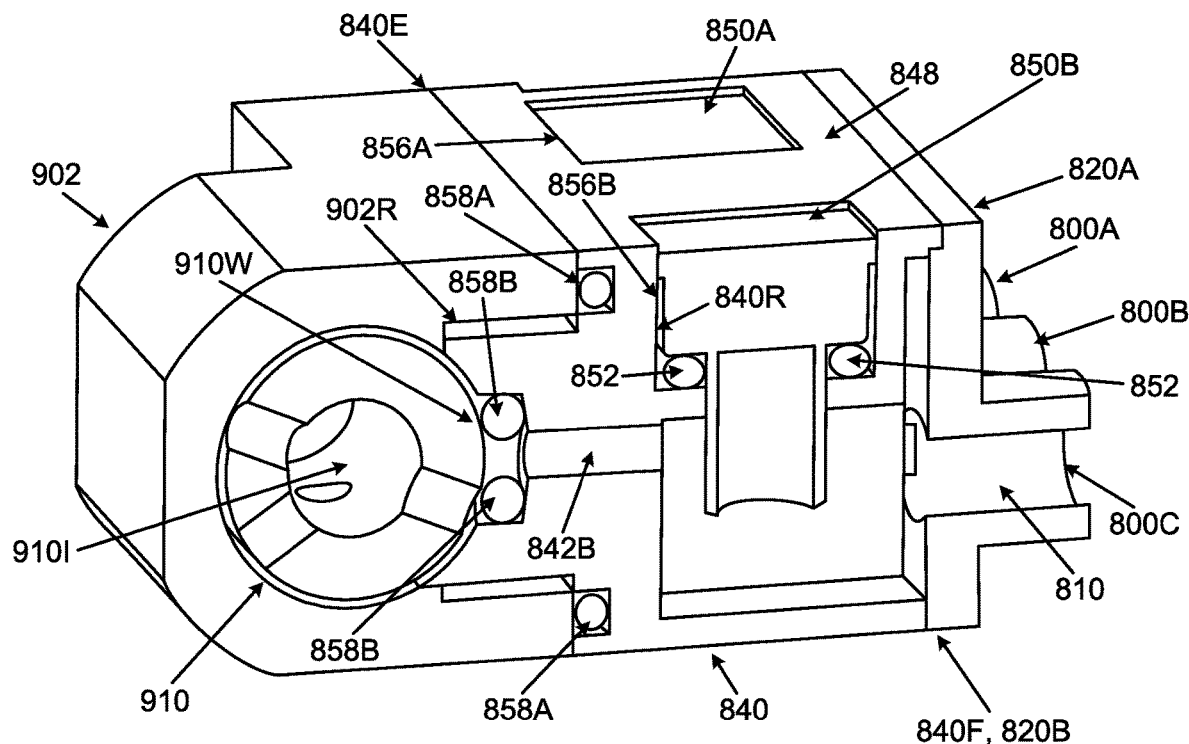

FIGS. 36A and 36B illustrate another example in which pressure sensor(s) (e.g., 850A, 850B) is/are engaged with sealing connector 840. Different from the examples of FIGS. 34A-35B, this sealing connector 840 may be made from a somewhat more rigid material and has various connections with the valve housing 902 sealed by O-rings, gaskets, and/or other types of seals. In this illustrated example, the junction of surface 840E with housing 902 is sealed by one or more O-rings, gaskets, and/or other types of seals 858A, and the junctions of ports 840A, 840B, 840C, 840D with perimeter wall 910W of valve stem 910 are sealed with O-rings, gaskets, and/or other types of seals 858B (only one seal 858B shown in FIGS. 36A-36B). The sealing connector 840 of this example is a block 848 of material through which sealed fluid channels 842A, 842B, 842C, 842D are formed. While shown in fluid communication with sealed channels 842B, 842D in FIGS. 36-36B, recess(es) (e.g., 856A, 856B) defined in the block 848 of sealing connector material—and thus pressure sensor(s) (e.g., 850A, 850B) received in the recess(es) (e.g., 856A, 856B)—may be in fluid communication with any of sealed fluid channels 842A, 842B, 842C, 842D extending between surfaces 840E and 840F, e.g., to measure pressure in any of channels 842A, 842B, 842C, 842D and/or devices in fluid communication with them. In some examples, pressure sensors 850A, 850B will provide pressure readings in foot support bladder 200 and fluid container 400. Pressure sensors 850A, 850B are engaged with sealing connector 840 within the recesses 856A, 856B by O-rings 852 (or gaskets or other appropriate seals).

Also, FIGS. 36A-36B illustrate sealing connector 840 engaged with a manifold 800. The manifold 800 of this example is relatively short as compared to others described above. The manifold 800 includes a base 820A having a base surface 820B to engage surface 840F of the sealing connector 840 and four manifold ports 800A, 800B, 800C, 800D projecting outward from the base 820A. These manifold ports 800A, 800B, 800C, 800D may engage a connector 700 as described above and/or may directly engage fluid tubes, e.g., coming from the fluid supply (e.g., pumps 600H, 600F), external environment 150, foot support bladder 200, and fluid container 400 (e.g., if no connector 700 is present).

Figure 37A:
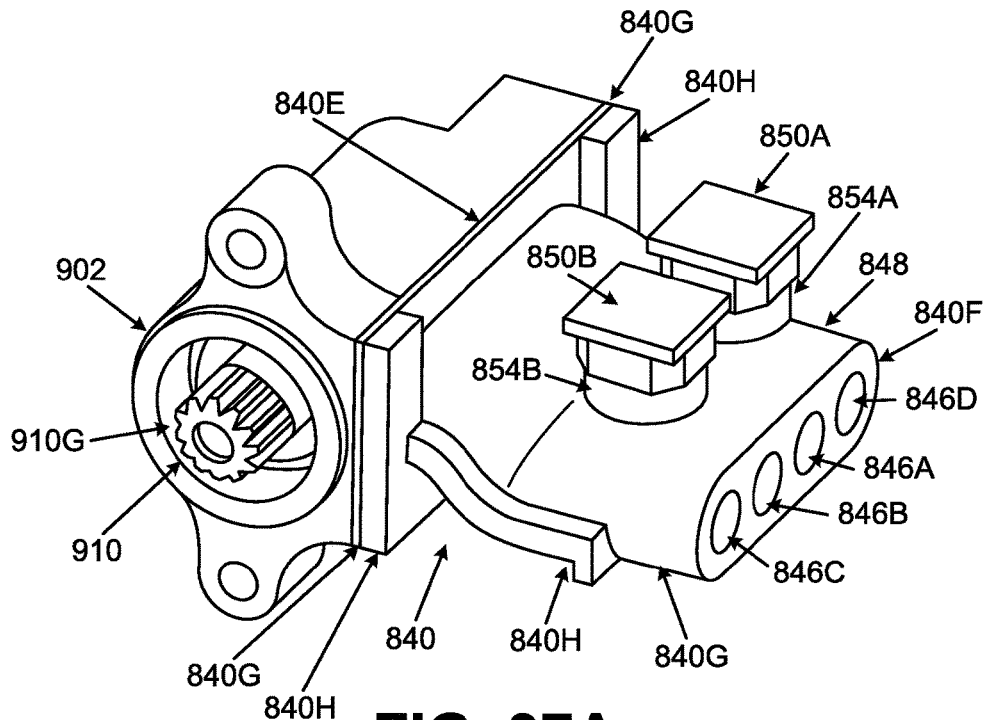
Figure 37B:
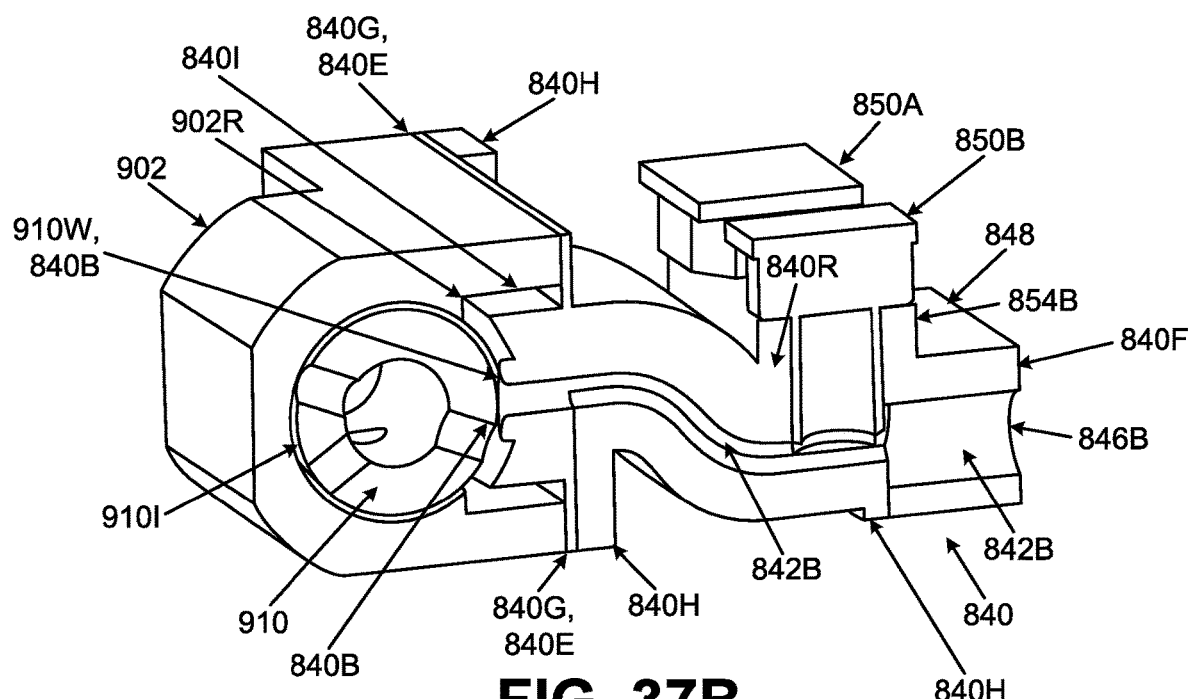

FIGS. 37A and 37B illustrate an example structure including a two part sealing connector 840—one part 840G relatively flexible and the other part 840H more rigid. More specifically, as shown in FIGS. 37A and 37B, the flexible part 840G of sealing connector 840 forms the direct interface with valve housing 902 and valve stem 910 perimeter wall 910W. Seal ports 840A, 840B, 840C, 840D are provided on an extension 840I of flexible part 840G that extends inward from surface 840E and into a recess 902R defined in housing 902. Further, this example flexible part 840G includes tubes 854A and 854B for engaging pressure sensors 850A, 850B. This example flexible part 840G forms the top half of a portion of the sealed channels 842A, 842B, 842C, 842D between the pressure sensors 850A, 850B and the valve housing 902. The flexible part 840G also defines the entire sealed channels 842A, 842B, 842C, 842D between the pressure sensors 850A, 850B and the surface 840F of sealing connector 840 including the openings 846A, 846B, 846C, 846D for connecting to manifold 800 (or other appropriate component, e.g., if the manifold 800 and sealing connector 840 are formed as a single part).

The rigid part 840H forms the bottom half of a portion of the sealed channels 842A, 842B, 842C, 842D between the pressure sensors 850A, 850B and the valve housing 902. Thus, between the pressure sensors 850A, 850B and the valve housing 902, the flexible part 840G and the rigid part 840H cooperate to define the portion of the sealed channels 842A, 842B, 842C, 842D between the pressure sensors 850A, 850B and the valve housing 902. The rigid part 840H also defines a portion of the sealed channels 842A, 842B, 842C, 842D immediately opposite the pressure sensor(s) 850A, 850B across the channels 842A-842D. This two part sealing connector 840 may provide some flexibility, e.g., for ease of assembly, while still providing a solid overall structure.

Figure 38A:
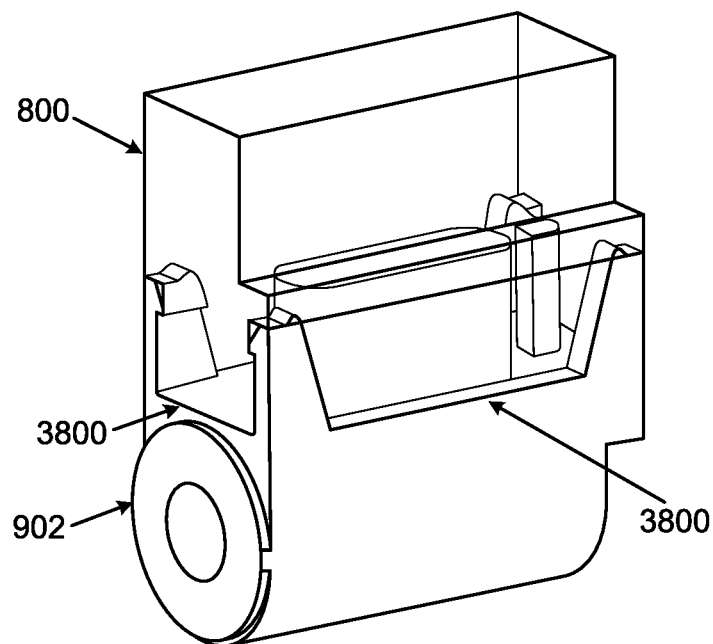
FIGS. 38A and 38B various views of a valve housing to manifold connection in accordance with some examples of this technology.
Figure 38B:
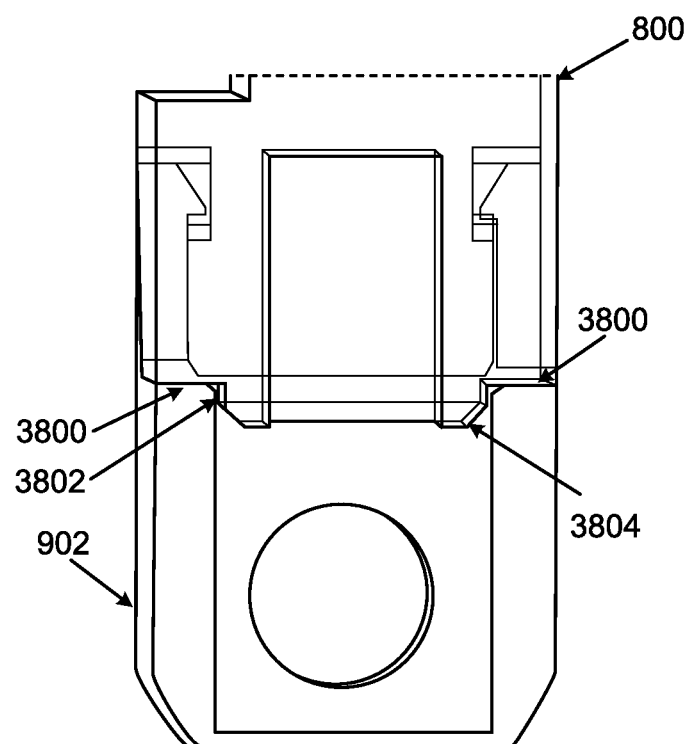

As described above in conjunction with FIGS. 28-30G, 32A, 32B, and 33, in some examples of this technology, the valve housing 902 may be engaged with a rigid manifold 800 component that includes recess 800R into which a sealing connector 840 is inserted. The valve housing 902 and the manifold 800 may be joined together using any desired technique(s), such as mechanical connectors, adhesives, ultrasonic welding, laser welding, and/or other fusing techniques, etc. FIGS. 38A and 38B illustrate one example of such a connection (although similar connections may be used, if desired, to engage a sealing connector 840 with a valve housing 902, e.g., as shown in FIGS. 34A-37B). Each of the four corners and/or edges of the valve housing 902 and the manifold 800 of this example snap together mechanically to hold the parts together. At the interface of valve housing 902 and manifold 800, as shown in FIG. 38B, flat faces 3800 are provided on each of the valve housing 902 and the manifold 800 (although grooved surfaces could be provided, if desired), e.g., around the various interfacing side surfaces. Prior to snapping the parts together, adhesive (e.g., a liquid dispensed adhesive) may be provided at the interfacing surfaces 3800 to permanently fix the valve housing 902 to the manifold 800. Small chamfers 3802 may be included in one or both of interfacing surfaces 3800 of valve housing 902 and the manifold 800, e.g., to provide room for any excess adhesive to be squeezed out from the interfacing surfaces 3800. Overlapping lips 3804 also may be provided between the parts, e.g., inward from the flat faces 3800.

Figure 39:
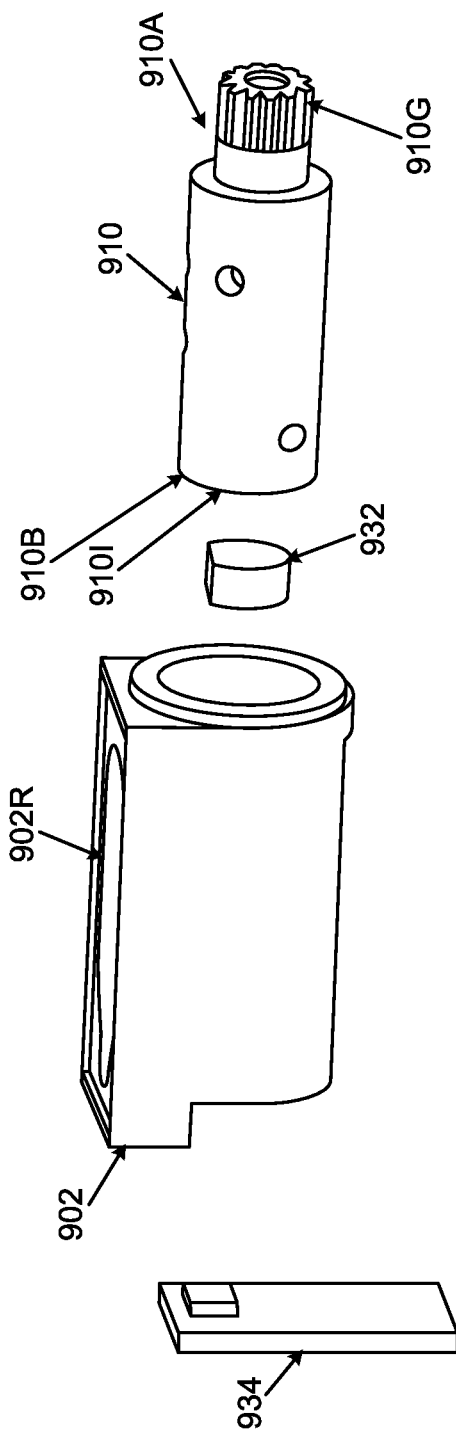
FIG. 39 illustrates a positional sensor in valve stem based fluid transfer systems in accordance with some examples of this technology.

Fluid transfer systems 900A in accordance with at least some examples of this technology include one or more sensors for determining a position (e.g., a rotational position) of the valve stem 910 with respect to the valve housing 902 (and/or with respect to any one of more of the sealing connector 840 and/or manifold 800 (when either or both are present)). FIG. 39 illustrates an example fluid transfer system 900A in which a position sensor 930 is provided. Position sensing may be performed, in at least some examples of this technology, by an encoding system capable of measuring an absolute rotational position, or a relative positioning sensor with an additional index channel that denotes a specific absolute rotational position. In this illustrated example, the position sensor constitutes a magnetic encoder system 930 (e.g., an on-axis magnetic encoder system, an off-axis magnetic encoder system, etc.) including an encoder magnet 932 and a sensor 934. This magnetic encoder system 930 is an absolute position sensor. The encoder magnet 932 is engaged with the movable (e.g., rotatable) valve stem 910 (e.g., within internal chamber 910I at the second end 910B) and rotates with the valve stem 910. Changes in magnetic field strength measured at the sensor 934 indicate the position of the magnet 932 (and thus the position of the valve stem 910) with respect to the housing 902 or other component. The relative position of the magnet 932 (and valve stem 910) with respect to the housing 902 or other component also determines (and/or allows determination of) the operational state of the fluid transfer system 900A as described above. Other types of position sensors 930 may be used without departing from at least some aspects of this technology (e.g., optical encoders, other rotational sensors, etc.). Magnetic encoder systems 930, however, provide some advantages in that they do not require physical contact of parts and they typically will be less susceptible to failure due to adhesive, lubricant, debris, or other undesired material that may work its way into internal chamber 910I. Optical encoders are more susceptible to failure, e.g., due to undesired material potentially masking or blocking an optical source or optical detector. Magnetic encoder systems 930 as well as other positional sensor systems are known and commercially available.

Figure 40B:
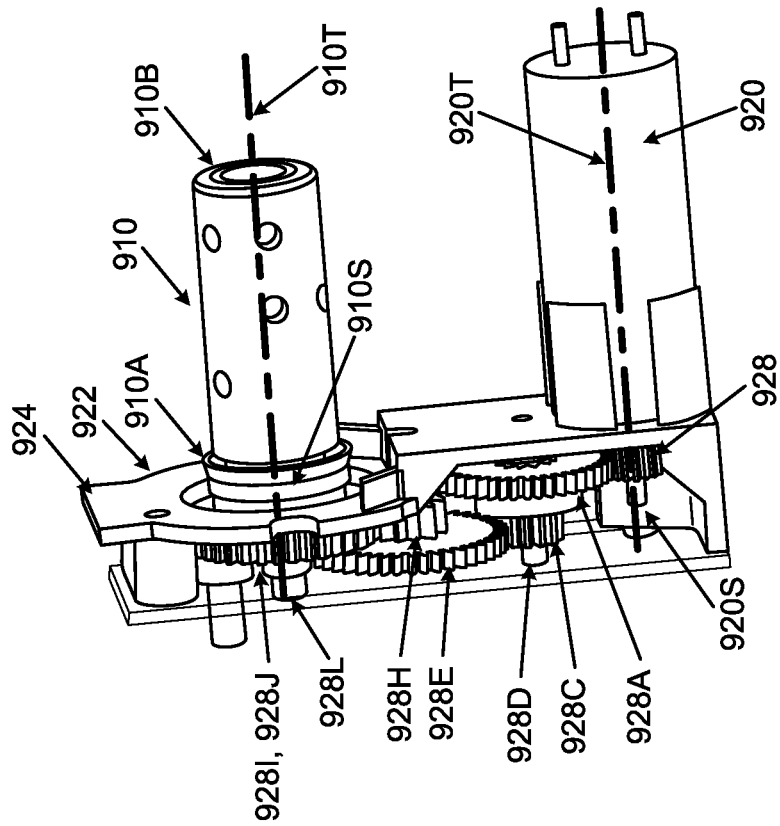
FIGS. 40A-40C provide views of an example geartrain transmission used in accordance with some examples of this technology.
Figure 40A:
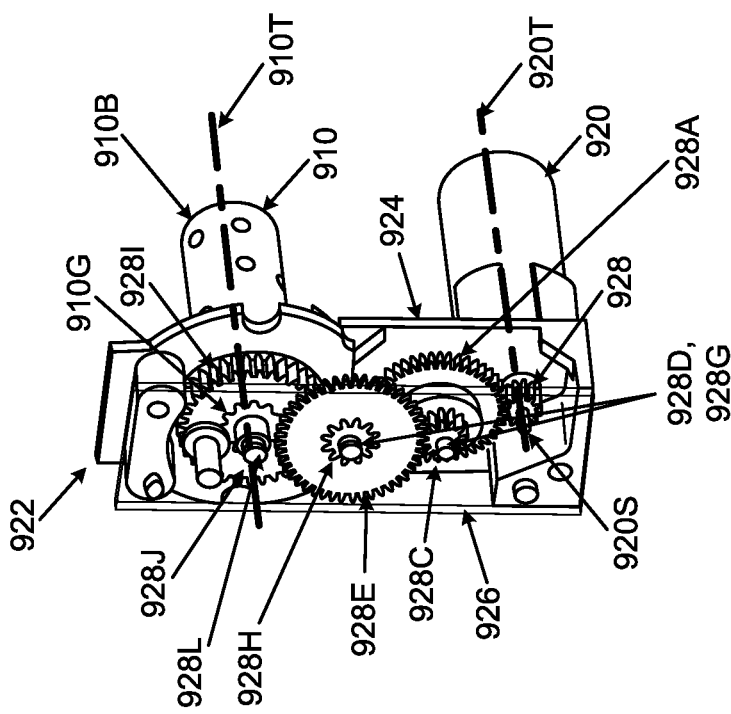
Figure 40C:
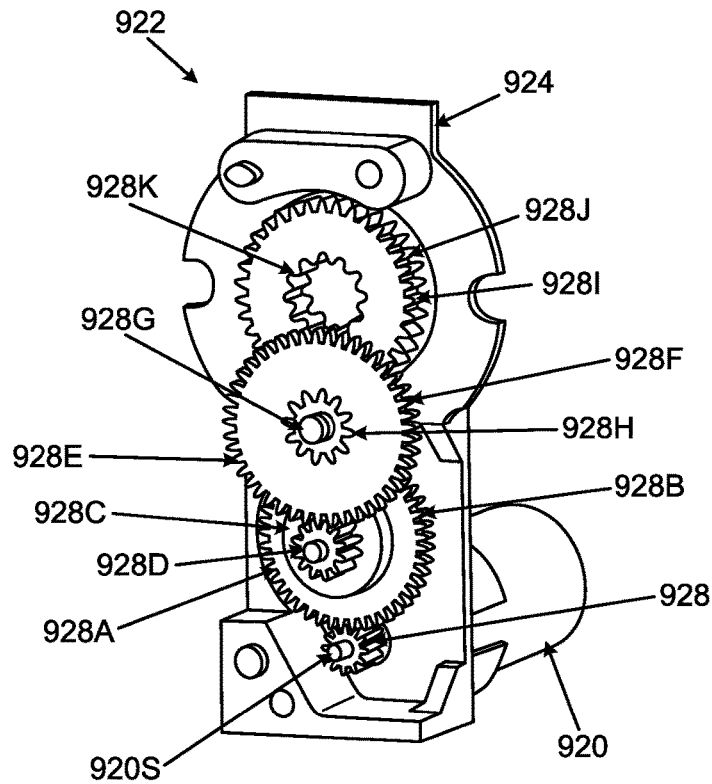

FIGS. 40A-40C (together with FIG. 28 and others) provide various views of a drive system, including a motor 920 and a transmission 922 to transfer power to the first end 910A of the valve stem 910 and to move (rotate in this example) the valve stem 910 with respect to the valve housing 902 (and/or manifold 800 and/or sealing connector 840, etc.). A power source (e.g., from a battery) and a microcontroller, e.g., provided with the fluid distributor 500 (and not shown in FIGS. 40A and 40B), selectively drive the motor 920 to position the valve stem 910 in one of the various plurality of positions and operational states to thereby move fluid between the desired locations as described above. The motor 920 may constitute a DC coreless brushed motor (e.g., commercially available from Constar Micromotor Co., Ltd. or other commercial source).

The transmission 922 is mounted, at least in part, on a frame 924 (e.g., a die cast zinc frame) and may be covered by a cover plate 926 (e.g., made from metal). This specific example transmission 922—a three stage transmission— will be described in more detail with reference to FIGS. 40A-40C. The shaft 920S of the motor 920 engages a motor pinion 928. The motor pinion 928 engages a large gear 928A of a first intermediate gear cluster 928B that additionally includes a small gear 928C mounted on a common rotary pin 928D (e.g., a steel pin) with large gear 928A. The small gear 928C of the first intermediate gear cluster 928B engages a large outer gear 928E of a second intermediate gear cluster 928F. Large outer gear 928E of second intermediate gear cluster 928F is mounted on a common rotary pin 928G (e.g., a steel pin) with a smaller gear 928H of the second intermediate gear cluster 928F. The smaller gear 928H of the second intermediate gear cluster 928F engages an outer geartrain 928I of output gear 928J. The central opening 928K of output gear 928J includes an inner geartrain that engages the geared end 910G of valve stem 910. One or more cup seals 910S, O-rings, gaskets, or other sealing devices may be provided at the first end 910A of valve stem 910 to prevent fluid from leaking out of the housing 902. A nose pin 928L secures the output gear 928J and its associate components with the frame 922.

Figure 41A:
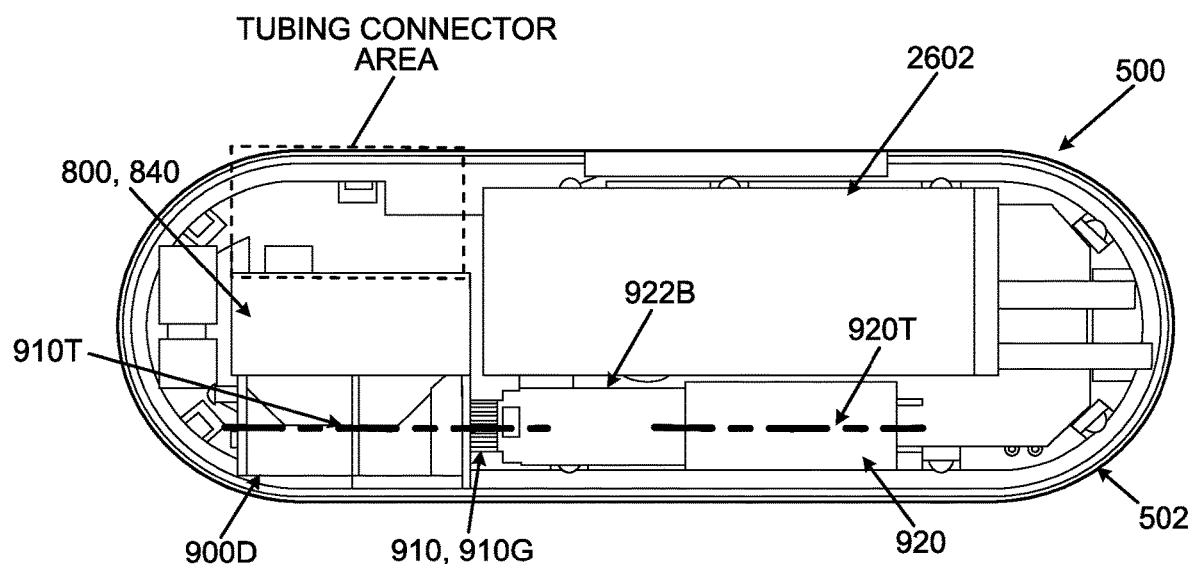
FIGS. 41A and 41B provide views of an example planetary gear transmission used in accordance with some examples of this technology.
Figure 41B:
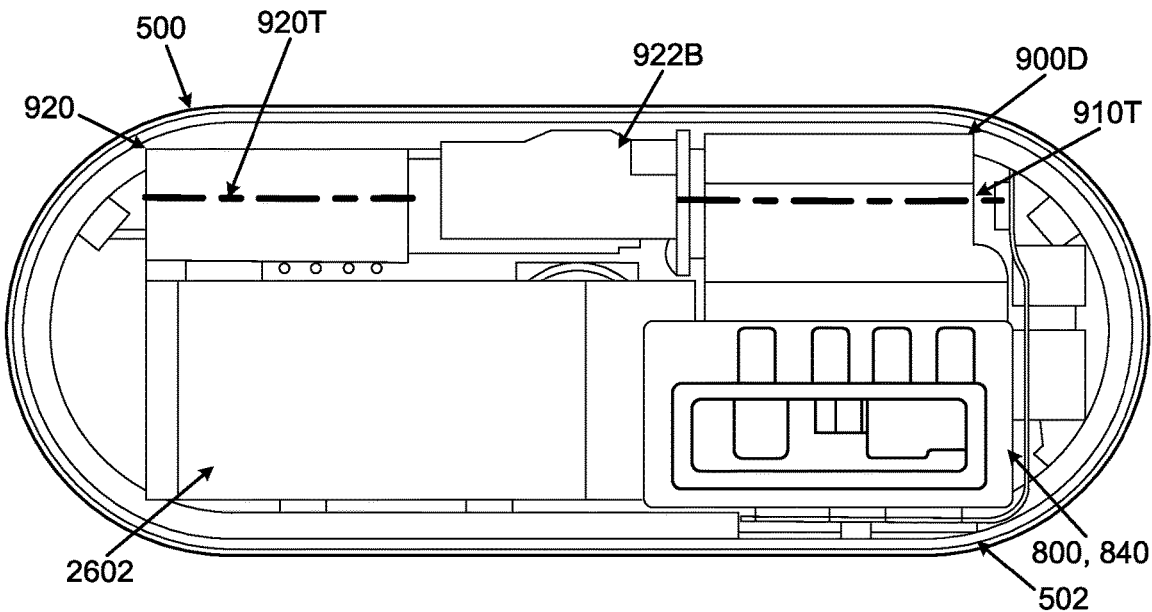

In the example transmission system 922 shown in FIGS. 40A and 40B, the axis 920T of motor shaft 920S extends parallel to and spaced apart from the rotational axis 910T of the valve stem 910. FIGS. 41A and 41B show a fluid transfer system 900D having different arrangements of the motor 920 and valve stem 910 in which axis 920T of motor shaft 920S is aligned and co-linear with the rotational axis 910T of the valve stem 910. A planetary transmission 922B or planetary gearbox may be used in that situation to transmit power and rotational motion from the motor 920 to the valve stem 910. Typical planetary transmissions 922B include a central "sun gear" (e.g., driven by motor 920 shaft 920S) and plural "planet gears" that rotate in a cooperative manner to transmit rotational energy from the motor to a driven shaft (e.g., valve stem 910's gear 910G). Planetary transmissions 922B of this type are known and commercially available.

The foot support systems and fluid distributors 500 described above with respect to fluid transfer system 900A include a single foot support bladder 200 and a single fluid container 400. If desired, however, foot support systems, fluid distributors 500, sole structures 104, and/or articles of footwear 100 in accordance with at least some aspects of this technology may include structures for supporting fluid pressure changes to more than one foot support bladder 200 and/or more than one fluid container 400. When two or more foot support bladders 200 are present, fluid could be introduced to all bladders simultaneously. This could be accomplished in various ways. For example, all foot support bladders may be filled simultaneously by branching fluid line 202 into individual foot support supply lines running to corresponding individual foot support bladders. As another example, all foot support bladders in an article of footwear 100 may be filled simultaneously by fluid lines connecting the foot support bladders in series or parallel. Similarly, two or more fluid containers 400 may be filled simultaneously in the same manners, but by branching container fluid line 402 into individual lines and/or connecting the fluid containers in series or parallel.

If multiple foot support bladders 200 and/or fluid containers 400 are present in a single shoe 100 and it is desired to potentially provide different fluid pressures in the bladders 200 and/or containers 400, appropriate valving or switching mechanisms may be provided, e.g., after fluid leaves connector 700 and enters foot support fluid line 202 and/or container fluid line 402. Alternatively, if desired, a separate fluid pathway through the connector 700, manifold 800, and sealing connector 840 (if present) may be provided for each individual foot support bladder 200 and/or fluid container 400; separate through holes 910H for the additional foot support bladder(s) and/or fluid container(s) may be provided in the valve stem 910 (e.g., axially spaced from the other through holes 910H); and additional operational states may be provided. In other words, an additional set of ports, fluid channels, and the like as shown to move fluid into and out of foot support bladder 200 may be provided for each additional foot support bladder in the shoe 100 and/or an additional set of ports, fluid channels, and the like as shown to move fluid into and out of fluid container 400 may be provided for each additional fluid container in the shoe. The input system (e.g., on an external computing device, part of the "on-board" switching system 2200, etc.) also may be modified to allow separate inputs and control of each additional foot support bladder and/or fluid container.

C. Solenoid Based Fluid Transfer System Features

The fluid transfer system 900A described above utilizes a movable (e.g., rotatable) valve stem 910 that is movable to various positions to place the fluid distributor 500, fluid flow control system, foot support system, sole structure 104, and/or article of footwear 100 in two or more different operational states. Other types of fluid transfer systems 900, however, may be used to place such systems and components in two or more different operational states, including any two or more of the operational states described above with respect to FIGS. 5A to 5F. The following discussion relates to solenoid based fluid transfer systems 900B in accordance with at least some aspects of this technology.

Figure 42:
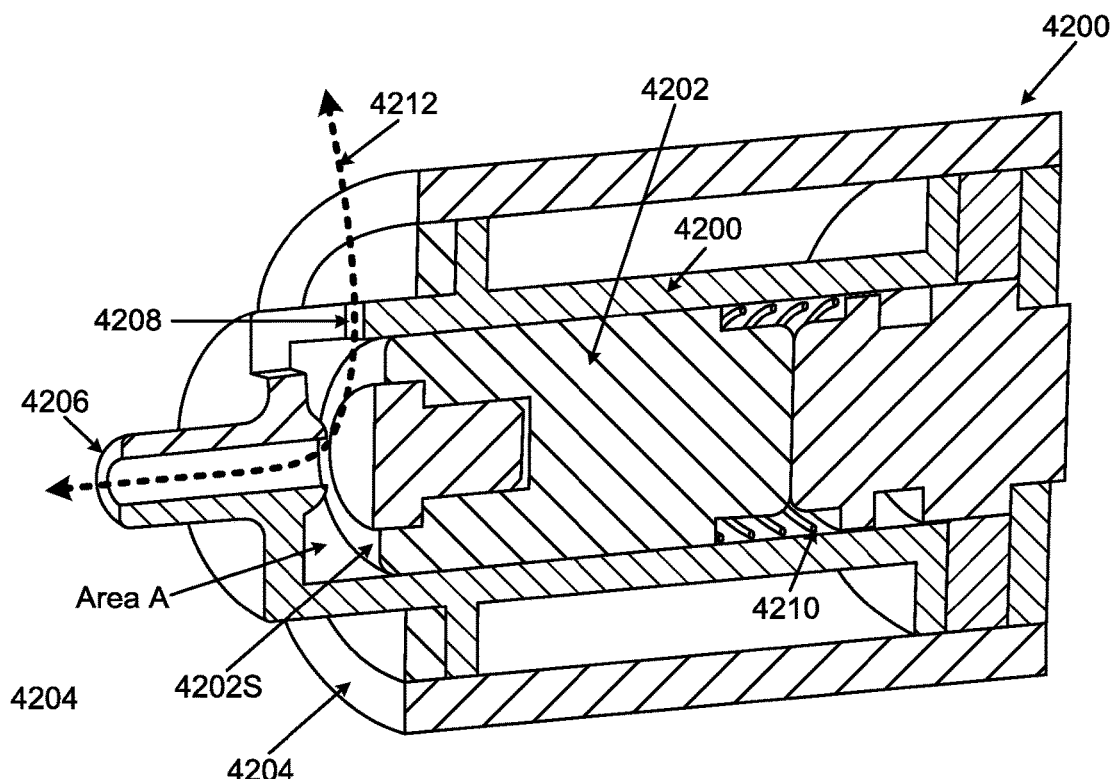
FIG. 42 illustrates an example solenoid used in solenoid based fluid transfer systems in accordance with some examples of this technology.

Various types of solenoids and/or combinations of solenoids may be used in fluid transfer systems 900B in accordance with some aspects of this technology. Some solenoids that may be used in accordance with this technology are "latching solenoids." Some latching solenoids, like latching solenoid 4200 shown in FIG. 42, include two stable states—an open state and a closed state. Such solenoids can maintain either of these stable states when no power is applied. FIG. 42 shows solenoid 4200 in the open state in which plunger 4202 is moved rearward to allow fluid to flow through the solenoid body 4204 between one port 4206 and the other port 4208 (in either direction). See fluid flow arrow 4212. In the closed state, spring 4210 or other biasing means forces plunger 4202 forward to close off (seal) either or both of ports 4206, 4208. In that state, fluid does not flow through the solenoid body 4204.

For latching solenoids, power is required to initiate movement of the plunger 4204 and change the solenoid 4200 from one state to another state. Typically, a short power pulse is applied to move the plunger 4202 of the solenoid 4200 from one position to another position. Latching solenoids also typically have a "normal state." The "normal state" is the state the plunger 4200 will default to (e.g., due to biasing force on the plunger 4204) when no "latches" are activated to hold the plunger 4200 in one of the states.

For two-way latching solenoids, the solenoid may be "normally open" (or "NO") in which fluid can flow through the solenoid or "normally closed (or "NC") in which fluid cannot flow through the solenoid. Power may be applied to a normally open solenoid in a relatively short pulse to: (a) move the plunger from the open configuration to the closed configuration and (b) activate the latching mechanism to hold the solenoid in the closed position without continuous use of power. To return this solenoid back to its open configuration, power is applied to release the latch or "unlatch" the plunger in a relatively short pulse and a biasing system (e.g., spring) then returns the plunger to its open configuration. A "normally closed" solenoid works in somewhat the opposite manner. Power may be applied to a normally closed solenoid in a relatively short pulse to: (a) move the plunger from the closed configuration to the open configuration and (b) activate the latching mechanism to hold the solenoid in the open position without continuous use of power. To return this solenoid back to its closed configuration, power is applied to release the latch or "unlatch" the plunger in a relatively short pulse and a biasing system (e.g., spring) then returns the plunger to its closed configuration. In this manner, relatively low amounts of power are consumed to move the latching solenoid between its different configurations and continuous application of power for long periods of time is not needed. Because of the position of spring 4210 in FIG. 42, the illustrated solenoid 4200 is a "normally closed" solenoid. If spring 4210 was moved to apply its biasing force between port 4206 and the front surface 4202S of the plunger 4202 (area A), then the solenoid would be a "normally open" solenoid.

Like latching solenoids, non-latching solenoids also may have one "normal" position (e.g., NO or NC) and one (or more) non-normal positions. Unlike latching solenoids, non-latching solenoids require continued application of power to maintain the valve in one of the two (or more) states. For example, a normally open ("NO") non-latching valve requires continuous application of power to move and maintain the valve in a closed state, but it returns back to the open state when the power is shut down (e.g., under biasing force applied to the plunger). Similarly, a normally closed ("NC") valve requires continuous application of power to move and maintain the valve in the open state, but it returns back to the closed state when the power is shut down (e.g., under biasing force applied to the plunger). Thus, in use, it can be advantageous from a power consumption and/or battery life point of view to select a normally open non-latching solenoid for applications where the valve only needs to be closed for relatively short time periods and/or to select a normally closed non-latching solenoid for applications where the valve only needs to be open for relatively short time periods.

As described above in conjunction with FIGS. 4A and 4B (and other figures), fluid distributors 500, fluid flow control systems, foot support systems, sole structures 104, and/or articles of footwear 100 in accordance with some examples of this technology include a fluid transfer system 900 for controlling the fluid flow direction and for opening/closing fluid pathways. Solenoid based fluid transfer systems 900B (as will be described in more detail below) may be used as the fluid transfer system 900 shown in FIG. 4A. Thus, solenoid based fluid transfer systems 900B in accordance with some aspects of this technology may use any of the features of the foot support bladder(s) 200, fluid container(s) 400, housing 502, connector 700, manifold 800, sealing connector 840, etc. described above (e.g., in conjunction with FIGS. 1-41), except fluid transfer system(s) 900A, 900D is/are replaced with the fluid transfer systems 900B described below.

Figure 43:
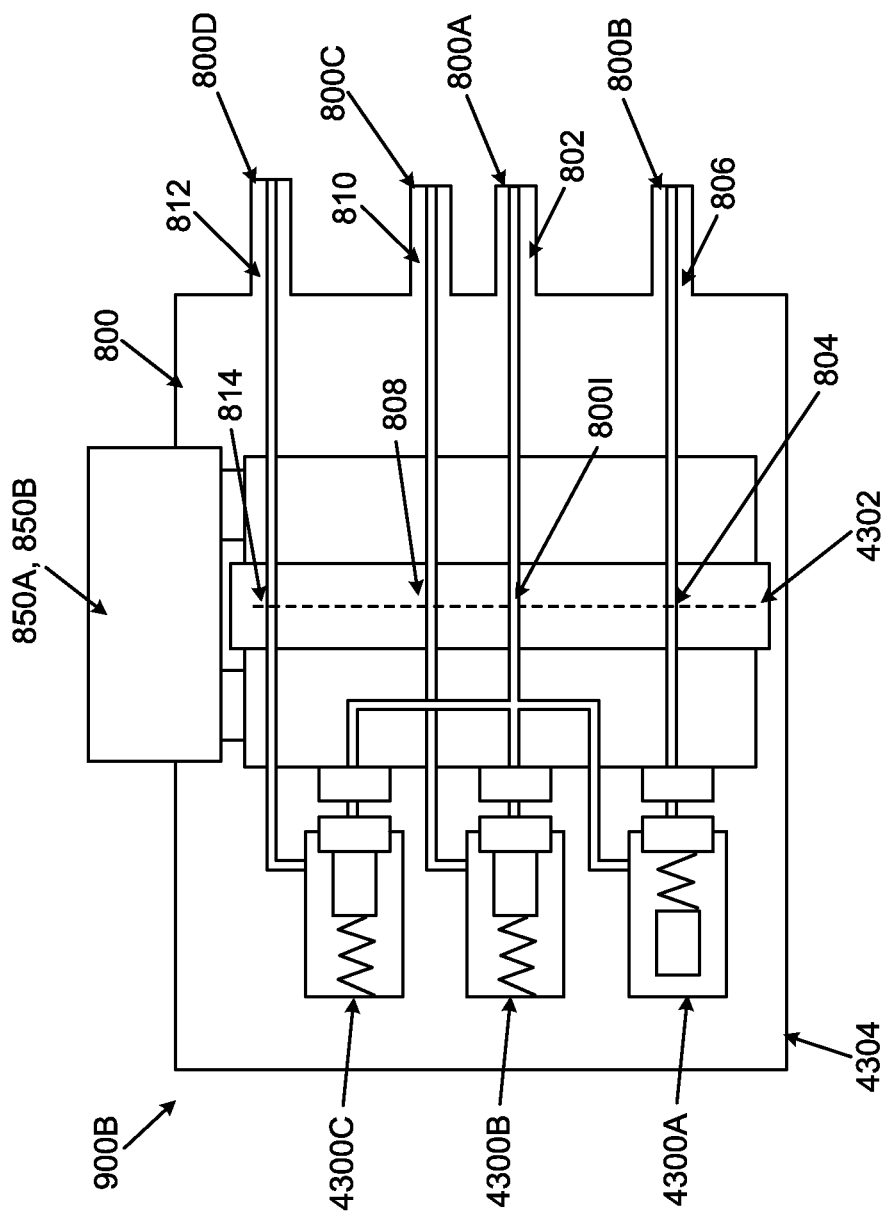
FIGS. 43-47B provide views of solenoid based fluid transfer systems in accordance with some examples of this technology.

FIG. 43 provides a schematic illustration of a solenoid based fluid transfer system 900B that may be used as fluid transfer system 900 in the example of FIGS. 4A and 4B (and other figures). The fluid transfer system 900B of FIG. 43 includes three 2×2 latching solenoid valves 4300A, 4300B, 4300C. While other options are possible, in this specific example, solenoid valve 4300A is a normally open latching solenoid valve, and solenoid valves 4300B and 4300C are normally closed latching solenoid valves. The fluid transfer system 900B is connected to a manifold 800 (e.g., at interface 4302, optionally via a sealed connector 840, if desired) that includes: (a) ports 800A and 800I and fluid inlet path 802 (from a fluid source, such as one or more pumps 600H, 600F); (b) ports 800B and 804 and first fluid path 806

(to the external environment); (c) ports 800C and 808 and second fluid path 810 (to and from the foot support bladder 200); and (d) ports 800D and 814 and third fluid path 812 (to and from the fluid container 400). The solenoid valves 4300A, 4300B, 4300C may be contained in a common housing 4304 that includes ports (e.g., like ports 800A, 800B, 800C, 800D, other types of connector structures, etc.) for engaging ports 800I, 804, 808, 814 of the manifold 800. The structure and operation of solenoid valves 4300A, 4300B, 4300C and their connections with manifold 800 are described in more detail below.

Figure 26A:
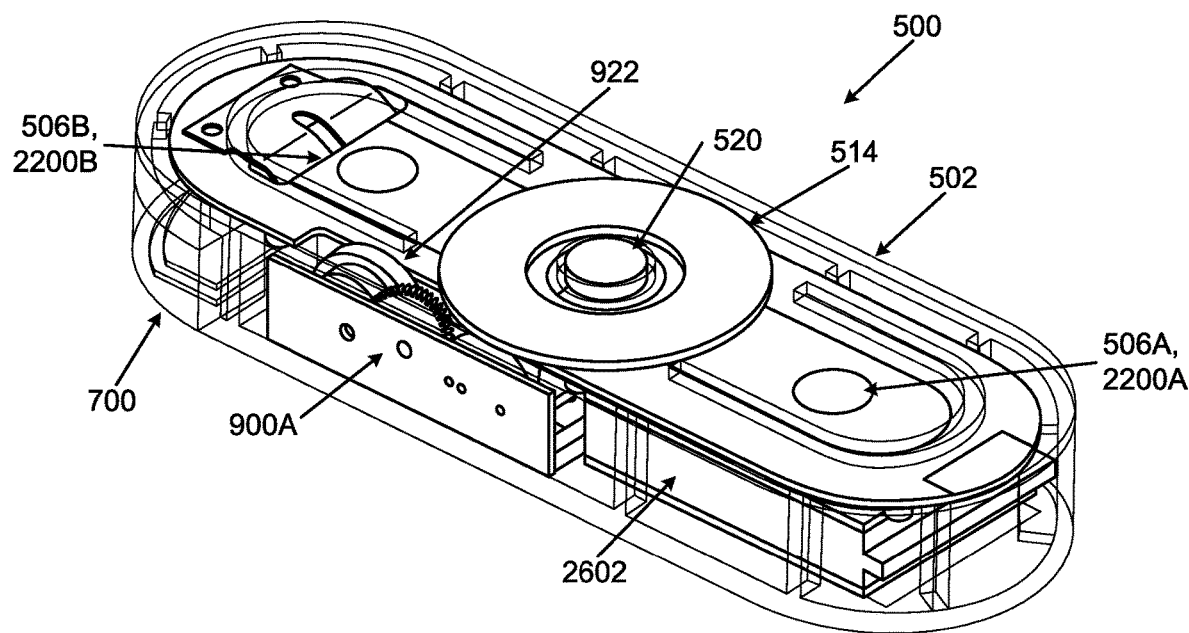
FIGS. 26A-29 illustrate components of a valve stem based fluid transfer system in accordance with some examples of this technology.
Figure 26B:
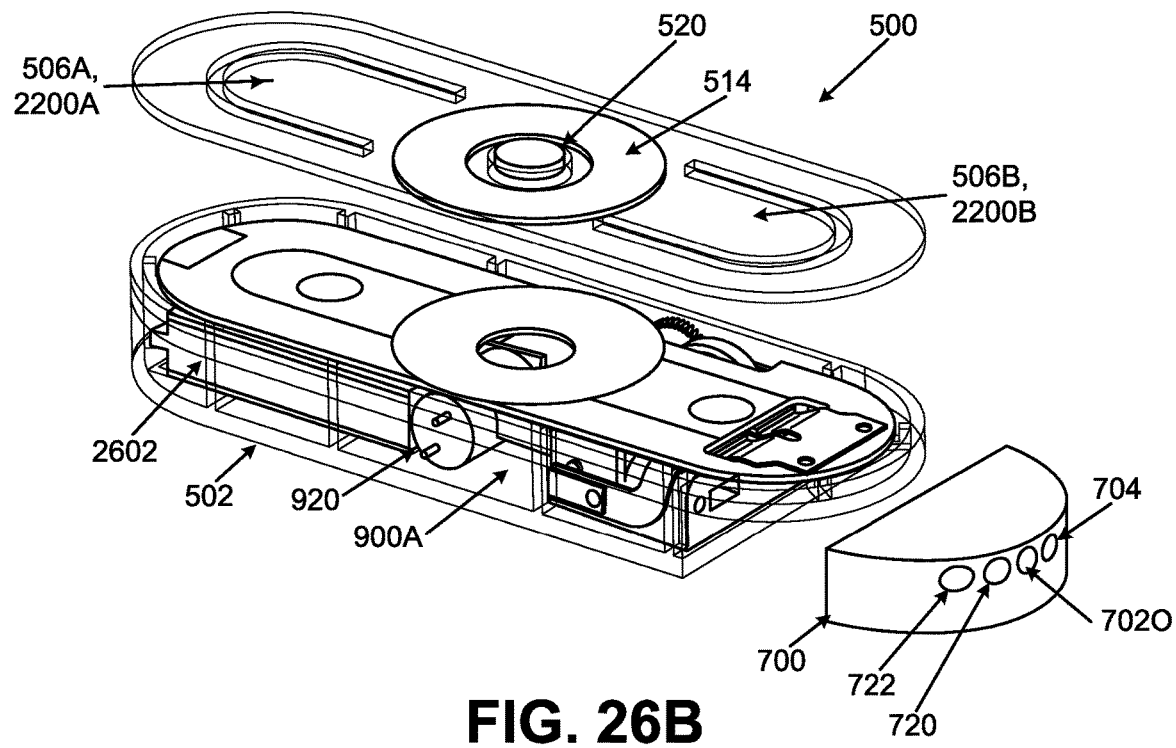
Figure 26C:
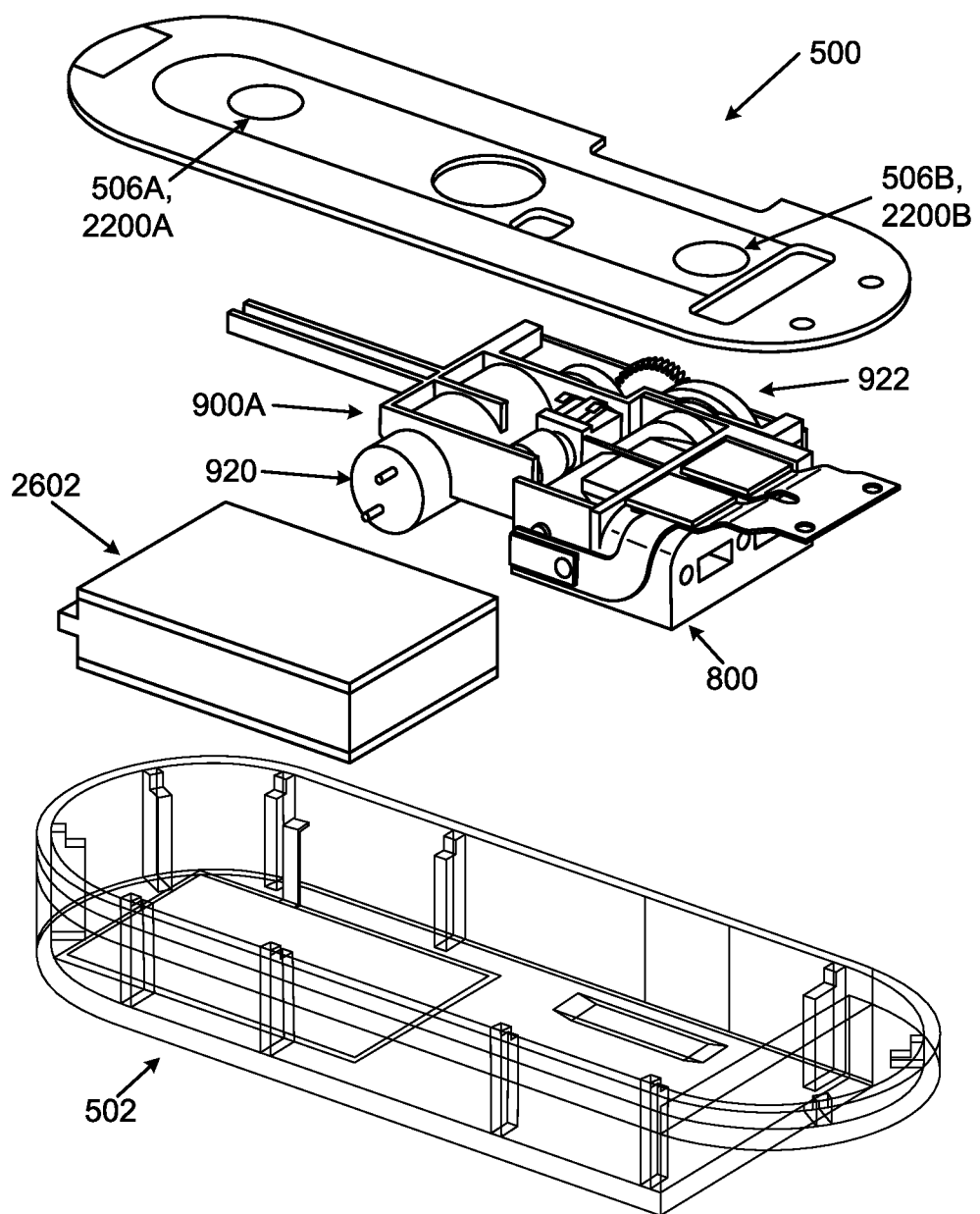
Figure 26D:
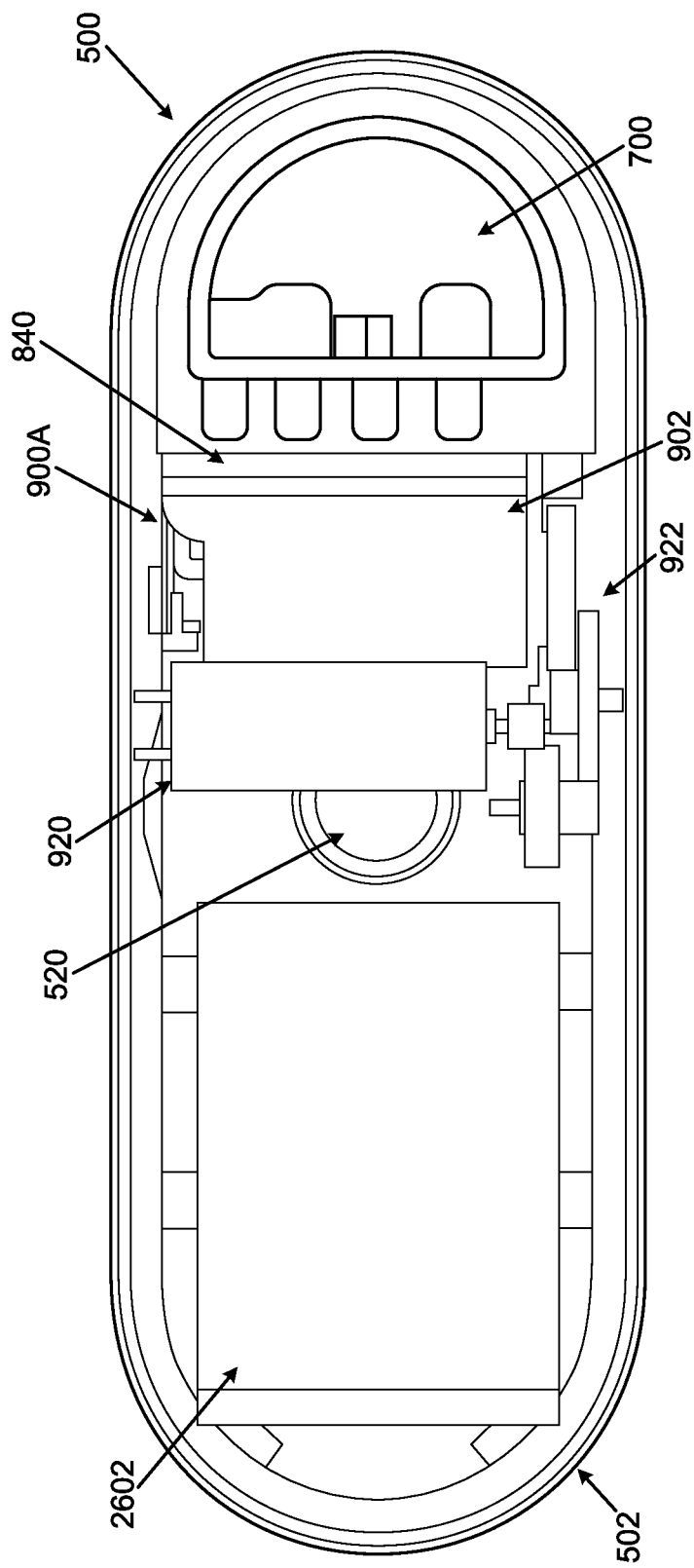
Figure 27A:
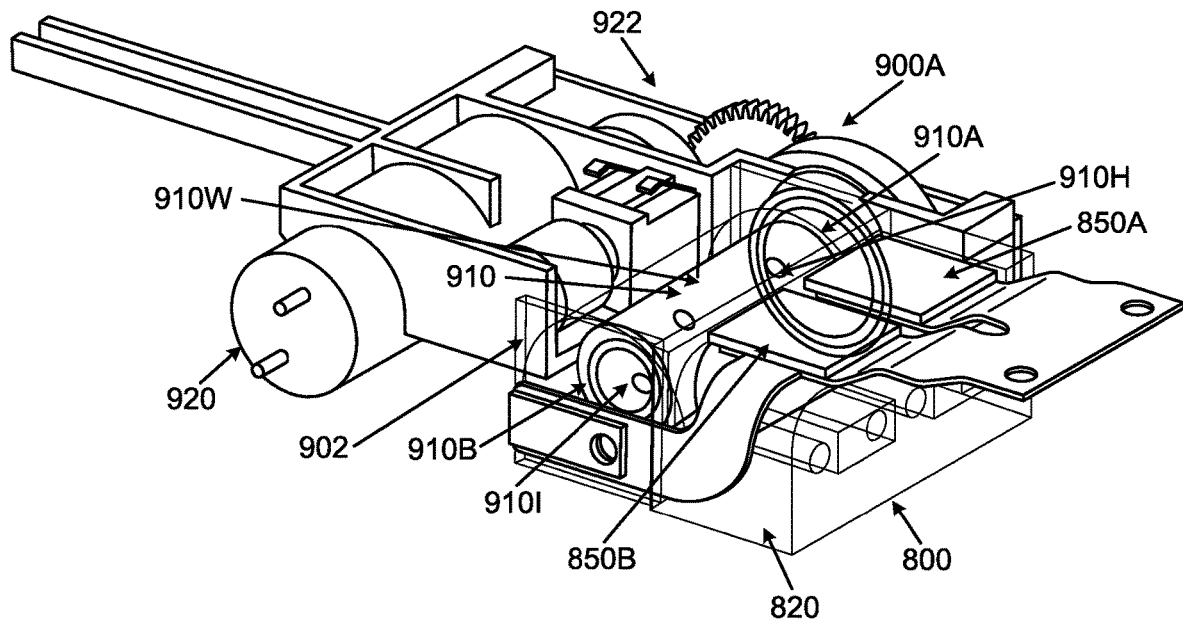
Figure 27B:
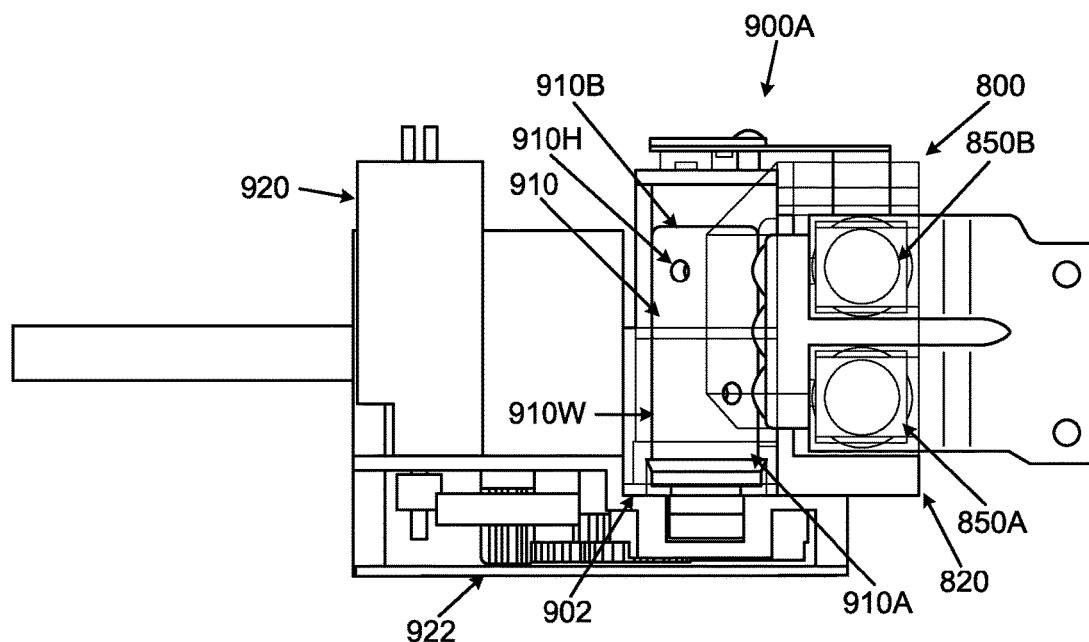
Figure 28:
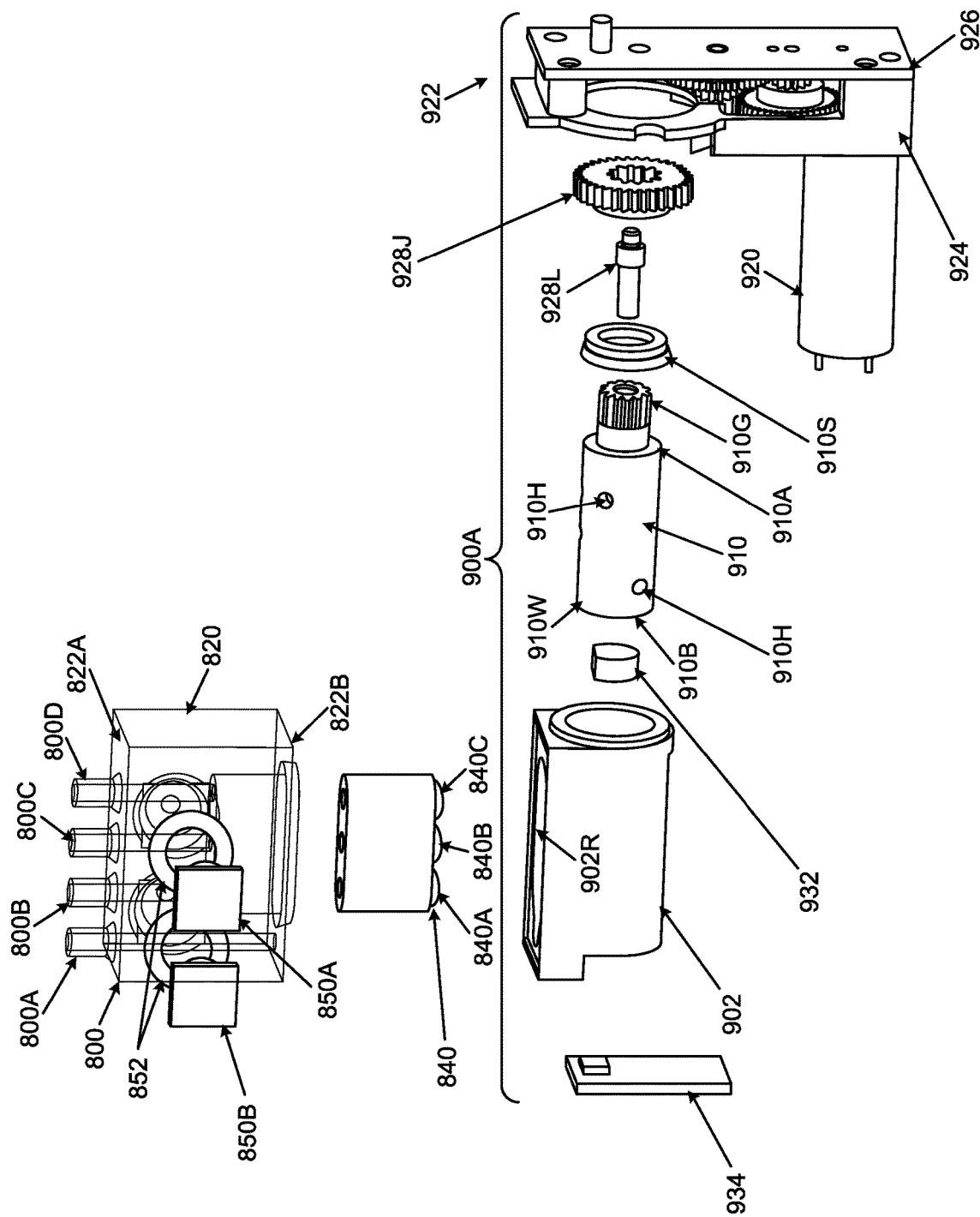
Figure 44A:
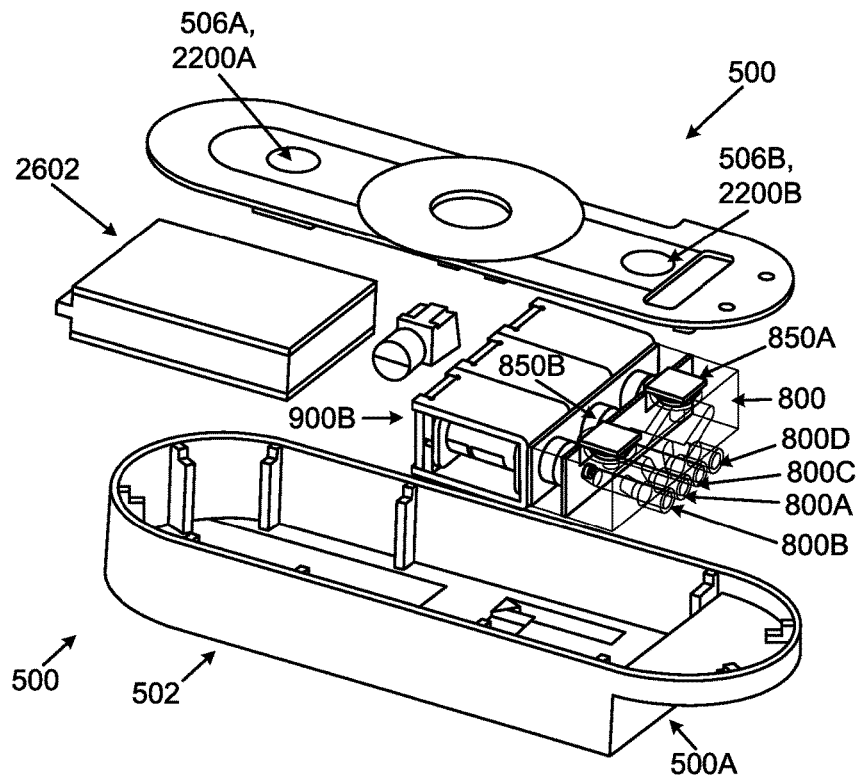
Figure 44B:
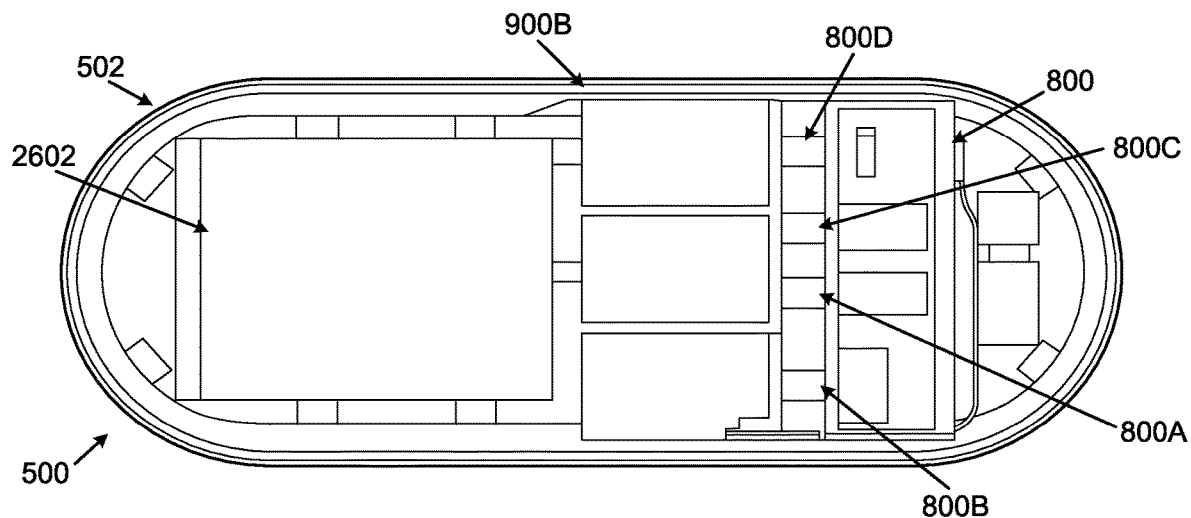
Figure 45:
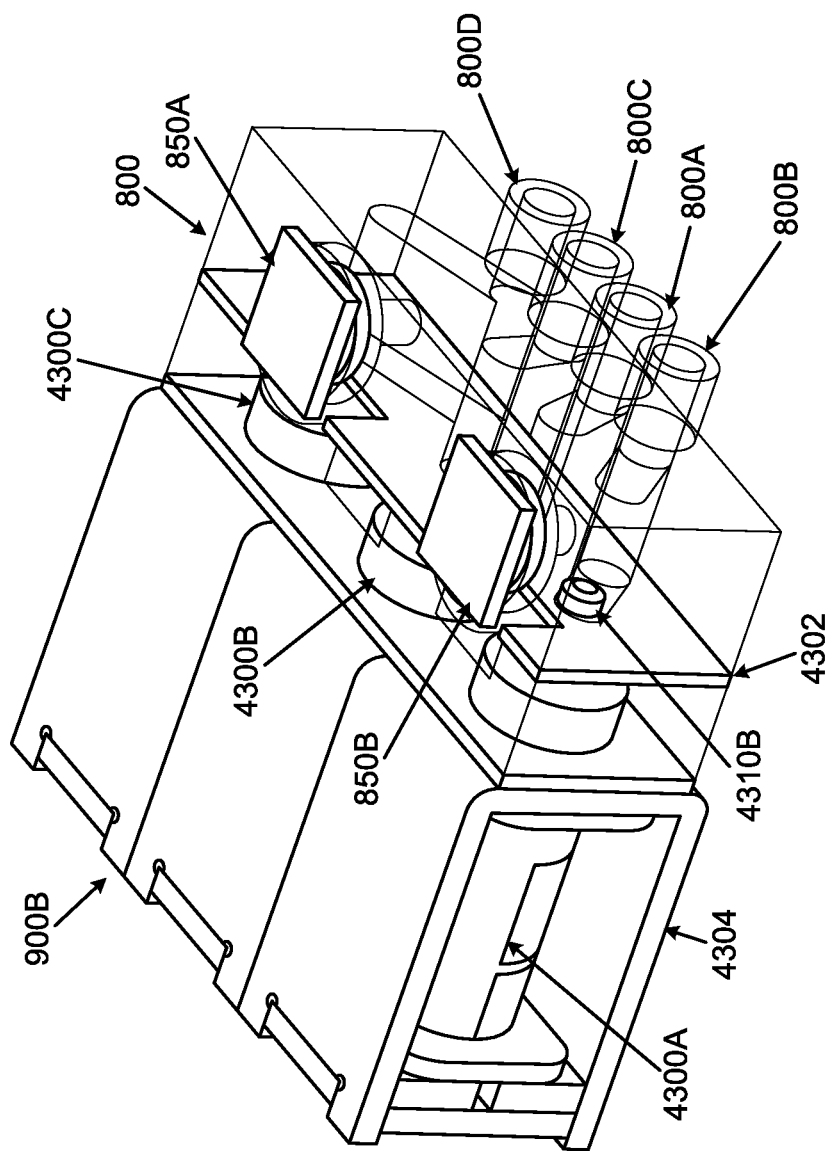
Figure 46:
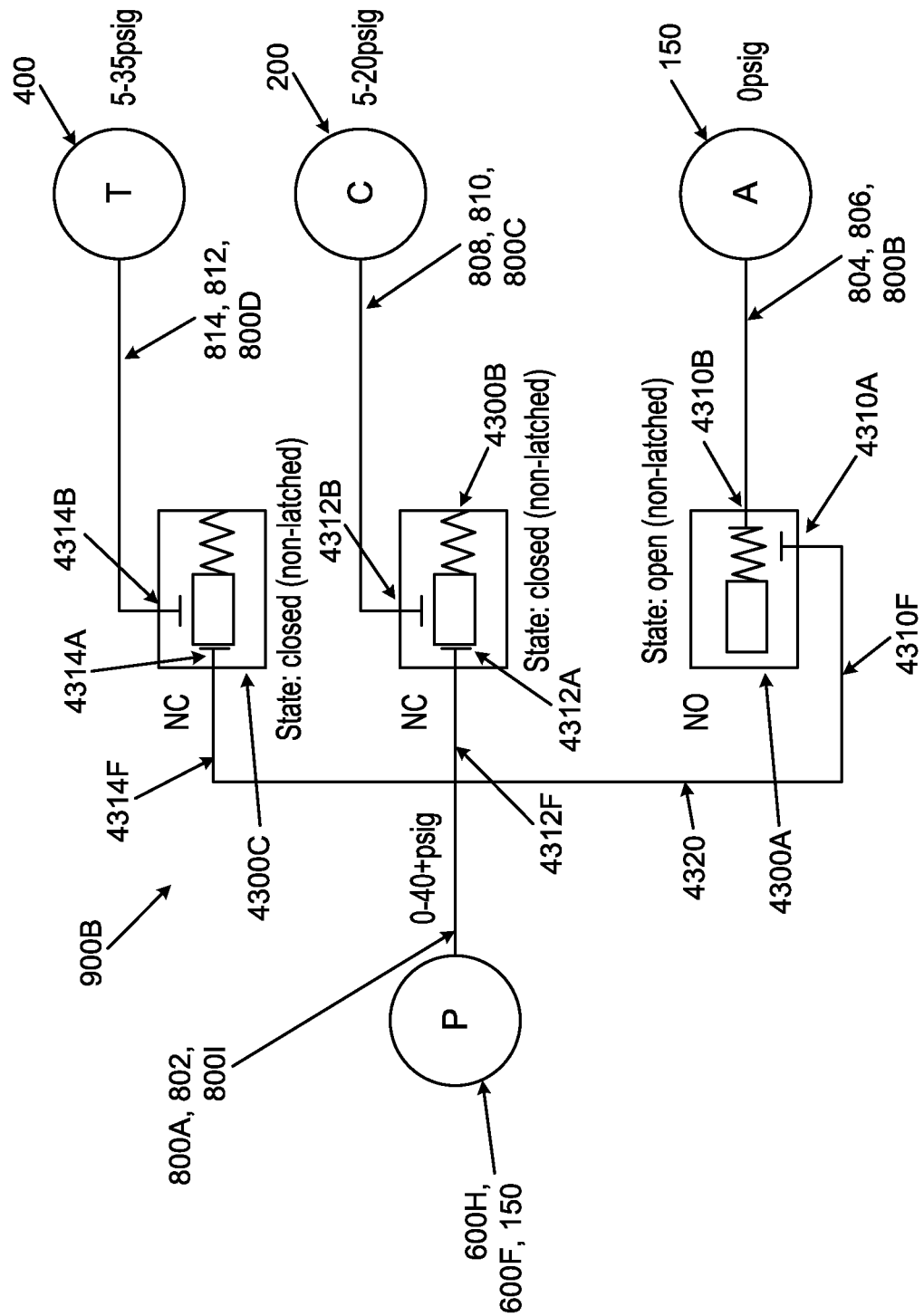

FIG. 44A is an exploded view of fluid distributor 500 similar to the view of FIG. 26C, but the valve stem based fluid transfer system 900A of FIG. 26B is replaced with a solenoid based fluid transfer system 900B. FIG. 44B provides an assembled view of such a fluid distributor 500. This example fluid distributor 500 includes a housing 502 in which a manifold 800 and fluid transfer system 900B are housed. Housing 502 further defines a space 500A for engaging a connector 700 that connects the components within housing 502 with a fluid source (e.g., the external environment, pump(s) 600H, 600F, a compressor, etc.), the external environment 150, at least one foot support bladder 200, and at least one fluid container 400. FIGS. 44A and 44B further show potential locations of fluid transfer system 900B within the housing 502 and a rechargeable battery 2602, e.g., for powering the various electrical components shown and described above or below including the solenoids. Example switching components 506A, 2200A, 506B, 2200B also are shown in FIG. 44A (and may have the same structures and/or functions as described for these components above).

FIGS. 45-47B illustrate example physical structures of solenoid based fluid transfer systems 900B engaged with a manifold 800 and a schematic view of the fluid pathways in accordance with some aspects of this technology. As shown, these example fluid transfer systems 900B and fluid flow control systems include: (a) a first solenoid 4300A having a first port 4310A and a second port 4310B and switchable between an open configuration and a closed configuration; (b) a second solenoid 4300B having a first port 4312A and a second port 4312B and switchable between an open configuration and a closed configuration; and (c) a third solenoid 4300C having a first port 4314A and a second port 4314B and switchable between an open configuration and a closed configuration.

The first ports 4310A, 4312A, 4314A of solenoids 4300A, 4300B, 4300C, respectively, in this example fluid transfer system 900B are in fluid communication with a common fluid line 4320. Thus, common fluid line 4320 also places the first ports 4310A, 4312A, 4314A of the solenoids 4300A, 4300B, 4300C in fluid communication with one another (at least under some conditions). As an example, common fluid line 4320 may branch into: (a) fluid line 4310F (going to the first port 4310A of first solenoid 4300A), (b) fluid line 4312F (going to the first port 4312A of second solenoid 4300B), and (c) fluid line 4314F (going to the first port 4314A of third solenoid 4300C). Additionally, the common fluid line 4320 also is in fluid communication with a fluid source (e.g., one or more of pump(s) 600H, 600F, a compressor, the external environment 150, etc.), e.g., via one or more of manifold 800 port 800A, fluid inlet path 802, fluid inlet port 800I, connector 700, etc.

The second port 4310B of first solenoid 4300A of this example is in fluid communication with the external environment 150, e.g., via one or more of manifold port 804, first fluid flow path 806, manifold port 800B, connector 700, etc.

First solenoid 4300A in this example is a latching solenoid having a normally open configuration. The second port 4312B of second solenoid 4300B of this example is in fluid communication with a foot support bladder 200, e.g., via one or more of manifold port 808, second fluid flow path 810, manifold port 800C, connector 700, etc. Second solenoid 4300B in this example is a latching solenoid having a normally closed configuration. The second port 4314B of third solenoid 4300C of this example is in fluid communication with a fluid container 400, e.g., via one or more of manifold port 814, third fluid flow path 812, manifold port 800D, connector 700, etc. Third solenoid 4300C in this example also is a latching solenoid having a normally closed configuration.

Figure 47A:
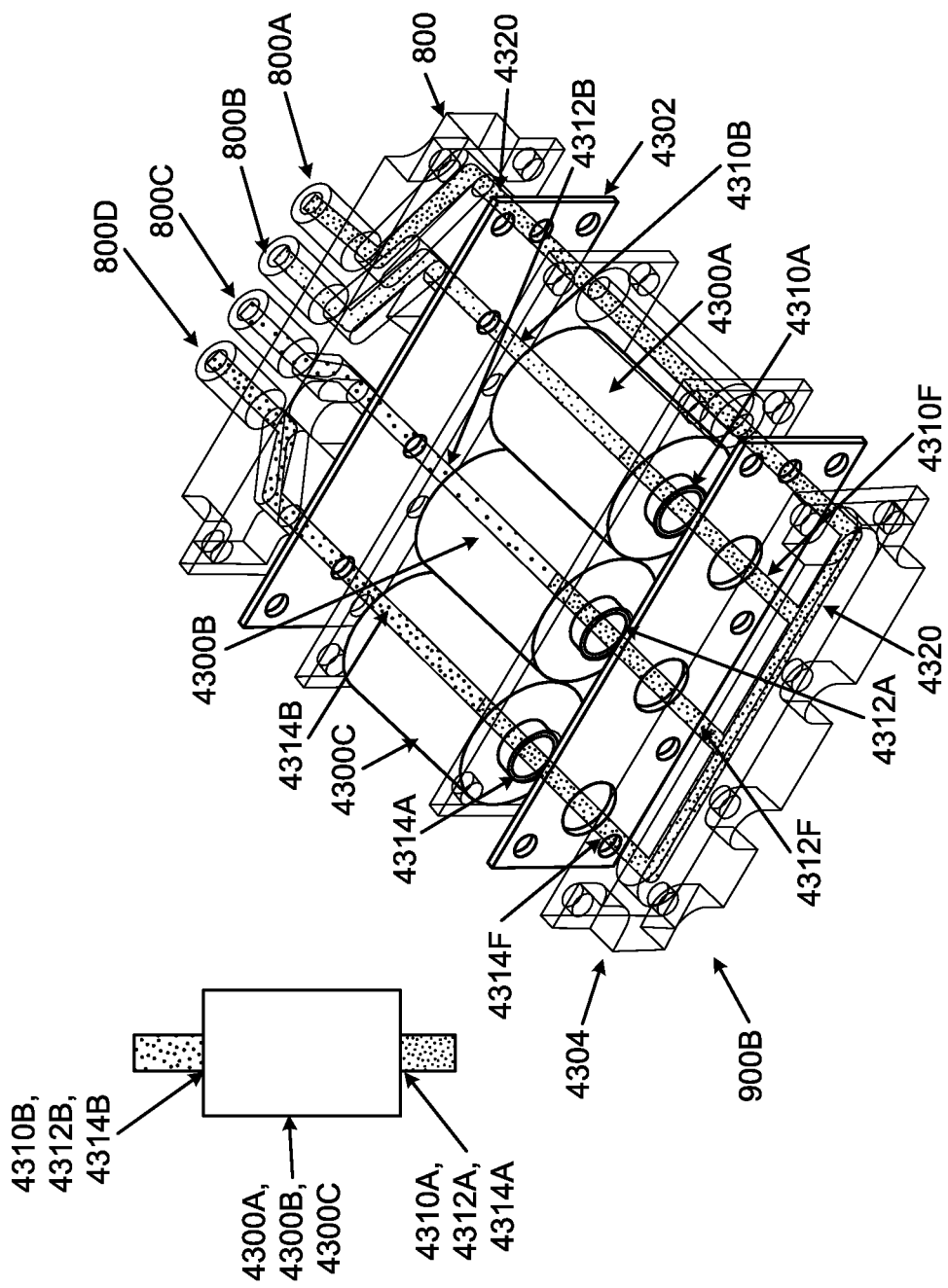
Figure 47B:
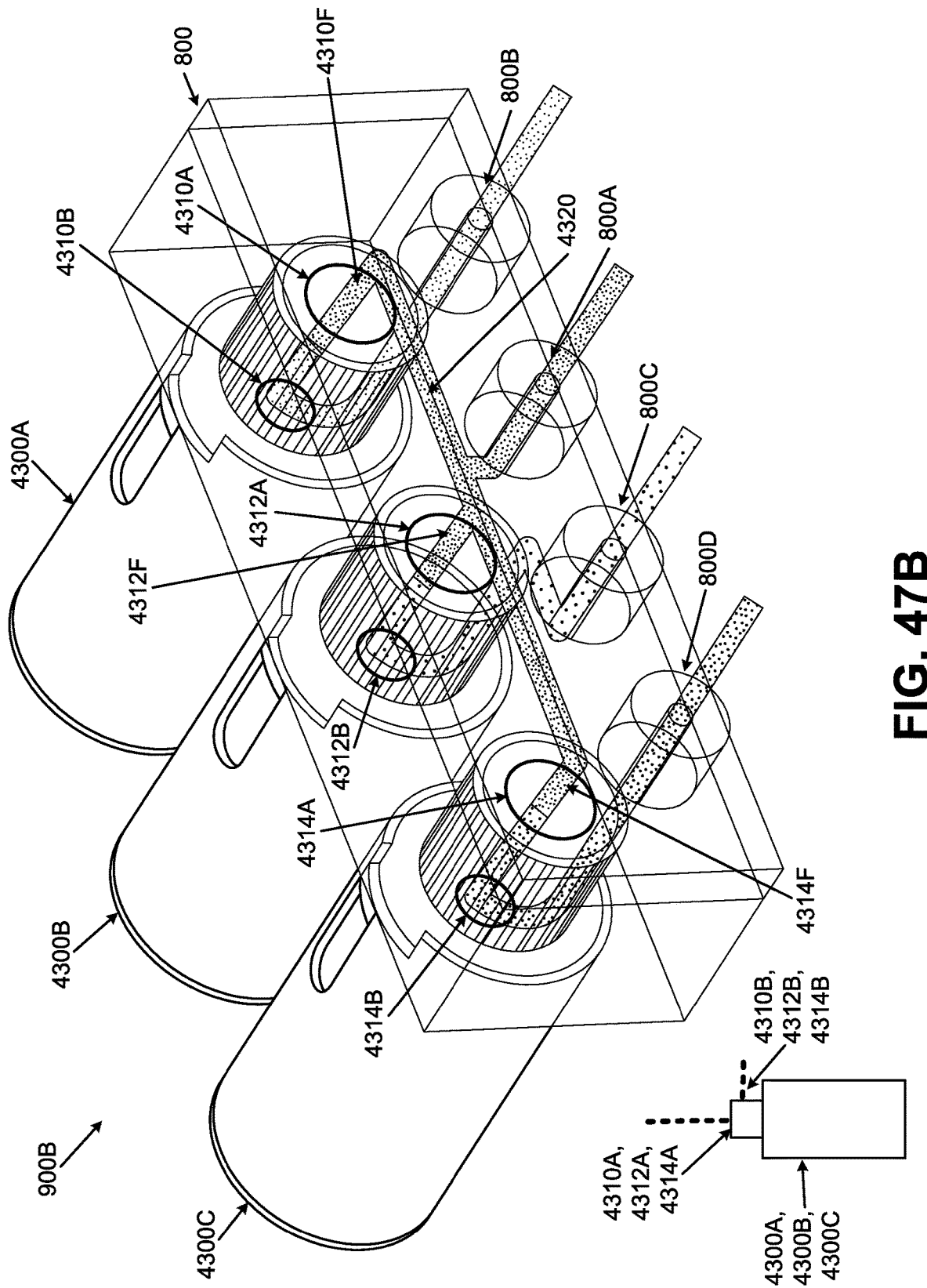

As shown in FIG. 47A, in this example structure, each of solenoids 4300A, 4300B, and 4300C is arranged to have its first port 4310A, 4312A, 4313A at one end of the solenoid and its second port 4310B, 4312B, 4313B at the opposite end of the solenoid (e.g., "dual sided" solenoids). In this manner, the first ports 4310A, 4312A, 4313A may be aligned at one end of the fluid transfer system 900B and the second ports 4310B, 4312B, 4313B may be aligned at the opposite end of the fluid transfer system 900B. As shown in FIG. 47B, in this example structure, each of solenoids 4300A, 4300B, and 4300C is arranged to have its first port 4310A, 4312A, 4314A at one end of the solenoid and its second port 4310B, 4312B, 4314B at a side surface of the solenoid (e.g., "single sided" solenoids). Note also the "single sided" arrangement of solenoid ports 4206 and 4208 in FIG. 42 and the solenoid ports of FIG. 43. In this manner, the first ports 4310A, 4312A, 4314A may be aligned at one end of the fluid transfer system 900B and all ports are located toward this same end. These types of "single sided" arrangements can provide a compact footprint, e.g., suitable for engagement with an article of footwear 100 and/or sole structure 104.

Figure 48A:
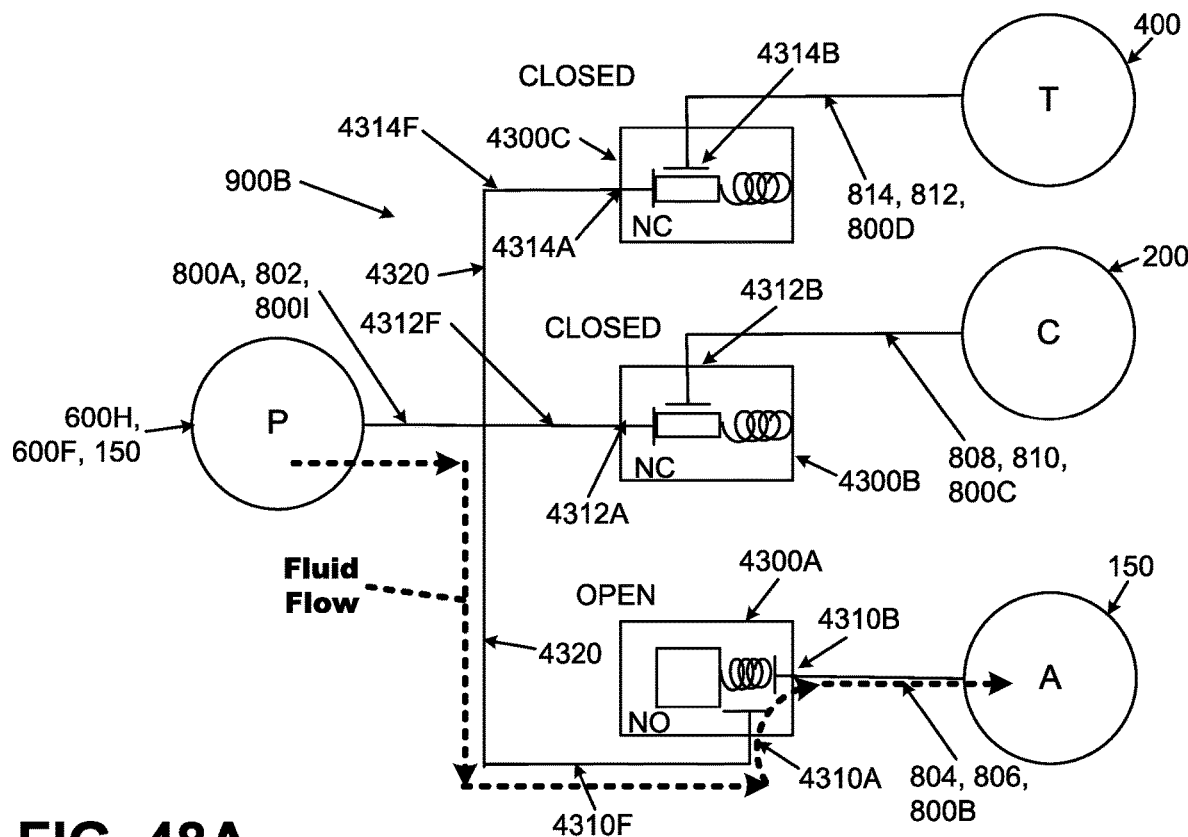
FIGS. 48A-48F provide views explaining example operational states in accordance with some examples of this technology.

FIGS. 48A-48F provide schematic views of one example solenoid based fluid transfer system 900B placed in the six operational states described above in conjunction with FIGS. 5A-5F. FIG. 48A (along with FIG. 5A) shows an operational state in which fluid moves into the fluid distributor 500 from the external environment 150 and is discharged back to the external environment 150. The fluid flow in this operational state is shown by the thick, arrowed, broken lines in FIGS. 5A and 48A. This operational state may be used as a "standby" or "steady state" operational state to keep the pumped fluid moving through the fluid distributor 500 even when no pressure changes are needed to the foot support bladder 200 and/or the fluid container 400. In this operational state, incoming fluid from the external environment 150 (e.g., air) moves, e.g., as described above with respect to FIG. 5A, until it goes through the manifold 800 and reaches the fluid transfer system 900B. In this first operational state, the first solenoid 4300A is in the open configuration, the second solenoid 4300B is in the closed configuration, and the third solenoid 4300C is in the closed configuration. Thus, fluid flows from the source (e.g., pumps 600H, 600F, a compressor, etc.), through manifold port 800A, through common fluid line 4320, through fluid line 4310F, through the first port 4310A of the first solenoid 4300A, through the first solenoid 4300A, through the second port 4310B of the first solenoid 4300A, through manifold port 800B, and to its ultimate destination (the external environment 150 in this example).

Alternatively, in some examples of this technology, in this operational state, rather than continuously moving fluid through the fluid distributor 500 with each step when it is simply going to be discharged back into the external environment 150, a fluid path could be provided from the pump(s) 600H, 600F directly to the external environment 150. As another option, the pump(s) 600H, 600F could be deactivated to provide this operational state.

Figure 48B:
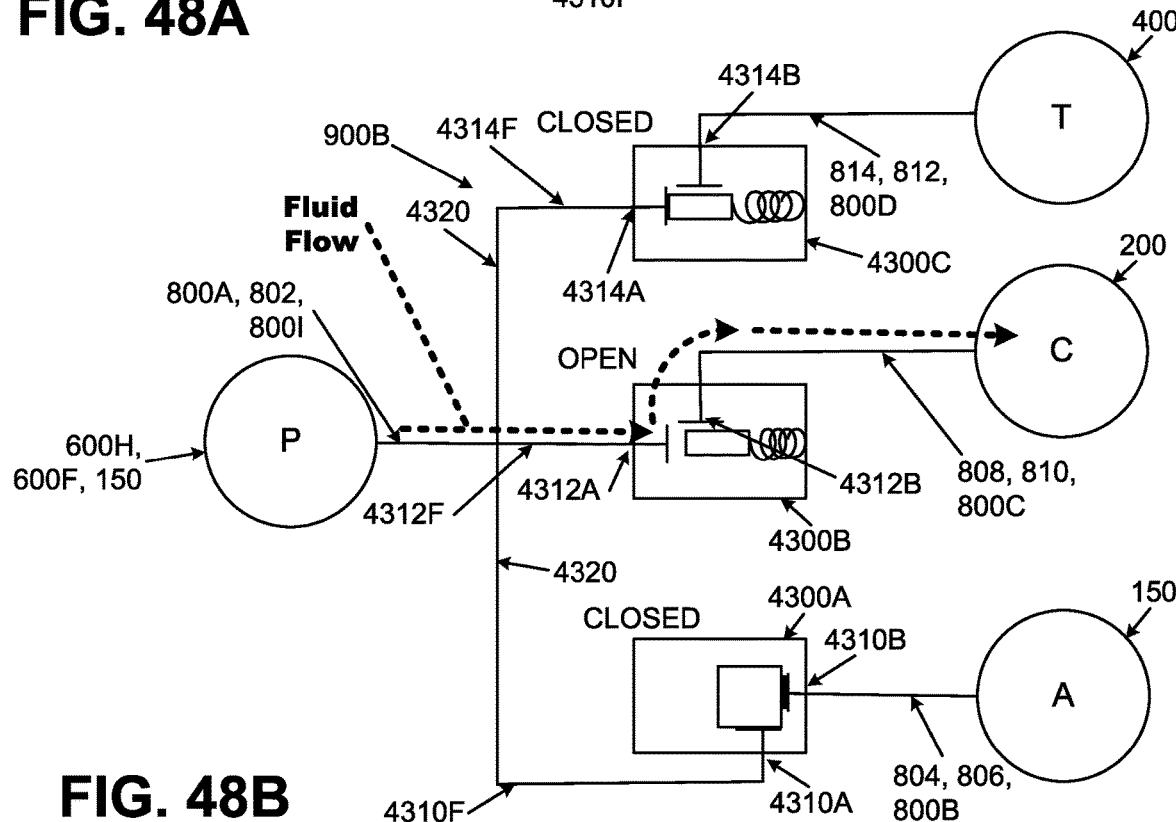

FIG. 48B (along with FIG. 5B) shows an operational state in which fluid moves into the fluid distributor 500 from the external environment 150 and is transferred to the foot support bladder 200. The fluid flow in this operational state is shown by the thick, arrowed, broken lines in FIGS. 5B and 48B. This operational state may be used to increase pressure in the foot support bladder 200, e.g., for a firmer feel and/or to support more intense activities (such as running). In this operational state, incoming fluid from the external environment 150 (e.g., air) moves, e.g., as described above with respect to FIGS. 5A and 5B, until it goes through the manifold 800 and reaches the fluid transfer system 900B. In this second operational state, the first solenoid 4300A is in the closed configuration, the second solenoid 4300B is in the open configuration, and the third solenoid 4300C is in the closed configuration. Thus, fluid flows from the source (e.g., pumps 600H, 600F, a compressor, etc.), through manifold port 800A, through common fluid line 4320, through fluid line 4312F, through the first port 4312A of the second solenoid 4300B, through the second solenoid 4300B, through the second port 4312B of the second solenoid 4300B, through manifold port 800C, and to its ultimate destination (the foot support bladder 200 in this example).

Figure 48C:
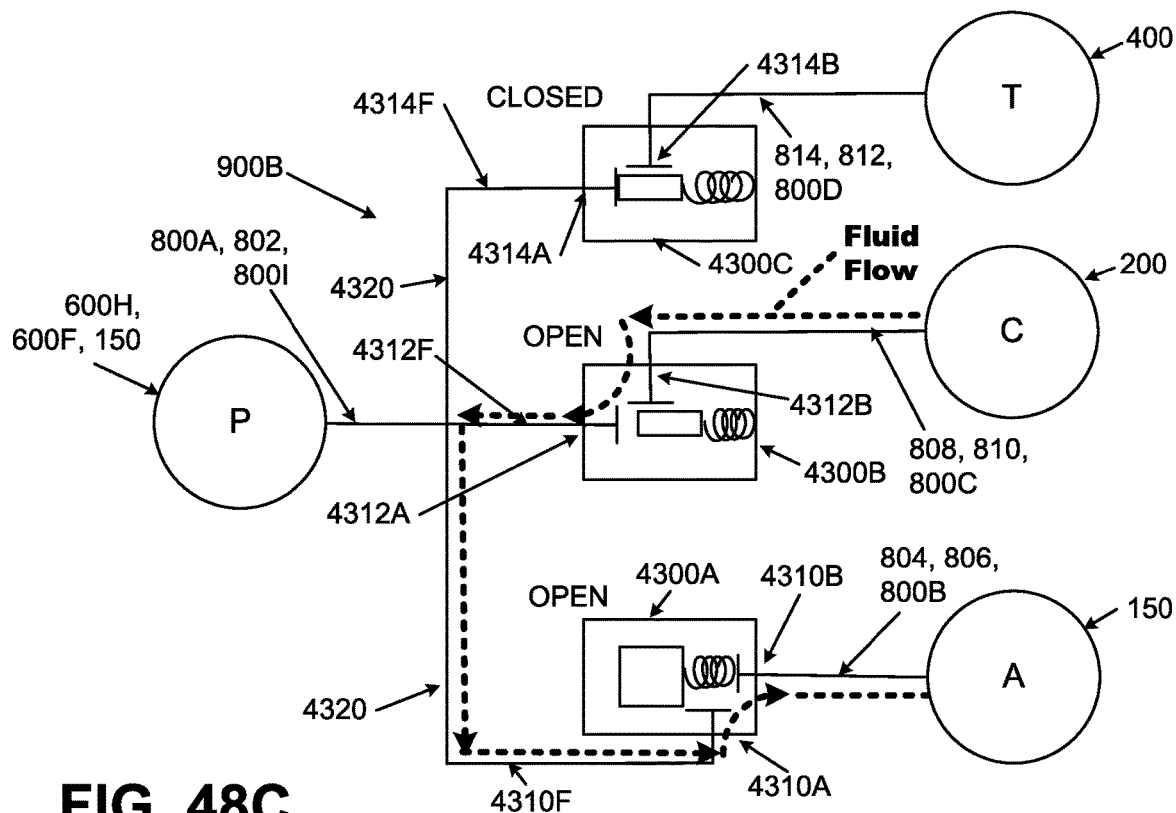

In some instances, it may be desired to remove fluid from the foot support bladder 200 in order to decrease pressure in the foot support bladder 200 (e.g., to provide a softer feel or for less intense activities, such as walking or casual wear). FIG. 48C (along with FIG. 5C) shows an example of this operational state. Again, the fluid flow in this operational state is shown by the thick, arrowed, broken lines in FIGS. 5C and 48C. In this third operational state, the first solenoid 4300A is in the open configuration, the second solenoid 4300B is in the open configuration, and the third solenoid 4300C is in the closed configuration. Thus, fluid flows from the foot support bladder 200, through second manifold port 800C, through the second port 4312B of the second solenoid 4300B, through the second solenoid 4300B, through the first port 4312A of the second solenoid, through fluid line 4312F, through the common fluid line 4320, through fluid line 4310F, through the first port 4310A of the first solenoid 4300A, through the first solenoid 4300A, through the second port 4310B of the first solenoid 4300A, through manifold port 800B, and to its ultimate destination (the external environment 150 in this example).

Figure 48D:
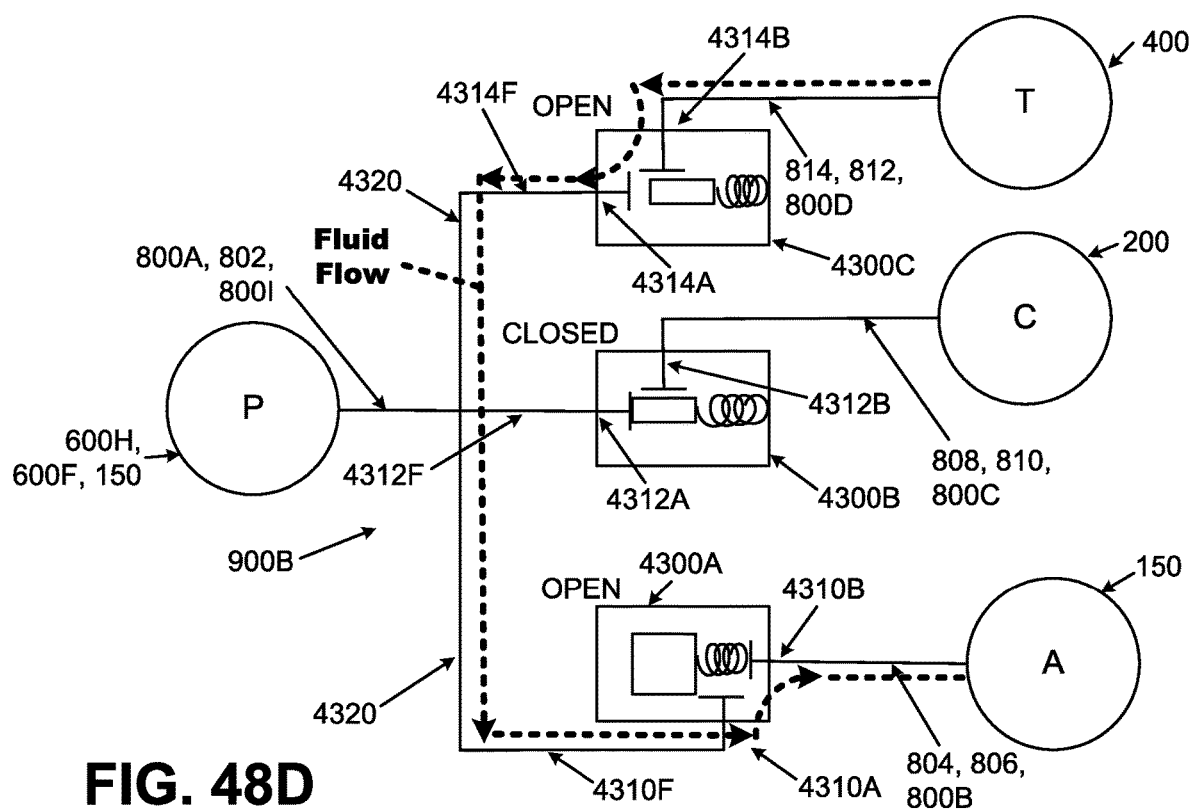

Another potential operational state for fluid transfer systems 900B and foot support systems in accordance with some examples of this technology is shown in FIG. 48D (along with FIG. 5D). In this operational state, fluid is transferred from the fluid container 400 to the external environment, e.g., to reduce fluid pressure in the fluid container 400. The fluid flow of this operational state is shown by the thick, arrowed, broken lines in FIGS. 5D and 48D. In this fourth operational state, the first solenoid 4300A is in the open configuration, the second solenoid 4300B is in the closed configuration, and the third solenoid 4300C is in the open configuration. Thus, fluid flows from the fluid container 400, through the third manifold port 800D, through the second port 4314B of the third solenoid 4300C, through the third solenoid 4300C, through the first port 4314A of the third solenoid 4300C, through fluid line 4314F, through common fluid line 4320, through fluid line 4310F, through the first port 4310A of the first solenoid 4300A, through the first solenoid 4300A, through the second port 4310B of the first solenoid 4300A, through the manifold port 800B, and to its ultimate destination (the external environment 150 in this example).

Figure 48E:
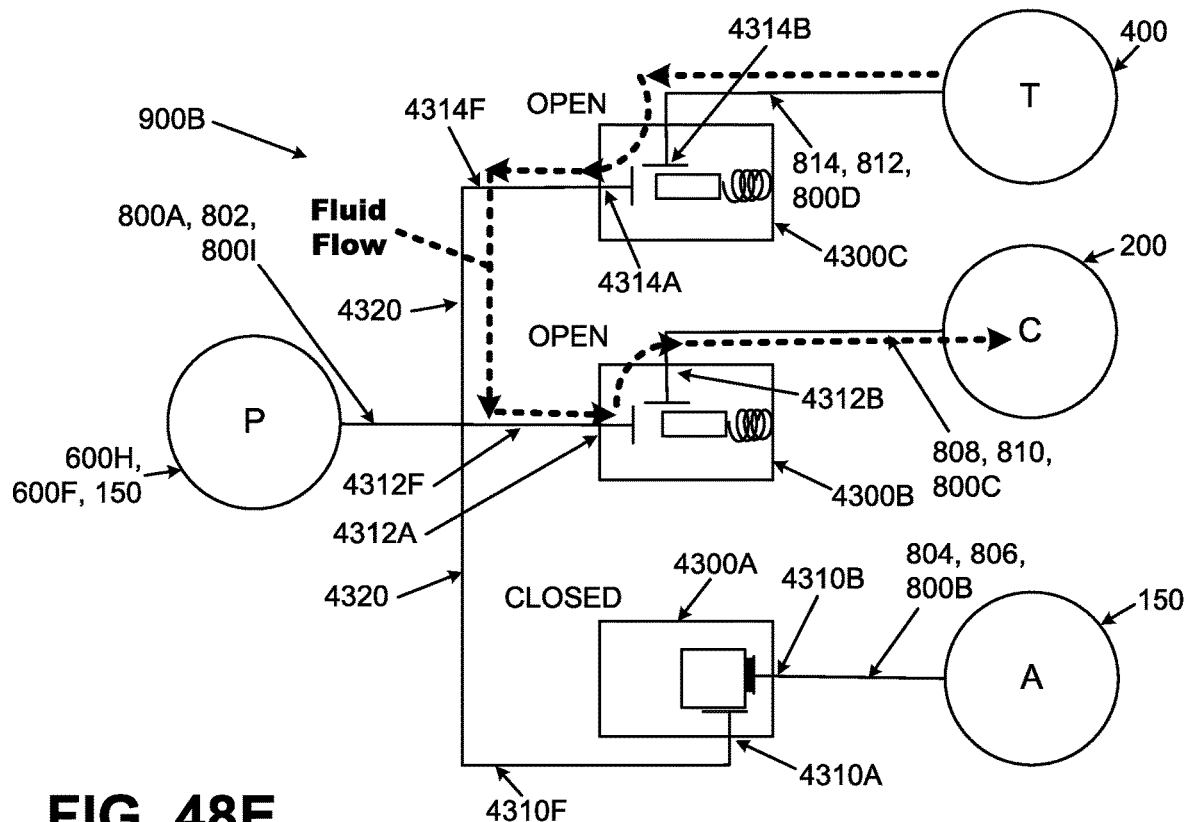

In some examples of fluid transfer systems 900B and foot support systems according to aspects of this technology, it may be desired to use the on-board fluid container 400 to adjust (and in this example, increase) pressure in the foot support bladder 200. An example of this operational state is shown in FIG. 48E (along with FIG. 5E). In this fifth operational state, the first solenoid 4300A is in the closed configuration, the second solenoid 4300B is in the open configuration, and the third solenoid 4300C is in the open configuration. Thus, when the fluid container 400 pressure is higher than the foot support bladder 200 pressure, fluid flows from the fluid container 400, through the third manifold port 800D, through the second port 4314B of the third solenoid 4300C, through the third solenoid 4300C, through the first port 4314A of the third solenoid 4300C, through fluid line 4314F, through common fluid line 4320, through fluid line 4312F, through the first port 4312A of the second solenoid 4300B, through the second solenoid 4300B, through the second port 4312B of the second solenoid 4300B, through manifold port 800C, and to its ultimate destination (the foot support bladder 200 in this example).

Figure 48F:
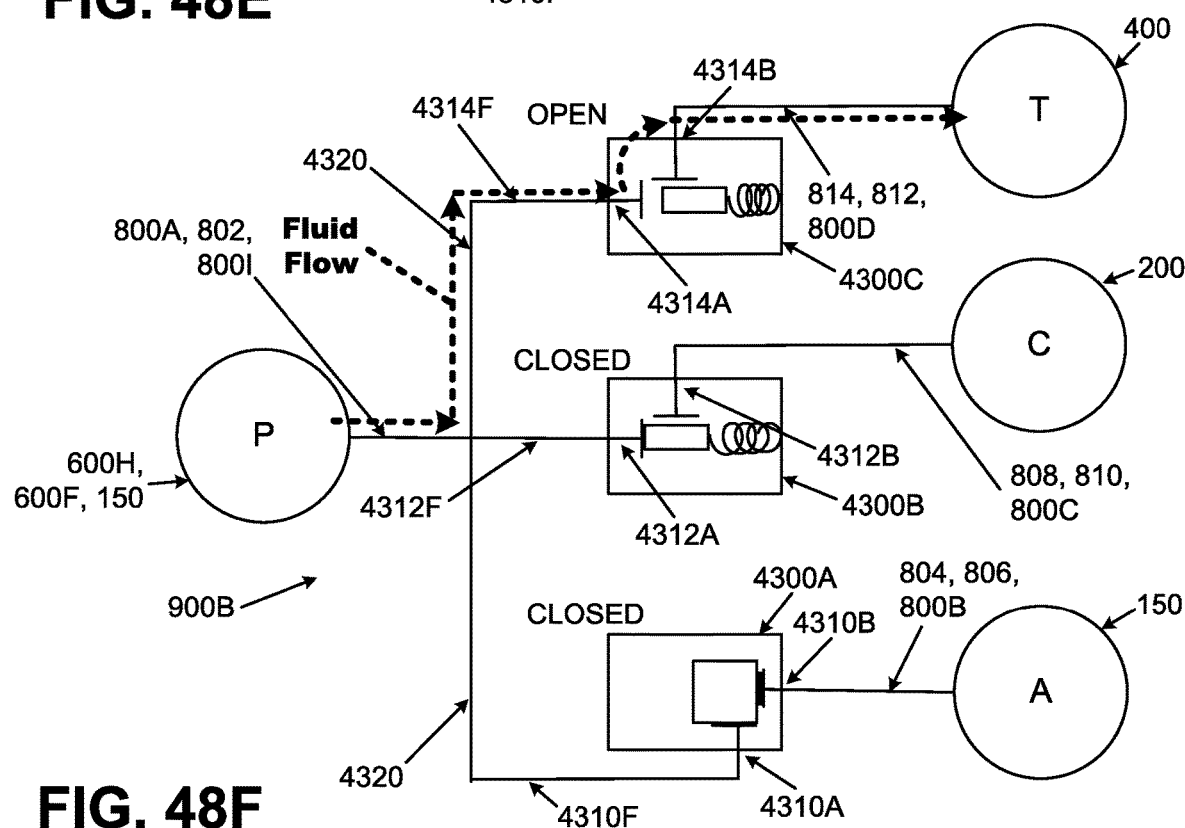

FIG. 48F (along with FIG. 5F) shows an example operational state for adding fluid to the fluid container 400 (e.g., to increase fluid volume and/or pressure in the fluid container 400). In this sixth operational state, the first solenoid 4300A is in the closed configuration, the second solenoid 4300B is in the closed configuration, and the third solenoid 4300C is in the open configuration. Thus, fluid flows from the source (e.g., pumps 600H, 600F, a compressor, etc.), through manifold port 800A, through common fluid line 4320, through fluid line 4314F, through the first port 4314A of the third solenoid 4300C, through the third solenoid 4300C, through the second port 4314B of the third solenoid 4300C, through manifold port 800D, and to its ultimate destination (the fluid container 400 in this example).

As mentioned above, fluid distributors 500, fluid flow control systems, foot support systems, sole structures 104, and/or articles of footwear 100 in accordance with some examples of this technology need not provide all six of the operational states described above. Rather, more operational states, less operational states, and/or different operational states may be available in some examples of this technology. FIGS. 49A-49D illustrate an example solenoid based fluid transfer system 900C having four operational states when one foot support bladder 200 and one fluid container 400 are present.

This example fluid transfer system 900C includes two solenoids: (a) a first solenoid 4900A including a first port 4910A, a second port 4910B, and a third port 4910C; and (b) a second solenoid 4900B including a first 4912A port and a second port 4912B. The first ports 4910A and 4912A of solenoids 4900A, 4900B, respectively, in this example fluid transfer system 900C are in fluid communication with a common fluid line 4920. Thus, common fluid line 4920 also places the first ports 4910A, 4912A of the solenoids 4900A, 4900B in fluid communication with one another (at least under some conditions). As an example, common fluid line 4920 may branch into: (a) fluid line 4910F (going to the first port 4910A of first solenoid 4900A) and (b) fluid line 4912F (going to the first port 4912A of second solenoid 4900B). Additionally, the common fluid line 4920 also is in fluid communication with a fluid source (e.g., one or more of pump(s) 600H, 600F, a compressor, the external environment 150, etc.), e.g., via one or more of manifold 800 port 800A, fluid inlet path 802, fluid inlet port 800I, connector 700, etc. In this example, the first solenoid 4900A may be a latching three port, two state solenoid (a 3/2 solenoid) and the second solenoid 4900B may be a normally closed non-latching solenoid (a 2/2 solenoid), although other specific types of solenoids may be used, if desired. The fluid transfer system 900C may engage with a manifold 800, e.g., of the various types described above (e.g., a four port and four fluid path manifold of the types described above).

In this illustrated example (and as will be described in more detail below), the first solenoid 4900A is independently switchable to: (a) a first configuration in which fluid flows through the first solenoid 4900A between the first port 4910A and the second port 4910B and (b) a second configuration in which fluid flows through the first solenoid 4900A between the first port 4910A and the third port 4910C. Thus, in this example, first port 4910A and first solenoid 4900A always remain open and the plunger 4910P moves between: (a) one position in which second port 4910B is open and third port 4910C is closed and (b) another position in which second port 4910B is closed and third port 4910C is open. The first solenoid 4900A in the illustrated example is biased to "normally" be in the first configuration (with the biasing system closing third port 4910C). The second solenoid 4900B of this example is independently switchable between an open configuration (in which fluid flows through solenoid 4900B between the first port 4912A and the second port 4912B) and a closed configuration (in which fluid does not flow through solenoid 4900B). In this fluid transfer system 900C, simultaneous selective placement of: (a) the first solenoid 4900A in one of the first configuration or the second configuration and (b) the second solenoid 4900B in one of the open configuration or the closed configuration selectively places this fluid transfer system 900C in a plurality of (e.g., two or more) operational states. Examples of these operational states are described in more detail below.

Figure 49B:
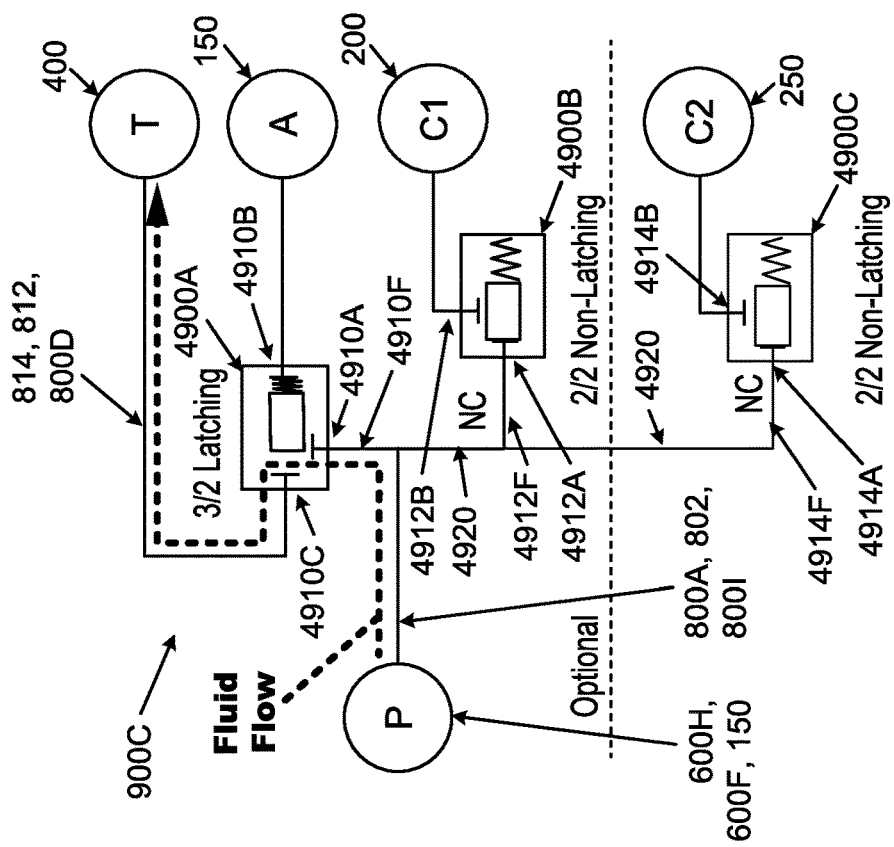
FIGS. 49A-49D provide views explaining additional solenoid based fluid transfer systems and available operational states in accordance with some examples of this technology.
Figure 49A:
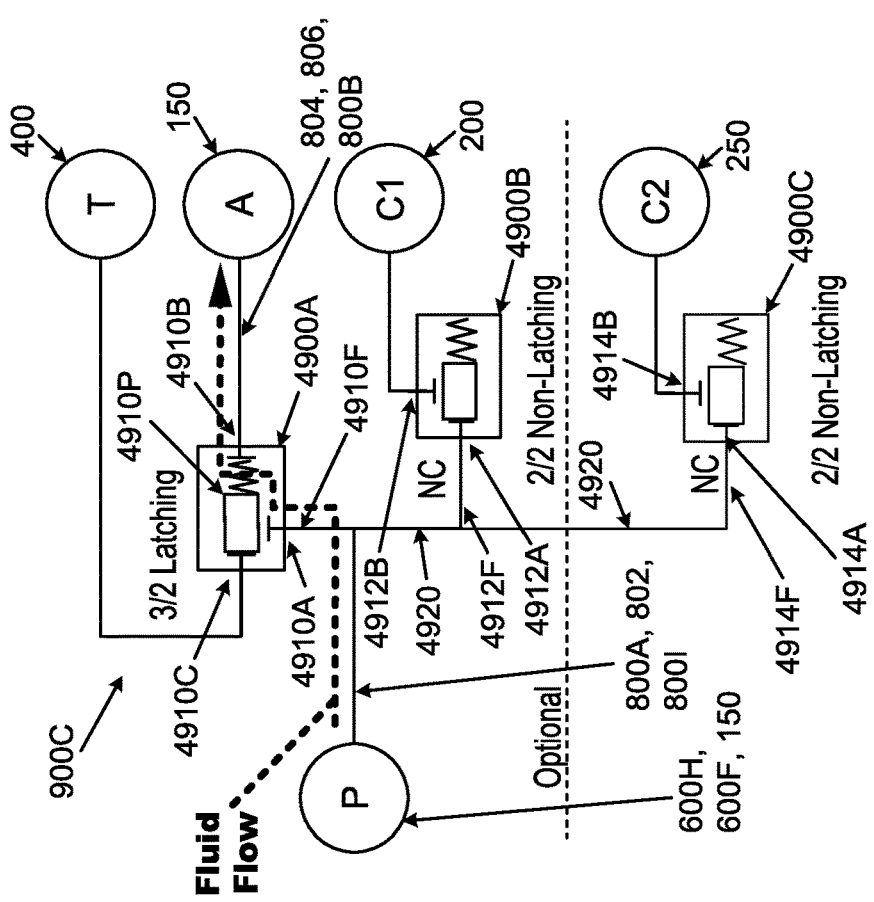

FIGS. 49A-49D provide schematic views of the solenoid based fluid transfer system 900C placed in four operational states. FIG. 49A (along with FIG. 5A) shows an operational state in which fluid moves into the fluid distributor 500 from the external environment 150 and is discharged back to the external environment 150. The fluid flow in this operational state is shown by the thick, arrowed, broken lines in FIGS. 5A and 49A. This operational state may be used as a "standby" or "steady state" operational state to keep the pumped fluid moving through the fluid distributor 500 even when no pressure changes are needed to the foot support bladder 200 and/or the fluid container 400. In this operational state, incoming fluid from the external environment 150 (e.g., air) moves, e.g., as described above with respect to FIG. 5A, until it goes through the manifold 800 and reaches the fluid transfer system 900C. In this first operational state, the first solenoid 4900A is in the first configuration and the second solenoid 4900B is in the closed configuration. Thus, fluid flows from the source (e.g., pumps 600H, 600F, a compressor, etc.), through manifold port 800A, through common fluid line 4920, through fluid line 4910F, through the first port 4910A of the first solenoid 4900A, through the first solenoid 4900A, through second port 4910B of the first solenoid 4900A, through manifold port 800B, and to its ultimate destination (the external environment 150 in this example).

Alternatively, in some examples of this technology, in this operational state, rather than continuously moving fluid through the fluid distributor 500 with each step when it is simply going to be discharged back into the external environment 150, a fluid path could be provided from the pump(s) 600H, 600F directly to the external environment 150. As another option, pump(s) 600H, 600F could be deactivated to accomplish this operational state.

FIG. 49B (along with FIG. 5F) shows an example operational state for adding fluid to the fluid container 400 (e.g., to increase fluid volume and/or pressure in the fluid container 400). In this second operational state, the first solenoid 4900A is in the second configuration and the second solenoid 4900B is in the closed configuration. Thus, fluid flows from the source (e.g., pumps 600H, 600F, a compressor, etc.), through manifold port 800A, through common fluid line 4920, through fluid line 4910F, through the first port 4910A of the first solenoid 4900A, through the first solenoid 4900A, through third port 4910C of the first solenoid 4900A, through manifold port 800D, and to its ultimate destination (the fluid container 400 in this example).

Figure 49D:
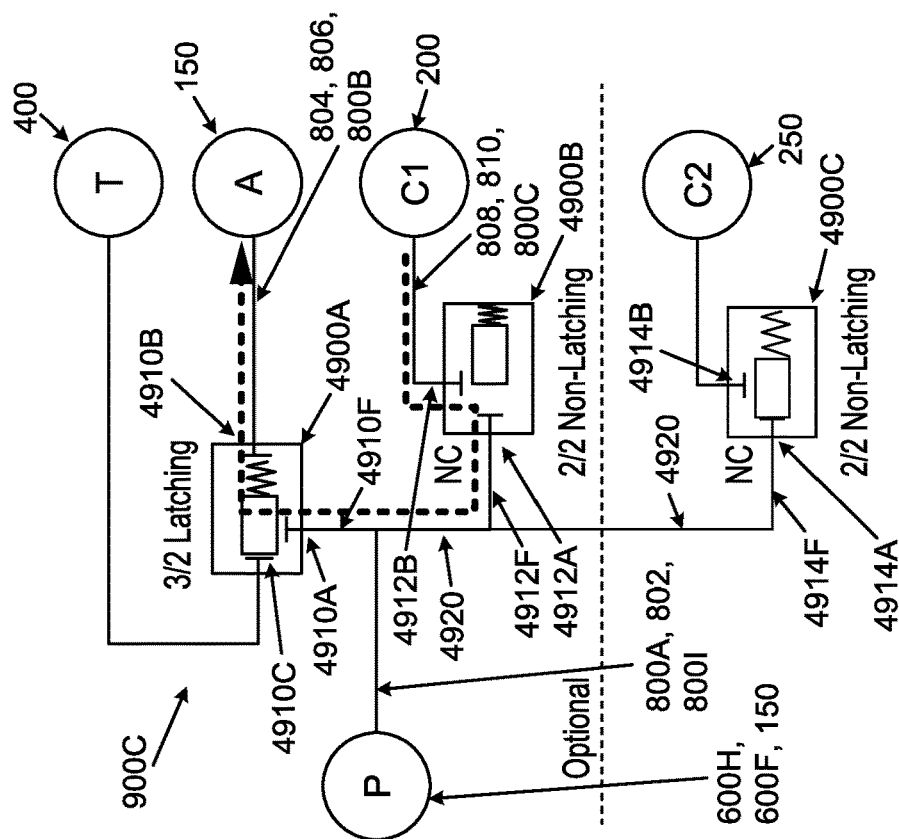
Figure 49C:
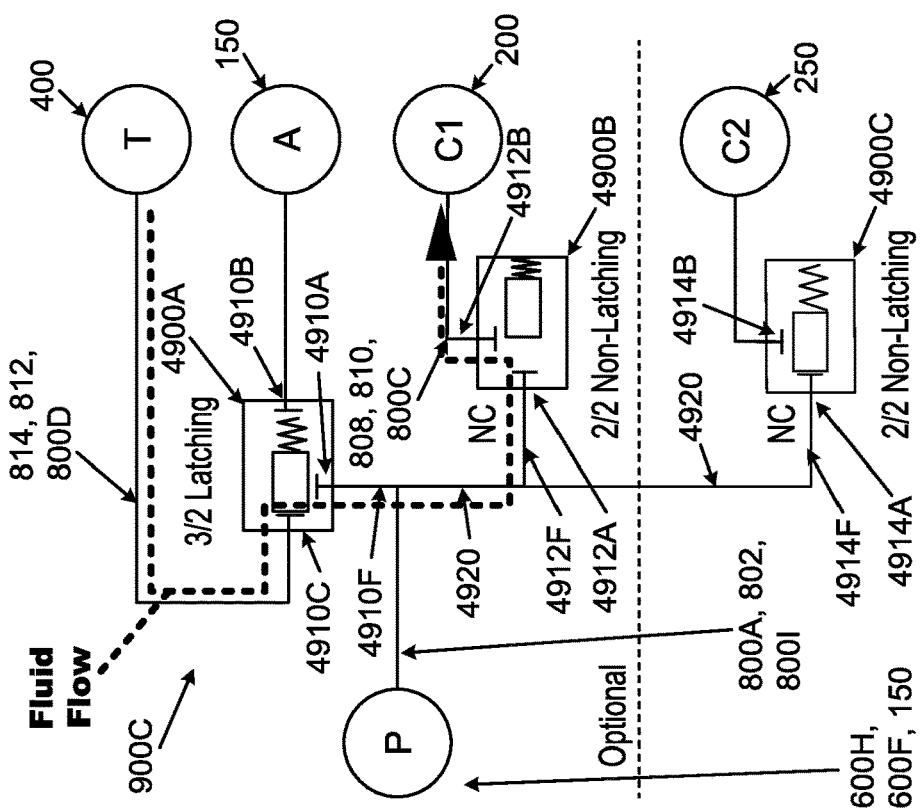

In this example fluid transfer system 900C, the on-board fluid container 400 is used to adjust (and in this example, increase) fluid pressure in the foot support bladder 200. An example of this operational state is shown in FIG. 49C (along with FIG. 5E). In this third operational state, first solenoid 4900A is in the second configuration and the second solenoid 4900B is in the open configuration. Thus, when the fluid container 400 pressure is higher than the foot support bladder 200 pressure, fluid flows from the fluid container 400, through the third manifold port 800D, through the third port 4910C of the first solenoid 4900A, through the first solenoid 4900A, through the first port 4910A of the first solenoid 4900A, through fluid line 4910F, through common fluid line 4920, through fluid line 4912F, through the first port 4912A of the second solenoid 4900B, through the second solenoid 4900B, through second port 4912B of the second solenoid 4900B, through manifold port 800C, and to its ultimate destination (the foot support bladder 200 in this example).

In some instances, it may be desired to remove fluid from the foot support bladder 200 in order to decrease pressure in the foot support bladder 200 (e.g., to provide a softer feel or for less intense activities, such as walking or casual wear). FIG. 49D (along with FIG. 5C) shows an example of this operational state. The fluid flow in this operational state is shown by the thick, arrowed, broken lines. In this fourth operational state, the first solenoid 4900A is in the first configuration and the second solenoid 4900B is in the open configuration. Thus, fluid flows from the foot support bladder 200, through second manifold port 800C, through the second port 4912B of the second solenoid 4900B, through the second solenoid 4900B, through the first port 4912B of the second solenoid 4900B, through fluid line 4912F, through the common fluid line 4920, through fluid line 4910F, through the first port 4910A of the first solenoid 4900A, through the first solenoid 4900A, through the second port 4910B of the first solenoid 4900A, through manifold port 800B, and to its ultimate destination (the external environment 150 in this example).

Thus, as compared to fluid transfer system 900B, fluid transfer system 900C includes up to four operational states rather than the six operational states described above for fluid transfer system 900B. Specifically, fluid transfer system 900C of FIGS. 49A-49D does not have an operational state in which fluid moves into the fluid distributor 500 from the external environment 150 and is transferred directly into the foot support bladder 200 (the states shown in FIGS. 5B and 48B). Rather, in the fluid transfer system 900C of FIGS. 49A-49D, fluid pressure is increased in the foot support bladder 200 only by fluid transfer from the fluid container 400 to the foot support bladder 200 (as shown by the operational state of FIG. 49C). Further, as compared to fluid transfer system 900B, fluid transfer system 900C does not have an operational state in which fluid moves from the fluid container 400 to the external environment 150 (the states shown in FIGS. 5D and 48D). If necessary or desired, fluid container 400 may include a check valve that opens to the external environment to prevent over-pressurization of the fluid container 400 (rather than having excess fluid from container 400 passing through fluid transfer system 900C to reduce pressure in the fluid container 400). Additionally or alternatively, if fluid pressure from the fluid source (e.g., fluid pressure generated by one or more foot activated pumps 600H, 600F) is insufficient or below the fluid pressure in open fluid pathways to the fluid container 400, fluid will not transfer from the source to the fluid container 400. Still additionally or alternatively, other pressure relief valves and/or fluid pathways may be provided at one or more locations in the overall fluid transfer system 900C, fluid distributor 500, fluid flow control system, foot support system, sole structure 104, and/or article of footwear 100 to prevent over-pressurization of any part of the systems (e.g., to relieve pressure from fluid discharged by pump(s) 600H, 600F if there is no other place for the fluid to go).

Fluid transfer system 900C has some advantages, however, in that it uses only two solenoid as compared to three used in fluid transfer system 900B. Thus, fluid transfer system 900C may be somewhat lighter, smaller, less expensive, and/or more energy efficient (e.g., consume less battery power) as compared to fluid transfer system 900B.

Fluid transfer systems 900B and 900C described above include a single foot support bladder 200 and a single fluid container 400. If desired, however, fluid transfer systems, foot support systems, fluid distributors 500, sole structures 104, and/or articles of footwear 100 in accordance with at least some aspects of this technology may include structure for supporting fluid pressure changes to more than one foot support bladder 200 and/or more than one fluid container 400. When two or more foot support bladders 200 are present, fluid could be introduced to all bladders simultaneously. This could be accomplished in various ways. For example, all foot support bladders may be filled simultaneously by branching fluid line 202 into individual foot support supply lines running to corresponding individual foot support bladders. As another example, all foot support bladders in an article of footwear 100 may be filled simultaneously by fluid lines connecting the foot support bladders in series or parallel. Similarly, two or more fluid containers 400 may be filled simultaneously in the same manners, but by branching container fluid line 402 into individual lines and/or connecting the fluid containers in series or parallel.

If multiple foot support bladders 200 and/or fluid containers 400 are present in a single shoe 100 and it is desired to potentially provide different fluid pressures in the bladders 200 and/or containers 400, appropriate valving or switching mechanisms may be provided, e.g., after fluid leaves connector 700 and enters foot support fluid line 202 and/or container fluid line 402. Alternatively, if desired, a separate fluid pathway through the connector 700, manifold 800, and sealing connector 840 (if present) may be provided for each individual foot support bladder 200 and/or fluid container 400; separate solenoids may be provided for each additional foot support bladder 200 and/or fluid container 400; and additional operational states may be provided. In other words, an additional set of ports, fluid channels, solenoids, and the like as shown to move fluid into and out of foot support bladder 200 may be provided for each additional foot support bladder and/or an additional set of ports, fluid channels, solenoids, and the like as shown to move fluid into and out of fluid container 400 may be provided for each additional fluid container in the shoe. The input system (e.g., on an external computing device, part of the "on-board" switching system 2200, etc.) also may be modified to allow separate inputs and control of each additional foot support bladder and/or fluid container.

FIGS. 49A-49D schematically illustrate (as "optional") a second foot support bladder 250 in fluid transfer system 900C. Thus, in this fluid transfer system 900C, a third solenoid 4900C is provided to transfer fluid into and out of second foot support bladder 250. This third solenoid 4900C includes a first port 4914A and a second port 4914B, and it may be structured as a normally closed non-latching solenoid, e.g., a 2/2 solenoid. The first port 4914A of third solenoid 4900C may have a fluid line 4914F in fluid communication with the common fluid line 4920. The second port 4914B of the third solenoid 4900C is in fluid communication with the second foot support bladder 250 in any desired manner. Specifically, the fluid pathway from second port 4914B to foot support bladder 250 may have a separate set of ports and fluid paths through manifold 800, sealing connector 840 (if present), connector 700 (if present), etc., that generally correspond in structure and/or function to the fluid pathway between second port 4912B of second solenoid 4900B and foot support bladder 200.

The fluid transfer system 900C of FIGS. 49A-49D may be placed in all the operational states shown in FIGS. 49A-49D by placing the first solenoid 4900A and second solenoid 4900B in the configurations shown in FIGS. 49A-49D and maintaining third solenoid 4900C in the closed configuration. But, this example fluid transfer system 900C may include two additional operational states to accommodate: (a) increases in fluid pressure in the second foot support bladder 250 and (b) decreases in fluid pressure in the second foot support bladder 250. A fifth operational state used to increase fluid pressure in the second foot support bladder 250 utilizes the first solenoid 4900A in the second configuration, the second solenoid 4900B in the closed configuration, and the third solenoid 4900C in the open configuration. Thus, in a manner similar to the configuration shown in FIG. 49C, fluid moves from fluid container 400, through the third manifold port 800D, through the third port 4910C of the first solenoid 4900A, through the first solenoid 4900A, through the first port 4910A of the first solenoid 4900A, through fluid line 4910F, through common fluid line 4920, through fluid line 4914F, through the first port 4914A of the third solenoid 4900C, through the third solenoid 4900C, through second port 4914B of the third solenoid 4900B, and from there to its ultimate destination (the foot support bladder 250 in this example).

Similarly, a sixth operational state used to decrease fluid pressure in the second foot support bladder 250 utilizes the first solenoid 4900A in the first configuration, the second solenoid 4900B in the closed configuration, and the third solenoid 4900C in the open configuration. Thus, in a manner similar to the configuration shown in FIG. 49D, fluid moves from the foot support bladder 250 (through whatever fluid pathways are provided) through the second port 4914B of the third solenoid 4900C, through the third solenoid 4900C, through the first port 4914A of the third solenoid 4900C, through fluid line 4914F, through the common fluid line 4920, through fluid line 4910F, through the first port 4910A of the first solenoid 4900A, through the first solenoid 4900A, through the second port 4910B of the first solenoid 4900A, through manifold port 800B, and to its ultimate destination (the external environment 150 in this example).

An additional solenoid (e.g., 2/2 non-latching solenoid) and appropriate structures and operational states may be provided for any additional foot support bladders beyond bladders 200 and 250 discussed above.

As described herein, aspects of this technology relate to controlling and changing pressure in various footwear components, such as one or more foot support bladders 200 and/or one or more fluid reservoirs 400 (which also may be fluid filled bladders). In the various example structures described above, however, the pressure sensors (e.g., 850A, 850B) are not located directly inside or directly engaged with the corresponding foot support bladder 200 and/or fluid container 400. Incorporating pressure sensor(s) 850A, 850B directly into or with a foot support bladder 200 and/or fluid container 400 of the types described herein may be practically difficult, e.g., due to the pliable bladder structures, due to their locations within the footwear, due to footwear assembly difficulties, etc. Thus, as described above, systems and methods in accordance with at least some aspects of this technology provide pressure sensor(s) 850A, 850B at locations to measure pressure in fluid lines within manifold 800 or within sealing connector 840. These fluid lines, in turn, are in fluid communication with foot support bladder 200 and/or fluid container 400. In this manner, the pressure sensor(s) 850A, 850B may be provided with external fluid distributor 500 (as described above) and may be more easily and conveniently incorporated into the overall footwear 100 structure as the fluid distributor 500 is connected with the shoe 100.

When no fluid is flowing through the relevant fluid lines equipped with sensors 850A, 850B, those sensors 850A, 850B generally will accurately measure pressure in the foot support bladder 200 and/or fluid container 400 (because the sensors 850A, 850B are mounted at fluid lines in open fluid communication with the foot support bladder 200 and/or fluid container 400). But, because the pressure sensor(s) 850A, 850B are not directly included with the foot support bladder 200 and/or fluid container 400, the pressure measurements made at pressure sensor(s) 850A, 850B within the manifold 800 or sealing connector 840 when fluid is flowing through the relevant fluid lines may not correspond to the actual pressure present within the foot support bladder 200 and/or fluid container 400. For example, there may be significant flow restriction on fluid flowing through the manifold 800 and/or sealing connector 840 because the fluid flows through relatively small sized (e.g., small cross sectional area and/or diameter) fluid lines within the manifold 800 and/or sealing connector 840. This flow resistance at the pressure sensor 850A, 850B locations causes corresponding differences in the pressure readings taken at the sensors 850A, 850B (and at the manifold 800 and/or sealing connector 840) as compared to the actual pressures at foot support bladder 200 and/or fluid container 400. This "difference" in sensed pressure v. actual pressure may be referred to as "offset." During fluid flow, this flow resistance offset also may be affected by flow rate past the pressure sensors 850A, 850B (i.e., flow rate dependent offset). Flow resistance offset also may be more pronounced shortly after fluid flow starts, stops, and/or changes rate significantly.

For these reasons, systems and methods in accordance with at least some aspects of this technology may determine an "adjusted" pressure (e.g., adjusted for offset) based on the pressure readings taken at the pressure sensor(s) (e.g., 850A, 850B) within the manifold 800 and/or sealing connector 840. These adjusted pressure(s) then may be used as input (e.g., input data to the microprocessor of an on-board fluid distributor 500, input data to an external computing device controlling pressure change operations, etc.) for determining when to start and stop fluid flow (e.g., when to rotate valve stem 910 and/or when to change the configuration of one or more solenoids (e.g., 4300A-4300C, 4900A-4900C) when adjusting pressure in the foot support bladder 200 and/or the fluid container 400). Use of adjusted pressure(s) for controlling pressure changes may allow the fluid flow control system to better arrive at a target pressure in response to pressure change input. For example, use of the adjusted pressure, as opposed to directly using the sensor 850A, 850B measured pressures, may allow the systems and/or methods to arrive at the target pressure more directly and/or with less pressure change "overshoot" (i.e., inflating too much) or "undershoot" (deflating too much) in the foot support bladder 200 and/or fluid container 400 (as compared to using the actual pressure sensor 850A, 850B readings). Additionally or alternatively, this may allow the systems and/or methods to arrive at the target pressure with less cycles of "starting" and "stopping" the fluid flow to arrive at the final target pressure (and especially with fewer short bursts of starts to fine tune and adjust pressure to the final target pressure).

Figure 50A:
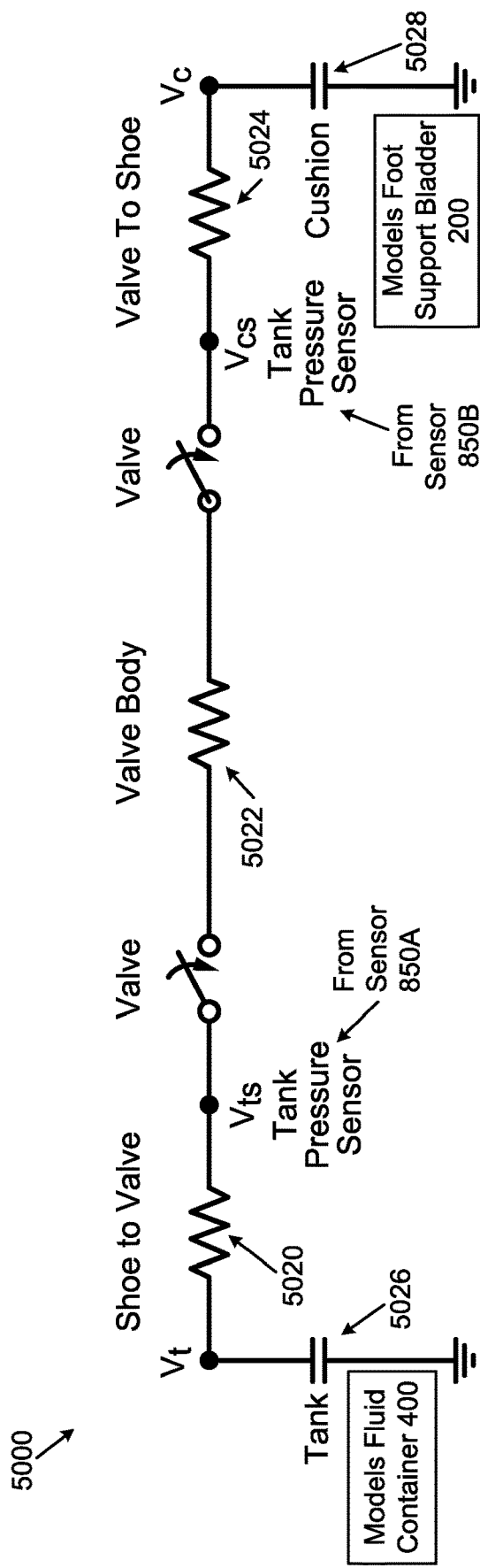
FIGS. 50A and 50B include information relating to pressure sensing adjustment in accordance with some examples of this technology.
Figure 50B:
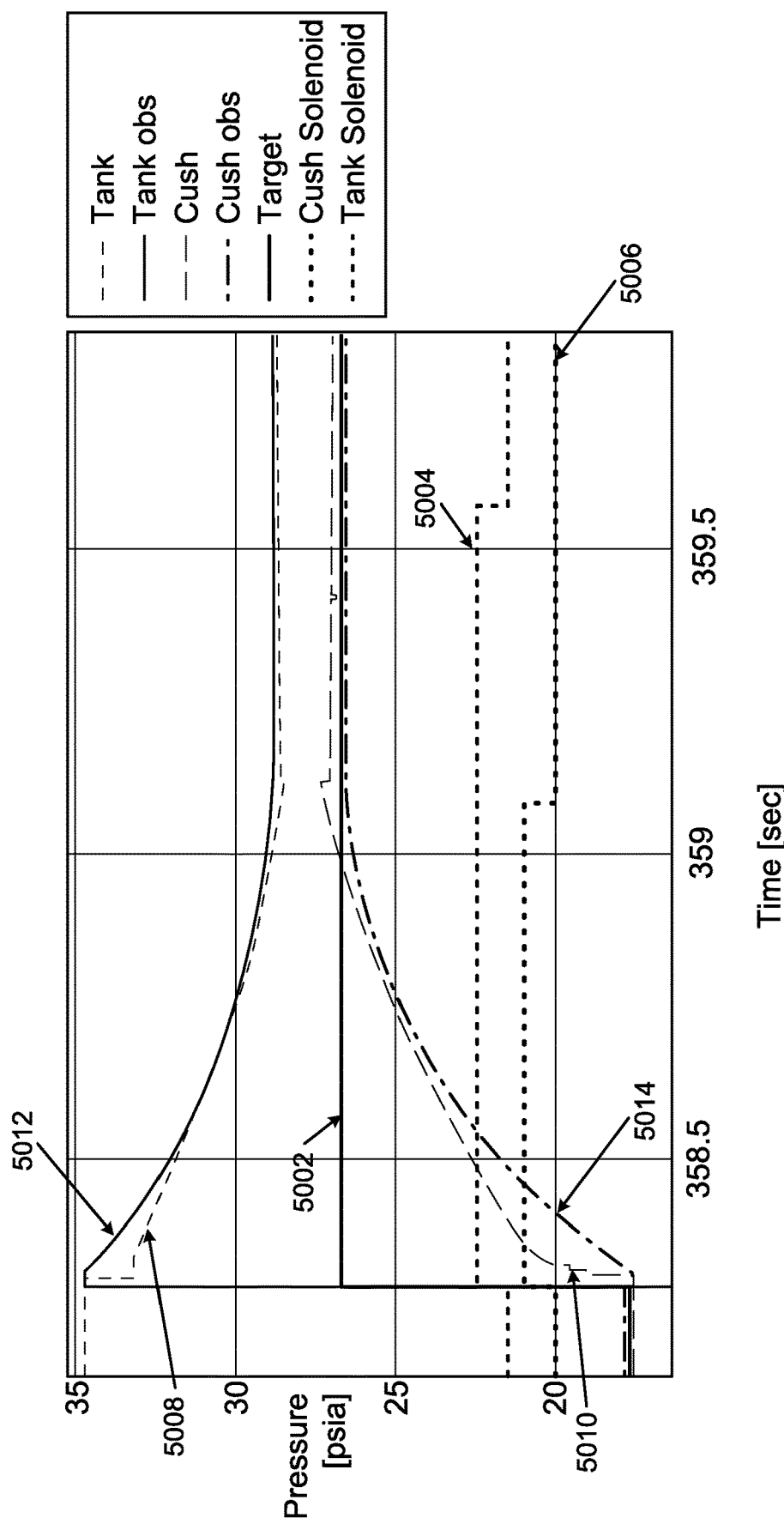

In some examples of this aspect of the present technology, adjusted pressures due to flow rate dependent offset may be determined using a state observer model. A state observer model uses a system that provides an estimate of the internal state of a given real system (in this example, the actual pressure in foot support bladder 200 and/or fluid container 400, $P_{ACTUAL}$) from measurements of a real system (in this example, pressure measurements at pressure sensors 850A, 850B ($P_{850A, 850B}$) at manifold 800 and/or sealing connector 840). FIGS. 50A and 50B provide figures helping explain one potential state observer model. FIG. 50A shows an electrical equivalent model 5000 of a pneumatic pressure control system of the types described herein in which the actual system includes one foot support bladder 200 ("cushion") and one fluid container 400 ("tank"). In this model, the fluid container 400 and the foot support bladder 200 are modeled as capacitors and store pressure. Fluid flow through the various parts of the system is modeled as resistors (e.g., fluid flow between the fluid container 400 and the fluid transfer system 900 is shown as resistor 5020, fluid flow through the fluid transfer system 900 is shown as resistor 5022, and fluid flow between the foot support bladder 200 and the fluid transfer system 900 is shown as resistor 5024).

FIG. 50B illustrates how the state observer model 5000 of FIG. 50A corresponds to the actual pressure measurements in sensors 850A, 850B (and other related information). Line 5002 represents desired target pressure in the foot support bladder 200 and shows a desired pressure change from about 18 psi to about 27 psi shortly before time 358.5. Lines 5004 and 5006 represent operation of solenoid valves for fluid container 400 and the foot support bladder 200, respectively. These lines 5004, 5006 show that both solenoid valves change configuration when the desired pressure change is triggered (shortly before time 358.5). The valve configuration changes configure the solenoids to allow fluid to transfer from the fluid container 400 to the foot support bladder 200 (thereby increasing pressure in the foot support bladder 200 and decreasing pressure in the fluid container 400). Curve 5008 shows the actual pressure measurements taken by sensor 850A in the manifold/sealing connector fluid line in fluid communication with the fluid container 400, and curve 5010 shows the actual pressure measurements taken by sensor 850B in the manifold/sealing connector fluid line in fluid communication with the foot support bladder 200.

As evident from curves 5008, 5010, the actual sensor 850A, 850B measurements jump significantly when flow starts and stops due to flow resistance offset. This flow resistance offset typically becomes even more pronounced as the fluid line cross sectional area decreases.

Curves 5012 and 5014, on the other hand, show the pressure values predicted/calculated by the model 5000 of FIG. 50A. As shown, these curves 5012, 5014 lack the substantial "jumps" and thus better correspond to the actual fluid pressures within the fluid container 400 and/or foot support bladder 200. From the actual measured pressure readings at pressure sensors 850A and/or 850B, state observer pressure values may be calculated using the model 5000. For example, based on the pressure sensor measurements 850A, 850B (which correlate to voltage measured by the sensors 850A, 850B), and in view of the known values assigned to the various resistors 5020, 5022, 5024 and capacitances (Tank and Cushion) in model 5000, the voltages at fluid container model location 5026 and foot support bladder model location 5028 can be calculated. These calculated voltages correspond to the pressure calculated state observer pressure values.

Then these calculated state observer pressure values may be used as inputs corresponding to pressure in the foot support bladder 200 and/or fluid container 400. The use of the calculated state observer pressure values as pressure input and data allows systems and methods in accordance with some examples of this technology to better control pressure changes, arrive at target pressures more directly and/or with less pressure change "overshoot" (i.e., inflating too much) or "undershoot" (deflating too much), and/or with less cycles of "starting" and "stopping" the fluid flow to arrive at the target pressure (e.g., due to the lack of "jumps").

Other ways of using actual pressure readings from pressure sensors 850A, 850B to determine an adjusted pressure value (and estimate actual pressure in foot support bladder 200 and/or fluid container 400) may be used. As one example, a laboratory physical model of the overall foot support system may be formed including the same interconnected foot support bladder 200, fluid lines 400, fluid distributor 500 components, but the model could be made to additionally include pressure sensors with the foot support bladder 200 and fluid container 400 to measure the actual pressure in those components. Then, using this physical model, pressure measurements may be taken: (a) at the pressure sensor(s) 850A, 850B located at manifold 800 and/or sealing connector 840 ($P_{850A, 850B}$), and (b) at the additional pressure sensor(s) included with the foot support bladder 200 and/or fluid container 400 as part of the physical model ($P_{ACTUAL}$) under various operating conditions (e.g., using different flow rates, using different starting pressures, using different pressure change amounts, etc.). By comparing the actual pressure measurements of part (a) with those of part (b), the differences in the actual measured pressures can be used to develop correction factors to be used in systems and methods where actual pressure measurements are available only at manifold 800 and/or sealing connector 840 (i.e., in actual shoes in use where no additional pressure sensor(s) is (are) included directly with the foot support bladder 200 and/or fluid container 400). The correction factor may take on the form of a look-up table, a mathematical formula or equation for converting $P_{850A, 850B}$ to $P_{ACTUAL}$, a "best fit" curve, etc., and may be applied by the microprocessor to the actual pressure readings $P_{850A, 850B}$. Applying an appropriate correction factor for the conditions to the pressure sensor measurements at manifold 800 and/or sealing connector 840 ($P_{850A, 850B}$) provides an adjusted pressure value that may be used as input for controlling pressure changes, e.g., as described above.

III. CONCLUSION

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

For the avoidance of doubt, the present application, technology, and invention includes at least the subject matter described in the following numbered Clauses:

Clause 1. A foot support system, comprising:
a foot support bladder;
a first sole member engaged with the foot support bladder, wherein the first sole member includes a plantar support surface at least at a heel support area of the foot support system and a sidewall forming an exterior surface of the first sole member;
a fluid container; and
a fluid distributor engaged with the exterior surface of the first sole member, wherein the fluid distributor includes: (a) an inlet for receiving fluid from a fluid supply, (b) a first fluid pathway for transferring fluid to the external environment, (c) a second fluid pathway in fluid communication with the foot support bladder, and (d) a third fluid pathway in fluid communication with the fluid container.

Clause 2. The foot support system according to Clause 1, further comprising a fluid supply including a first pump, wherein an inlet of the first pump is in fluid communication with the external environment and an outlet of the first pump is in fluid communication with the inlet of the fluid distributor.

Clause 3. The foot support system according to Clause 1, further comprising a fluid supply including a first pump and a second pump, wherein an inlet of the first pump is in fluid communication with the external environment, wherein an outlet of the first pump is in fluid communication with an inlet of the second pump, and wherein an outlet of the second pump is in fluid communication with the inlet of the fluid distributor.

Clause 4. The foot support system according to Clause 3, wherein the second pump is a foot activated pump.

Clause 5. The foot support system according to any one of Clauses 2 to 4, further comprising a fluid line including a first end and a second end, wherein the first end is in fluid communication with the external environment and the second end is in fluid communication with the inlet of the first pump.

Clause 6. The foot support system according to any one of Clauses 2 to 4, wherein the first pump is a foot activated pump.

Clause 7. The foot support system according to any one of Clauses 1 to 6, wherein the fluid distributor includes a housing having: (a) a first port opening into the first fluid pathway, (b) a second port opening into the second fluid pathway, and (c) a third port opening into the third fluid pathway.

Clause 8. The foot support system according to Clause 7, wherein the first port, the second port, and the third port are aligned on a side surface of the housing.

Clause 9. The foot support system according to any one of Clauses 1 to 6, wherein the fluid distributor includes a housing having: (a) the inlet, (b) a first port opening into the first fluid pathway, (c) a second port opening into the second fluid pathway, and (d) a third port opening into the third fluid pathway.

Clause 10. The foot support system according to Clause 9, wherein the inlet, the first port, the second port, and the third port are aligned on a side surface of the housing.

Clause 11. The foot support system according to any one of Clauses 1 to 10, wherein the fluid container includes a fluid filled bladder.

Clause 12. The foot support system according to Clause 11, wherein at least a portion of the fluid filled bladder extends beneath a bottom surface of the foot support bladder.

Clause 13. The foot support system according to any one of Clauses 1 to 12, further comprising a second sole member engaged with the fluid container.

Clause 14. The foot support system according to Clause 13, wherein a heel support portion of the second sole member engages a heel support portion of the first sole member.

Clause 15. The foot support system according to any one of Clauses 1 to 14, wherein the exterior surface of the first sole member includes a recess defined therein, and wherein at least a portion of the fluid distributor is received in the recess.

Clause 16. The foot support system according to Clause 15, wherein the fluid distributor includes or is attached to a lateral cage component that engages at least one of the first sole member or another sole member.

Clause 17. The foot support system according to any one of Clauses 1 to 16, wherein an exposed exterior surface of the fluid distributor includes a user input system that receives input triggering an adjustment of pressure in the foot support bladder.

Clause 18. The foot support system according to any one of Clauses 1 to 17, wherein the fluid distributor includes an antenna for receiving user input in a wireless manner from a remote device.

Clause 19. The foot support system according to any one of Clauses 1 to 18, wherein the fluid distributor is engaged with the exterior surface of the first sole member at a lateral side heel portion of the first sole member.

Clause 20. The foot support system according to any one of Clauses 1 to 18, wherein the foot support bladder is located at least in a forefoot support region of the foot support system.

Clause 21. The foot support system according to any one of Clauses 1 to 19, wherein the foot support bladder is located in a forefoot support region of the foot support system and the fluid container is located in a heel support region of the foot support system.

Clause 22. The foot support system according to any one of Clauses 1 to 19, wherein the foot support bladder is located in a heel support region of the foot support system and the fluid container is located in a forefoot support region of the foot support system.

Clause 23. The foot support system according to any one of Clauses 1 to 19, wherein the foot support bladder is located at least in a heel support region of the foot support system.

Clause 24. The foot support system according to any one of Clauses 1 to 19, wherein the fluid container is located at least in a forefoot support region of the foot support system.

Clause 25. The foot support system according to any one of Clauses 1 to 19, wherein the fluid container is located at least in a heel support region of the foot support system.

Clause 26. An article of footwear, comprising:
an upper; and
a foot support system according to any one of Clauses 1 to 25 engaged with the upper.

Clause 27. The article of footwear according to Clause 26, wherein a portion of the fluid distributor is engaged with the upper.

Clause 28. An article of footwear, comprising:
a upper;
a first sole member engaged with the upper;
a foot support bladder engaged with the first sole member;
a fluid container engaged with at least one of the upper or the first sole member; and
a fluid distributor engaged with at least one of the upper or the first sole member, wherein the fluid distributor includes: (a) an inlet for receiving fluid from a fluid supply, (b) a first fluid pathway for transferring fluid to the external environment, (c) a second fluid pathway in fluid communication with the foot support bladder, and (d) a third fluid pathway in fluid communication with the fluid container.

Clause 29. The article of footwear according to Clause 28, further comprising a fluid supply including a first pump, wherein an inlet of the first pump is in fluid communication with the external environment and an outlet of the first pump is in fluid communication with the inlet of the fluid distributor.

Clause 30. The article of footwear according to Clause 28, further comprising a fluid supply including a first pump and a second pump, wherein an inlet of the first pump is in fluid communication with the external environment, wherein an outlet of the first pump is in fluid communication with an inlet of the second pump, and wherein an outlet of the second pump is in fluid communication with the inlet of the fluid distributor.

Clause 31. The article of footwear according to Clause 30, wherein the second pump is a foot activated pump.

Clause 32. The article of footwear according to any one of Clauses 29 to 31, further comprising a fluid line including a first end and a second end, wherein the first end is in fluid communication with the external environment and the second end is in fluid communication with the inlet of the first pump.

Clause 33. The article of footwear according to any one of Clauses 29 to 32, wherein the first pump is a foot activated pump.

Clause 34. The article of footwear according to any one of Clauses 28 to 33, wherein the fluid distributor includes a housing having: (a) a first port opening into the first fluid pathway, (b) a second port opening into the second fluid pathway, and (c) a third port opening into the third fluid pathway.

Clause 35. The article of footwear according to Clause 34, wherein the first port, the second port, and the third port are aligned on a side surface of the housing.

Clause 36. The article of footwear according to any one of Clauses 28 to 35, wherein the fluid distributor includes a housing having: (a) the inlet, (b) a first port opening into the first fluid pathway, (c) a second port opening into the second fluid pathway, and (d) a third port opening into the third fluid pathway.

Clause 37. The article of footwear according to Clause 36, wherein the inlet, the first port, the second port, and the third port are aligned on a side surface of the housing.

Clause 38. The article of footwear according to any one of Clauses 28 to 37, wherein the fluid container includes a fluid filled bladder.

Clause 39. The article of footwear according to Clause 38, wherein at least a portion of the fluid filled bladder extends beneath a bottom surface of the foot support bladder.

Clause 40. The article of footwear according to any one of Clauses 28 to Clause 39, further comprising a second sole member engaged with the fluid container.

Clause 41. The article of footwear according to Clause 40, wherein a heel support portion of the second sole member engages a heel support portion of the first sole member.

Clause 42. The article of footwear according to any one of Clauses 28 to 41, wherein an exterior surface of the first sole member includes a recess defined therein, and wherein at least a portion of the fluid distributor is received in the recess.

Clause 43. The article of footwear according to Clause 42, wherein the fluid distributor includes or is engaged with a lateral cage component that engages at least one of the first sole member or another sole member.

Clause 44. The article of footwear according to any one of Clauses 28 to 43, wherein an exposed exterior surface of the fluid distributor includes a user input system that receives input triggering an adjustment of pressure in the foot support bladder.

Clause 45. The article of footwear according to any one of Clauses 28 to 44, wherein the fluid distributor includes an antenna for receiving user input in a wireless manner from a remote device.

Clause 46. The article of footwear according to any one of Clauses 28 to 45, wherein the foot support bladder is located at least in a forefoot support region of the article of footwear.

Clause 47. The article of footwear according to any one of Clauses 28 to 45, wherein the foot support bladder is located in a forefoot support region of the article of footwear and the fluid container is located in a heel support region of the article of footwear.

Clause 48. The article of footwear according to any one of Clauses 28 to 45, wherein the foot support bladder is located in a heel support region of the article of footwear and the fluid container is located in a forefoot support region of the article of footwear.

Clause 49. The article of footwear according to any one of Clauses 28 to 45, wherein the foot support bladder is located at least in a heel support region of the article of footwear.

Clause 50. The article of footwear according to any one of Clauses 28 to 45, wherein the fluid container is located at least in a forefoot support region of the article of footwear.

Clause 51. The article of footwear according to any one of Clauses 28 to 45, wherein the fluid container is located at least in a heel support region of the article of footwear.

Clause 52. The article of footwear according to any one of Clauses 28 to 51, wherein the fluid distributor is engaged with an exterior surface of the first sole member at a lateral side heel portion of the first sole member.

Clause 53. The article of footwear according to any one of Clauses 28 to 52, wherein the fluid distributor is engaged with the upper at a rear heel area of the upper.

Clause 54. The article of footwear according to Clause 53, wherein the rear heel area of the upper includes a receptacle attached to one or more rear heel upper components, and wherein the fluid distributor is received in the receptacle.

Clause 55. A fluid flow control system for an article of footwear, comprising:
a valve housing;
a valve stem movably mounted in the valve housing, wherein the valve stem includes a first end, a second end, and a perimeter wall extending between the first end and the second end, wherein the first end, the second end, and the perimeter wall define an internal chamber of the valve stem, and wherein the perimeter wall of the valve stem includes a plurality of through holes extending from the internal chamber to an exterior surface of the perimeter wall;
a fluid inlet port in fluid communication with the internal chamber; and
a manifold in fluid communication with the valve housing, wherein the manifold includes a first fluid flow path that extends through the manifold to a first manifold port, a second fluid flow path that extends through the manifold to a second manifold port, and a third fluid flow path that extends through the manifold to a third manifold port,
wherein movement of the valve stem to a plurality of positions selectively places the fluid flow control system in a plurality of operational states by placing one or more of the plurality of through holes in fluid communication with the first fluid flow path, the second fluid flow path, or the third fluid flow path.

Clause 56. The fluid flow control system according to Clause 55, wherein the plurality of operational states includes two or more of:
(a) a first operational state at a first position of the valve stem in which fluid introduced into the internal chamber through the fluid inlet port passes through the perimeter wall and into the first fluid flow path,
(b) a second operational state at a second position of the valve stem in which fluid introduced into the internal chamber through the fluid inlet port passes through the perimeter wall and into the second fluid flow path,
(c) a third operational state at a third position of the valve stem in which fluid passes through the second fluid flow path, through the perimeter wall, through the internal chamber, through the perimeter wall, and into the first fluid flow path,
(d) a fourth operational state at a fourth position of the valve stem in which fluid passes through the third fluid flow path, through the perimeter wall, through the internal chamber, through the perimeter wall, and into the first fluid flow path,
(e) a fifth operational state at a fifth position of the valve stem in which fluid passes through the third fluid flow path, through the perimeter wall, through the internal chamber, through the perimeter wall, and into the second fluid flow path, and
(f) a sixth operational state at a sixth position of the valve stem in which fluid introduced into the internal chamber through the fluid inlet port passes through the perimeter wall and into the third fluid flow path.

Clause 57. The fluid flow control system according to Clause 55 or 56, wherein the first manifold port, the second manifold port, and the third manifold port align along an exterior side of the manifold.

Clause 58. The fluid flow control system according to any one of Clauses 55 to 57, wherein the fluid inlet port introduces fluid to the internal chamber at the second end of the valve stem.

Clause 59. The fluid flow control system according to any one of Clauses 55 to 58, further comprising a sealing connector engaging the manifold and the valve housing.

Clause 60. The fluid flow control system according to Clause 59, wherein the sealing connector includes a seal block body having a first sealed channel extending from the perimeter wall to the first fluid flow path, a second sealed channel extending from the perimeter wall to the second fluid flow path, and a third sealed channel extending from the perimeter wall to the third fluid flow path.

Clause 61. The fluid flow control system according to Clause 60, wherein the first sealed channel, the second sealed channel, and the third sealed channel extend in parallel directions through the seal block body.

Clause 62. The fluid flow control system according to Clause 60 or 61, wherein axial directions of the first sealed channel, the second sealed channel, and the third sealed channel are aligned in the seal block body.

Clause 63. The fluid flow control system according to any one of Clauses 60 to 62, wherein an outer surface of the seal block body includes a first opening that opens to the first sealed channel, a second opening that opens to the second sealed channel, and a third opening that opens to the third sealed channel, and wherein at each of the plurality of operational states, an extent of alignment of the first opening, the second opening, and/or the third opening with one or more of the plurality of through holes in the perimeter wall of the valve stem is adjustable to allow control over a rate of fluid flow through the sealing connector.

Clause 64. The fluid flow control system according to Clause 59, wherein the sealing connector includes a first opening that opens to a first sealed channel, and wherein in at least one of the plurality of operational states, an extent of alignment of the first opening with one of the plurality of through holes in the perimeter wall of the valve stem is adjustable to allow control over a rate of fluid flow through the sealing connector.

Clause 65. The fluid flow control system according to any one of Clauses 55 to 64, further comprising a housing containing at least the valve housing, the valve stem, the manifold, and the sealing connector.

Clause 66. The fluid flow control system according to any one of Clauses 55 to 65, further comprising a drive system engaged at the first end of the valve stem, wherein the drive system moves the valve stem at least to the plurality of positions.

Clause 67. The fluid flow control system according to Clause 66, wherein the drive system includes a motor.

Clause 68. The fluid flow control system according to Clause 67, wherein the drive system further includes a transmission operatively coupled between an output of the motor and the first end of the valve stem.

Clause 69. The fluid flow control system according to any one of Clauses 66 to 68, further comprising a housing containing at least the valve housing, the valve stem, the manifold, and the drive system.

Clause 70. The fluid flow control system according to any one of Clauses 66 to 68, further comprising a power source for powering the drive system.

Clause 71. The fluid flow control system according to Clause 70, wherein the power source includes a battery.

Clause 72. The fluid flow control system according to Clause 70 or 71, further comprising a housing containing at least the valve housing, the valve stem, the manifold, the drive system, and the power source.

Clause 73. The fluid flow control system according to any one of Clauses 55 to 72, further comprising a sensor for determining a position of the valve stem with respect to the valve housing.

Clause 74. The fluid flow control system according to Clause 73, wherein the sensor includes a magnetic encoder.

Clause 75. The fluid flow control system according to Clause 73 or 74, further comprising a housing containing at least the valve housing, the valve stem, the manifold, and the sensor.

Clause 76. The fluid flow control system according to any one of Clauses 55 to 75, further comprising a first pressure sensor engaged with the manifold for determining fluid pressure in at least one of the first fluid flow path, the second fluid flow path, or the third fluid flow path.

Clause 77. The fluid flow control system according to Clause 76, wherein the first pressure sensor is provided to determine fluid pressure in the third fluid flow path, and wherein the fluid flow control system further comprises a second pressure sensor engaged with the manifold for determining fluid pressure in at least one of the first fluid flow path or the second fluid flow path.

Clause 78. The fluid flow control system according to any one of Clauses 55 to 77, further comprising a housing containing at least the valve housing, the valve stem, and the manifold.

Clause 79. The fluid flow control system according to Clause 78, further comprising a connector engaged with the housing and including: (a) a first connector fluid path extending through the connector and connected to the first manifold port, (b) a second connector fluid path extending through the connector and connected to the second manifold port, and (c) a third connector fluid path extending through the connector and connected to the third manifold port.

Clause 80. The fluid flow control system according to Clause 79, wherein the connector further includes a fourth connector fluid path extending through the connector and in fluid communication with the fluid inlet port.

Clause 81. The fluid flow control system according to Clause 80, further comprising a first pump located in a fluid path between the connector and the fluid inlet port.

Clause 82. The fluid flow control system according to Clause 81, further comprising a second pump located in the fluid path between the connector and the fluid inlet port.

Clause 83. The fluid flow control system according to Clause 82, wherein an outlet of the first pump is in fluid communication with an inlet of the second pump, and wherein an outlet of the second pump is in fluid communication with the fluid inlet port.

Clause 84. The fluid flow control system according to any one of Clauses 80 to 83, wherein the fourth connector fluid path is in fluid communication with an external environment to intake external fluid from the external environment.

Clause 85. The fluid flow control system according to Clause 84, further comprising a filter to filter the external fluid before the external fluid enters the fourth connector fluid path.

Clause 86. A fluid flow control system for an article of footwear, comprising:
   a manifold including: (a) a fluid inlet path that extends through the manifold to a fluid inlet port, (b) a first fluid flow path that extends through the manifold to a first manifold port, (c) a second fluid flow path that extends through the manifold to a second manifold port, and (d) a third fluid flow path that extends through the manifold to a third manifold port;

a valve housing in fluid communication with the manifold, wherein the valve housing includes a fluid intake path in fluid communication with the fluid inlet path of the manifold; and a valve stem rotatably mounted in the valve housing, wherein the valve stem includes a first end, a second end, and a perimeter wall extending between the first end and the second end, wherein the first end, the second end, and the perimeter wall define an internal chamber of the valve stem, and wherein the fluid intake path of the valve housing is in fluid communication with the internal chamber of the valve stem, wherein rotation of the valve stem to a plurality of rotational positions selectively places the fluid flow control system in a plurality of operational states including the following:

(a) a first operational state at a first rotational position of the valve stem in which fluid introduced into the internal chamber through the fluid intake path passes through a first through hole of the perimeter wall and into the first fluid flow path, (b) a second operational state at a second rotational position of the valve stem in which fluid introduced into the internal chamber through the fluid intake path passes through a second through hole of the perimeter wall and into the second fluid flow path, (c) a third operational state at a third rotational position of the valve stem in which fluid passes through the second fluid flow path, through a third through hole of the perimeter wall, through the internal chamber, through a fourth through hole of the perimeter wall, and into the first fluid flow path, (d) a fourth operational state at a fourth rotational position of the valve stem in which fluid passes through the third fluid flow path, through a fifth through hole of the perimeter wall, through the internal chamber, through a sixth through hole of the perimeter wall, and into the first fluid flow path, (e) a fifth operational state at a fifth rotational position of the valve stem in which fluid passes through the third fluid flow path, through a seventh through hole of the perimeter wall, through the internal chamber, through an eighth sixth through hole of the perimeter wall, and into the second fluid flow path, and (f) a sixth operational state at a sixth rotational position of the valve stem in which fluid introduced into the internal chamber through the fluid intake path passes through a ninth through hole of the perimeter wall and into the third fluid flow path.

Clause 87. The fluid flow control system according to Clause 86, wherein the fluid inlet port, the first manifold port, the second manifold port, and the third manifold port align along an exterior side of the manifold.

Clause 88. The fluid flow control system according to Clause 86 or 87, wherein the fluid intake path introduces fluid to the internal chamber at the second end of the valve stem.

Clause 89. The fluid flow control system according to any one of Clauses 86 to 88, further comprising a sealing connector engaging the manifold and the valve housing.

Clause 90. The fluid flow control system according to Clause 89, wherein the sealing connector includes a seal block body having a first sealed channel extending from the perimeter wall to the first fluid flow path, a second sealed channel extending from the perimeter wall to the second fluid flow path, and a third sealed channel extending from the perimeter wall to the third fluid flow path.

Clause 91. The fluid flow control system according to Clause 90, wherein the first sealed channel, the second sealed channel, and the third sealed channel extend in parallel directions through the seal block body.

Clause 92. The fluid flow control system according to Clause 90 or 91, wherein axial directions of the first sealed channel, the second sealed channel, and the third sealed channel are aligned in the seal block body.

Clause 93. The fluid flow control system according to any one of Clauses 90 to 92, wherein an outer surface of the seal block body includes a first opening that opens to the first sealed channel, a second opening that opens to the second sealed channel, and a third opening that opens to the third sealed channel, and wherein at each of the first rotational position, the second rotational position, the third rotational position, the fourth rotational position, the fifth rotational position, and the sixth rotational position, an extent of rotational alignment of the first opening, the second opening, and/or the third opening of the seal block body with respect to at least one of the through holes in the perimeter wall of the valve stem is adjustable to allow control over a rate of fluid flow through the sealing connector.

Clause 94. The fluid flow control system according to Clause 89, wherein the sealing connector includes a first opening that opens to a first sealed channel, and wherein in at least one of the plurality of operational states, an extent of alignment of the first opening with one of the through holes in the perimeter wall of the valve stem is adjustable to allow control over a rate of fluid flow through the sealing connector.

Clause 95. The fluid flow control system according to any one of Clauses 86 to 94, further comprising a rotational drive system engaged at the first end of the valve stem, wherein the rotational drive system moves the valve stem at least to the plurality of rotational positions.

Clause 96. The fluid flow control system according to Clause 95, wherein the rotational drive system includes a motor.

Clause 97. The fluid flow control system according to Clause 96, wherein the rotational drive system further includes a transmission operatively coupled between an output of the motor and the first end of the valve stem.

Clause 98. The fluid flow control system according to any one of Clauses 95 to 97, further comprising a power source for powering the rotational drive system.

Clause 99. The fluid flow control system according to Clause 98, wherein the power source includes a battery.

Clause 100. The fluid flow control system according to any one of Clauses 86 to 99, further comprising a sensor for determining a rotational position of the valve stem.

Clause 101. The fluid flow control system according to Clause 100, wherein the sensor includes a magnetic encoder.

Clause 102. The fluid flow control system according to any one of Clauses 86 to 101, further comprising a first pressure sensor engaged with the manifold for determining fluid pressure in at least one of the first fluid flow path, the second fluid flow path, or the third fluid flow path.

Clause 103. The fluid flow control system according to Clause 102, wherein the first pressure sensor is provided to determine fluid pressure in the third fluid flow path, and wherein the fluid flow control system further comprises a second pressure sensor engaged with the manifold for determining fluid pressure in at least one of the first fluid flow path or the second fluid flow path.

Clause 104. The fluid flow control system according to any one of Clauses 86 to 103, further comprising a housing containing at least the manifold, the valve housing, and the valve stem.

Clause 105. The fluid flow control system according to Clause 104, further comprising a connector engaged with the housing and including: (a) a first connector fluid path extending through the connector and connected to the first manifold port, (b) a second connector fluid path extending through the connector and connected to the second manifold port, and (c) a third connector fluid path extending through the connector and connected to the third manifold port.

Clause 106. The fluid flow control system according to Clause 105, wherein the connector further includes a fourth connector fluid path extending through the connector and in fluid communication with the fluid inlet port.

Clause 107. The fluid flow control system according to Clause 106, further comprising a first pump located in a fluid path between the connector and the fluid inlet port.

Clause 108. The fluid flow control system according to Clause 107, further comprising a second pump located in the fluid path between the connector and the fluid inlet port.

Clause 109. The fluid flow control system according to Clause 108, wherein an outlet of the first pump is in fluid communication with an inlet of the second pump, and wherein an outlet of the second pump is in fluid communication with the fluid inlet port.

Clause 110. The fluid flow control system according to any one of Clauses 106 to 109, wherein the fourth connector fluid path is in fluid communication with an external environment to intake external fluid from the external environment.

Clause 111. The fluid flow control system according to Clause 110, further comprising a filter to filter the external fluid before the external fluid enters the fourth connector fluid path.

Clause 112. A foot support system, comprising:
a foot support bladder;
a fluid container; and
a fluid flow control system according to any of Clauses 55 to 111 for moving fluid into and out of the foot support bladder and into and out of the fluid container.

Clause 113. An article of footwear, comprising:
an upper;
a sole structure engaged with the upper; and
a foot support system according to Clause 112, wherein the foot support bladder is engaged with or formed as part of the sole structure.

Clause 114. A foot support system for an article of footwear, comprising:
a foot support bladder;
a fluid container;
a fluid supply;
a valve housing;
a valve stem movably mounted in the valve housing, wherein the valve stem includes a first end, a second end, and a perimeter wall extending between the first end and the second end, wherein the first end, the second end, and the perimeter wall define an internal chamber of the valve stem, and wherein the perimeter wall of the valve stem includes a plurality of through holes extending from the internal chamber to an exterior surface of the perimeter wall;
a fluid inlet port placing the fluid supply in fluid communication with the internal chamber; and
a manifold including: (a) a first manifold port in fluid communication with an external environment and opening into a first fluid flow path extending through the manifold, (b) a second manifold port in fluid communication with the foot support bladder and opening into a second fluid flow path extending through the manifold, and (c) a third manifold port in fluid communication with the fluid container and opening into a third fluid flow path extending through the manifold,
wherein movement of the valve stem to a plurality of positions selectively places the foot support system in a plurality of operational states by placing one or more of the plurality of through holes of the valve stem in fluid communication with the first fluid flow path, the second fluid flow path, or the third fluid flow path.

Clause 115. The foot support system according to Clause 114, wherein the plurality of operational states includes two or more of:
(a) a first operational state at a first position of the valve stem in which fluid moves from the fluid supply, through the fluid inlet port, into the internal chamber, through the first fluid flow path, through the first manifold port, and to the external environment,
(b) a second operational state at a second position of the valve stem in which fluid moves from the fluid supply, through the fluid inlet port, into the internal chamber, through the second fluid flow path, through the second manifold port, and into the foot support bladder,
(c) a third operational state at a third position of the valve stem in which fluid moves from the foot support bladder, through the second manifold port, through the second fluid flow path, into the internal chamber, through the first fluid flow path, through the first manifold port, and into the external environment,
(d) a fourth operational state at a fourth position of the valve stem in which fluid moves from the fluid container, through the third manifold port, through the third fluid flow path, into the internal chamber, through the first fluid flow path, through the first manifold port, and to the external environment,
(e) a fifth operational state at a fifth position of the valve stem in which fluid moves from the fluid container, through the third manifold port, into the internal chamber, through the second fluid flow path, through the second manifold port, and into the foot support bladder, and
(f) a sixth operational state at a sixth position of the valve stem in which fluid moves from the fluid supply, through the fluid inlet port, into the internal chamber, through the third fluid flow path, through the third manifold port, and into the fluid container.

Clause 116. The foot support system according to Clause 114 or 115, wherein the first manifold port, the second manifold port, and the third manifold port align along an exterior side of the manifold.

Clause 117. The foot support system according to any one of Clauses 114 to 116, wherein the fluid inlet port introduces fluid to the internal chamber at the second end of the valve stem.

Clause 118. The foot support system according to any one of Clauses 114 to 117, further comprising a sealing connector engaging the manifold and the valve housing.

Clause 119. The foot support system according to Clause 118, wherein the sealing connector includes a seal block body having a first sealed channel extending from the perimeter wall to the first fluid flow path, a second sealed channel extending from the perimeter wall to the second fluid flow path, and a third sealed channel extending from the perimeter wall to the third fluid flow path.

Clause 120. The foot support system according to Clause 119, wherein the first sealed channel, the second sealed channel, and the third sealed channel extend in parallel directions through the seal block body and/or are aligned in the seal block body.

Clause 121. The foot support system according to Clause 119 or 120, wherein an outer surface of the seal block body includes a first opening that opens to the first sealed channel, a second opening that opens to the second sealed channel, and a third opening that opens to the third sealed channel, and wherein at each of the plurality of operational states, an extent of alignment of the first opening, the second opening, and/or the third opening with one or more of the plurality of through holes in the perimeter wall of the valve stem is adjustable to allow control over a rate of fluid flow through the sealing connector.

Clause 122. The foot support system according to Clause 118, wherein the sealing connector includes a first opening that opens to a first sealed channel, and wherein in at least one of the plurality of operational states, an extent of alignment of the first opening with one of the plurality of through holes in the perimeter wall of the valve stem is adjustable to allow control over a rate of fluid flow through the sealing connector.

Clause 123. The foot support system according to any one of Clauses 114 to 122, further comprising a drive system engaged at the first end of the valve stem, wherein the drive system moves the valve stem at least to the plurality of positions.

Clause 124. The foot support system according to Clause 123, wherein the drive system includes a motor.

Clause 125. The foot support system according to Clause 124, wherein the drive system further includes a transmission operatively coupled between an output of the motor and the first end of the valve stem.

Clause 126. The foot support system according to any one of Clauses 123 to 125, further comprising a power source for powering the drive system.

Clause 127. The foot support system according to Clause 126, wherein the power source includes a battery.

Clause 128. The foot support system according to any one of Clauses 114 to 127, further comprising a sensor for determining a position of the valve stem with respect to the valve housing.

Clause 129. The foot support system according to Clause 128, wherein the sensor includes a magnetic encoder.

Clause 130. The foot support system according to any one of Clauses 114 to 129, further comprising a first pressure sensor engaged with the manifold for determining fluid pressure in at least one of the first fluid flow path, the second fluid flow path, or the third fluid flow path.

Clause 131. The foot support system according to Clause 130, wherein the first pressure sensor is provided to determine fluid pressure in the third fluid flow path, and wherein the foot support system further comprises a second pressure sensor engaged with the manifold for determining fluid pressure in at least one of the first fluid flow path or the second fluid flow path.

Clause 132. The foot support system according to any one of Clauses 114 to 131, further comprising a housing containing at least the valve housing, the valve stem, and the manifold.

Clause 133. The foot support system according to Clause 132, further comprising a connector engaged with the housing and including: (a) a first connector fluid path extending through the connector and connected to the first manifold port, (b) a second connector fluid path extending through the connector and connected to the second manifold port, and (c) a third connector fluid path extending through the connector and connected to the third manifold port.

Clause 134. The foot support system according to any one of Clauses 114 to 133, further comprising a fluid supply line extending from the fluid supply to the fluid inlet port.

Clause 135. The foot support system according to any one of Clauses 114 to 134, further comprising a fluid line extending from the first manifold port to the external environment.

Clause 136. The foot support system according to any one of Clauses 114 to 135, further comprising a foot support fluid line extending from the foot support bladder to the second manifold port.

Clause 137. The foot support system according to any one of Clauses 114 to 136, further comprising a container fluid line extending from the fluid container to the third manifold port.

Clause 138. The foot support system according to any one of Clauses 114 to 137, wherein the fluid supply includes a first pump in fluid communication with the fluid inlet port.

Clause 139. The foot support system according to Clause 138, wherein the fluid supply includes a second pump in fluid communication with the fluid inlet port.

Clause 140. The foot support system according to Clause 138, wherein an outlet of the first pump is in fluid communication with an inlet of the second pump, and wherein an outlet of the second pump is in fluid communication with the fluid inlet port.

Clause 141. The foot support system according to any one of Clauses 138 to 140, wherein an inlet of the first pump is in fluid communication with the external environment.

Clause 142. The foot support system according to Clause 141, further comprising a filter to filter external fluid before the external fluid enters the first pump.

Clause 143. The foot support system according to any one of Clauses 138 to 142, further comprising an external fluid supply line supply fluid from the external environment to the first pump.

Clause 144. An article of footwear, comprising:
an upper; and
a foot support system according to any one of Clauses 114 to 143 engaged with the upper.

Clause 145. A foot support system, comprising:
a foot support bladder;
a fluid container;
a fluid supply;
a manifold including: (a) a fluid inlet port in fluid communication with the fluid supply and opening into a fluid inlet path extending through the manifold, (b) a first manifold port in fluid communication with an external environment and opening into a first fluid flow path extending through the manifold, (c) a second manifold port in fluid communication with the foot support bladder and opening into a second fluid flow path extending through the manifold, and (d) a third manifold port in fluid communication with the fluid container and opening into a third fluid flow path extending through the manifold;
a valve housing in fluid communication with the manifold, wherein the valve housing includes a fluid intake path in fluid communication with the fluid inlet path of the manifold; and
a valve stem rotatably mounted in the valve housing, wherein the valve stem includes a first end, a second end, and a perimeter wall extending between the first end and the second end, wherein the first end, the second end, and the perimeter wall define an internal chamber of the valve stem, and wherein the fluid intake path of the valve housing is in fluid communication with the internal chamber of the valve stem, wherein rotation of the valve stem to a plurality of rotational positions selectively places the foot support system in a plurality of operational states including the following:

(a) a first operational state at a first rotational position of the valve stem in which fluid moves from the fluid supply, through the fluid inlet port, into the internal chamber, through the first fluid flow path, through the first manifold port, and to the external environment, (b) a second operational state at a second rotational position of the valve stem in which fluid moves from the fluid supply, through the fluid inlet port, into the internal chamber, through the second fluid flow path, through the second manifold port, and into the foot support bladder, (c) a third operational state at a third rotational position of the valve stem in which fluid moves from the foot support bladder, through the second manifold port, through the second fluid flow path, into the internal chamber, through the first fluid flow path, through the first manifold port, and to the external environment, (d) a fourth operational state at a fourth rotational position of the valve stem in which fluid moves from the fluid container, through the third manifold port, through the third fluid flow path, into the internal chamber, through the first fluid flow path, through the first manifold port, and to the external environment, (e) a fifth operational state at a fifth rotational position of the valve stem in which fluid moves from the fluid container, through the third manifold port, into the internal chamber, through the second fluid flow path, through the second manifold port, and into the foot support bladder, and (f) a sixth operational state at a sixth rotational position of the valve stem in which fluid moves from the fluid supply, through the fluid inlet port, into the internal chamber, through the third fluid flow path, through the third manifold port, and into the fluid container.

Clause 146. The foot support system according to Clause 145, wherein the fluid container includes a fluid filled bladder.

Clause 147. The foot support system according to Clause 145 or 146, wherein the fluid supply includes a first pump in fluid communication with the fluid inlet port.

Clause 148. The foot support system according to Clause 147, wherein the fluid supply includes a second pump in fluid communication with the fluid inlet port.

Clause 149. The foot support system according to Clause 148, wherein an outlet of the first pump is in fluid communication with an inlet of the second pump, and wherein an outlet of the second pump is in fluid communication with the fluid inlet port.

Clause 150. The foot support system according to any one of Clauses 147 to 149, wherein an inlet of the first pump is in fluid communication with the external environment.

Clause 151. The foot support system according to Clause 150, further comprising a filter to filter external fluid before the external fluid enters the first pump.

Clause 152. The foot support system according to any one of Clauses 147 to 149, further comprising an external fluid supply line supplying fluid from the external environment to the first pump.

Clause 153. The foot support system according to any one of Clauses 145 to 152, wherein the fluid inlet port, the first manifold port, the second manifold port, and the third manifold port align along an exterior side of the manifold.

Clause 154. The foot support system according to any one of Clauses 145 to 153, wherein the fluid intake path introduces fluid to the internal chamber at the second end of the valve stem.

Clause 155. The foot support system according to any one of Clauses 145 to 154, further comprising a sealing connector engaging the manifold and the valve housing.

Clause 156. The foot support system according to Clause 155, wherein the sealing connector includes a seal block body having a first sealed channel extending from the perimeter wall to the first fluid flow path, a second sealed channel extending from the perimeter wall to the second fluid flow path, and a third sealed channel extending from the perimeter wall to the third fluid flow path.

Clause 157. The foot support system according to Clause 156, wherein the first sealed channel, the second sealed channel, and the third sealed channel extend in parallel directions through the seal block body and/or are aligned in the seal block body.

Clause 158. The foot support system according to Clause 156 or 157, wherein an outer surface of the seal block body includes a first opening that opens to the first sealed channel, a second opening that opens to the second sealed channel, and a third opening that opens to the third sealed channel, and wherein at each of the first rotational position, the second rotational position, the third rotational position, the fourth rotational position, the fifth rotational position, and the sixth rotational position, an extent of rotational alignment of the first opening, the second opening, and/or the third opening of the seal block with respect to at least one through hole in the perimeter wall of the valve stem is adjustable to allow control over a rate of fluid flow through the sealing connector.

Clause 159. The foot support system according to Clause 155, wherein the sealing connector includes a first opening that opens to a first sealed channel, and wherein in at least one of the plurality of operational states, an extent of alignment of the first opening with a through holes in the perimeter wall of the valve stem is adjustable to allow control over a rate of fluid flow through the sealing connector.

Clause 160. The foot support system according to any one of Clauses 145 to 159, further comprising a rotational drive system engaged at the first end of the valve stem, wherein the rotational drive system moves the valve stem at least to the plurality of rotational positions.

Clause 161. The foot support system according to Clause 160, wherein the rotational drive system includes a motor.

Clause 162. The foot support system according to Clause 161, wherein the rotational drive system further includes a transmission operatively coupled between an output of the motor and the first end of the valve stem.

Clause 163. The foot support system according to any one of Clauses 160 to 162, further comprising a power source for powering the rotational drive system.

Clause 164. The foot support system according to Clause 163, wherein the power source includes a battery.

Clause 165. The foot support system according to any one of Clauses 145 to 164, further comprising a sensor for determining a rotational position of the valve stem.

Clause 166. The foot support system according to Clause 165, wherein the sensor includes a magnetic encoder.

Clause 167. The foot support system according to any one of Clauses 145 to 166, further comprising a first pressure sensor engaged with the manifold for determining fluid pressure in at least one of the first fluid flow path, the second fluid flow path, or the third fluid flow path.

Clause 168. The foot support system according to Clause 167, wherein the first pressure sensor is provided to determine fluid pressure in the third fluid flow path, and wherein the foot support system further comprises a second pressure sensor engaged with the manifold for determining fluid pressure in at least one of the first fluid flow path or the second fluid flow path.

Clause 169. The foot support system according to any one of Clauses 145 to 168, further comprising a housing containing at least the manifold, the valve housing, and the valve stem.

Clause 170. The foot support system according to Clause 169, further comprising a connector engaged with the housing and including: (a) a first connector fluid path extending through the connector and connected to the first manifold port, (b) a second connector fluid path extending through the connector and connected to the second manifold port, and (c) a third connector fluid path extending through the connector and connected to the third manifold port.

Clause 171. The foot support system according to any one of Clauses 145 to 170, further comprising a fluid supply line extending from the fluid supply to the fluid inlet port.

Clause 172. The foot support system according to any one of Clauses 145 to 171, further comprising a fluid line extending from the first manifold port to the external environment.

Clause 173. The foot support system according to any one of Clauses 145 to 172, further comprising a foot support fluid line extending from the foot support bladder to the second manifold port.

Clause 174. The foot support system according to any one of Clauses 145 to 173, further comprising a container fluid line extending from the fluid container to the third manifold port.

Clause 175. An article of footwear, comprising:
an upper; and
a foot support system according to any one of Clauses 145 to 174 engaged with the upper.

Clause 176. A fluid flow control system for an article of footwear, comprising:
a first solenoid including a first port and a second port and switchable between an open configuration and a closed configuration;
a second solenoid including a first port and a second port and switchable between an open configuration and a closed configuration;
a third solenoid including a first port and a second port and switchable between an open configuration and a closed configuration;
a fluid line in fluid communication with the first port of each of the first solenoid, the second solenoid, and the third solenoid; and
a manifold having: (a) a first manifold port in fluid communication with the second port of the first solenoid, (b) a second manifold port in fluid communication with the second port of the second solenoid, and (c) a third manifold port in fluid communication with the second port of the third solenoid,
wherein the first solenoid, the second solenoid, and the third solenoid are independently switchable between their open configuration and their closed configuration to selectively place the fluid flow control system in a plurality of operational states.

Clause 177. The fluid flow control system according to Clause 176, wherein the plurality of operational states includes two or more of:
(a) a first operational state in which the first solenoid is in the open configuration, the second solenoid is in the closed configuration, and the third solenoid is in the closed configuration to move fluid from the fluid line through the second port of the first solenoid and to the first manifold port,
(b) a second operational state in which the first solenoid is in the closed configuration, the second solenoid is in the open configuration, and the third solenoid is in the closed configuration to move fluid from the fluid line through the second port of the second solenoid and to the second manifold port,
(c) a third operational state in which the first solenoid is in the open configuration, the second solenoid is in the open configuration, and the third solenoid is in the closed configuration to move fluid from the second manifold port, through the second port of the second solenoid, through the fluid line, through the second port of the first solenoid, and to the first manifold port,
(d) a fourth operational state in which the first solenoid is in the open configuration, the second solenoid is in the closed configuration, and the third solenoid is in the open configuration to move fluid from the third manifold port, through the second port of the third solenoid, through the fluid line, through the second port of the first solenoid, and to the first manifold port,
(e) a fifth operational state in which the first solenoid is in the closed configuration, the second solenoid is in the open configuration, and the third solenoid is in the open configuration to move fluid from the third manifold port, through the second port of the third solenoid, through the fluid line, through the second port of the second solenoid, and to the second manifold port,
(f) a sixth operational state in which the first solenoid is in the closed configuration, the second solenoid is in the closed configuration, and the third solenoid is in the open configuration to move fluid from the fluid line through the second port of the third solenoid and to the third manifold port.

Clause 178. The fluid flow control system according to Clause 176 or 177, wherein the first solenoid is a normally open latching solenoid, the second solenoid is a normally closed latching solenoid, and the third solenoid is a normally closed latching solenoid.

Clause 179. The fluid flow control system according to any one of Clauses 176 to 178, wherein the first manifold port, the second manifold port, and the third manifold port align along an exterior side of the manifold.

Clause 180. The fluid flow control system according to any one of Clauses 176 to 179, wherein the manifold includes a fluid inlet port in fluid communication with the fluid line.

Clause 181. The fluid flow control system according to Clause 180, wherein the fluid inlet port, the first manifold port, the second manifold port, and the third manifold port align along an exterior side of the manifold.

Clause 182. The fluid flow control system according to any one of Clauses 176 to 181, further comprising a power source for switching the first solenoid, the second solenoid, and the third solenoid between their open configuration and their closed configuration.

Clause 183. The fluid flow control system according to Clause 182, wherein the power source includes a battery.

Clause 184. The fluid flow control system according to any one of Clauses 176 to 183, further comprising a connector engaged with the manifold and including: (a) a first connector fluid path extending through the connector and connected to the first manifold port, (b) a second connector fluid path extending through the connector and connected to the second manifold port, and (c) a third connector fluid path extending through the connector and connected to the third manifold port.

Clause 185. The fluid flow control system according to Clause 184, wherein the manifold includes a fluid inlet port in fluid communication with the fluid line, and wherein the connector further includes a fourth connector fluid path in fluid communication with the fluid inlet port.

Clause 186. The fluid flow control system according to Clause 185, further comprising a first pump located in a fluid path between the fourth connector fluid path and the fluid inlet port.

Clause 187. The fluid flow control system according to Clause 186, further comprising a second pump located in the fluid path between the fourth connector fluid path and the fluid inlet port.

Clause 188. The fluid flow control system according to Clause 187, wherein an outlet of the first pump is in fluid communication with an inlet of the second pump, and wherein an outlet of the second pump is in fluid communication with the fluid inlet port.

Clause 189. The fluid flow control system according to any one of Clauses 185 to 188, wherein the fourth connector fluid path is in fluid communication with an external environment to intake external fluid from the external environment.

Clause 190. The fluid flow control system according to Clause 189, further comprising a filter to filter the external fluid before the external fluid enters the fourth connector fluid path.

Clause 191. A fluid flow control system for an article of footwear, comprising:
- a manifold including: (a) a fluid inlet path that extends through the manifold to a fluid inlet port, (b) a first fluid flow path that extends through the manifold to a first manifold port, (c) a second fluid flow path that extends through the manifold to a second manifold port, and (d) a third fluid flow path that extends through the manifold to a third manifold port;
- a first solenoid including a first port and a second port and switchable between an open configuration and a closed configuration, wherein the second port of the first solenoid is in fluid communication with the first manifold port via the first fluid flow path;
- a second solenoid including a first port and a second port and switchable between an open configuration and a closed configuration, wherein the second port of the second solenoid is in fluid communication with the second manifold port via the second fluid flow path;
- a third solenoid including a first port and a second port and switchable between an open configuration and a closed configuration, wherein the second port of the third solenoid is in fluid communication with the third manifold port via the third fluid flow path; and
- a fluid line in fluid communication with the first port of each of the first solenoid, the second solenoid, and the third solenoid and in fluid communication with the fluid inlet port via the fluid inlet path, wherein the first solenoid, the second solenoid, and the third solenoid are independently switchable between their open configuration and their closed configuration to selectively place the fluid flow control system in a plurality of operational states including the following:
- (a) a first operational state in which the first solenoid is in the open configuration, the second solenoid is in the closed configuration, and the third solenoid is in the closed configuration to move fluid from the fluid inlet port, through the fluid line, through the second port of the first solenoid, and to the first manifold port,
- (b) a second operational state in which the first solenoid is in the closed configuration, the second solenoid is in the open configuration, and the third solenoid is in the closed configuration to move fluid from the fluid inlet port, through the fluid line, through the second port of the second solenoid, and to the second manifold port,
- (c) a third operational state in which the first solenoid is in the open configuration, the second solenoid is in the open configuration, and the third solenoid is in the closed configuration to move fluid from the second manifold port, through the second port of the second solenoid, through the fluid line, through the second port of the first solenoid, and to the first manifold port,
- (d) a fourth operational state in which the first solenoid is in the open configuration, the second solenoid is in the closed configuration, and the third solenoid is in the open configuration to move fluid from the third manifold port, through the second port of the third solenoid, through the fluid line, through the second port of the first solenoid, and to the first manifold port,
- (e) a fifth operational state in which the first solenoid is in the closed configuration, the second solenoid is in the open configuration, and the third solenoid is in the open configuration to move fluid from the third manifold port, through the second port of the third solenoid, through the fluid line, through the second port of the second solenoid, and to the second manifold port, and
- (f) a sixth operational state in which the first solenoid is in the closed configuration, the second solenoid is in the closed configuration, and the third solenoid is in the open configuration to move fluid from the fluid inlet port, through the fluid line, through the second port of the third solenoid, and to the third manifold port.

Clause 192. The fluid flow control system according to Clause 191, wherein the fluid inlet port, the first manifold port, the second manifold port, and the third manifold port align along an exterior side of the manifold.

Clause 193. The fluid flow control system according to Clause 191 or 192, wherein the first solenoid is a normally open latching solenoid, the second solenoid is a normally closed latching solenoid, and the third solenoid is a normally closed latching solenoid.

Clause 194. The fluid flow control system according to any one of Clauses 191 to 193, further comprising a power source for switching the first solenoid, the second solenoid, and the third solenoid between their open configuration and their closed configuration.

Clause 195. The fluid flow control system according to Clause 194, wherein the power source includes a battery.

Clause 196. The fluid flow control system according to any one of Clauses 191 to 195, further comprising a connector engaged with the manifold and including: (a) a first connector fluid path extending through the connector and connected to the first manifold port, (b) a second connector fluid path extending through the connector and connected to the second manifold port, (c) a third connector fluid path extending through the connector and connected to the third manifold port, and (d) a fourth connector fluid path extending through the connector and connected to the fluid inlet port.

Clause 197. The fluid flow control system according to Clause 196, further comprising a first pump located in a fluid path between the fourth connector fluid path and the fluid inlet port.

Clause 198. The fluid flow control system according to Clause 197, further comprising a second pump located in the fluid path between the fourth connector fluid path and the fluid inlet port.

Clause 199. The fluid flow control system according to Clause 198, wherein an outlet of the first pump is in fluid communication with an inlet of the second pump, and wherein an outlet of the second pump is in fluid communication with the fluid inlet port.

Clause 200. The fluid flow control system according to any one of Clauses 196 to 199, wherein the fourth connector fluid path is in fluid communication with an external environment to intake external fluid from the external environment.

Clause 201. The fluid flow control system according to Clause 200, further comprising a filter to filter the external fluid before the external fluid enters the fourth connector fluid path.

Clause 202. A foot support system, comprising:
a foot support bladder;
a fluid container; and
a fluid flow control system according to any of Clauses 176 to 201 for moving fluid into and out of the foot support bladder and into and out of the fluid container.

Clause 203. An article of footwear, comprising:
an upper;
a sole structure engaged with the upper; and
a foot support system according to Clause 202, wherein the foot support bladder is engaged with or formed as part of the sole structure.

Clause 204. A foot support system, comprising:
a foot support bladder;
a fluid container;
a fluid supply;
a first solenoid including a first port and a second port and switchable between an open configuration and a closed configuration;
a second solenoid including a first port and a second port and switchable between an open configuration and a closed configuration;
a third solenoid including a first port and a second port and switchable between an open configuration and a closed configuration;
a fluid line in fluid communication with the fluid supply and with the first port of each of the first solenoid, the second solenoid, and the third solenoid; and
a manifold having: (a) a first manifold port in fluid communication with the second port of the first solenoid and with an external environment, (b) a second manifold port in fluid communication with the second port of the second solenoid and with the foot support bladder, and (c) a third manifold port in fluid communication with the second port of the third solenoid and with the fluid container,
wherein the first solenoid, the second solenoid, and the third solenoid are independently switchable between their open configuration and their closed configuration to selectively place the foot support system in a plurality of operational states.

Clause 205. The foot support system according to Clause 204, wherein the plurality of operational states includes two or more of:
(a) a first operational state in which the first solenoid is in the open configuration, the second solenoid is in the closed configuration, and the third solenoid is in the closed configuration to move fluid from the fluid supply, into the fluid line, through the second port of the first solenoid, through the first manifold port, and to the external environment,
(b) a second operational state in which the first solenoid is in the closed configuration, the second solenoid is in the open configuration, and the third solenoid is in the closed configuration to move fluid from the fluid supply, into the fluid line, through the second port of the second solenoid, through the second manifold port, and into the foot support bladder,
(c) a third operational state in which the first solenoid is in the open configuration, the second solenoid is in the open configuration, and the third solenoid is in the closed configuration to move fluid from the foot support bladder, through the second manifold port, through the second port of the second solenoid, through the fluid line, through the second port of the first solenoid, through the first manifold port, and to the external environment,
(d) a fourth operational state in which the first solenoid is in the open configuration, the second solenoid is in the closed configuration, and the third solenoid is in the open configuration to move fluid from the fluid container, through the third manifold port, through the second port of the third solenoid, through the fluid line, through the second port of the first solenoid, through the first manifold port, and to the external environment,
(e) a fifth operational state in which the first solenoid is in the closed configuration, the second solenoid is in the open configuration, and the third solenoid is in the open configuration to move fluid from the fluid container, through the third manifold port, through the second port of the third solenoid, through the fluid line, through the second port of the second solenoid, through the second manifold port, and into the foot support bladder,
(f) a sixth operational state in which the first solenoid is in the closed configuration, the second solenoid is in the closed configuration, and the third solenoid is in the open configuration to move fluid from fluid supply, through the fluid line, through the second port of the third solenoid, through the third manifold port, and into the fluid container.

Clause 206. The foot support system according to Clause 204 or 205, wherein the first solenoid is a normally open latching solenoid, the second solenoid is a normally closed latching solenoid, and the third solenoid is a normally closed latching solenoid.

Clause 207. The foot support system according to any one of Clauses 204 to 206, wherein the first manifold port, the second manifold port, and the third manifold port align along an exterior side of the manifold.

Clause 208. The foot support system according to any one of Clauses 204 to 207, wherein the manifold includes a fluid inlet port in fluid communication with the fluid line and with the fluid supply.

Clause 209. The foot support system according to Clause 208, wherein the fluid inlet port, the first manifold port, the second manifold port, and the third manifold port align along an exterior side of the manifold.

Clause 210. The foot support system according to any one of Clauses 204 to 209, further comprising a power source for switching the first solenoid, the second solenoid, and the third solenoid between their open configuration and their closed configuration.

Clause 211. The foot support system according to Clause 210, wherein the power source includes a battery.

Clause 212. The foot support system according to any one of Clauses 204 to 211, wherein the fluid supply includes a first pump.

Clause 213. The foot support system according to Clause 212, wherein the fluid supply further includes a second pump.

Clause 214. The foot support system according to Clause 213, wherein an outlet of the first pump is in fluid communication with an inlet of the second pump, and wherein an outlet of the second pump is in fluid communication with the fluid line.

Clause 215. An article of footwear, comprising:
an upper; and
a foot support system according to any one of Clauses 204 to 214 engaged with the upper.

Clause 216. A foot support system, comprising:
a foot support bladder;
a fluid container;
a fluid supply;
a manifold including: (a) a fluid inlet port in fluid communication with the fluid supply and opening into a fluid inlet path extending through the manifold, (b) a first manifold port in fluid communication with an external environment and opening into a first fluid flow path extending through the manifold, (c) a second manifold port in fluid communication with the foot support bladder and opening into a second fluid flow path extending through the manifold, and (d) a third manifold port in fluid communication with the fluid container and opening into a third fluid flow path extending through the manifold; a first solenoid including a first port and a second port and switchable between an open configuration and a closed configuration, wherein the second port of the first solenoid is in fluid communication with the first manifold port via the first fluid flow path;
a second solenoid including a first port and a second port and switchable between an open configuration and a closed configuration, wherein the second port of the second solenoid is in fluid communication with the second manifold port via the second fluid flow path;
a third solenoid including a first port and a second port and switchable between an open configuration and a closed configuration, wherein the second port of the third solenoid is in fluid communication with the third manifold port via the third fluid flow path; and
a fluid line in fluid communication with the first port of each of the first solenoid, the second solenoid, and the third solenoid and in fluid communication with the fluid inlet port via the fluid inlet path,
wherein the first solenoid, the second solenoid, and the third solenoid are independently switchable between their open configuration and their closed configuration to selectively place the foot support system in a plurality of operational states including the following:
(a) a first operational state in which the first solenoid is in the open configuration, the second solenoid is in the closed configuration, and the third solenoid is in the closed configuration to move fluid from the fluid supply, through the fluid inlet port, through the fluid line, through the second port of the first solenoid, through the first manifold port, and to the external environment,
(b) a second operational state in which the first solenoid is in the closed configuration, the second solenoid is in the open configuration, and the third solenoid is in the closed configuration to move fluid from the fluid supply, through the fluid inlet port, through the fluid line, through the second port of the second solenoid, through the second manifold port, and into the foot support bladder,
(c) a third operational state in which the first solenoid is in the open configuration, the second solenoid is in the open configuration, and the third solenoid is in the closed configuration to move fluid from the foot support bladder, through the second manifold port, through the second port of the second solenoid, through the fluid line, through the second port of the first solenoid, through the first manifold port, and to the external environment,
(d) a fourth operational state in which the first solenoid is in the open configuration, the second solenoid is in the closed configuration, and the third solenoid is in the open configuration to move fluid from the fluid container, through the third manifold port, through the second port of the third solenoid, through the fluid line, through the second port of the first solenoid, through the first manifold port, and to the external environment,
(e) a fifth operational state in which the first solenoid is in the closed configuration, the second solenoid is in the open configuration, and the third solenoid is in the open configuration to move fluid from the fluid container, through the third manifold port, through the second port of the third solenoid, through the fluid line, through the second port of the second solenoid, through the second manifold port, and into the foot support bladder, and
(f) a sixth operational state in which the first solenoid is in the closed configuration, the second solenoid is in the closed configuration, and the third solenoid is in the open configuration to move fluid from the fluid supply, through the fluid inlet port, through the fluid line, through the second port of the third solenoid, through the third manifold port, and into the fluid container.

Clause 217. The foot support system according to Clause 216, wherein the fluid container includes a fluid filled bladder.

Clause 218. The foot support system according to Clause 216 or 217, wherein the fluid supply includes a first pump in fluid communication with the fluid inlet port.

Clause 219. The foot support system according to Clause 218, wherein the fluid supply includes a second pump in fluid communication with the fluid inlet port.

Clause 220. The foot support system according to Clause 219, wherein an outlet of the first pump is in fluid communication with an inlet of the second pump, and wherein an outlet of the second pump is in fluid communication with the fluid inlet port.

Clause 221. The foot support system according to any one of Clauses 218 to 220, wherein an inlet of the first pump is in fluid communication with the external environment.

Clause 222. The foot support system according to Clause 221, further comprising a filter to filter external fluid before the external fluid enters the first pump.

Clause 223. The foot support system according to any one of Clauses 218 to 222, further comprising a fluid supply line extending from the external environment to the first pump.

Clause 224. The foot support system according to any one of Clauses 216 to 223, wherein the fluid inlet port, the first manifold port, the second manifold port, and the third manifold port align along an exterior side of the manifold.

Clause 225. The foot support system according to any one of Clauses 216 to 224, further comprising a power source for switching the first solenoid, the second solenoid, and the third solenoid between their open configuration and their closed configuration.

Clause 226. The foot support system according to Clause 225, wherein the power source includes a battery.

Clause 227. The foot support system according to any one of Clauses 216 to 226, further comprising a fluid supply line extending from the fluid supply to the fluid inlet port.

Clause 228. The foot support system according to any one of Clauses 216 to 227, further comprising a fluid line extending from the first manifold port to the external environment.

Clause 229. The foot support system according to any one of Clauses 216 to 228, further comprising a foot support fluid line extending from the foot support bladder to the second manifold port.

Clause 230. The foot support system according to any one of Clauses 216 to 229, further comprising a container fluid line extending from the fluid container to the third manifold port.

Clause 231. An article of footwear, comprising:
an upper; and
a foot support system according to any one of Clauses 216 to 230 engaged with the upper.

Clause 232. A fluid flow control system for an article of footwear, comprising:
a first solenoid including a first port, a second port, and a third port;
a second solenoid including a first port and a second port;
a fluid line in fluid communication with the first port of each of the first solenoid and the second solenoid; and
a manifold having: (a) a first manifold port in fluid communication with the second port of the first solenoid, (b) a second manifold port in fluid communication with the third port of the first solenoid, and (c) a third manifold port in fluid communication with the second port of the second solenoid,
wherein the first solenoid is independently switchable to: (a) a first configuration in which fluid flows through the first solenoid between the first port and the second port and (b) a second configuration in which fluid flows through the first solenoid between the first port and the third port,
wherein the second solenoid is independently switchable between an open configuration and a closed configuration,
and wherein simultaneous selective placement of: (a) the first solenoid in one of the first configuration or the second configuration and (b) the second solenoid in one of the open configuration or the closed configuration selectively places the fluid flow control system in a plurality of operational states.

Clause 233. The fluid flow control system according to Clause 232, wherein the plurality of operational states includes two or more of:
(a) a first operational state in which the first solenoid is in first configuration and the second solenoid is in the closed configuration to move fluid from the fluid line through the first port of the first solenoid, through the second port of the first solenoid, and to the first manifold port,
(b) a second operational state in which the first solenoid is in the second configuration and the second solenoid is in the closed configuration to move fluid from the fluid line, through the first port of the first solenoid, through the third port of the first solenoid, and to the second manifold port,
(c) a third operational state in which the first solenoid is in the second configuration and the second solenoid is in the open configuration to move fluid from the second manifold port, through the third port of the first solenoid, through the first port of the first solenoid, through the fluid line, through the first port of the second solenoid, through the second port of the second solenoid, and to the third manifold port, and
(d) a fourth operational state in which the first solenoid is in the first configuration and the second solenoid is in the open configuration to move fluid from the third manifold port, through the second port of the second solenoid, through the first port of the second solenoid, through the fluid line, through the first port of the first solenoid, through the second port of the first solenoid, and to the first manifold port.

Clause 234. The fluid flow control system according to Clause 233, wherein the fluid flow control system is switchable to be selectively placed in each of the first operational state, the second operational state, the third operational state, and the fourth operational state.

Clause 235. The fluid flow control system according to Clause 232, further comprising: a third solenoid including a first port and a second port, wherein the fluid line is in fluid communication with the first port of the third solenoid, and the second port of the third solenoid is in fluid communication with a fourth manifold port, and wherein the third solenoid is independently switchable between an open configuration and a closed configuration.

Clause 236. The fluid flow control system according to Clause 235, wherein the plurality of operational states includes two or more of:
(a) a first operational state in which the first solenoid is in first configuration, the second solenoid is in the closed configuration, and the third solenoid is in the closed configuration to move fluid from the fluid line through the first port of the first solenoid, through the second port of the first solenoid, and to the first manifold port,
(b) a second operational state in which the first solenoid is in the second configuration, the second solenoid is in the closed configuration, and the third solenoid is in the closed configuration to move fluid from the fluid line, through the first port of the first solenoid, through the third port of the first solenoid, and to the second manifold port,
(c) a third operational state in which the first solenoid is in the second configuration, the second solenoid is in the open configuration, and the third solenoid is in the closed configuration to move fluid from the second manifold port, through the third port of the first solenoid, through the first port of the first solenoid, through the fluid line, through the first port of the second solenoid, through the second port of the second solenoid, and to the third manifold port,
(d) a fourth operational state in which the first solenoid is in the first configuration, the second solenoid is in the open configuration, and the third solenoid is in the closed configuration to move fluid from the third manifold port, through the second port of the second solenoid, through the first port of the second solenoid, through the fluid line, through the first port of the first solenoid, through the second port of the first solenoid, and to the first manifold port, (e) a fifth operational state in which the first solenoid is in the second configuration, the second solenoid is in the closed configuration, and the third solenoid is in the open configuration to move fluid from the second manifold port, through the third port of the first solenoid, through the first port of the first solenoid, through the fluid line, through the first port of the third solenoid, through the second port of the third solenoid, and to the fourth manifold port, and (f) a sixth operational state in which the first solenoid is in the first configuration, the second solenoid is in the closed configuration, and the third solenoid is in the open configuration to move fluid from the fourth manifold port, through the second port of the third solenoid, through the first port of the third solenoid, through the fluid line, through the first port of the first solenoid, through the second port of the first solenoid, and to the first manifold port.

Clause 237. The fluid flow control system according to Clause 236, wherein the fluid flow control system is switchable to be selectively placed in each of the first operational state, the second operational state, the third operational state, the fourth operational state, the fifth operational state, and the sixth operational state.

Clause 238. The fluid flow control system according to any one of Clauses 235 to 237, wherein the third solenoid is a normally closed non-latching solenoid.

Clause 239. The fluid flow control system according to any one of Clauses 232 to 238, wherein the first solenoid is a latching three port, two state solenoid and the second solenoid is a normally closed non-latching solenoid.

Clause 240. The fluid flow control system according to any one of Clauses 232 to 239, wherein the first manifold port, the second manifold port, and the third manifold port align along an exterior side of the manifold.

Clause 241. The fluid flow control system according to any one of Clauses 232 to 240, wherein the manifold includes a fluid inlet port in fluid communication with the fluid line.

Clause 242. The fluid flow control system according to Clause 241, wherein the fluid inlet port, the first manifold port, the second manifold port, and the third manifold port align along an exterior side of the manifold.

Clause 243. The fluid flow control system according to any one of Clauses 232 to 242, further comprising a power source for switching the first solenoid between the first configuration and the second configuration and for holding the second solenoid in the open configuration.

Clause 244. The fluid flow control system according to Clause 243, wherein the power source includes a battery.

Clause 245. The fluid flow control system according to any one of Clauses 232 to 244, further comprising a connector engaged with the manifold and including: (a) a first connector fluid path extending through the connector and connected to the first manifold port, (b) a second connector fluid path extending through the connector and connected to the second manifold port, and (c) a third connector fluid path extending through the connector and connected to the third manifold port.

Clause 246. The fluid flow control system according to Clause 245, wherein the manifold includes a fluid inlet port in fluid communication with the fluid line, and wherein the connector further includes a fourth connector fluid path in fluid communication with the fluid inlet port.

Clause 247. The fluid flow control system according to Clause 246, further comprising a first pump located in a fluid path between the fourth connector fluid path and the fluid inlet port.

Clause 248. The fluid flow control system according to Clause 247, further comprising a second pump located in the fluid path between the fourth connector fluid path and the fluid inlet port.

Clause 249. The fluid flow control system according to Clause 248, wherein an outlet of the first pump is in fluid communication with an inlet of the second pump, and wherein an outlet of the second pump is in fluid communication with the fluid inlet port.

Clause 250. The fluid flow control system according to any one of Clauses 246 to 249, wherein the fourth connector fluid path is in fluid communication with an external environment to intake external fluid from the external environment.

Clause 251. The fluid flow control system according to Clause 250, further comprising a filter to filter the external fluid before the external fluid enters the fourth connector fluid path.

Clause 252. A foot support system, comprising:
a foot support bladder;
a fluid container; and
a fluid flow control system according to any of Clauses 232 to 251 for moving fluid into and out of the foot support bladder and into and out of the fluid container.

Clause 253. An article of footwear, comprising:
an upper;
a sole structure engaged with the upper; and
a foot support system according to Clause 252, wherein the foot support bladder is engaged with or formed as part of the sole structure.

Clause 254. A foot support system, comprising:
a foot support bladder;
a fluid container;
a fluid supply;
a first solenoid including a first port, a second port, and a third port;
a second solenoid including a first port and a second port;
a fluid line in fluid communication with the first port of each of the first solenoid and the second solenoid; and
a manifold having: (a) a first manifold port in fluid communication with the second port of the first solenoid, (b) a second manifold port in fluid communication with the third port of the first solenoid, and (c) a third manifold port in fluid communication with the second port of the second solenoid,
wherein the first solenoid is independently switchable to: (a) a first configuration in which fluid flows through the first solenoid between the first port and the second port and (b) a second configuration in which fluid flows through the first solenoid between the first port and the third port,
wherein the second solenoid is independently switchable between an open configuration and a closed configuration,
and wherein simultaneous selective placement of: (a) the first solenoid in one of the first configuration or the second configuration and (b) the second solenoid in one of the open configuration or the closed configuration selectively places the foot support system in a plurality of operational states.

Clause 255. The foot support system according to Clause 254, wherein the plurality of operational states includes two or more of:

(a) a first operational state in which the first solenoid is in first configuration and the second solenoid is in the closed configuration to move fluid from the fluid supply, into the fluid line, through the first port of the first solenoid, through the second port of the first solenoid, to the first manifold port, and to an external environment, (b) a second operational state in which the first solenoid is in the second configuration and the second solenoid is in the closed configuration to move fluid from the fluid supply, into the fluid line, through the first port of the first solenoid, through the third port of the first solenoid, through the second manifold port, and into the fluid container, (c) a third operational state in which the first solenoid is in the second configuration and the second solenoid is in the open configuration to move fluid from the fluid container, through the second manifold port, through the third port of the first solenoid, through the first port of the first solenoid, through the fluid line, through the first port of the second solenoid, through the second port of the second solenoid, through the third manifold port, and into the foot support bladder, and (d) a fourth operational state in which the first solenoid is in the first configuration and the second solenoid is in the open configuration to move fluid from the foot support bladder, through the third manifold port, through the second port of the second solenoid, through the first port of the second solenoid, through the fluid line, through the first port of the first solenoid, through the second port of the first solenoid, to the first manifold port, and into the external environment.

Clause 256. The foot support system according to Clause 255, wherein the foot support system is switchable to be selectively placed in each of the first operational state, the second operational state, the third operational state, and the fourth operational state.

Clause 257. The foot support system according to Clause 254, further comprising:

a second foot support bladder; and a third solenoid including a first port and a second port, wherein the fluid line is in fluid communication with the first port of the third solenoid, and the second port of the third solenoid is in fluid communication with a fourth manifold port, and wherein the third solenoid is independently switchable between an open configuration and a closed configuration.

Clause 258. The foot support system according to Clause 257, wherein the plurality of operational states includes two or more of:

(a) a first operational state in which the first solenoid is in first configuration, the second solenoid is in the closed configuration, and the third solenoid is in the closed configuration to move fluid from the fluid supply into the fluid line, through the first port of the first solenoid, through the second port of the first solenoid, through the first manifold port, and to an external environment, (b) a second operational state in which the first solenoid is in the second configuration, the second solenoid is in the closed configuration, and the third solenoid is in the closed configuration to move fluid from the fluid supply, into the fluid line, through the first port of the first solenoid, through the third port of the first solenoid, through the second manifold port, and into the fluid container, (c) a third operational state in which the first solenoid is in the second configuration, the second solenoid is in the open configuration, and the third solenoid is in the closed configuration to move fluid from the fluid container, through the second manifold port, through the third port of the first solenoid, through the first port of the first solenoid, through the fluid line, through the first port of the second solenoid, through the second port of the second solenoid, through the third manifold port, and into the foot support bladder, (d) a fourth operational state in which the first solenoid is in the first configuration, the second solenoid is in the open configuration, and the third solenoid is in the closed configuration to move fluid from the foot support bladder, through the third manifold port, through the second port of the second solenoid, through the first port of the second solenoid, through the fluid line, through the first port of the first solenoid, through the second port of the first solenoid, through the first manifold port, and into the external environment, (e) a fifth operational state in which the first solenoid is in the second configuration, the second solenoid is in the closed configuration, and the third solenoid is in the open configuration to move fluid from the fluid container, through the second manifold port, through the third port of the first solenoid, through the first port of the first solenoid, through the fluid line, through the first port of the third solenoid, through the second port of the third solenoid, to the fourth manifold port, and into the second foot support bladder, and (f) a sixth operational state in which the first solenoid is in the first configuration, the second solenoid is in the closed configuration, and the third solenoid is in the open configuration to move fluid from the second foot support bladder, through the fourth manifold port, through the second port of the third solenoid, through the first port of the third solenoid, through the fluid line, through the first port of the first solenoid, through the second port of the first solenoid, to the first manifold port, and into the external environment.

Clause 259. The foot support system according to Clause 258, wherein the foot support system is switchable to be selectively placed in each of the first operational state, the second operational state, the third operational state, the fourth operational state, the fifth operational state, and the sixth operational state.

Clause 260. The foot support system according to any one of Clauses 257 to 259, wherein the third solenoid is a normally closed non-latching solenoid.

Clause 261. The foot support system according to any one of Clauses 254 to 260, wherein the first solenoid is a latching three port, two state solenoid and the second solenoid is a normally closed non-latching solenoid.

Clause 262. The foot support system according to any one of Clauses 254 to 261, wherein the first manifold port, the second manifold port, and the third manifold port align along an exterior side of the manifold.

Clause 263. The foot support system according to any one of Clauses 254 to 262, wherein the manifold includes a fluid inlet port in fluid communication with the fluid line and with the fluid supply.

Clause 264. The foot support system according to Clause 263, wherein the fluid inlet port, the first manifold port, the second manifold port, and the third manifold port align along an exterior side of the manifold.

Clause 265. The foot support system according to any one of Clauses 254 to 264, further comprising a power source for switching the first solenoid between the first configuration and the second configuration and for holding the second solenoid in the open configuration.

Clause 266. The foot support system according to Clause 265, wherein the power source includes a battery.

Clause 267. The foot support system according to any one of Clauses 254 to 266, wherein the fluid supply includes a first pump.

Clause 268. The foot support system according to Clause 267, wherein the fluid supply further includes a second pump.

Clause 269. The foot support system according to Clause 268, wherein an outlet of the first pump is in fluid communication with an inlet of the second pump, and wherein an outlet of the second pump is in fluid communication with the fluid line.

Clause 270. An article of footwear, comprising:
an upper; and
a foot support system according to any one of Clauses 254 to 269 engaged with the upper.

Clause 271. A button assembly, comprising:
a first button actuator;
an elastomer overmold material covering an actuator surface of the first button actuator, wherein the elastomer overmold material includes: (a) a first base portion having a first thickness and (b) a first groove portion adjacent the first button actuator, wherein the first groove portion has a second thickness, wherein the second thickness is less than the first thickness, and wherein the first base portion and the first groove portion are formed as a continuous layer of the elastomer overmold material.

Clause 272. The button assembly according to Clause 271, further comprising: a second button actuator, wherein the elastomer overmold material covers an actuator surface of the second button actuator, wherein the elastomer overmold material further includes: (a) a second base portion having a third thickness and (b) a second groove portion adjacent the second button actuator, wherein the second groove portion has a fourth thickness, wherein the fourth thickness is less than the third thickness, and wherein the second base portion and the second groove portion are formed as part of the continuous layer of the elastomer overmold material.

Clause 273. The button assembly according to Clause 272, wherein the first groove portion has a U-shape including two free ends, wherein the second groove portion has a U-shape including two free ends, and wherein the two free ends of the first groove portion face the two free ends of the second groove portion.

Clause 274. The button assembly according to Clause 272 or 273, wherein force applied to the actuator surface of the second button actuator through the overmold material stretches the elastomer overmold material forming the second groove portion.

Clause 275. The button assembly according to any one of Clauses 271 to 274, wherein force applied to the actuator surface of the first button actuator through the overmold material stretches the elastomer overmold material forming the first groove portion.

Clause 276. A button assembly, comprising:
a capacitive touch activator for unlocking the button assembly; and
a first physical switch button activator for receiving user input.

Clause 277. The button assembly according to Clause 276, further comprising a second physical switch button activator for receiving user input.

Clause 278. A fluid flow control system, comprising: (a) a first fluid-filled bladder, (b) a fluid source for supplying fluid to the first fluid-filled bladder, (c) a housing, (d) a first fluid flow path for moving fluid from the fluid source to the first fluid-filled bladder, wherein the first fluid flow path passes through the housing, and (e) a button assembly according to any one of Clauses 271 to 277 engaged or integrally formed with the housing, wherein user interaction with the first button actuator activates the fluid flow control system to change fluid pressure in the first fluid-filled bladder.

Clause 279. An article of footwear, comprising: an upper; a sole structure engaged with the upper; and a fluid flow control system according to Clause 278, wherein the first fluid-filled bladder is engaged with the sole structure, and wherein the housing is engaged with at least one of the upper and/or the sole structure.

Clause 280. A sole structure for an article of footwear, comprising: (a) a first fluid-filled bladder for supporting at least a portion of a plantar surface of a wearer's foot, (b) a fluid source for supplying fluid to the first fluid-filled bladder, (c) a housing, (d) a first fluid flow path for moving fluid from the fluid source to the first fluid-filled bladder, wherein the first fluid flow path passes through the housing, and (e) a button assembly according to any one of Clauses 271 to 277 engaged or integrally formed with the housing, wherein user interaction with the first button actuator activates the fluid flow control system to change fluid pressure in the first fluid-filled bladder.

Clause 281. A filtered fluid flow connector for an article of footwear, comprising:
a housing;
an incoming fluid inlet extending through the housing;
an incoming fluid outlet extending through the housing;
a filter for filtering incoming fluid before the incoming fluid reaches the incoming fluid outlet;
a pumped fluid inlet extending through the housing, a pumped fluid outlet extending through the housing, and a pumped fluid line within the housing and connecting the pumped fluid inlet and the pumped fluid outlet; and
a first foot support bladder port extending through the housing, a second foot support bladder port extending through the housing, and a foot support fluid line within the housing and connecting the first foot support bladder port and the second foot support bladder port.

Clause 282. The filtered fluid flow connector according to Clause 281, further comprising a first fluid container port extending through the housing, a second fluid container port extending through the housing, and a fluid container fluid line within the housing and connecting the first fluid container port and the second fluid container port.

Clause 283. The filtered fluid flow connector according to Clause 281 or 282, further comprising a fluid release port extending through the housing.

Clause 284. The filtered fluid flow connector according to any one of Clauses 281 to 283, wherein the filter includes a surface having an area of at least 50 mm$^2$ positioned to form or cover at least a portion of an exterior surface of the housing and to cover the incoming fluid inlet.

Clause 285. An article of footwear, comprising: an upper; a sole structure engaged with the upper, wherein the sole structure includes a first fluid-filled bladder in fluid communication with the first foot support bladder port; and a filtered fluid flow connector according to any one of Clauses 281 to 284, wherein the housing is engaged with at least one of the upper and/or the sole structure.

Clause 286. A fluid flow connector system for an article of footwear, comprising:
> a manifold having a first port;
> a connector having: (i) a first port in fluid communication with the first port of the manifold, (ii) a second port, and (iii) a first internal connector fluid line connecting the first port of the connector and the second port of the connector; and
> a first fluid line in fluid communication with the second port of the connector and in fluid communication with the first port of the manifold through the first internal connector fluid line.

Clause 287. The fluid flow connector system according to Clause 286, wherein the manifold has a second port, the connector has: (i) a third port in fluid communication with the second port of the manifold, (ii) a fourth port, and (iii) a second internal connector fluid line connecting the third port of the connector and the fourth port of the connector, and wherein the fluid flow connector system further comprises:
> a second fluid line in fluid communication with the fourth port of the connector and in fluid communication with the second port of the manifold through the second internal connector fluid line.

Clause 288. The fluid flow connector system according to Clause 287, wherein the manifold has a third port, the connector has: (i) a fifth port in fluid communication with the third port of the manifold, (ii) a sixth port, and (iii) a third internal connector fluid line connecting the fifth port of the connector and the sixth port of the connector; and wherein the fluid flow connector system further comprises:
> a third fluid line in fluid communication with the sixth port of the connector and in fluid communication with the third port of the manifold through the third internal connector fluid line.

Clause 289. The fluid flow connector system according to Clause 288, wherein the manifold has a fourth port and the connector has a seventh port in fluid communication with the fourth port of the manifold.

Clause 290. The fluid flow connector system according to any one of Clauses 286 to 289, further comprising: a sealing connector having individual chambers for engaging each port of the manifold with a corresponding port of the connector in a sealed manner.

Clause 291. The fluid flow connector system according to any one of Clauses 286 to 290, wherein at least one internal connector fluid line defines a bent or curved path.

Clause 292. The fluid flow connector system according to any one of Clauses 286 to 291, wherein at least one internal connector fluid line defines: (a) a first axial direction, (b) a second axial direction, and (c) a connecting portion joining the first axial direction and the second axial direction, and wherein the first axial direction and the second axial direction extend away from one another from the connecting portion at an angle of 70 degrees or less.

Clause 293. A fluid flow connector system for an article of footwear, comprising:
> a manifold having a first port, a second port, and a first internal manifold fluid line connecting the first port and the second port;
> a fluid transfer system in fluid communication with the first port of the manifold; and
> a first external fluid line in fluid communication with the second port of the manifold.

Clause 294. The fluid flow connector system according to Clause 293, wherein the manifold has a third port, a fourth port, and a second internal manifold fluid line connecting the third port and the fourth port, wherein the third port is in fluid communication with the fluid transfer system, and wherein the fluid flow connector system further includes:
> a second external fluid line in fluid communication with the fourth port of the manifold.

Clause 295. The fluid flow connector system according to Clause 294, wherein the manifold has a fifth port, a sixth port, and a third internal manifold fluid line connecting the fifth port and the sixth port, wherein the fifth port is in fluid communication with the fluid transfer system, and wherein the fluid flow connector system further includes:
> a third external fluid line in fluid communication with the sixth port of the manifold.

Clause 296. The fluid flow connector system according to Clause 295, wherein the manifold has a seventh port in fluid communication with a fourth external fluid line.

Clause 297. The fluid flow connector system according to Clause 295, wherein the manifold has a seventh port in fluid communication with the fluid transfer system.

Clause 298. An article of footwear, comprising: an upper; a sole structure engaged with the upper; and a fluid flow connector system according to any one of Clauses 286 to 297 engaged with at least one of the upper and/or the sole structure.

Clause 299. A method of making a sole structure for an article of footwear, comprising:
> engaging a first fluid line that extends from a first sole component with a first port of a connector, wherein the first port of the connector is in fluid communication with a second port of the connector by a first internal connector fluid line that extends through the connector;
> engaging the second port of the connector with a first manifold port of a fluid distributor;
> engaging the fluid distributor and the connector as a single connected component with at least one of the first sole component or a different sole component.

Clause 300. The method of Clause 299, further comprising:
> engaging a second fluid line that extends from a second sole component with a third port of the connector, wherein the third port of the connector is in fluid communication with a fourth port of the connector by a second internal connector fluid line that extends through the connector; and
> engaging the fourth port of the connector with a second manifold port of the fluid distributor,
> and wherein the single connected component engaged with at least one of the first sole component or the different sole component includes the second fluid line engaged with the third port of the connector.

Clause 301. The method of Clause 300, further comprising:
> engaging a third fluid line that extends from a third sole component with a fifth port of the connector, wherein the fifth port of the connector is in fluid communication with a sixth port of the connector by a third internal connector fluid line that extends through the connector; and
> engaging the sixth port of the connector with a third manifold port of the fluid distributor,
> and wherein the single connected component engaged with at least one of the first sole component or the different sole component includes the third fluid line engaged with the fifth port of the connector.

Clause 302. A method of making a sole structure for an article of footwear, comprising:

engaging a first fluid line that extends from a first sole component with a first port of a manifold of a fluid distributor, wherein the first port of the manifold is in fluid communication with a second port of the manifold by a first internal manifold fluid line that extends through the manifold; and engaging at least one of the first sole component or a different sole component with the fluid distributor having the first fluid line engaged with the first port of the manifold.

Clause 303. The method of Clause 302, further comprising: engaging a second fluid line that extends from a second sole component with a third port of the manifold, wherein the third port of the manifold is in fluid communication with a fourth port of the manifold by a second internal manifold fluid line that extends through the manifold, wherein the second fluid line is engaged with the third port of the manifold when the step of engaging the at least one of the first sole component or the different sole component with the fluid distributor occurs.

Clause 304. The method of Clause 303, further comprising: engaging a third fluid line that extends from a third sole component with a fifth port of the manifold, wherein the fifth port of the manifold is in fluid communication with a sixth port of the manifold by a third internal manifold fluid line that extends through the manifold, wherein the third fluid line is engaged with the fifth port of the manifold when the step of engaging the at least one of the first sole component or the different sole component with the fluid distributor occurs.

Clause 305. A sole structure made by the method of any one of Clause 299 to 304.

Clause 306. An article of footwear comprising: an upper; and a sole structure according to Clause 305 engaged with the upper.

Clause 307. A fluid transfer system for an article of footwear, comprising:
- a valve housing defining an interior chamber;
- a valve stem extending at least partially through the interior chamber, the valve stem having: (i) a first end operatively coupled with a motor to move the valve stem with respect to the valve housing, (ii) a second end opposite the first end, and (iii) a perimeter wall extending from the first end to the second end; and
- a position sensor for determining a position of the valve stem with respect to the valve housing or other component of the fluid transfer system, the position sensor including: (i) an encoder magnet movable with the valve stem, and (ii) an encoder sensor sensing changes in a magnetic field generated by the encoder magnet due to the position of the valve stem.

Clause 308. The fluid transfer system according to Clause 307, wherein the encoder magnet is engaged with the valve stem.

Clause 309. The fluid transfer system according to Clause 307 or 308, wherein the encoder sensor is engaged with the valve housing.

Clause 310. The fluid transfer system according to Clause 309, wherein the encoder sensor is engaged with the valve housing at a location closer to the second end of the valve stem than to the first end of the valve stem.

Clause 311. The fluid transfer system according to any one of Clauses 307 to 310, wherein the perimeter wall of the valve stem partially encloses an interior channel within the valve stem.

Clause 312. The fluid transfer system according to Clause 311, wherein the perimeter wall of the valve stem further includes a plurality of through holes extending from the interior channel to an outer surface of the valve stem.

Clause 313. The fluid transfer system according to Clause 312, wherein a fluid inlet to the interior channel of the valve stem is provided at the second end of the valve stem and the plurality of through holes form ports through which fluid moves into or out of the interior channel.

Clause 314. An article of footwear, comprising: an upper; a sole structure engaged with the upper and including a first fluid-filled bladder for supporting at least a portion of a plantar surface of a wearer's foot; and a fluid transfer system according to any one of Clauses 307 to 313 engaged with at least one of the upper and/or the sole structure.

Clause 315. A sole structure for an article of footwear, comprising: (a) a first fluid-filled bladder for supporting at least a portion of a plantar surface of a wearer's foot, (b) a fluid source for supplying fluid to the first fluid-filled bladder, and (c) a fluid transfer system according to any one of Clauses 307 to 313 providing fluid for the first fluid-filled bladder.

Clause 316. A transmission for a fluid transfer system in an article of footwear, comprising:
- a motor pinion;
- a first intermediate gear cluster including: (i) a first axial pin, (ii) a first gear having a first central axis coaxial with the first axial pin and engaging the motor pinion, the first gear having a first diameter, and (iii) a second gear having a second central axis coaxial with the first axial pin, the second gear having a second diameter different from the first diameter;
- a second intermediate gear cluster including: (i) a second axial pin, (ii) a third gear having a third central axis coaxial with the second axial pin and engaging the second gear, the third gear having a third diameter, and (iii) a fourth gear having a fourth central axis coaxial with the second axial pin, the fourth gear having a fourth diameter different from the third diameter;
- a third axial pin; and
- a fifth gear having a third central axis coaxial with the third axial pin and engaging the fourth gear, wherein the third central axis of the fifth gear is coaxial with a rotational axis of an output of the transmission.

Clause 317. A drive system for a fluid transfer system in an article of footwear, comprising:
- a motor including a drive shaft;
- a valve stem; and
- a three stage transmission operative coupled between the drive shaft and valve stem to rotate the valve stem in response to rotation of the drive shaft.

Clause 318. The drive system according to Clause 317, wherein the three stage transmission includes a transmission according to Clause 316.

Clause 319. An article of footwear, comprising: an upper; a sole structure engaged with the upper and including a first fluid-filled bladder for supporting at least a portion of a plantar surface of a wearer's foot; and a fluid transfer system for supplying fluid to the first fluid-filled bladder, wherein the fluid transfer system includes a transmission according to Clause 316 and/or a drive system according to any one of Clauses 317 or 318.

Clause 320. A method of changing fluid pressure in a component of an article of footwear, comprising:
- receiving input data indicating a target pressure for fluid pressure in a first footwear component, wherein the first footwear component is a foot support bladder or a fluid container;

moving fluid through a continuous fluid line that extends between a first port of a manifold or a sealing connector and a second port of the manifold or a sealing connector, wherein the first port is in fluid communication with the first footwear component, and wherein the second port is in fluid communication with a second footwear component or an external environment;

measuring fluid pressure in the continuous fluid line as fluid moves through the continuous fluid line using a first pressure sensor;

determining an adjusted fluid pressure based on the fluid pressure measured by the first pressure sensor during the measuring step; and stopping fluid flow through the continuous fluid line when the adjusted fluid pressure determined in the determining step is within a predetermined range of the target pressure.

Clause 321. The method according to Clause 320, wherein the first footwear component is the foot support bladder and the second port is in fluid communication with the external environment.

Clause 322. The method according to Clause 320, wherein the first footwear component is the foot support bladder and the second port is in fluid communication with the second footwear component.

Clause 323. The method according to Clause 322, wherein the second footwear component is a fluid container.

Clause 324. The method according to Clause 320, wherein the first footwear component is the fluid container and the second port is in fluid communication with the external environment.

Clause 325. The method according to Clause 320, wherein the first footwear component is the fluid container and the second port is in fluid communication with the second footwear component.

Clause 326. The method according to Clause 325, wherein the second footwear component is a foot support bladder.

Clause 327. The method according to any one of Clauses 320 to 326, wherein the adjusted fluid pressure estimates fluid pressure in the first footwear component.

Clause 328. The method according to any one of Clauses 320 to 327, wherein the adjusted fluid pressure corrects for flow rate dependent offset between the fluid pressure measured by the first pressure sensor during the measuring step and actual fluid pressure in the first footwear component.

Clause 329. A footwear system, comprising:
a first shoe having a first footwear component with pressure adjustment capability, a first microprocessor, and a first antenna in electronic communication with the first microprocessor;
a second shoe having a second footwear component with pressure adjustment capability, a second microprocessor, and a second antenna in electronic communication with the second microprocessor; and
a central communication source for transmitting data to at least one of the first antenna or the second antenna in response to input data directing a pressure change in at least one of the first footwear component or the second footwear component.

Clause 330. The footwear system according to Clause 329, wherein the central communication source is located in the first shoe, and the first shoe transmits data from the first antenna to the second antenna when the input data directs a pressure change in the second footwear component.

Clause 331. The footwear system according to Clause 329, wherein: (a) during a first time period, the central communication source is located in the first shoe and the first shoe transmits data from the first antenna to the second antenna when the input data directs a pressure change in the second footwear component, and (b) during a second time period, the central communication source is located in the second shoe and the second shoe transmits data from the second antenna to the first antenna when the input data directs a pressure change in the first footwear component.

Clause 332. The footwear system according to Clause 329, wherein the central communication source constitutes an external computing device not physically incorporated in either of the first shoe or the second shoe, and wherein the external computing device: (a) transmits data to the first antenna when the input data directs a pressure change in the first footwear component, and/or (b) transmits data to the second antenna when the input data directs a pressure change in the second footwear component.

Clause 333. The footwear system according to Clause 329, wherein the central communication source constitutes an external computing device not physically incorporated in either of the first shoe or the second shoe, wherein the external computing device transmits data to the first antenna when the input data directs a pressure change in the first footwear component or the second footwear component, and wherein the first antenna transmits data to the second antenna when the input data directs a pressure change in the second footwear component.

Clause 334. The footwear system according to Clause 329, wherein communication of the input data directing the pressure change is switchable between at least three communication configurations as follows: (a) a first communication configuration when an external computing device is in electronic communication with at least one of the first shoe or the second shoe, wherein the external computing device acts as the central communication source and each of the first shoe and the second shoe act as peripheral communication devices receiving pressure change input from the external computing device, (b) a second communication configuration when no external computing device is in electronic communication with the first shoe or the second shoe, wherein the first shoe acts as the central communication source and the second shoe acts as a peripheral communication device receiving pressure change input from the first shoe, and (c) a third communication configuration when no external computing device is in electronic communication with the first shoe or the second shoe, wherein the second shoe acts as the central communication source and the first shoe acts as a peripheral communication device receiving pressure change input from the second shoe.

Clause 335. The footwear system according to any one of Clauses 329 to 334, wherein the central communication device is further in electronic communication with at least one additional electronically adjustable component.

Clause 336. The footwear system according to Clause 335, wherein the additional electronically adjustable component includes at least one of: an apparel based adjustable component on an article of apparel separate from the first shoe and the second shoe, a motorized apparel component, a motorized lacing system for tightening or loosening lacing systems on at least one of the first shoe or the second shoe, a motorized shoe securing system for at least one of the first shoe or the second shoe, a motorized fluid containing sports bra, and a motorized fluid containing compression sleeve.

Clause 337. A sealed connection, comprising:
a rotatable valve stem having a peripheral wall including a first fluid port extending through it;
a manifold including a first manifold port; and a sealing connector including: (a) a first connector port in direct contact with the peripheral wall, (b) a second connector port connected to the first manifold port, and (c) a first connector fluid path extending between the first connector port and the second connector port, wherein rotation of the rotatable valve stem to a first position at least partially aligns the first fluid port of the rotatable valve stem with the first connector port to place the first fluid port of the rotatable valve stem in fluid communication with the first manifold port through the first connector fluid path.

Clause 338. The sealed connection according to Clause 337, wherein the peripheral wall of the rotatable valve stem further includes a second fluid port extending through it, the manifold further includes a second manifold port, and the sealing connector further includes: (a) a third connector port in direct contact with the peripheral wall, (b) a fourth connector port connected to the second manifold port, and (c) a second connector fluid path extending between the third connector port and the fourth connector port, wherein rotation of the rotatable valve stem to a second position at least partially aligns the second fluid port of the rotatable valve stem with the third connector port to place the second fluid port of the rotatable valve stem in fluid communication with the second manifold port through the second connector fluid path.

Clause 339. The sealed connection according to Clause 338, wherein the peripheral wall of the rotatable valve stem further includes a third fluid port extending through it, the manifold further includes a third manifold port, and the sealing connector further includes: (a) a fifth connector port in direct contact with the peripheral wall, (b) a sixth connector port connected to the third manifold port, and (c) a third connector fluid path extending between the fifth connector port and the sixth connector port, wherein rotation of the rotatable valve stem to a third position at least partially aligns the third fluid port of the rotatable valve stem with the fifth connector port to place the third fluid port of the rotatable valve stem in fluid communication with the third manifold port through the third connector fluid path.

Clause 340. The sealed connection according to Clause 339, wherein the peripheral wall of the rotatable valve stem further includes a fourth fluid port extending through it, the manifold further includes a fourth manifold port, and the sealing connector further includes: (a) a seventh connector port in direct contact with the peripheral wall, (b) an eighth connector port connected to the fourth manifold port, and (c) a fourth connector fluid path extending between the seventh connector port and the eighth connector port, wherein rotation of the rotatable valve stem to a fourth position at least partially aligns the fourth fluid port of the rotatable valve stem with the seventh connector port to place the fourth fluid port of the rotatable valve stem in fluid communication with the fourth manifold port through the fourth connector fluid path.

Clause 341. The sealed connection according to Clause 337, wherein the peripheral wall of the rotatable valve stem further includes a second fluid port extending through it, the manifold further includes a second manifold port, and the sealing connector further includes: (a) a third connector port in direct contact with the peripheral wall, (b) a fourth connector port connected to the second manifold port, and (c) a second connector fluid path extending between the third connector port and the fourth connector port, wherein rotation of the rotatable valve stem to the first position at least partially aligns the second fluid port of the rotatable valve stem with the third connector port to place the second fluid port of the rotatable valve stem in fluid communication with the second manifold port through the second connector fluid path.

Clause 342. The sealed connection according to any one of Clauses 337 to 341, wherein any one or more of the connector ports in direct contact with the peripheral wall includes a curved outer surface shaped to correspond to a curvature of an outer surface of the peripheral wall and/or to seal that port with the peripheral wall.

Clause 343. An article of footwear, comprising: an upper; a sole structure engaged with the upper and including a first fluid-filled bladder for supporting at least a portion of a plantar surface of a wearer's foot; and a fluid transfer system engaged with at least one of the upper and/or the sole structure, wherein the fluid transfer system includes a sealed connection according to any one of Clauses 337 to 342.

Clause 344. A fluid flow control system for an article of footwear, comprising:
 a fluid distributor;
 a manifold including: (i) a manifold body, (ii) a first manifold fluid path defined through the manifold body and extending from a first manifold port that is in fluid communication with the fluid distributor to a second manifold port that is in fluid communication with a first footwear component, (iii) a first pressure sensor mount defined in the manifold body or extending from the manifold body, and (iv) an first open channel extending between the first pressure sensor mount and the first manifold fluid path; and
 a first pressure sensor mounted at the first pressure sensor mount in a fluid tight manner.

Clause 345. The fluid flow control system according to Clause 344, wherein the manifold further includes: (i) a second manifold fluid path defined through the manifold body and extending from a third manifold port that is in fluid communication with the fluid distributor to a fourth manifold port that is in fluid communication with a second footwear component, (ii) a second pressure sensor mount defined in the manifold body or extending from the manifold body, and (iii) a second open channel extending between the second pressure sensor mount and the second manifold fluid path, and wherein the fluid flow control system further comprises:
 a second pressure sensor mounted at the second pressure sensor mount in a fluid tight manner.

Clause 346. The fluid flow control system according to Clause 345, wherein the second pressure sensor mount includes a recess for receiving the second pressure sensor that extends into the manifold body in a direction substantially perpendicular to a fluid flow direction through the second manifold fluid path at the second open channel's location.

Clause 347. The fluid flow control system according to any one of Clauses 344 to 346, wherein the first pressure sensor mount includes a recess for receiving the first pressure sensor that extends into the manifold body in a direction substantially perpendicular to a fluid flow direction through the first manifold fluid path at the first open channel's location.

Clause 348. A fluid flow control system for an article of footwear, comprising:
 a fluid distributor;
 a manifold including a first manifold port;
 a sealing connector including: (i) a connector body, (ii) a first connector fluid path defined through the connector body and extending from a first connector port that is in fluid communication with the fluid distributor to a second connector port that is in fluid communication with the first manifold port, (iii) a first pressure sensor mount defined in the connector body or extending from the connector body, and (iv) an first open channel extending between the first pressure sensor mount and the first connector fluid path; and a first pressure sensor mounted at the first pressure sensor mount in a fluid tight manner.

Clause 349. The fluid flow control system according to Clause 348, wherein the manifold includes a second manifold port, wherein the sealing connector further includes: (i) a second connector fluid path defined through the connector body and extending from a third connector port that is in fluid communication with the fluid distributor to a fourth connector port that is in fluid communication with the second manifold port, (ii) a second pressure sensor mount defined in the connector body or extending from the connector body, and (iii) a second open channel extending between the second pressure sensor mount and the second connector fluid path, and wherein the fluid flow control system further comprises:

a second pressure sensor mounted at the second pressure sensor mount in a fluid tight manner.

Clause 350. The fluid flow control system according to Clause 349, wherein the second pressure sensor mount includes a raised tube extending away from a base portion of the connector body.

Clause 351. The fluid flow control system according to Clause 349, wherein the second pressure sensor mount includes a recess that extends into the connector body.

Clause 352. The fluid flow control system according to any one of Clauses 348 to 351, wherein the first pressure sensor mount includes a raised tube extending away from a base portion of the connector body.

Clause 353. The fluid flow control system according to any one of Clauses 348 to 351, wherein the first pressure sensor mount includes a recess that extends into the connector body.

Clause 354. The fluid flow control system according to any one of Clauses 348 to 353, wherein at least one individual connector fluid path defined through the connector body is formed by a first connector body component forming a first portion of said individual fluid path and a second connector body component forming a second portion of said individual fluid path.

Clause 355. An article of footwear, comprising: an upper; a sole structure engaged with the upper and including a first fluid-filled bladder for supporting at least a portion of a plantar surface of a wearer's foot; and a fluid flow control system according to any one of Clauses 344 to 354 engaged with at least one of the upper and/or the sole structure.

What is claimed is:

1. A footwear system, comprising:

a first shoe having a first footwear component with pressure adjustment capability, a first microprocessor, and a first antenna in electronic communication with the first microprocessor;

a first fluid distributor in fluid communication with the first footwear component, wherein the first fluid distributor moves fluid into and out of the first footwear component to provide the pressure adjustment capability for the first shoe;

a second shoe having a second footwear component with pressure adjustment capability, a second microprocessor, and a second antenna in electronic communication with the second microprocessor; and a central communication source for transmitting data to at least one of the first antenna or the second antenna in response to input data directing a pressure change in at least one of the first footwear component or the second footwear component, wherein the footwear system includes at least a first communication configuration in which the first shoe transmits data from the first antenna to the second antenna when the input data directs a pressure change in the second footwear component.

2. The footwear system according to claim 1, wherein the central communication source is located in the first shoe.

3. The footwear system according to claim 1, wherein the footwear system is switchable between the first communication configuration and a second communication configuration, wherein: (a) during a first time period, the footwear system is in the first communication configuration in which the central communication source is located in the first shoe and the first shoe transmits data from the first antenna to the second antenna when the input data directs a pressure change in the second footwear component, and (b) during a second time period, the footwear system is in the second communication configuration in which the central communication source is located in the second shoe and the second shoe transmits data from the second antenna to the first antenna when the input data directs a pressure change in the first footwear component.

4. The footwear system according to claim 1, wherein the footwear system is switchable between the first communication configuration and a second communication configuration, wherein in the second communication configuration, the central communication source constitutes an external computing device not physically incorporated in either of the first shoe or the second shoe, and wherein in the second communication configuration, the external computing device: (a) transmits data to the first antenna when the input data directs a pressure change in the first footwear component, and (b) transmits data to the second antenna when the input data directs a pressure change in the second footwear component.

5. The footwear system according to claim 1, wherein in the first communication configuration: (a) the central communication source constitutes an external computing device not physically incorporated in either of the first shoe or the second shoe, (b) the external computing device transmits data to the first antenna when the input data directs a pressure change in the first footwear component or the second footwear component, and (c) the first antenna transmits data to the second antenna when the input data directs a pressure change in the second footwear component.

6. The footwear system according to claim 1, wherein communication of the input data directing the pressure change is switchable between at least three communication configurations as follows: (a) the first communication configuration in which no external computing device is in electronic communication with the first shoe or the second shoe, wherein the first shoe acts as the central communication source and the second shoe acts as a peripheral communication device receiving pressure change input from the first shoe, (b) a second communication configuration in which an external computing device is in electronic communication with the first shoe and the second shoe, wherein the external computing device acts as the central communication source and each of the first shoe and the second shoe act as peripheral communication devices receiving pressure change input from the external computing device, and (c) a third communication configuration in which no external computing device is in electronic communication with the first shoe or the second shoe, wherein the second shoe acts as the central communication source and the first shoe acts as a peripheral communication device receiving pressure change input from the second shoe.

7. The footwear system according to claim 6, wherein the external computing device comprises a smartphone.

8. The footwear system according to claim 1, wherein the central communication source is further in electronic communication with at least one additional electronically adjustable component, and wherein the at least one additional electronically adjustable component includes an apparel based adjustable component on an article of apparel separate from the first shoe and the second shoe.

9. The footwear system according to claim 1, wherein the central communication source is further in electronic communication with at least one additional electronically adjustable component, and wherein the at least one additional electronically adjustable component includes at least one of: a motorized apparel component, a motorized fluid containing sports bra, or a motorized fluid containing compression sleeve.

10. The footwear system according to claim 1, wherein the central communication source is further in electronic communication with at least one additional electronically adjustable component, wherein the at least one additional electronically adjustable component includes a motorized lacing system for tightening or loosening lacing systems on at least one of the first shoe or the second shoe or a motorized shoe securing system for at least one of the first shoe or the second shoe.

11. The footwear system according to claim 1, wherein the first shoe includes a first foot presence sensor for determining whether a foot is present in the first shoe.

12. The footwear system according to claim 11, wherein detection of a foot presence in the first shoe by the first foot presence sensor places the first shoe in an awake mode.

13. The footwear system according to claim 1, further comprising:
a first housing mounted to the first shoe, wherein the first fluid distributor, the first microprocessor, and the first antenna are engaged with the first housing.

14. The footwear system according to claim 13, further comprising:
a second housing mounted to the second shoe, wherein the second microprocessor and the second antenna are engaged with the second housing; and
a second fluid distributor engaged with the second housing, wherein the second fluid distributor moves fluid to provide the pressure adjustment capability for the second shoe.

15. The footwear system according to claim 1, wherein the first footwear component with pressure adjustment capability comprises a first pressure adjustable foot support bladder included in a sole structure of the first shoe, and wherein the second footwear component with pressure adjustment capability comprises a second pressure adjustable foot support bladder included in a sole structure of the second shoe.

16. The footwear system according to claim 1, further comprising:
a first housing mounted to the first shoe, wherein the first fluid distributor, the first microprocessor, and the first antenna are engaged with the first housing, and wherein the first fluid distributor moves fluid to provide the pressure adjustment capability for the first shoe in response to input data received through a mobile electronic device.

17. The footwear system according to claim 16, further comprising:
a second housing mounted to the second shoe, wherein the second microprocessor and the second antenna are engaged with the second housing; and
a second fluid distributor engaged with the second housing, wherein the second fluid distributor moves fluid to provide the pressure adjustment capability for the second shoe in response to input data received through a mobile electronic device.

18. The footwear system according to claim 1, wherein the first footwear component with the pressure adjustment capability comprises a first pressure adjustable foot support bladder for supporting at least some portion of a plantar surface of a wearer's first foot, and wherein the first pressure adjustable foot support bladder is included in a sole structure of the first shoe, and
wherein the second footwear component with the pressure adjustment capability comprises a second pressure adjustable foot support bladder for supporting at least some portion of a plantar surface of a wearer's second foot, and wherein the second pressure adjustable foot support bladder is included in a sole structure of the second shoe.

19. A footwear system, comprising:
a first shoe having a first footwear component with pressure adjustment capability including a first pressure adjustable foot support bladder for supporting at least some portion of a plantar surface of a wearer's first foot, a first microprocessor, and a first antenna in electronic communication with the first microprocessor;
a second shoe having a second footwear component with pressure adjustment capability including a second pressure adjustable foot support bladder for supporting at least some portion of a plantar surface of a wearer's second foot, a second microprocessor, and a second antenna in electronic communication with the second microprocessor; and
a central communication source for transmitting data to at least one of the first antenna or the second antenna in response to input data directing any of: (i) an increase in foot support pressure for the first pressure adjustable foot support bladder, (ii) a decrease in the foot support pressure for the first pressure adjustable foot support bladder, (iii) an increase in foot support pressure for the second pressure adjustable foot support bladder, and (iv) a decrease in the foot support pressure for the second pressure adjustable foot support bladder, wherein the footwear system includes at least one communication configuration in which the first shoe transmits data from the first antenna to the second antenna when the input data directs a pressure change in the second footwear component.

* * * * *